US012761784B2

(12) United States Patent
Herz et al.

(10) Patent No.: US 12,761,784 B2
(45) Date of Patent: Oct. 13, 2026

(54) PORTABLE MULTIFUNCTION DEVICE WITH INTERFACE RECONFIGURATION MODE

(71) Applicant: Apple Inc., Cupertino, CA (US)

(72) Inventors: Scott M. Herz, San Jose, CA (US); Imran Chaudhri, San Francisco, CA (US); Gregory N. Christie, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 434 days.

(21) Appl. No.: 18/222,317

(22) Filed: Jul. 14, 2023

(65) Prior Publication Data

US 2023/0359349 A1 Nov. 9, 2023

Related U.S. Application Data

(63) Continuation of application No. 16/832,285, filed on Mar. 27, 2020, now abandoned, which is a (Continued)

(51) Int. Cl.

*G06F 3/048* (2013.01)
*G06F 3/01* (2006.01)

(Continued)

(52) U.S. Cl.

CPC .......... *G06F 3/04883* (2013.01); *G06F 3/017* (2013.01); *G06F 3/048* (2013.01);

(Continued)

(58) Field of Classification Search

CPC ...... G06F 3/04883; G06F 3/017; G06F 3/048; G06F 3/0481; G06F 3/04817;

(Continued)

(56) References Cited

U.S. PATENT DOCUMENTS 4,355,380 A 10/1982 Huguenin et al.
4,899,136 A 2/1990 Beard et al.

(Continued)

FOREIGN PATENT DOCUMENTS

AU 2006338183 A1 8/2007
AU 2012202140 A1 5/2012

(Continued)

OTHER PUBLICATIONS

Applicant-Initiated Interview Summary received for U.S. Appl. No. 17/950,972, mailed on Apr. 16, 2024, 4 pages.

(Continued)

*Primary Examiner* — K C Chen
(74) *Attorney, Agent, or Firm* — YHE Law LLP

(57) ABSTRACT

In one aspect of the invention, a computer-implemented method at a computing device with a touch screen display includes: displaying a first set of a first plurality of icons in a first area of the touch screen display, wherein the first plurality of icons includes a plurality of sets of icons that are separately displayed in the first area of the touch screen display; displaying a second plurality of icons in a second area on the touch screen display, wherein the second area is different from the first area; detecting a first finger gesture on the touch screen display; in response to detecting the first finger gesture, initiating a user interface reconfiguration process, and varying positions of one or more icons in the first set of the first plurality of icons about respective average positions.

26 Claims, 86 Drawing Sheets

Related U.S. Application Data continuation of application No. 15/426,836, filed on Feb. 7, 2017, now Pat. No. 10,628,028, which is a continuation of application No. 12/242,851, filed on Sep. 30, 2008, now Pat. No. 9,619,143.

(60) Provisional application No. 61/010,208, filed on Jan. 6, 2008.

(51) Int. Cl.

| | |
|---|---|
| ***G06F 3/0481*** | (2022.01) |
| ***G06F 3/04817*** | (2022.01) |
| ***G06F 3/0482*** | (2013.01) |
| ***G06F 3/0483*** | (2013.01) |
| ***G06F 3/0486*** | (2013.01) |
| ***G06F 3/0488*** | (2022.01) |
| ***G06F 3/04883*** | (2022.01) |
| ***G06F 3/04886*** | (2022.01) |
| ***G06F 9/54*** | (2006.01) |
| ***G06F 16/957*** | (2019.01) |
| *G06F 8/38* | (2018.01) |
| *G06F 9/451* | (2018.01) |
| *G06F 15/02* | (2006.01) |
| *G06Q 10/109* | (2023.01) |

(52) U.S. Cl.

CPC ........ *G06F 3/0481* (2013.01); *G06F 3/04817* (2013.01); *G06F 3/0482* (2013.01); *G06F 3/0483* (2013.01); *G06F 3/0486* (2013.01); *G06F 3/0488* (2013.01); *G06F 3/04886* (2013.01); *G06F 9/542* (2013.01); *G06F 16/9577* (2019.01); *G06F 8/38* (2013.01); *G06F 9/451* (2018.02); *G06F 15/0291* (2013.01); *G06F 2200/1637* (2013.01); *G06F 2203/04803* (2013.01); *G06Q 10/109* (2013.01)

(58) Field of Classification Search

CPC .... G06F 3/0482; G06F 3/0483; G06F 3/0486; G06F 3/0488; G06F 3/04886; G06F 9/542; G06F 16/9577; G06F 8/38; G06F 9/451; G06F 15/0291; G06F 2200/1637; G06F 2203/04803; G06Q 10/109

See application file for complete search history.

(56) References Cited

U.S. PATENT DOCUMENTS

| | | | | |
|---|---|---|---|---|
| 5,051,736 | A | | 9/1991 | Bennett et al. |
| 5,124,959 | A | | 6/1992 | Yamazaki et al. |
| 5,146,556 | A | | 9/1992 | Hullot et al. |
| 5,196,838 | A | | 3/1993 | Meier et al. |
| 5,237,679 | A | | 8/1993 | Wang et al. |
| 5,312,478 | A | | 5/1994 | Reed et al. |
| 5,452,414 | A | | 9/1995 | Rosendahl et al. |
| 5,491,778 | A | | 2/1996 | Gordon et al. |
| 5,497,454 | A | | 3/1996 | Bates et al. |
| 5,515,486 | A | | 5/1996 | Amro et al. |
| 5,544,295 | A | | 8/1996 | Capps |
| 5,546,529 | A | | 8/1996 | Bowers et al. |
| 5,572,238 | A | | 11/1996 | Krivacic |
| 5,598,524 | A | | 1/1997 | Johnston et al. |
| 5,610,653 | A | | 3/1997 | Abecassis |
| 5,612,719 | A | | 3/1997 | Beernink et al. |
| 5,621,878 | A | | 4/1997 | Owens et al. |
| 5,625,818 | A | | 4/1997 | Zarmer et al. |
| 5,642,490 | A | | 6/1997 | Morgan et al. |
| 5,644,739 | A | | 7/1997 | Moursund |
| 5,657,049 | A | | 8/1997 | Ludolph et al. |
| 5,671,381 | A | | 9/1997 | Strasnick et al. |
| 5,678,014 | A | | 10/1997 | Malamud et al. |
| 5,678,015 | A | | 10/1997 | Goh |
| 5,714,971 | A | * | 2/1998 | Shalit .................... G06F 3/0481 715/792 |
| 5,726,687 | A | | 3/1998 | Belfiore et al. |
| 5,736,974 | A | | 4/1998 | Selker |
| 5,740,389 | A | | 4/1998 | Li et al. |
| 5,745,096 | A | | 4/1998 | Ludolph et al. |
| 5,745,116 | A | | 4/1998 | Pisutha-Arnond |
| 5,745,718 | A | | 4/1998 | Cline et al. |
| 5,745,910 | A | | 4/1998 | Piersol et al. |
| 5,751,287 | A | | 5/1998 | Hahn et al. |
| 5,754,179 | A | | 5/1998 | Hocker et al. |
| 5,754,809 | A | | 5/1998 | Gandre |
| 5,757,371 | A | | 5/1998 | Oran et al. |
| 5,760,773 | A | | 6/1998 | Berman et al. |
| 5,774,119 | A | | 6/1998 | Alimpich et al. |
| 5,796,401 | A | | 8/1998 | Winer |
| 5,801,699 | A | | 9/1998 | Hocker et al. |
| 5,801,704 | A | | 9/1998 | Oohara et al. |
| 5,812,862 | A | | 9/1998 | Smith et al. |
| 5,825,349 | A | | 10/1998 | Meier et al. |
| 5,825,352 | A | | 10/1998 | Bisset et al. |
| 5,825,357 | A | | 10/1998 | Malamud et al. |
| 5,835,079 | A | | 11/1998 | Shieh |
| 5,835,094 | A | | 11/1998 | Ermel et al. |
| 5,838,326 | A | | 11/1998 | Card et al. |
| 5,861,885 | A | | 1/1999 | Strasnick et al. |
| 5,870,683 | A | | 2/1999 | Wells et al. |
| 5,870,734 | A | | 2/1999 | Kao |
| 5,877,765 | A | | 3/1999 | Dickman et al. |
| 5,877,775 | A | | 3/1999 | Theisen et al. |
| 5,880,733 | A | | 3/1999 | Horvitz et al. |
| 5,880,743 | A | | 3/1999 | Moran et al. |
| 5,900,876 | A | | 5/1999 | Yagita et al. |
| 5,914,716 | A | | 6/1999 | Rubin et al. |
| 5,914,717 | A | | 6/1999 | Kleewein et al. |
| 5,923,327 | A | | 7/1999 | Smith et al. |
| 5,923,908 | A | | 7/1999 | Schrock et al. |
| 5,934,707 | A | | 8/1999 | Johnson |
| 5,943,679 | A | | 8/1999 | Niles et al. |
| 5,956,025 | A | | 9/1999 | Goulden et al. |
| 5,963,204 | A | | 10/1999 | Ikeda et al. |
| 5,995,106 | A | | 11/1999 | Naughton et al. |
| 6,005,579 | A | | 12/1999 | Sugiyama et al. |
| 6,012,072 | A | | 1/2000 | Lucas et al. |
| 6,025,842 | A | | 2/2000 | Filetto et al. |
| 6,043,818 | A | | 3/2000 | Nakano et al. |
| 6,049,336 | A | | 4/2000 | Liu et al. |
| 6,054,989 | A | | 4/2000 | Robertson et al. |
| 6,069,626 | A | | 5/2000 | Cline et al. |
| 6,072,486 | A | | 6/2000 | Sheldon et al. |
| 6,073,036 | A | | 6/2000 | Heikkinen et al. |
| 6,088,032 | A | | 7/2000 | Mackinlay |
| 6,111,573 | A | | 8/2000 | Mccomb et al. |
| 6,121,969 | A | | 9/2000 | Jain et al. |
| 6,133,914 | A | | 10/2000 | Rogers et al. |
| 6,144,863 | A | | 11/2000 | Charron |
| 6,145,083 | A | | 11/2000 | Shaffer et al. |
| 6,166,738 | A | | 12/2000 | Robertson et al. |
| 6,177,936 | B1 | | 1/2001 | Cragun |
| 6,188,407 | B1 | | 2/2001 | Smith et al. |
| 6,195,094 | B1 | | 2/2001 | Celebiler |
| 6,199,082 | B1 | | 3/2001 | Ferrel et al. |
| 6,211,858 | B1 | | 4/2001 | Moon et al. |
| 6,222,465 | B1 | | 4/2001 | Kumar et al. |
| 6,229,542 | B1 | | 5/2001 | Miller |
| 6,243,080 | B1 | | 6/2001 | Molne |
| 6,253,218 | B1 | | 6/2001 | Aoki et al. |
| 6,256,008 | B1 | | 7/2001 | Sparks et al. |
| 6,262,732 | B1 | | 7/2001 | Coleman et al. |
| 6,262,735 | B1 | | 7/2001 | Eteläperä |
| 6,271,841 | B1 | | 8/2001 | Tsujimoto |
| 6,275,935 | B1 | | 8/2001 | Barlow et al. |
| 6,278,454 | B1 | | 8/2001 | Krishnan |
| 6,297,795 | B1 | | 10/2001 | Kato et al. |
| 6,313,853 | B1 | | 11/2001 | Lamontagne et al. |
| 6,313,855 | B1 | | 11/2001 | Shuping et al. |
| 6,317,140 | B1 | | 11/2001 | Livingston |
| 6,323,846 | B1 | | 11/2001 | Westerman et al. |

(56) References Cited

U.S. PATENT DOCUMENTS 6,326,970 B1 12/2001 Mott et al.
6,349,410 B1 2/2002 Lortz
6,353,451 B1 3/2002 Teibel et al.
6,359,615 B1 3/2002 Singh
6,377,698 B1 4/2002 Cumoli et al.
6,396,520 B1 5/2002 Ording
6,407,757 B1 6/2002 Ho et al.
6,411,283 B1 6/2002 Murphy
6,418,394 B1 7/2002 Puolakanaho et al.
6,433,801 B1 8/2002 Moon et al.
6,466,198 B1 10/2002 Feinstein
6,466,203 B2 10/2002 Van Ee
6,477,117 B1 11/2002 Narayanaswami et al.
6,486,895 B1 11/2002 Robertson et al.
6,489,975 B1 12/2002 Patil et al.
6,496,182 B1 12/2002 Wong et al.
6,496,206 B1 12/2002 Mernyk et al.
6,496,209 B2 12/2002 Horii
6,525,997 B1 2/2003 Narayanaswami et al.
6,545,669 B1 4/2003 Kinawi et al.
6,549,218 B1 4/2003 Gershony et al.
6,556,222 B1 4/2003 Narayanaswami
6,570,557 B1 5/2003 Westerman et al.
6,570,583 B1 5/2003 Kung et al.
6,571,245 B2 5/2003 Huang et al.
6,590,568 B1 7/2003 Astala et al.
6,597,378 B1 7/2003 Shiraishi et al.
6,597,391 B2 7/2003 Hudson
6,613,100 B2 9/2003 Miller
6,621,509 B1 9/2003 Eiref et al.
6,621,768 B1 9/2003 Keller et al.
6,628,309 B1 9/2003 Dodson et al.
6,628,310 B1 9/2003 Hiura et al.
6,629,793 B1 10/2003 Miller
6,639,584 B1 10/2003 Li
6,647,534 B1 11/2003 Graham
6,664,991 B1 * 12/2003 Chew .................. G06F 3/04883
715/825
6,677,932 B1 1/2004 Westerman
6,683,628 B1 1/2004 Nakagawa et al.
6,690,623 B1 2/2004 Maano
6,700,612 B1 3/2004 Anderson et al.
6,710,788 B1 3/2004 Freach et al.
6,714,222 B1 3/2004 Björn et al.
6,727,916 B1 4/2004 Ballard
6,734,859 B2 5/2004 Hayashi et al.
6,763,388 B1 7/2004 Tsimelzon
6,771,250 B1 8/2004 Oh
6,774,914 B1 8/2004 Benayoun
6,781,575 B1 8/2004 Hawkins et al.
6,798,429 B2 9/2004 Bradski
6,809,724 B1 10/2004 Shiraishi et al.
6,816,175 B1 11/2004 Hamp et al.
6,820,111 B1 11/2004 Rubin et al.
6,822,638 B2 11/2004 Dobies et al.
6,847,387 B2 1/2005 Roth
6,874,128 B1 3/2005 Moore et al.
6,880,132 B2 4/2005 Uemura
6,915,294 B1 7/2005 Singh et al.
6,915,490 B1 7/2005 Ewing
6,928,461 B2 8/2005 Tuli
6,931,601 B2 8/2005 Vronay et al.
6,934,911 B2 8/2005 Salmimaa et al.
6,940,494 B2 9/2005 Hoshino et al.
6,950,949 B1 9/2005 Gilchrist
6,956,564 B1 10/2005 Williams
6,963,349 B1 11/2005 Nagasaki
6,970,749 B1 11/2005 Chinn et al.
6,976,210 B1 12/2005 Silva et al.
6,976,228 B2 12/2005 Bernhardson
6,978,127 B1 12/2005 Bulthuis et al.
6,987,991 B2 1/2006 Nelson
6,990,452 B1 1/2006 Ostermann et al.
7,003,495 B1 2/2006 Burger et al.
7,007,239 B1 2/2006 Hawkins et al.
7,010,755 B2 3/2006 Anderson et al.
7,017,118 B1 3/2006 Carroll
7,030,861 B1 4/2006 Westerman et al.
7,043,701 B2 5/2006 Gordon
7,054,965 B2 5/2006 Bell et al.
7,071,943 B2 7/2006 Adler
7,075,512 B1 7/2006 Fabre et al.
7,080,326 B2 7/2006 Molander et al.
7,085,590 B2 8/2006 Kennedy et al.
7,093,201 B2 8/2006 Duarte
7,107,549 B2 9/2006 Deaton et al.
7,117,453 B2 10/2006 Drucker et al.
7,119,819 B1 10/2006 Robertson et al.
7,126,579 B2 10/2006 Ritter
7,133,859 B1 11/2006 Wong
7,134,092 B2 11/2006 Fung et al.
7,134,095 B1 11/2006 Smith et al.
7,142,210 B2 11/2006 Schwuttke et al.
7,146,576 B2 12/2006 Chang et al.
7,149,549 B1 12/2006 Ortiz et al.
7,155,667 B1 12/2006 Kotler et al.
7,162,488 B2 1/2007 Wong et al.
7,166,791 B2 1/2007 Robbin et al.
7,167,731 B2 1/2007 Nelson
7,171,625 B1 1/2007 Sacchi
7,173,604 B2 2/2007 Marvit et al.
7,178,111 B2 2/2007 Glein et al.
7,194,527 B2 3/2007 Drucker et al.
7,194,698 B2 3/2007 Gottfurcht et al.
7,215,323 B2 5/2007 Gombert et al.
7,216,305 B1 5/2007 Jaeger
7,221,933 B2 5/2007 Sauer et al.
7,231,229 B1 6/2007 Hawkins et al.
7,242,406 B2 7/2007 Johnson et al.
7,249,327 B2 7/2007 Nelson et al.
7,278,115 B1 10/2007 Robertson et al.
7,283,845 B2 10/2007 De Bast
7,287,232 B2 10/2007 Tsuchimura et al.
7,292,243 B1 11/2007 Burke
7,310,636 B2 12/2007 Bodin et al.
7,340,678 B2 3/2008 Chiu et al.
7,346,855 B2 3/2008 Hellyar et al.
7,355,593 B2 4/2008 Hill et al.
7,360,166 B1 4/2008 Krzanowski
7,362,331 B2 4/2008 Ording
7,383,497 B2 6/2008 Glenner et al.
7,392,488 B2 6/2008 Card et al.
7,403,211 B2 7/2008 Sheasby et al.
7,403,910 B1 7/2008 Hastings et al.
7,404,151 B2 7/2008 Borchardt et al.
7,406,666 B2 7/2008 Davis et al.
7,412,650 B2 8/2008 Gallo
7,415,677 B2 8/2008 Arend et al.
7,417,680 B2 8/2008 Aoki et al.
7,432,928 B2 10/2008 Shaw et al.
7,433,179 B2 10/2008 Hisano et al.
7,434,177 B1 10/2008 Ording et al.
7,437,005 B2 10/2008 Drucker et al.
7,456,823 B2 11/2008 Poupyrev et al.
7,461,353 B2 12/2008 Rohrabaugh et al.
7,468,742 B2 12/2008 Ahn et al.
7,478,437 B2 1/2009 Hatanaka et al.
7,479,948 B2 1/2009 Kim et al.
7,480,870 B2 1/2009 Anzures et al.
7,480,872 B1 1/2009 Ubillos
7,480,873 B2 1/2009 Kawahara
7,487,467 B1 2/2009 Kawahara et al.
7,490,295 B2 2/2009 Chaudhri et al.
7,493,573 B2 2/2009 Wagner
7,496,595 B2 2/2009 Accapadi
7,506,268 B2 3/2009 Jennings et al.
7,509,321 B2 3/2009 Wong et al.
7,509,588 B2 3/2009 Van Os et al.
7,511,710 B2 3/2009 Barrett
7,512,898 B2 3/2009 Jennings et al.
7,523,414 B2 4/2009 Schmidt et al.
7,526,738 B2 4/2009 Ording et al.
7,546,548 B2 6/2009 Chew et al.
7,546,554 B2 6/2009 Chiu et al.

(56) References Cited

U.S. PATENT DOCUMENTS 7,552,402 B2 6/2009 Bilow
7,557,804 B1 7/2009 Mcdaniel et al.
7,561,874 B2 7/2009 Wang et al.
7,584,278 B2 9/2009 Rajarajan et al.
7,587,671 B2 9/2009 Saft et al.
7,587,683 B2 9/2009 Ito et al.
7,589,750 B1 9/2009 Stratton
7,594,185 B2 9/2009 Anderson et al.
7,603,105 B2 10/2009 Bocking et al.
7,606,819 B2 10/2009 Audet et al.
7,607,150 B1 10/2009 Kobayashi et al.
7,614,008 B2 11/2009 Ording
7,620,894 B1 11/2009 Kahn
7,624,357 B2 11/2009 De Bast
7,633,076 B2 12/2009 Huppi et al.
7,642,934 B2 1/2010 Scott
7,650,137 B2 1/2010 Jobs et al.
7,650,575 B2 1/2010 Cummins et al.
7,653,883 B2 1/2010 Hotelling et al.
7,657,252 B2 2/2010 Futami
7,657,842 B2 2/2010 Matthews et al.
7,657,845 B2 2/2010 Drucker et al.
7,657,849 B2 2/2010 Chaudhri et al.
7,663,607 B2 2/2010 Hotelling et al.
7,663,620 B2 2/2010 Robertson et al.
7,665,033 B2 2/2010 Byrne et al.
7,667,703 B2 2/2010 Hong et al.
7,669,135 B2 2/2010 Cunningham et al.
7,680,817 B2 3/2010 Audet et al.
7,683,883 B2 3/2010 Touma et al.
7,683,889 B2 3/2010 Ribikauskas et al.
7,694,231 B2 4/2010 Kocienda et al.
7,698,658 B2 4/2010 Ohwa et al.
7,710,423 B2 5/2010 Drucker et al.
7,716,604 B2 5/2010 Kataoka et al.
7,719,523 B2 5/2010 Hillis
7,719,542 B1 5/2010 Gough et al.
7,720,893 B2 5/2010 Boudreau et al.
7,724,242 B2 5/2010 Hillis et al.
7,725,839 B2 5/2010 Michaels
7,728,821 B2 6/2010 Hillis et al.
7,730,401 B2 6/2010 Gillespie et al.
7,730,423 B2 6/2010 Graham
7,735,021 B2 6/2010 Padawer et al.
7,739,271 B2 6/2010 Cook et al.
7,739,604 B1 6/2010 Lyons et al.
7,747,289 B2 6/2010 Wang et al.
7,761,813 B2 7/2010 Kim et al.
7,765,266 B2 7/2010 Kropivny et al.
7,770,125 B1 8/2010 Young et al.
7,783,583 B2 8/2010 Sendhoff et al.
7,783,990 B2 8/2010 Amadio et al.
7,788,583 B1 8/2010 Amzallag et al.
7,797,637 B2 9/2010 Marcjan et al.
7,805,684 B2 9/2010 Arvilommi
7,810,038 B2 10/2010 Matsa et al.
7,831,926 B2 11/2010 Rohrabaugh et al.
7,835,729 B2 11/2010 Hyon
7,840,901 B2 11/2010 Lacey et al.
7,840,907 B2 11/2010 Kikuchi et al.
7,840,912 B2 11/2010 Elias et al.
7,844,889 B2 11/2010 Rohrabaugh et al.
7,844,914 B2 11/2010 Andre et al.
7,853,972 B2 12/2010 Brodersen et al.
7,856,602 B2 12/2010 Armstrong
7,873,916 B1 1/2011 Chaudhri et al.
7,880,726 B2 2/2011 Nakadaira et al.
7,904,832 B2 3/2011 Ubillos
7,907,124 B2 3/2011 Hillis et al.
7,907,476 B2 3/2011 Lee
7,917,846 B2 3/2011 Decker et al.
7,917,869 B2 3/2011 Anderson
7,924,444 B2 4/2011 Takahashi
7,934,152 B2 4/2011 Krishnamurthy et al.
7,940,250 B2 5/2011 Forstall
7,956,869 B1 6/2011 Gilra
7,957,762 B2 6/2011 Herz et al.
7,958,457 B1 6/2011 Brandenberg et al.
7,979,879 B2 7/2011 Uchida et al.
7,986,324 B2 7/2011 Funaki et al.
7,995,078 B2 8/2011 Baar
7,996,789 B2 8/2011 Louch et al.
8,006,002 B2 8/2011 Kalayjian et al.
8,020,110 B2 9/2011 Hurst et al.
8,024,671 B2 9/2011 Lee et al.
8,046,714 B2 10/2011 Yahiro et al.
8,059,101 B2 11/2011 Westerman et al.
8,059,491 B1 11/2011 Hennings-Kampa
8,064,704 B2 11/2011 Kim et al.
8,065,618 B2 11/2011 Kumar et al.
8,069,404 B2 11/2011 Audet
8,072,439 B2 12/2011 Hillis et al.
8,078,966 B2 12/2011 Audet
8,099,441 B2 1/2012 Surasinghe
8,103,963 B2 1/2012 Ikeda et al.
8,111,255 B2 2/2012 Park
8,125,481 B2 2/2012 Gossweiler et al.
8,130,211 B2 3/2012 Abernathy
8,139,043 B2 3/2012 Hillis
8,151,185 B2 4/2012 Audet
8,156,175 B2 4/2012 Hopkins
8,161,419 B2 4/2012 Palahnuk et al.
8,185,839 B2 5/2012 Jalon et al.
8,185,842 B2 5/2012 Chang et al.
8,188,985 B2 5/2012 Hillis et al.
8,205,172 B2 6/2012 Wong et al.
8,209,628 B1 6/2012 Davidson et al.
8,214,793 B1 7/2012 Muthuswamy
8,230,358 B1 7/2012 Chaudhri
8,232,990 B2 7/2012 King et al.
8,239,784 B2 8/2012 Hotelling et al.
8,255,808 B2 8/2012 Lindgren et al.
8,259,163 B2 9/2012 Bell
8,266,550 B1 9/2012 Cleron et al.
8,269,729 B2 9/2012 Han et al.
8,269,739 B2 9/2012 Hillis et al.
8,279,180 B2 10/2012 Hotelling et al.
8,306,515 B2 11/2012 Ryu et al.
8,335,784 B2 12/2012 Gutt et al.
8,365,084 B1 1/2013 Lin et al.
8,369,843 B2 2/2013 Fux et al.
8,381,135 B2 2/2013 Hotelling et al.
8,423,911 B2 4/2013 Chaudhri
8,434,027 B2 4/2013 Jones
8,446,371 B2 5/2013 Fyke et al.
8,458,615 B2 6/2013 Chaudhri
8,479,122 B2 7/2013 Hotelling et al.
8,519,964 B2 8/2013 Platzer et al.
8,519,972 B2 8/2013 Forstall
8,525,839 B2 9/2013 Chaudhri et al.
8,558,808 B2 10/2013 Forstall
8,564,544 B2 10/2013 Jobs et al.
8,601,370 B2 12/2013 Chiang et al.
8,619,038 B2 12/2013 Chaudhri et al.
8,626,762 B2 1/2014 Seung et al.
8,672,885 B2 3/2014 Kriesel et al.
8,683,349 B2 3/2014 Roberts et al.
8,713,011 B2 4/2014 Asai et al.
8,713,469 B2 4/2014 Park et al.
8,730,188 B2 5/2014 Pasquero et al.
8,788,954 B2 7/2014 Lemay et al.
8,799,777 B1 8/2014 Lee et al.
8,799,821 B1 8/2014 Sullivan et al.
8,826,170 B1 9/2014 Shah et al.
8,839,128 B2 9/2014 Krishnaraj et al.
8,881,060 B2 11/2014 Chaudhri et al.
8,881,061 B2 11/2014 Chaudhri et al.
8,957,866 B2 2/2015 Law et al.
8,966,375 B2 2/2015 Wasko
8,972,898 B2 3/2015 Carter
9,026,508 B2 5/2015 Nagai
9,032,438 B2 5/2015 Ozawa et al.
9,053,462 B2 6/2015 Cadiz et al.
9,082,314 B2 7/2015 Tsai

(56) References Cited

U.S. PATENT DOCUMENTS 9,152,312 B1 10/2015 Terleski et al.
9,170,708 B2 10/2015 Chaudhri et al.
9,237,855 B2 1/2016 Hong et al.
9,239,673 B2 1/2016 Shaffer et al.
9,256,627 B2 2/2016 Surasinghe
9,259,615 B2 2/2016 Weast et al.
9,367,232 B2 6/2016 Platzer et al.
9,377,762 B2 6/2016 Hoobler et al.
9,386,432 B2 7/2016 Chu et al.
9,417,787 B2 8/2016 Fong et al.
9,448,691 B2 9/2016 Suda
9,619,139 B2 4/2017 Wada et al.
9,619,143 B2 4/2017 Christie et al.
9,715,277 B2 7/2017 Lee et al.
9,772,749 B2 9/2017 Chaudhri et al.
9,794,397 B2 10/2017 Min et al.
9,839,363 B2 12/2017 Albert
9,933,913 B2 4/2018 Van Os et al.
9,993,913 B2 6/2018 Mccardle et al.
10,025,458 B2 7/2018 Chaudhri et al.
10,165,108 B1 12/2018 Douglas
10,250,735 B2 4/2019 Butcher et al.
10,359,907 B2 7/2019 Van Os et al.
10,620,780 B2 4/2020 Chaudhri et al.
10,684,592 B2 6/2020 Chang et al.
10,788,953 B2 9/2020 Chaudhri et al.
10,788,976 B2 9/2020 Chaudhri et al.
10,884,579 B2 1/2021 Van Os et al.
10,915,224 B2 2/2021 Van Os et al.
11,009,833 B2 5/2021 Essery
11,126,321 B2 * 9/2021 Chaudhri .............. G06F 3/0483
11,790,686 B2 10/2023 Kho et al.
2001/0024195 A1 9/2001 Hayakawa
2001/0024212 A1 9/2001 Ohnishi
2001/0038394 A1 11/2001 Tsuchimura et al.
2001/0043514 A1 11/2001 Kita et al.
2002/0008691 A1 1/2002 Hanajima et al.
2002/0015024 A1 2/2002 Westerman et al.
2002/0015042 A1 2/2002 Robotham et al.
2002/0015064 A1 2/2002 Robotham et al.
2002/0016187 A1 2/2002 Hirayama et al.
2002/0018051 A1 2/2002 Singh
2002/0024540 A1 2/2002 Mccarthy
2002/0038299 A1 3/2002 Zernik et al.
2002/0054090 A1 5/2002 Silva et al.
2002/0057287 A1 5/2002 Crow et al.
2002/0067376 A1 6/2002 Martin et al.
2002/0078037 A1 6/2002 Hatanaka et al.
2002/0085037 A1 7/2002 Leavitt et al.
2002/0087747 A1 7/2002 Yamaguchi et al.
2002/0091697 A1 7/2002 Huang et al.
2002/0093531 A1 7/2002 Barile
2002/0097261 A1 7/2002 Gottfurcht et al.
2002/0104096 A1 8/2002 Cramer et al.
2002/0109721 A1 8/2002 Konaka et al.
2002/0140698 A1 10/2002 Robertson et al.
2002/0140736 A1 10/2002 Chen et al.
2002/0143949 A1 10/2002 Rajarajan et al.
2002/0149561 A1 10/2002 Fukumoto et al.
2002/0152222 A1 10/2002 Holbrook
2002/0152283 A1 10/2002 Dutta et al.
2002/0167683 A1 11/2002 Hanamoto et al.
2002/0188948 A1 12/2002 Florence
2002/0191029 A1 12/2002 Gillespie et al.
2002/0196238 A1 12/2002 Tsukada et al.
2003/0001898 A1 1/2003 Bernhardson
2003/0007012 A1 1/2003 Bate
2003/0013483 A1 1/2003 Ausems et al.
2003/0014415 A1 1/2003 Weiss et al.
2003/0016241 A1 1/2003 Burke
2003/0025676 A1 2/2003 Cappendijk
2003/0030664 A1 2/2003 Parry
2003/0033331 A1 2/2003 Sena et al.
2003/0048295 A1 3/2003 Lilleness et al.
2003/0063072 A1 4/2003 Brandenberg et al.
2003/0063125 A1 4/2003 Miyajima et al.
2003/0080991 A1 5/2003 Crow et al.
2003/0081135 A1 5/2003 Boll
2003/0085931 A1 5/2003 Card et al.
2003/0090572 A1 5/2003 Belz et al.
2003/0095135 A1 5/2003 Kaasila et al.
2003/0095155 A1 5/2003 Johnson
2003/0097361 A1 5/2003 Huang et al.
2003/0098894 A1 5/2003 Sheldon et al.
2003/0117427 A1 6/2003 Haughawout et al.
2003/0117440 A1 6/2003 Hellyar et al.
2003/0122787 A1 7/2003 Zimmerman et al.
2003/0128242 A1 7/2003 Gordon
2003/0132938 A1 7/2003 Shibao
2003/0142136 A1 7/2003 Carter et al.
2003/0154190 A1 8/2003 Misawa et al.
2003/0156119 A1 8/2003 Bonadio
2003/0156140 A1 8/2003 Watanabe et al.
2003/0156756 A1 8/2003 Gokturk et al.
2003/0160825 A1 8/2003 Weber
2003/0164827 A1 9/2003 Gottesman et al.
2003/0164861 A1 9/2003 Barbanson et al.
2003/0169298 A1 9/2003 Ording
2003/0169302 A1 9/2003 Davidsson et al.
2003/0174170 A1 9/2003 Jung et al.
2003/0174172 A1 9/2003 Conrad et al.
2003/0179240 A1 9/2003 Gest
2003/0184552 A1 10/2003 Chadha
2003/0184587 A1 10/2003 Ording et al.
2003/0189597 A1 10/2003 Anderson et al.
2003/0193524 A1 10/2003 Bates et al.
2003/0195950 A1 10/2003 Huang et al.
2003/0200289 A1 10/2003 Kemp et al.
2003/0206195 A1 11/2003 Matsa et al.
2003/0206197 A1 11/2003 Mcinerney
2003/0210278 A1 11/2003 Kyoya et al.
2003/0210280 A1 11/2003 Baker et al.
2003/0225811 A1 12/2003 Ali et al.
2004/0008224 A1 1/2004 Molander et al.
2004/0021643 A1 2/2004 Hoshino et al.
2004/0027330 A1 2/2004 Bradski
2004/0041849 A1 3/2004 Mock et al.
2004/0056809 A1 3/2004 Prassmayer et al.
2004/0056839 A1 3/2004 Yoshihara
2004/0070608 A1 4/2004 Saka
2004/0085364 A1 * 5/2004 Keely .................. G06F 3/0488
715/804
2004/0093582 A1 5/2004 Segura
2004/0103156 A1 5/2004 Quillen et al.
2004/0103371 A1 5/2004 Chen et al.
2004/0109013 A1 6/2004 Goertz
2004/0109025 A1 6/2004 Hullot et al.
2004/0121823 A1 6/2004 Noesgaard et al.
2004/0125088 A1 7/2004 Zimmerman et al.
2004/0138569 A1 7/2004 Grunwald et al.
2004/0141011 A1 7/2004 Smethers et al.
2004/0143598 A1 7/2004 Drucker et al.
2004/0143796 A1 7/2004 Lerner et al.
2004/0155909 A1 8/2004 Wagner
2004/0160462 A1 8/2004 Sheasby et al.
2004/0169674 A1 9/2004 Linjama
2004/0177148 A1 9/2004 Tsimelzon, Jr.
2004/0196267 A1 10/2004 Kawai et al.
2004/0201595 A1 10/2004 Manchester
2004/0205492 A1 10/2004 Newsome
2004/0205496 A1 10/2004 Dutta et al.
2004/0215719 A1 10/2004 Altshuler
2004/0218104 A1 11/2004 Smith et al.
2004/0221006 A1 11/2004 Gopalan et al.
2004/0222975 A1 11/2004 Nakano et al.
2004/0236769 A1 11/2004 Smith et al.
2004/0257375 A1 12/2004 Cowperthwaite
2004/0268400 A1 12/2004 Barde et al.
2005/0005246 A1 1/2005 Card et al.
2005/0005248 A1 1/2005 Rockey et al.
2005/0010955 A1 1/2005 Elia et al.
2005/0012862 A1 1/2005 Lee
2005/0020317 A1 1/2005 Koyama
2005/0024341 A1 2/2005 Gillespie et al.

(56) References Cited

U.S. PATENT DOCUMENTS

2005/0026644 A1 2/2005 Lien
2005/0039134 A1 2/2005 Wiggeshoff et al.
2005/0043987 A1 2/2005 Kumar et al.
2005/0044509 A1 2/2005 Hunleth et al.
2005/0052471 A1 3/2005 Nagasaki
2005/0057524 A1 3/2005 Hill et al.
2005/0057530 A1 3/2005 Hinckley et al.
2005/0057548 A1 3/2005 Kim
2005/0060653 A1 3/2005 Fukase et al.
2005/0060664 A1 3/2005 Rogers
2005/0060665 A1 3/2005 Rekimoto
2005/0066286 A1 3/2005 Makela
2005/0071364 A1 3/2005 Xie et al.
2005/0071736 A1 3/2005 Schneider et al.
2005/0071778 A1 3/2005 Tokkonen
2005/0078804 A1 4/2005 Yomoda
2005/0079896 A1 4/2005 Kokko et al.
2005/0088423 A1 4/2005 Keely et al.
2005/0091596 A1 4/2005 Anthony et al.
2005/0091609 A1 4/2005 Matthews et al.
2005/0093826 A1 5/2005 Huh
2005/0097089 A1 5/2005 Nielsen et al.
2005/0108657 A1 5/2005 Han
2005/0114788 A1 5/2005 Fabritius
2005/0116026 A1 6/2005 Burger et al.
2005/0120142 A1 6/2005 Hall
2005/0131924 A1 6/2005 Jones
2005/0134578 A1 6/2005 Chambers et al.
2005/0138570 A1 6/2005 Good et al.
2005/0151742 A1 7/2005 Hong et al.
2005/0154798 A1 7/2005 Nurmi
2005/0156873 A1 7/2005 Walter et al.
2005/0166232 A1 7/2005 Lamkin et al.
2005/0169527 A1 8/2005 Longe et al.
2005/0177783 A1 8/2005 Agrawala et al.
2005/0177796 A1 8/2005 Takahashi
2005/0183017 A1 8/2005 Cain
2005/0190059 A1 9/2005 Wehrenberg
2005/0192924 A1 9/2005 Drucker et al.
2005/0204309 A1 9/2005 Szeto
2005/0204385 A1 9/2005 Sull et al.
2005/0210018 A1 9/2005 Singh et al.
2005/0210369 A1 9/2005 Damm, Jr.
2005/0210403 A1 9/2005 Satanek
2005/0210410 A1 9/2005 Ohwa et al.
2005/0210412 A1 9/2005 Matthews et al.
2005/0216913 A1 9/2005 Gemmell et al.
2005/0227642 A1 10/2005 Jensen
2005/0229102 A1 10/2005 Watson et al.
2005/0229118 A1 10/2005 Chiu et al.
2005/0246331 A1 11/2005 De Vorchik et al.
2005/0246918 A1 11/2005 Tanahashi et al.
2005/0250438 A1 11/2005 Makipaa et al.
2005/0251755 A1 11/2005 Mullins et al.
2005/0253817 A1 11/2005 Rytivaara et al.
2005/0259087 A1 11/2005 Hoshino et al.
2005/0262448 A1 11/2005 Vronay et al.
2005/0267869 A1 12/2005 Horvitz et al.
2005/0270276 A1 12/2005 Sugimoto et al.
2005/0275636 A1 12/2005 Dehlin et al.
2005/0278757 A1 12/2005 Grossman et al.
2005/0283734 A1 12/2005 Santoro et al.
2005/0285880 A1 12/2005 Lai et al.
2005/0289109 A1 12/2005 Arrouye et al.
2005/0289458 A1 12/2005 Kylmanen
2005/0289476 A1 12/2005 Tokkonen
2005/0289482 A1 12/2005 Anthony et al.
2006/0004685 A1 1/2006 Pyhalammi et al.
2006/0005207 A1 1/2006 Louch et al.
2006/0007182 A1 1/2006 Sato et al.
2006/0017692 A1 1/2006 Wehrenberg et al.
2006/0020903 A1 1/2006 Wang et al.
2006/0022955 A1 2/2006 Kennedy
2006/0025091 A1 2/2006 Buford
2006/0025110 A1 2/2006 Liu
2006/0026170 A1 2/2006 Kreitler et al.
2006/0026521 A1 2/2006 Hotelling et al.
2006/0026535 A1 2/2006 Hotelling et al.
2006/0026536 A1 2/2006 Hotelling et al.
2006/0031874 A1 2/2006 Ok et al.
2006/0033724 A1 2/2006 Chaudhri et al.
2006/0033751 A1 2/2006 Keely et al.
2006/0033761 A1 2/2006 Suen et al.
2006/0035628 A1 2/2006 Miller et al.
2006/0036568 A1 2/2006 Moore et al.
2006/0036944 A1 2/2006 Wilson
2006/0048069 A1 3/2006 Igeta
2006/0051073 A1 3/2006 Jung et al.
2006/0053386 A1 3/2006 Kuhl et al.
2006/0053387 A1 3/2006 Ording
2006/0053392 A1 3/2006 Salmimaa et al.
2006/0055662 A1 3/2006 Rimas-Ribikauskas et al.
2006/0055700 A1 3/2006 Niles et al.
2006/0064647 A1 3/2006 Tapuska et al.
2006/0070007 A1 3/2006 Cummins et al.
2006/0075355 A1 4/2006 Shiono et al.
2006/0075396 A1 4/2006 Surasinghe
2006/0080386 A1 4/2006 Roykkee et al.
2006/0080616 A1 4/2006 Vogel et al.
2006/0080617 A1 4/2006 Anderson et al.
2006/0085743 A1 4/2006 Baudisch et al.
2006/0085763 A1 4/2006 Leavitt et al.
2006/0090022 A1 4/2006 Flynn et al.
2006/0092133 A1 5/2006 Touma et al.
2006/0092770 A1 5/2006 Demas
2006/0097991 A1 5/2006 Hotelling et al.
2006/0101354 A1 5/2006 Hashimoto et al.
2006/0105814 A1 5/2006 Monden et al.
2006/0107231 A1 5/2006 Matthews et al.
2006/0112335 A1 5/2006 Hofmeister et al.
2006/0112347 A1 5/2006 Baudisch
2006/0116578 A1 6/2006 Grunwald et al.
2006/0117197 A1 6/2006 Nurmi
2006/0117372 A1 6/2006 Hopkins
2006/0119619 A1 6/2006 Fagans et al.
2006/0123353 A1 6/2006 Matthews et al.
2006/0123359 A1 6/2006 Schatzberger et al.
2006/0123360 A1 6/2006 Anwar et al.
2006/0125799 A1 6/2006 Hillis et al.
2006/0129586 A1 6/2006 Arrouye et al.
2006/0129647 A1 6/2006 Kaghazian
2006/0143574 A1 6/2006 Ito et al.
2006/0146016 A1 7/2006 Chan et al.
2006/0146038 A1 7/2006 Park et al.
2006/0148526 A1 7/2006 Kamiya et al.
2006/0153531 A1 7/2006 Kanegae et al.
2006/0161863 A1 7/2006 Gallo
2006/0161871 A1 7/2006 Hotelling et al.
2006/0164418 A1 7/2006 Hao et al.
2006/0168510 A1 7/2006 Bryar et al.
2006/0174211 A1 8/2006 Hoellerer et al.
2006/0179415 A1 8/2006 Cadiz et al.
2006/0187212 A1 8/2006 Park et al.
2006/0190833 A1 8/2006 Sangiovanni et al.
2006/0197752 A1 9/2006 Hurst et al.
2006/0197753 A1 9/2006 Hotelling
2006/0209035 A1 9/2006 Jenkins et al.
2006/0210958 A1 9/2006 Rimas-Ribikauskas et al.
2006/0212828 A1 9/2006 Yahiro et al.
2006/0212833 A1 9/2006 Gallagher et al.
2006/0224997 A1 10/2006 Wong et al.
2006/0236266 A1 10/2006 Majava
2006/0238625 A1 10/2006 Sasaki et al.
2006/0239640 A1 10/2006 Watanabe et al.
2006/0242145 A1 10/2006 Krishnamurthy et al.
2006/0242596 A1 10/2006 Armstrong
2006/0242604 A1 10/2006 Wong et al.
2006/0242607 A1 10/2006 Hudson
2006/0250578 A1 11/2006 Pohl et al.
2006/0253771 A1 11/2006 Baschy
2006/0262116 A1 11/2006 Moshiri et al.
2006/0265643 A1 11/2006 Saft et al.
2006/0267966 A1 11/2006 Grossman et al.
2006/0268100 A1 11/2006 Karukka et al.

(56) References Cited

U.S. PATENT DOCUMENTS

| | | | |
|---|---|---|---|
| 2006/0271864 | A1 | 11/2006 | Satterfield et al. |
| 2006/0271867 | A1 | 11/2006 | Wang et al. |
| 2006/0271874 | A1 | 11/2006 | Raiz et al. |
| 2006/0277460 | A1 | 12/2006 | Forstall et al. |
| 2006/0277481 | A1 | 12/2006 | Forstall et al. |
| 2006/0277486 | A1 | 12/2006 | Skinner |
| 2006/0277588 | A1 | 12/2006 | Harrington et al. |
| 2006/0278692 | A1 | 12/2006 | Matsumoto et al. |
| 2006/0282786 | A1 | 12/2006 | Shaw et al. |
| 2006/0282790 | A1 | 12/2006 | Matthews et al. |
| 2006/0284852 | A1 | 12/2006 | Hofmeister et al. |
| 2006/0290661 | A1 | 12/2006 | Innanen et al. |
| 2007/0004451 | A1 | 1/2007 | Anderson |
| 2007/0005581 | A1 | 1/2007 | Arrouye et al. |
| 2007/0013665 | A1 | 1/2007 | Vetelainen et al. |
| 2007/0016872 | A1 | 1/2007 | Cummins et al. |
| 2007/0016958 | A1 | 1/2007 | Bodepudi et al. |
| 2007/0022386 | A1 | 1/2007 | Boss et al. |
| 2007/0024468 | A1 | 2/2007 | Quandel et al. |
| 2007/0024646 | A1 | 2/2007 | Saarinen et al. |
| 2007/0028269 | A1 | 2/2007 | Nezu et al. |
| 2007/0030362 | A1 | 2/2007 | Ota et al. |
| 2007/0035513 | A1 | 2/2007 | Sherrard et al. |
| 2007/0038612 | A1 | 2/2007 | Sull et al. |
| 2007/0044029 | A1 | 2/2007 | Fisher et al. |
| 2007/0050432 | A1 | 3/2007 | Yoshizawa |
| 2007/0050726 | A1 | 3/2007 | Wakai et al. |
| 2007/0050727 | A1 | 3/2007 | Lewis-Bowen et al. |
| 2007/0055947 | A1 | 3/2007 | Ostojic et al. |
| 2007/0061745 | A1 | 3/2007 | Anthony et al. |
| 2007/0067272 | A1 | 3/2007 | Flynt et al. |
| 2007/0067738 | A1 | 3/2007 | Flynt et al. |
| 2007/0070066 | A1 | 3/2007 | Bakhash |
| 2007/0072602 | A1 | 3/2007 | Iyer et al. |
| 2007/0083827 | A1 | 4/2007 | Scott et al. |
| 2007/0083911 | A1 | 4/2007 | Madden et al. |
| 2007/0091068 | A1 | 4/2007 | Liberty |
| 2007/0094267 | A1* | 4/2007 | Good .................... G06F 16/954 |
| 2007/0100948 | A1 | 5/2007 | Adams et al. |
| 2007/0101292 | A1 | 5/2007 | Kupka |
| 2007/0101297 | A1 | 5/2007 | Forstall et al. |
| 2007/0106950 | A1 | 5/2007 | Hutchinson et al. |
| 2007/0106952 | A1 | 5/2007 | Matas et al. |
| 2007/0113207 | A1 | 5/2007 | Gritton |
| 2007/0118813 | A1 | 5/2007 | Forstall et al. |
| 2007/0121869 | A1 | 5/2007 | Gorti et al. |
| 2007/0123205 | A1 | 5/2007 | Lee et al. |
| 2007/0124677 | A1 | 5/2007 | De Los Reyes et al. |
| 2007/0126696 | A1 | 6/2007 | Boillot |
| 2007/0126732 | A1 | 6/2007 | Robertson et al. |
| 2007/0132789 | A1 | 6/2007 | Ording et al. |
| 2007/0136351 | A1 | 6/2007 | Dames et al. |
| 2007/0146325 | A1 | 6/2007 | Poston et al. |
| 2007/0150810 | A1 | 6/2007 | Katz et al. |
| 2007/0150830 | A1 | 6/2007 | Ording et al. |
| 2007/0150834 | A1 | 6/2007 | Muller et al. |
| 2007/0150835 | A1 | 6/2007 | Muller et al. |
| 2007/0152958 | A1 | 7/2007 | Ahn et al. |
| 2007/0152980 | A1 | 7/2007 | Kocienda et al. |
| 2007/0152984 | A1 | 7/2007 | Ording et al. |
| 2007/0155434 | A1 | 7/2007 | Jobs et al. |
| 2007/0156697 | A1 | 7/2007 | Tsarkova |
| 2007/0157089 | A1 | 7/2007 | Van Os et al. |
| 2007/0157094 | A1 | 7/2007 | Lemay et al. |
| 2007/0157097 | A1 | 7/2007 | Peters et al. |
| 2007/0157228 | A1 | 7/2007 | Bayer et al. |
| 2007/0174785 | A1 | 7/2007 | Perttula |
| 2007/0177803 | A1 | 8/2007 | Elias et al. |
| 2007/0177804 | A1 | 8/2007 | Elias et al. |
| 2007/0180395 | A1 | 8/2007 | Yamashita et al. |
| 2007/0188518 | A1 | 8/2007 | Vale et al. |
| 2007/0189737 | A1 | 8/2007 | Chaudhri et al. |
| 2007/0192741 | A1 | 8/2007 | Yoritate et al. |
| 2007/0200713 | A1 | 8/2007 | Weber et al. |
| 2007/0204218 | A1 | 8/2007 | Weber et al. |
| 2007/0226652 | A1 | 9/2007 | Kikuchi et al. |
| 2007/0233695 | A1 | 10/2007 | Boudreau et al. |
| 2007/0239760 | A1 | 10/2007 | Simon |
| 2007/0240079 | A1 | 10/2007 | Flynt et al. |
| 2007/0243862 | A1 | 10/2007 | Coskun et al. |
| 2007/0243905 | A1 | 10/2007 | Juh et al. |
| 2007/0245250 | A1 | 10/2007 | Schechter et al. |
| 2007/0247425 | A1 | 10/2007 | Liberty et al. |
| 2007/0250768 | A1 | 10/2007 | Funakami et al. |
| 2007/0250793 | A1 | 10/2007 | Miura et al. |
| 2007/0250794 | A1 | 10/2007 | Miura et al. |
| 2007/0254722 | A1 | 11/2007 | Kim et al. |
| 2007/0260999 | A1 | 11/2007 | Amadio et al. |
| 2007/0263176 | A1 | 11/2007 | Nozaki et al. |
| 2007/0266011 | A1 | 11/2007 | Rohrs et al. |
| 2007/0266342 | A1 | 11/2007 | Chang et al. |
| 2007/0271532 | A1 | 11/2007 | Nguyen et al. |
| 2007/0288860 | A1 | 12/2007 | Ording et al. |
| 2007/0288862 | A1 | 12/2007 | Ording |
| 2007/0288868 | A1 | 12/2007 | Rhee et al. |
| 2007/0294231 | A1 | 12/2007 | Kaihotsu |
| 2007/0300160 | A1 | 12/2007 | Ferrel et al. |
| 2008/0001924 | A1 | 1/2008 | De Los Reyes et al. |
| 2008/0005702 | A1 | 1/2008 | Skourup et al. |
| 2008/0005703 | A1 | 1/2008 | Radivojevic et al. |
| 2008/0006762 | A1 | 1/2008 | Fadell et al. |
| 2008/0016468 | A1 | 1/2008 | Chambers et al. |
| 2008/0016470 | A1 | 1/2008 | Misawa et al. |
| 2008/0016471 | A1 | 1/2008 | Park |
| 2008/0024454 | A1 | 1/2008 | Everest et al. |
| 2008/0034013 | A1 | 2/2008 | Cisler et al. |
| 2008/0034309 | A1 | 2/2008 | Louch et al. |
| 2008/0034317 | A1 | 2/2008 | Fard et al. |
| 2008/0040668 | A1 | 2/2008 | Ala-Rantala |
| 2008/0042984 | A1 | 2/2008 | Lim et al. |
| 2008/0059906 | A1 | 3/2008 | Toki |
| 2008/0059915 | A1 | 3/2008 | Boillot |
| 2008/0062126 | A1 | 3/2008 | Algreatly |
| 2008/0062137 | A1 | 3/2008 | Brodersen et al. |
| 2008/0062141 | A1 | 3/2008 | Chaudhri |
| 2008/0062257 | A1 | 3/2008 | Corson |
| 2008/0067626 | A1 | 3/2008 | Hirler et al. |
| 2008/0082930 | A1 | 4/2008 | Omernick et al. |
| 2008/0089587 | A1 | 4/2008 | Kim et al. |
| 2008/0091763 | A1 | 4/2008 | Devonshire et al. |
| 2008/0094369 | A1 | 4/2008 | Ganatra et al. |
| 2008/0104515 | A1 | 5/2008 | Dumitru et al. |
| 2008/0109408 | A1 | 5/2008 | Choi et al. |
| 2008/0117461 | A1 | 5/2008 | Mitsutake et al. |
| 2008/0120568 | A1 | 5/2008 | Jian et al. |
| 2008/0122796 | A1 | 5/2008 | Jobs et al. |
| 2008/0125180 | A1 | 5/2008 | Hoffman et al. |
| 2008/0126971 | A1 | 5/2008 | Kojima |
| 2008/0130421 | A1 | 6/2008 | Akaiwa et al. |
| 2008/0132252 | A1 | 6/2008 | Altman et al. |
| 2008/0134088 | A1 | 6/2008 | Tse et al. |
| 2008/0136785 | A1 | 6/2008 | Baudisch et al. |
| 2008/0139176 | A1 | 6/2008 | Kim |
| 2008/0151700 | A1 | 6/2008 | Inoue et al. |
| 2008/0155453 | A1 | 6/2008 | Othmer et al. |
| 2008/0155617 | A1 | 6/2008 | Angiolillo et al. |
| 2008/0158145 | A1 | 7/2008 | Westerman |
| 2008/0158172 | A1 | 7/2008 | Hotelling et al. |
| 2008/0161045 | A1 | 7/2008 | Vuorenmaa |
| 2008/0164468 | A1 | 7/2008 | Chen et al. |
| 2008/0165140 | A1 | 7/2008 | Christie et al. |
| 2008/0168075 | A1 | 7/2008 | Kamiyabu |
| 2008/0168365 | A1 | 7/2008 | Chaudhri |
| 2008/0168367 | A1 | 7/2008 | Chaudhri et al. |
| 2008/0168368 | A1 | 7/2008 | Louch et al. |
| 2008/0168382 | A1 | 7/2008 | Louch et al. |
| 2008/0168401 | A1 | 7/2008 | Boule et al. |
| 2008/0168478 | A1 | 7/2008 | Platzer et al. |
| 2008/0171555 | A1 | 7/2008 | Oh et al. |
| 2008/0174562 | A1 | 7/2008 | Kim |
| 2008/0180406 | A1 | 7/2008 | Han et al. |
| 2008/0182598 | A1 | 7/2008 | Bowman |
| 2008/0182628 | A1 | 7/2008 | Lee et al. |
| 2008/0184052 | A1 | 7/2008 | Itoh et al. |

(56) References Cited

U.S. PATENT DOCUMENTS

| | | | |
|---|---|---|---|
| 2008/0184112 | A1 | 7/2008 | Chiang et al. |
| 2008/0189108 | A1 | 8/2008 | Atar |
| 2008/0201452 | A1 | 8/2008 | Athas et al. |
| 2008/0204424 | A1 | 8/2008 | Jin et al. |
| 2008/0216017 | A1 | 9/2008 | Kurtenbach et al. |
| 2008/0216022 | A1 | 9/2008 | Lorch et al. |
| 2008/0222545 | A1 | 9/2008 | Lemay et al. |
| 2008/0225007 | A1 | 9/2008 | Nakadaira et al. |
| 2008/0225013 | A1 | 9/2008 | Muylkens et al. |
| 2008/0229254 | A1 | 9/2008 | Warner |
| 2008/0231610 | A1 | 9/2008 | Hotelling et al. |
| 2008/0244119 | A1 | 10/2008 | Tokuhara et al. |
| 2008/0259045 | A1 | 10/2008 | Kim et al. |
| 2008/0259057 | A1 | 10/2008 | Brons |
| 2008/0266407 | A1 | 10/2008 | Battles et al. |
| 2008/0268882 | A1 | 10/2008 | Moloney |
| 2008/0268948 | A1 | 10/2008 | Boesen |
| 2008/0276201 | A1 | 11/2008 | Risch et al. |
| 2008/0282202 | A1 | 11/2008 | Sunday |
| 2008/0294981 | A1 | 11/2008 | Balzano et al. |
| 2008/0300055 | A1 | 12/2008 | Lutnick et al. |
| 2008/0300572 | A1 | 12/2008 | Rankers et al. |
| 2008/0307361 | A1 | 12/2008 | Louch et al. |
| 2008/0307362 | A1 | 12/2008 | Chaudhri et al. |
| 2008/0309632 | A1 | 12/2008 | Westerman et al. |
| 2008/0310602 | A1 | 12/2008 | Bhupati |
| 2008/0313110 | A1 | 12/2008 | Kreamer et al. |
| 2008/0313596 | A1 | 12/2008 | Kreamer et al. |
| 2008/0320419 | A1 | 12/2008 | Matas et al. |
| 2009/0002324 | A1 | 1/2009 | Harbeson et al. |
| 2009/0002335 | A1 | 1/2009 | Chaudhri |
| 2009/0006991 | A1 | 1/2009 | Lindberg et al. |
| 2009/0007017 | A1 | 1/2009 | Anzures et al. |
| 2009/0019385 | A1 | 1/2009 | Khatib et al. |
| 2009/0021488 | A1 | 1/2009 | Kali et al. |
| 2009/0023433 | A1 | 1/2009 | Walley et al. |
| 2009/0024946 | A1 | 1/2009 | Gotz et al. |
| 2009/0034805 | A1 | 2/2009 | Perlmutter et al. |
| 2009/0058821 | A1 | 3/2009 | Chaudhri et al. |
| 2009/0063971 | A1 | 3/2009 | White et al. |
| 2009/0064055 | A1 | 3/2009 | Chaudhri et al. |
| 2009/0070708 | A1 | 3/2009 | Finkelstein |
| 2009/0077501 | A1 | 3/2009 | Partridge et al. |
| 2009/0103780 | A1 | 4/2009 | Nishihara et al. |
| 2009/0122018 | A1 | 5/2009 | Vymenets et al. |
| 2009/0125842 | A1 | 5/2009 | Nakayama et al. |
| 2009/0128581 | A1 | 5/2009 | Brid et al. |
| 2009/0132965 | A1 | 5/2009 | Shimizu |
| 2009/0138194 | A1 | 5/2009 | Geelen |
| 2009/0138827 | A1 | 5/2009 | Van Os et al. |
| 2009/0144653 | A1 | 6/2009 | Ubillos |
| 2009/0150775 | A1 | 6/2009 | Miyazaki et al. |
| 2009/0158200 | A1 | 6/2009 | Palahnuk et al. |
| 2009/0163193 | A1 | 6/2009 | Fyke et al. |
| 2009/0164936 | A1 | 6/2009 | Kawaguchi |
| 2009/0178008 | A1 | 7/2009 | Herz et al. |
| 2009/0183080 | A1 | 7/2009 | Thakkar et al. |
| 2009/0183125 | A1 | 7/2009 | Magal et al. |
| 2009/0184936 | A1 | 7/2009 | Algreatly |
| 2009/0189911 | A1 | 7/2009 | Ono et al. |
| 2009/0199128 | A1 | 8/2009 | Matthews et al. |
| 2009/0204920 | A1 | 8/2009 | Beverley et al. |
| 2009/0204928 | A1 | 8/2009 | Kallio et al. |
| 2009/0217187 | A1 | 8/2009 | Kendall et al. |
| 2009/0217206 | A1 | 8/2009 | Liu et al. |
| 2009/0217209 | A1 | 8/2009 | Chen et al. |
| 2009/0222420 | A1 | 9/2009 | Hirata |
| 2009/0222765 | A1 | 9/2009 | Ekstrand |
| 2009/0228825 | A1 | 9/2009 | Van Os et al. |
| 2009/0237371 | A1 | 9/2009 | Kim et al. |
| 2009/0237372 | A1 | 9/2009 | Kim et al. |
| 2009/0249252 | A1 | 10/2009 | Lundy et al. |
| 2009/0254799 | A1 | 10/2009 | Unger |
| 2009/0254869 | A1 | 10/2009 | Ludwig et al. |
| 2009/0265669 | A1 | 10/2009 | Kida et al. |
| 2009/0271723 | A1 | 10/2009 | Matsushima et al. |
| 2009/0278812 | A1 | 11/2009 | Yasutake et al. |
| 2009/0282369 | A1 | 11/2009 | Jones |
| 2009/0288032 | A1 | 11/2009 | Chang et al. |
| 2009/0295753 | A1 | 12/2009 | King et al. |
| 2009/0303231 | A1 | 12/2009 | Robinet et al. |
| 2009/0313567 | A1 | 12/2009 | Kwon et al. |
| 2009/0313584 | A1 | 12/2009 | Kerr et al. |
| 2009/0313585 | A1 | 12/2009 | Hellinger et al. |
| 2009/0315848 | A1 | 12/2009 | Ku et al. |
| 2009/0319928 | A1 | 12/2009 | Alphin et al. |
| 2009/0319935 | A1 | 12/2009 | Figura |
| 2009/0322676 | A1 | 12/2009 | Kerr et al. |
| 2009/0327969 | A1 | 12/2009 | Estrada |
| 2010/0011304 | A1 | 1/2010 | Van Os |
| 2010/0013780 | A1 | 1/2010 | Ikeda et al. |
| 2010/0031203 | A1 | 2/2010 | Morris et al. |
| 2010/0050133 | A1 | 2/2010 | Nishihara et al. |
| 2010/0053151 | A1 | 3/2010 | Marti et al. |
| 2010/0058182 | A1 | 3/2010 | Jung |
| 2010/0063813 | A1 | 3/2010 | Richter et al. |
| 2010/0082661 | A1 | 4/2010 | Beaudreau et al. |
| 2010/0083165 | A1 | 4/2010 | Andrews et al. |
| 2010/0095206 | A1 | 4/2010 | Kim |
| 2010/0095238 | A1 | 4/2010 | Baudet |
| 2010/0095248 | A1 | 4/2010 | Karstens et al. |
| 2010/0100841 | A1 | 4/2010 | Shin et al. |
| 2010/0105454 | A1 | 4/2010 | Weber et al. |
| 2010/0107101 | A1 | 4/2010 | Shaw et al. |
| 2010/0110025 | A1 | 5/2010 | Lim et al. |
| 2010/0115428 | A1 | 5/2010 | Shuping et al. |
| 2010/0122195 | A1 | 5/2010 | Hwang |
| 2010/0124152 | A1 | 5/2010 | Lee |
| 2010/0153844 | A1 | 6/2010 | Hwang et al. |
| 2010/0153878 | A1 | 6/2010 | Lindgren et al. |
| 2010/0157742 | A1 | 6/2010 | Relyea et al. |
| 2010/0159909 | A1 | 6/2010 | Stifelman |
| 2010/0162170 | A1 | 6/2010 | Johns et al. |
| 2010/0169357 | A1 | 7/2010 | Ingrassia et al. |
| 2010/0179991 | A1 | 7/2010 | Lorch et al. |
| 2010/0199227 | A1 | 8/2010 | Xiao et al. |
| 2010/0211872 | A1 | 8/2010 | Rolston et al. |
| 2010/0223563 | A1 | 9/2010 | Green |
| 2010/0223574 | A1 | 9/2010 | Wang et al. |
| 2010/0229129 | A1 | 9/2010 | Price et al. |
| 2010/0229130 | A1 | 9/2010 | Edge et al. |
| 2010/0241955 | A1 | 9/2010 | Price et al. |
| 2010/0241967 | A1 | 9/2010 | Lee et al. |
| 2010/0241999 | A1 | 9/2010 | Russ et al. |
| 2010/0248788 | A1 | 9/2010 | Yook et al. |
| 2010/0251085 | A1 | 9/2010 | Zearing et al. |
| 2010/0257468 | A1 | 10/2010 | Bernardo et al. |
| 2010/0262928 | A1 | 10/2010 | Abbott |
| 2010/0281408 | A1 | 11/2010 | Fujioka et al. |
| 2010/0283743 | A1 | 11/2010 | Coddington |
| 2010/0285775 | A1 | 11/2010 | Klein et al. |
| 2010/0295802 | A1 | 11/2010 | Lee |
| 2010/0315413 | A1 | 12/2010 | Izadi et al. |
| 2010/0318709 | A1 | 12/2010 | Bell et al. |
| 2010/0325529 | A1 | 12/2010 | Sun |
| 2010/0332497 | A1 | 12/2010 | Valliani et al. |
| 2010/0333017 | A1 | 12/2010 | Ortiz |
| 2011/0003665 | A1 | 1/2011 | Burton et al. |
| 2011/0004835 | A1 | 1/2011 | Yanchar et al. |
| 2011/0007000 | A1 | 1/2011 | Lim et al. |
| 2011/0007009 | A1 | 1/2011 | Ishihara et al. |
| 2011/0010672 | A1 | 1/2011 | Hope |
| 2011/0012921 | A1 | 1/2011 | Cholewin et al. |
| 2011/0029934 | A1 | 2/2011 | Locker et al. |
| 2011/0041098 | A1 | 2/2011 | Kajiya et al. |
| 2011/0055722 | A1 | 3/2011 | Ludwig et al. |
| 2011/0059733 | A1 | 3/2011 | Kim et al. |
| 2011/0061010 | A1 | 3/2011 | Wasko et al. |
| 2011/0078597 | A1 | 3/2011 | Rapp et al. |
| 2011/0080359 | A1 | 4/2011 | Jang et al. |
| 2011/0083104 | A1 | 4/2011 | Minton |
| 2011/0087999 | A1 | 4/2011 | Bichsel et al. |
| 2011/0093821 | A1 | 4/2011 | Wigdor et al. |
| 2011/0119610 | A1 | 5/2011 | Hackborn et al. |

(56) References Cited

U.S. PATENT DOCUMENTS

2011/0119629 A1 5/2011 Huotari et al.
2011/0124376 A1 5/2011 Kim et al.
2011/0131534 A1 6/2011 Subramanian et al.
2011/0145758 A1 6/2011 Rosales et al.
2011/0148786 A1 6/2011 Day et al.
2011/0148798 A1 6/2011 Dahl
2011/0164058 A1 7/2011 Lemay
2011/0167058 A1 7/2011 Van Os
2011/0167357 A1 7/2011 Benjamin et al.
2011/0167365 A1 7/2011 Wingrove et al.
2011/0173556 A1 7/2011 Czerwinski et al.
2011/0179368 A1 7/2011 King et al.
2011/0202883 A1 8/2011 Oh et al.
2011/0225549 A1 9/2011 Kim
2011/0246918 A1 10/2011 Henderson
2011/0252346 A1 10/2011 Chaudhri
2011/0252349 A1 10/2011 Chaudhri
2011/0252372 A1 10/2011 Chaudhri
2011/0252373 A1 10/2011 Chaudhri
2011/0275940 A1 11/2011 Nims et al.
2011/0283334 A1 11/2011 Choi et al.
2011/0285659 A1 11/2011 Kuwabara et al.
2011/0298723 A1 12/2011 Fleizach et al.
2011/0302513 A1 12/2011 Ademar et al.
2011/0310005 A1 12/2011 Chen et al.
2011/0310058 A1 12/2011 Yamada et al.
2011/0314098 A1 12/2011 Farrell et al.
2012/0023471 A1 1/2012 Fischer et al.
2012/0030623 A1 2/2012 Hoellwarth
2012/0066630 A1 3/2012 Kim et al.
2012/0084692 A1 4/2012 Bae
2012/0084694 A1 4/2012 Sirpal et al.
2012/0092812 A1 4/2012 Lewis et al.
2012/0110031 A1 5/2012 Lahcanski et al.
2012/0151331 A1 6/2012 Pallakoff et al.
2012/0169617 A1 7/2012 Mäenpää
2012/0216146 A1 8/2012 Korkonen
2012/0304092 A1 11/2012 Jarrett et al.
2012/0324390 A1 12/2012 Tao et al.
2013/0007666 A1 1/2013 Song et al.
2013/0019175 A1 1/2013 Kotler et al.
2013/0024796 A1 1/2013 Seo
2013/0055127 A1 2/2013 Saito et al.
2013/0067411 A1 3/2013 Kataoka et al.
2013/0080951 A1 3/2013 Chuang et al.
2013/0111400 A1 5/2013 Miwa
2013/0170324 A1 7/2013 Tu et al.
2013/0194066 A1 8/2013 Rahman et al.
2013/0205244 A1 8/2013 Decker et al.
2013/0234924 A1 9/2013 Janefalkar et al.
2013/0254705 A1 9/2013 Mooring et al.
2013/0321340 A1 12/2013 Seo et al.
2013/0332886 A1 12/2013 Cranfill et al.
2014/0015786 A1 1/2014 Honda
2014/0068483 A1 3/2014 Platzer et al.
2014/0108978 A1 4/2014 Yu et al.
2014/0109024 A1 4/2014 Miyazaki
2014/0135631 A1 5/2014 Brumback et al.
2014/0139637 A1 5/2014 Mistry et al.
2014/0143678 A1 5/2014 Mistry et al.
2014/0143784 A1 5/2014 Mistry et al.
2014/0165006 A1 6/2014 Chaudhri et al.
2014/0195972 A1 7/2014 Lee et al.
2014/0200742 A1 7/2014 Mauti, Jr.
2014/0215457 A1 7/2014 Gava et al.
2014/0223372 A1 8/2014 Dostie et al.
2014/0237360 A1 8/2014 Chaudhri et al.
2014/0276244 A1 9/2014 Kamyar
2014/0293755 A1 10/2014 Geiser et al.
2014/0317555 A1 10/2014 Choi et al.
2014/0328151 A1 11/2014 Serber
2014/0365126 A1 12/2014 Vulcano et al.
2014/0365956 A1 12/2014 Karunamuni et al.
2015/0012853 A1 1/2015 Chaudhri et al.
2015/0015500 A1 1/2015 Lee et al.
2015/0089407 A1 3/2015 Suzuki
2015/0105125 A1 4/2015 Min et al.
2015/0112752 A1 4/2015 Wagner et al.
2015/0117162 A1 4/2015 Tsai et al.
2015/0160812 A1 6/2015 Yuan et al.
2015/0172438 A1 6/2015 Yang
2015/0185947 A1 7/2015 Tsai et al.
2015/0242092 A1 8/2015 Van et al.
2015/0242989 A1 8/2015 Lee et al.
2015/0249733 A1 9/2015 Miura
2015/0253736 A1 9/2015 Watterson
2015/0277692 A1 10/2015 Liu
2015/0281945 A1 10/2015 Seo et al.
2015/0301506 A1 10/2015 Koumaiha
2015/0331589 A1 11/2015 Kawakita
2015/0366518 A1 12/2015 Sampson
2015/0379476 A1 12/2015 Chaudhri et al.
2016/0019360 A1 1/2016 Pahwa et al.
2016/0034133 A1 2/2016 Wilson et al.
2016/0034148 A1 2/2016 Wilson et al.
2016/0034167 A1 2/2016 Wilson et al.
2016/0048296 A1 2/2016 Gan et al.
2016/0054710 A1 2/2016 Jo et al.
2016/0058336 A1 3/2016 Blahnik et al.
2016/0058337 A1 3/2016 Blahnik et al.
2016/0062541 A1 3/2016 Anzures et al.
2016/0062572 A1 3/2016 Yang et al.
2016/0077495 A1 3/2016 Brown et al.
2016/0117141 A1 4/2016 Ro et al.
2016/0124626 A1 5/2016 Lee et al.
2016/0139798 A1 5/2016 Takikawa et al.
2016/0166197 A1 6/2016 Venkatraman et al.
2016/0179310 A1 6/2016 Chaudhri et al.
2016/0182805 A1 6/2016 Emmett et al.
2016/0196419 A1 7/2016 Kuscher
2016/0224211 A1 8/2016 Xu et al.
2016/0253065 A1 9/2016 Platzer et al.
2016/0269540 A1 9/2016 Butcher et al.
2016/0299679 A1 10/2016 Park et al.
2016/0313913 A1 10/2016 Leem et al.
2017/0039535 A1 2/2017 Park et al.
2017/0075305 A1 3/2017 Ryu et al.
2017/0147198 A1 5/2017 Herz et al.
2017/0212667 A1 7/2017 Miyazaki
2017/0223176 A1 8/2017 Anzures et al.
2017/0255169 A1 9/2017 Lee et al.
2017/0286614 A1 10/2017 Morris et al.
2017/0344329 A1 11/2017 Oh et al.
2017/0357426 A1 12/2017 Wilson et al.
2017/0357427 A1 12/2017 Wilson et al.
2017/0357433 A1 12/2017 Boule et al.
2017/0374205 A1 12/2017 Panda
2018/0150216 A1 5/2018 Choi et al.
2018/0307388 A1 10/2018 Chaudhri et al.
2019/0171349 A1 6/2019 Van Os et al.
2019/0173996 A1 6/2019 Butcher et al.
2019/0179514 A1 6/2019 Van Os et al.
2019/0235724 A1 8/2019 Platzer et al.
2019/0320057 A1 10/2019 Omernick et al.
2019/0369842 A1 12/2019 Dolbakian et al.
2020/0000035 A1 1/2020 Calmer
2020/0054549 A1 2/2020 Paufique
2020/0142554 A1 5/2020 Lin et al.
2020/0183572 A1 6/2020 Moore et al.
2020/0192683 A1 6/2020 Lin et al.
2020/0225843 A1 7/2020 Herz et al.
2020/0333945 A1 10/2020 Wilson et al.
2020/0348814 A1 11/2020 Platzer et al.
2020/0348822 A1 11/2020 Dascola et al.
2020/0356242 A1 11/2020 Wilson et al.
2020/0379615 A1 12/2020 Chaudhri et al.
2021/0109647 A1 4/2021 Van Os et al.
2021/0112152 A1 4/2021 Omernick et al.
2021/0132758 A1 5/2021 Xu
2021/0141506 A1 5/2021 Chaudhri et al.
2021/0195013 A1 6/2021 Butcher et al.
2021/0271374 A1 9/2021 Chaudhri et al.
2021/0311438 A1 10/2021 Wilson et al.
2022/0137765 A1 5/2022 Platzer et al.

(56) References Cited

U.S. PATENT DOCUMENTS

| | | | |
|---|---|---|---|
| 2022/0202384 | A1 | 6/2022 | Saiki et al. |
| 2022/0206649 | A1 | 6/2022 | Chaudhri et al. |
| 2022/0377167 | A1 | 11/2022 | Omernick et al. |
| 2022/0413684 | A1 | 12/2022 | Van Os et al. |
| 2022/0417358 | A1 | 12/2022 | Butcher et al. |
| 2023/0152940 | A1 | 5/2023 | Chaudhri et al. |
| 2023/0244355 | A1 | 8/2023 | Van Os et al. |
| 2023/0370538 | A1 | 11/2023 | Omernick et al. |
| 2023/0393535 | A1 | 12/2023 | Wilson et al. |
| 2023/0409165 | A1 | 12/2023 | Dascola et al. |
| 2023/0418434 | A1 | 12/2023 | Chaudhri et al. |
| 2024/0053878 | A1 | 2/2024 | Wilson et al. |
| 2024/0176479 | A1 | 5/2024 | Chaudhri et al. |
| 2024/0364806 | A1 | 10/2024 | Butcher et al. |
| 2025/0103178 | A1 | 3/2025 | Albrecht-Buehler et al. |
| 2025/0138701 | A1 | 5/2025 | Chaudhri et al. |
| 2025/0164941 | A1 | 5/2025 | Wilson et al. |
| 2025/0165137 | A1 | 5/2025 | Chaudhri et al. |

FOREIGN PATENT DOCUMENTS

| | | | |
|---|---|---|---|
| AU | 2015100115 | A4 | 3/2015 |
| AU | 2015101022 | A4 | 9/2015 |
| CA | 2349649 | A1 | 1/2002 |
| CA | 2800123 | C | 7/2016 |
| CH | 700242 | A2 | 7/2010 |
| CN | 1257247 | A | 6/2000 |
| CN | 1392977 | A | 1/2003 |
| CN | 1464719 | A | 12/2003 |
| CN | 1695105 | A | 11/2005 |
| CN | 1773875 | A | 5/2006 |
| CN | 1786906 | A | 6/2006 |
| CN | 1818843 | A | 8/2006 |
| CN | 1940833 | A | 4/2007 |
| CN | 1998150 | A | 7/2007 |
| CN | 101072410 | A | 11/2007 |
| CN | 101308443 | A | 11/2008 |
| CN | 102033710 | A | 4/2011 |
| CN | 102081502 | A | 6/2011 |
| CN | 102221931 | A | 10/2011 |
| CN | 102244676 | A | 11/2011 |
| CN | 102298502 | A | 12/2011 |
| CN | 102364438 | A | 2/2012 |
| CN | 102446059 | A | 5/2012 |
| CN | 102801649 | A | 11/2012 |
| CN | 102830911 | A | 12/2012 |
| CN | 102981704 | A | 3/2013 |
| CN | 102999249 | A | 3/2013 |
| CN | 103116440 | A | 5/2013 |
| CN | 102004614 | B | 6/2013 |
| CN | 103154849 | A | 6/2013 |
| CN | 103191557 | A | 7/2013 |
| CN | 103210366 | A | 7/2013 |
| CN | 103649897 | A | 3/2014 |
| CN | 104281405 | A | 1/2015 |
| CN | 104471532 | A | 3/2015 |
| CN | 104580576 | A | 4/2015 |
| CN | 104717356 | A | 6/2015 |
| CN | 104737114 | A | 6/2015 |
| CN | 105286843 | A | 2/2016 |
| CN | 105302468 | A | 2/2016 |
| CN | 105335087 | A | 2/2016 |
| CN | 105389107 | A | 3/2016 |
| CN | 105607858 | A | 5/2016 |
| EP | 0163032 | A2 | 12/1985 |
| EP | 0322332 | A2 | 6/1989 |
| EP | 0404373 | A1 | 12/1990 |
| EP | 0476972 | A2 | 3/1992 |
| EP | 0626635 | A2 | 11/1994 |
| EP | 0651544 | A2 | 5/1995 |
| EP | 0689134 | A1 | 12/1995 |
| EP | 0701220 | A1 | 3/1996 |
| EP | 0844553 | A1 | 5/1998 |
| EP | 0880090 | A2 | 11/1998 |
| EP | 1003098 | A2 | 5/2000 |
| EP | 1049305 | A1 | 11/2000 |
| EP | 1143334 | A2 | 10/2001 |
| EP | 1186997 | A2 | 3/2002 |
| EP | 1231763 | A1 | 8/2002 |
| EP | 1517228 | A2 | 3/2005 |
| EP | 1632874 | A2 | 3/2006 |
| EP | 1674976 | A2 | 6/2006 |
| EP | 1724996 | A2 | 11/2006 |
| EP | 1744242 | A2 | 1/2007 |
| EP | 1752880 | A1 | 2/2007 |
| EP | 2150031 | A1 | 2/2010 |
| EP | 1964022 | B1 | 3/2010 |
| EP | 2204702 | A1 | 7/2010 |
| EP | 2911377 | A1 | 8/2015 |
| EP | 2955591 | A2 | 12/2015 |
| EP | 2993602 | A1 | 3/2016 |
| EP | 3152643 | A1 | 4/2017 |
| FR | 2819675 | A1 | 7/2002 |
| GB | 2301217 | A | 11/1996 |
| GB | 2329813 | A | 3/1999 |
| GB | 2407900 | A | 5/2005 |
| GB | 2457939 | B | 9/2010 |
| JP | 5-225302 | A | 9/1993 |
| JP | 6-51930 | A | 2/1994 |
| JP | 6-208446 | A | 7/1994 |
| JP | 7-225829 | A | 8/1995 |
| JP | 8-221203 | A | 8/1996 |
| JP | 9-73381 | A | 3/1997 |
| JP | 9-97162 | A | 4/1997 |
| JP | 9-101874 | A | 4/1997 |
| JP | 9-128187 | A | 5/1997 |
| JP | 9-138745 | A | 5/1997 |
| JP | 9-258971 | A | 10/1997 |
| JP | 9-292262 | A | 11/1997 |
| JP | 9-297750 | A | 11/1997 |
| JP | 10-40067 | A | 2/1998 |
| JP | 10-96648 | A | 4/1998 |
| JP | 10-214350 | A | 8/1998 |
| JP | 10-340178 | A | 12/1998 |
| JP | 11-143604 | A | 5/1999 |
| JP | 11-154899 | A | 6/1999 |
| JP | 11-508116 | A | 7/1999 |
| JP | 11-242539 | A | 9/1999 |
| JP | 11-327433 | A | 11/1999 |
| JP | 2000-10702 | A | 1/2000 |
| JP | 2000-20213 | A | 1/2000 |
| JP | 2000-105772 | A | 4/2000 |
| JP | 2000-163031 | A | 6/2000 |
| JP | 2000-163193 | A | 6/2000 |
| JP | 2000-163444 | A | 6/2000 |
| JP | 2000-181436 | A | 6/2000 |
| JP | 2000-242390 | A | 9/2000 |
| JP | 2001-92430 | A | 4/2001 |
| JP | 2001-92586 | A | 4/2001 |
| JP | 2001-142604 | A | 5/2001 |
| JP | 2001-175386 | A | 6/2001 |
| JP | 2001-265481 | A | 9/2001 |
| JP | 2001-312347 | A | 11/2001 |
| JP | 2001-318751 | A | 11/2001 |
| JP | 2001-339509 | A | 12/2001 |
| JP | 2002-7016 | A | 1/2002 |
| JP | 2002-41197 | A | 2/2002 |
| JP | 2002-41206 | A | 2/2002 |
| JP | 2002-62966 | A | 2/2002 |
| JP | 2002-99370 | A | 4/2002 |
| JP | 2002-132412 | A | 5/2002 |
| JP | 2002-149312 | A | 5/2002 |
| JP | 2002-149616 | A | 5/2002 |
| JP | 2002-157078 | A | 5/2002 |
| JP | 2002-189567 | A | 7/2002 |
| JP | 2002-244635 | A | 8/2002 |
| JP | 2002-525705 | A | 8/2002 |
| JP | 2002-297514 | A | 10/2002 |
| JP | 2002-312105 | A | 10/2002 |
| JP | 2002-323850 | A | 11/2002 |
| JP | 2003-66941 | A | 3/2003 |
| JP | 2003-139546 | A | 5/2003 |
| JP | 2003-162356 | A | 6/2003 |
| JP | 2003-162731 | A | 6/2003 |

(56) References Cited

FOREIGN PATENT DOCUMENTS

| | | | |
|---|---|---|---|
| JP | 2003-198705 | A | 7/2003 |
| JP | 2003-248538 | A | 9/2003 |
| JP | 2003-256142 | A | 9/2003 |
| JP | 2003-271310 | A | 9/2003 |
| JP | 2003-295994 | A | 10/2003 |
| JP | 2003-536125 | A | 12/2003 |
| JP | 2004-38260 | A | 2/2004 |
| JP | 2004-38310 | A | 2/2004 |
| JP | 2004-62645 | A | 2/2004 |
| JP | 2004-70492 | A | 3/2004 |
| JP | 2004-118478 | A | 4/2004 |
| JP | 2004-132741 | A | 4/2004 |
| JP | 2004-152075 | A | 5/2004 |
| JP | 2004-159180 | A | 6/2004 |
| JP | 2004-164242 | A | 6/2004 |
| JP | 2004-206230 | A | 7/2004 |
| JP | 2004-208217 | A | 7/2004 |
| JP | 2004-227393 | A | 8/2004 |
| JP | 2004-288208 | A | 10/2004 |
| JP | 2004-318505 | A | 11/2004 |
| JP | 2004-341886 | A | 12/2004 |
| JP | 2004-341892 | A | 12/2004 |
| JP | 2004-343662 | A | 12/2004 |
| JP | 2005-4396 | A | 1/2005 |
| JP | 2005-4419 | A | 1/2005 |
| JP | 2005-18229 | A | 1/2005 |
| JP | 2005-115896 | A | 4/2005 |
| JP | 2005-515530 | A | 5/2005 |
| JP | 2005-198064 | A | 7/2005 |
| JP | 2005-202703 | A | 7/2005 |
| JP | 2005-227826 | A | 8/2005 |
| JP | 2005-227951 | A | 8/2005 |
| JP | 2005-228088 | A | 8/2005 |
| JP | 2005-228091 | A | 8/2005 |
| JP | 2005-234291 | A | 9/2005 |
| JP | 2005-242669 | A | 9/2005 |
| JP | 2005-267049 | A | 9/2005 |
| JP | 2005-309933 | A | 11/2005 |
| JP | 2005-321915 | A | 11/2005 |
| JP | 2005-327064 | A | 11/2005 |
| JP | 2005-352924 | A | 12/2005 |
| JP | 2005-352943 | A | 12/2005 |
| JP | 2006-18645 | A | 1/2006 |
| JP | 2006-71582 | A | 3/2006 |
| JP | 2006-99733 | A | 4/2006 |
| JP | 2006-155232 | A | 6/2006 |
| JP | 2006-242717 | A | 9/2006 |
| JP | 2006-259376 | A | 9/2006 |
| JP | 2007-25998 | A | 2/2007 |
| JP | 2007-124667 | A | 5/2007 |
| JP | 2007-132676 | A | 5/2007 |
| JP | 2007-512635 | A | 5/2007 |
| JP | 2007-334984 | A | 12/2007 |
| JP | 2008-15698 | A | 1/2008 |
| JP | 2008-503007 | A | 1/2008 |
| JP | 2008-52705 | A | 3/2008 |
| JP | 2008-102860 | A | 5/2008 |
| JP | 2008-123553 | A | 5/2008 |
| JP | 2008-518330 | A | 5/2008 |
| JP | 2008-171127 | A | 7/2008 |
| JP | 2008-262251 | A | 10/2008 |
| JP | 2008-304959 | A | 12/2008 |
| JP | 2008-306667 | A | 12/2008 |
| JP | 2009-9350 | A | 1/2009 |
| JP | 2009-508217 | A | 2/2009 |
| JP | 2009-51921 | A | 3/2009 |
| JP | 2009-136456 | A | 6/2009 |
| JP | 2009-522666 | A | 6/2009 |
| JP | 2009-151821 | A | 7/2009 |
| JP | 2009-265929 | A | 11/2009 |
| JP | 2009-277192 | A | 11/2009 |
| JP | 2009-290847 | A | 12/2009 |
| JP | 2010-61402 | A | 3/2010 |
| JP | 2010-97552 | A | 4/2010 |
| JP | 2010-187096 | A | 8/2010 |
| JP | 2010-538394 | A | 12/2010 |
| JP | 2012-208645 | A | 10/2012 |
| JP | 2013-25357 | A | 2/2013 |
| JP | 2013-25409 | A | 2/2013 |
| JP | 2013-47919 | A | 3/2013 |
| JP | 2013-106271 | A | 5/2013 |
| JP | 2013-516698 | A | 5/2013 |
| JP | 2013-120468 | A | 6/2013 |
| JP | 2013-191234 | A | 9/2013 |
| JP | 2013-200265 | A | 10/2013 |
| JP | 2013-203283 | A | 10/2013 |
| JP | 2013-206274 | A | 10/2013 |
| JP | 2013-211055 | A | 10/2013 |
| JP | 2013-218698 | A | 10/2013 |
| JP | 2014-503891 | A | 2/2014 |
| JP | 2020-161134 | A | 10/2020 |
| KR | 2002-0010863 | A | 2/2002 |
| KR | 10-0490373 | B1 | 5/2005 |
| KR | 10-2006-0085850 | A | 7/2006 |
| KR | 10-2009-0035499 | A | 4/2009 |
| KR | 10-2009-0100320 | A | 9/2009 |
| KR | 10-2010-0019887 | A | 2/2010 |
| KR | 10-2011-0078008 | A | 7/2011 |
| KR | 10-2011-0093729 | A | 8/2011 |
| KR | 10-2012-0050883 | A | 5/2012 |
| KR | 10-2012-0057800 | A | 6/2012 |
| KR | 10-2012-0091495 | A | 8/2012 |
| KR | 10-2013-0011437 | A | 1/2013 |
| KR | 10-2013-0016329 | A | 2/2013 |
| KR | 10-2015-0022599 | A | 3/2015 |
| KR | 10-2015-0140212 | A | 12/2015 |
| WO | 96/06401 | A1 | 2/1996 |
| WO | 98/44431 | A2 | 10/1998 |
| WO | 99/28815 | A1 | 6/1999 |
| WO | 99/38149 | A1 | 7/1999 |
| WO | 99/54807 | A1 | 10/1999 |
| WO | 00/08757 | A1 | 2/2000 |
| WO | 00/16186 | A2 | 3/2000 |
| WO | 01/16690 | A2 | 3/2001 |
| WO | 01/46790 | A2 | 6/2001 |
| WO | 01/57716 | A2 | 8/2001 |
| WO | 02/08881 | A2 | 1/2002 |
| WO | 02/13176 | A2 | 2/2002 |
| WO | 02/32088 | A2 | 4/2002 |
| WO | 02/46903 | A1 | 6/2002 |
| WO | 02/082418 | A2 | 10/2002 |
| WO | 02/093542 | A1 | 11/2002 |
| WO | 03/052626 | A1 | 6/2003 |
| WO | 03/060622 | A2 | 7/2003 |
| WO | 03/107168 | A1 | 12/2003 |
| WO | 2004/021166 | A1 | 3/2004 |
| WO | 2004/040481 | A1 | 5/2004 |
| WO | 2004/063862 | A2 | 7/2004 |
| WO | 2005/036416 | A2 | 4/2005 |
| WO | 2005/041020 | A1 | 5/2005 |
| WO | 2005/055034 | A1 | 6/2005 |
| WO | 2005/074268 | A1 | 8/2005 |
| WO | 2005/106684 | A1 | 11/2005 |
| WO | 2006/003591 | A2 | 1/2006 |
| WO | 2006/012343 | A2 | 2/2006 |
| WO | 2006/019639 | A2 | 2/2006 |
| WO | 2006/020304 | A2 | 2/2006 |
| WO | 2006/020305 | A2 | 2/2006 |
| WO | 2006/036069 | A1 | 4/2006 |
| WO | 2006/037545 | A2 | 4/2006 |
| WO | 2006/092464 | A1 | 9/2006 |
| WO | 2006/117438 | A1 | 11/2006 |
| WO | 2006/119269 | A2 | 11/2006 |
| WO | 2007/031816 | A1 | 3/2007 |
| WO | 2007/032908 | A1 | 3/2007 |
| WO | 2007/032972 | A1 | 3/2007 |
| WO | 2006/020304 | A3 | 5/2007 |
| WO | 2007/069835 | A1 | 6/2007 |
| WO | 2007/080559 | A2 | 7/2007 |
| WO | 2007/094894 | A2 | 8/2007 |
| WO | 2007/142256 | A1 | 12/2007 |
| WO | 2008/017936 | A2 | 2/2008 |
| WO | 2008/030874 | A1 | 3/2008 |
| WO | 2008/030976 | A2 | 3/2008 |

(56) References Cited

FOREIGN PATENT DOCUMENTS

| | | | |
|---|---|---|---|
| WO | 2008/086303 | A1 | 7/2008 |
| WO | 2007/100944 | A3 | 8/2008 |
| WO | 2008/114491 | A1 | 9/2008 |
| WO | 2009/032638 | A2 | 3/2009 |
| WO | 2009/032750 | A1 | 3/2009 |
| WO | 2009/089222 | A2 | 7/2009 |
| WO | 2011/126501 | A1 | 10/2011 |
| WO | 2012/078079 | A2 | 6/2012 |
| WO | 2013/017736 | A1 | 2/2013 |
| WO | 2013/103570 | A1 | 7/2013 |
| WO | 2013/149055 | A1 | 10/2013 |
| WO | 2013/157330 | A1 | 10/2013 |
| WO | 2016/025395 | A2 | 2/2016 |

OTHER PUBLICATIONS

Final Office Action received for U.S. Appl. No. 18/139,311, mailed on Mar. 29, 2024, 10 pages.
Notice of Allowance received for U.S. Appl. No. 15/421,865, mailed on Apr. 15, 2024, 12 pages.
Summons to Oral Proceedings received for European Patent Application No. 14734674.6, mailed on Apr. 5, 2024, 4 pages.
Decision to Grant received for European Patent Application No. 19176224.4, mailed on Oct. 24, 2024, 4 pages.
Notice of Allowance received for U.S. Appl. No. 18/236,340, mailed on Oct. 30, 2024, 7 pages.
Notice of Allowance received for U.S. Appl. No. 18/503,120, mailed on Nov. 13, 2024, 2 pages.
Notice of Allowance received for U.S. Appl. No. 18/503,120, mailed on Oct. 29, 2024, 9 pages.
Notice of Allowance received for U.S. Appl. No. 17/950,972, mailed on May 22, 2024, 8 pages.
Office Action received for Chinese Patent Application No. 202110957983.8, mailed on May 13, 2024, 18 pages (12 pages of English Translation and 6 pages of Official Copy).
Applicant-Initiated Interview Summary received for U.S. Appl. No. 18/375,448, mailed on Jul. 23, 2025, 4 pages.
Office Action received for Japanese Patent Application No. 2024-122504, mailed on Jul. 22, 2025, 10 pages (5 pages of English Translation and 5 pages of Official Copy).
Office Action received for European Patent Application No. 17810739.7, mailed on Jan. 20, 2025, 6 pages.
Decision to Grant received for European Patent Application No. 17813879.8, mailed on Sep. 11, 2025, 2 pages.
Notice of Allowance received for U.S. Appl. No. 18/121,539, mailed on Sep. 30, 2025, 12 pages.
Result of Consultation received for European Patent Application No. 17810739.7, mailed on Sep. 23, 2025, 3 pages.
Applicant-Initiated Interview Summary received for U.S. Appl. No. 18/121,539, mailed on May 1, 2024, 5 pages.
Applicant-Initiated Interview Summary received for U.S. Appl. No. 18/139,311, mailed on May 7, 2024, 2 pages.
Notice of Allowance received for U.S. Appl. No. 17/728,725, mailed on May 8, 2024, 9 pages.
Office Action received for Japanese Patent Application No. 2022-145450, mailed on Mar. 1, 2024, 9 pages (4 pages of English Translation and 5 pages of Official Copy).
Applicant-Initiated Interview Summary received for U.S. Appl. No. 15/421,865, mailed on Oct. 3, 2023, 6 pages.
Brief Communication Regarding Oral Proceedings received for European Patent Application No. 20203888.1, mailed on Sep. 22, 2023, 6 pages.
Corrected Notice of Allowance received for U.S. Appl. No. 17/698,979, mailed on Oct. 2, 2023, 2 pages.
Decision to Grant received for European Patent Application No. 17810723.1, mailed on Sep. 21, 2023, 2 pages.
Motley Latonya, "Course Topics", Windows XP Introduction, Mar. 2005, 19 pages.
Office Action received for Australian Patent Application No. 2022224726, mailed on Aug. 22, 2023, 6 pages.
Sams Teach Yourself Microsoft Windows 2000 Professional in 10 Minutes, InformIT, Online Available at: https://www.informit.com/articles/article.aspx?p=411736&seqNum=158, Sep. 9, 2005, 1 page.
Taskbar basics, Online Available at: www.microsoft.com/windows98/usingwindows/work/articles/811Nov/WRKfoundation4.asp, Apr. 21, 1999, 1 page.
Windows XP Tutorial—The Windows XP desktop & icons, www.helpwithpcs.com, Mar. 15, 2006, 13 pages.
Zisman Alan, "Clean up your Windows Desktop and Start Menu", Available online at: https://web.archive.org/web/20060103043656/http://www.zisman.ca/simple95/, Jan. 3, 2006, 7 pages.
Advisory Action received for U.S. Appl. No. 17/728,725, mailed on Nov. 9, 2023, 5 pages.
Applicant-Initiated Interview Summary received for U.S. Appl. No. 17/728,725, mailed on Oct. 27, 2023, 2 pages.
Extended European Search Report received for European Patent Application No. 23201849.9, mailed on Oct. 26, 2023, 9 pages.
Office Action received for Australian Patent Application No. 2022224726, mailed on Nov. 1, 2023, 4 pages.
Office Action received for Japanese Patent Application No. 2022-145450, mailed on Nov. 6, 2023, 8 pages (4 pages of English Translation and 4 pages of Official Copy).
Advisory Action received for U.S. Appl. No. 18/139,311, mailed on Apr. 10, 2025, 3 pages.
Extended European Search Report received for European Patent Application No. 24205042.5, mailed on Mar. 31, 2025, 10 pages.
Final Office Action received for U.S. Appl. No. 18/121,539, mailed on Apr. 10, 2025, 55 pages.
Office Action received for European Patent Application No. 23201849.9, mailed on Apr. 2, 2025, 6 pages.
Applicant-Initiated Interview Summary received for U.S. Appl. No. 15/421,865, mailed on Feb. 28, 2022, 5 pages.
Final Office Action received for U.S. Appl. No. 15/421,865, mailed on Jul. 12, 2022, 27 pages.
Non-Final Office Action received for U.S. Appl. No. 15/421,865, mailed on Dec. 29, 2021, 23 pages.
Non-Final Office Action received for U.S. Appl. No. 15/421,865, mailed on Jul. 11, 2023, 32 pages.
Notice of Acceptance received for Australian Patent Application No. 2022202583, mailed on Aug. 7, 2023, 3 pages.
Notice of Allowance received for U.S. Appl. No. 15/411,110, mailed on Aug. 2, 2023, 2 pages.
Non-Final Office Action received for U.S. Appl. No. 18/139,311, mailed on Dec. 22, 2023, 11 pages.
Office Action received for Chinese Patent Application No. 202110957983.8, mailed on Dec. 27, 2023, 23 pages (13 pages of English Translation and 10 pages of Official Copy).
Examiner's Answer to Appeal Brief received for U.S. Appl. No. 18/139,311, mailed on Aug. 13, 2025, 16 pages.
Applicant-Initiated Interview Summary received for U.S. Appl. No. 18/139,311, mailed on Feb. 23, 2024, 2 pages.
Final Office Action received for U.S. Appl. No. 15/421,865, mailed on Mar. 7, 2024, 27 pages.
Notice of Acceptance received for Australian Patent Application No. 2022224726, mailed on Mar. 5, 2024, 3 pages.
Notice of Allowance received for U.S. Appl. No. 18/130,847, mailed on Feb. 28, 2024, 9 pages.
Applicant-Initiated Interview Summary received for U.S. Appl. No. 15/411,110, mailed on May 3, 2023, 3 pages.
Applicant-Initiated Interview Summary received for U.S. Appl. No. 15/411,110, mailed on Oct. 31, 2022, 6 pages.
Applicant-Initiated Interview Summary received for U.S. Appl. No. 16/737,372, mailed on Aug. 31, 2022, 2 pages.
Applicant-Initiated Interview Summary received for U.S. Appl. No. 16/737,372, mailed on Mar. 1, 2022, 2 pages.
Applicant-Initiated Interview Summary received for U.S. Appl. No. 16/994,392, mailed on Mar. 10, 2022, 2 pages.
Applicant-Initiated Interview Summary received for U.S. Appl. No. 17/728,725, mailed on Apr. 19, 2023, 2 pages.

(56) References Cited

OTHER PUBLICATIONS

Brief Communication Regarding Oral Proceedings received for European Patent Application No. 17810723.1, mailed on Nov. 11, 2022, 11 pages.
Corrected Notice of Allowance received for U.S. Appl. No. 16/994,392, mailed on Aug. 4, 2022, 2 pages.
Corrected Notice of Allowance received for U.S. Appl. No. 16/994,392, mailed on Jul. 19, 2022, 2 pages.
Corrected Notice of Allowance received for U.S. Appl. No. 17/002,622, mailed on Feb. 16, 2022, 2 pages.
Corrected Notice of Allowance received for U.S. Appl. No. 17/002,622, mailed on Jan. 25, 2022, 2 pages.
Corrected Notice of Allowance received for U.S. Appl. No. 17/130,674, mailed on Jul. 29, 2022, 2 pages.
Corrected Notice of Allowance received for U.S. Appl. No. 17/521,768, mailed on Jul. 29, 2022, 2 pages.
Corrected Notice of Allowance received for U.S. Appl. No. 17/698,979, mailed on Feb. 17, 2023, 2 pages.
Decision to Grant received for European Patent Application No. 08829660.3, mailed on May 6, 2022, 2 pages.
Decision to Grant received for European Patent Application No. 09170697.8, mailed on Apr. 29, 2022, 2 pages.
Decision to Refuse received for European Patent Application No. 14734674.6, mailed on Jun. 29, 2022, 15 pages.
Decision to Refuse received for Japanese Patent Application No. 2020-123882, mailed on Mar. 3, 2023, 6 pages (3 pages of English Translation and 3 pages of Official Copy).
Examiner's Answer to Appeal Brief received for U.S. Appl. No. 15/411,110, mailed on Feb. 1, 2022, 9 pages.
Final Office Action received for U.S. Appl. No. 15/411,110, mailed on Apr. 12, 2023, 27 pages.
Final Office Action received for U.S. Appl. No. 16/737,372, mailed on Jan. 28, 2022, 20 pages.
Final Office Action received for U.S. Appl. No. 16/994,392, mailed on Jan. 18, 2022, 12 pages.
Final Office Action received for U.S. Appl. No. 17/728,725, mailed on Jul. 31, 2023, 15 pages.
Intention to Grant received for European Patent Application No. 17810723.1, mailed on Dec. 16, 2022, 9 pages.
Intention to Grant received for European Patent Application No. 17810723.1, mailed on Jun. 12, 2023, 9 pages.
Minutes of the Oral Proceedings received for European Patent Application No. 14734674.6, mailed on Jun. 13, 2022, 9 pages.
Minutes of the Oral Proceedings received for European Patent Application No. 17810723.1, mailed on Dec. 9, 2022, 7 pages.
Non-Final Office Action received for U.S. Appl. No. 15/411,110, mailed on Jul. 14, 2022, 28 pages.
Non-Final Office Action received for U.S. Appl. No. 16/737,372, mailed on Apr. 29, 2022, 19 pages.
Non-Final Office Action received for U.S. Appl. No. 17/130,674, mailed on Mar. 3, 2022, 8 pages.
Non-Final Office Action received for U.S. Appl. No. 17/321,313, mailed on Jul. 19, 2022, 18 pages.
Non-Final Office Action received for U.S. Appl. No. 17/349,226, mailed on Mar. 16, 2023, 9 pages.
Non-Final Office Action received for U.S. Appl. No. 17/728,725, mailed on Feb. 16, 2023, 11 pages.
Non-Final Office Action received for U.S. Appl. No. 17/950,972, mailed on Jul. 18, 2023, 15 pages.
Notice of Acceptance received for Australian Patent Application No. 2020239774, mailed on Jan. 5, 2022, 3 pages.
Notice of Acceptance received for Australian Patent Application No. 2021201687, mailed on Jun. 8, 2022, 3 pages.
Notice of Allowance received for Canadian Patent Application No. 3,109,701, mailed on Apr. 4, 2023, 1 page.
Notice of Allowance received for Chinese Patent Application No. 201780033621.1, mailed on Mar. 10, 2022, 2 pages (1 page of English Translation and 1 page of Official Copy).
Notice of Allowance received for Chinese Patent Application No. 201780034059.4, mailed on Feb. 19, 2023, 2 pages (1 page of English Translation and 1 page of Official Copy).
Notice of Allowance received for Chinese Patent Application No. 201910965046.X, mailed on Mar. 8, 2023, 2 pages (1 page of English Translation and 1 page of Official Copy).
Notice of Allowance received for Japanese Patent Application No. 2019-024663, mailed on Sep. 26, 2022, 23 pages (1 page of English Translation and 22 pages of Official Copy).
Notice of Allowance received for Japanese Patent Application No. 2020-046707, mailed on Aug. 15, 2022, 4 pages (1 page of English Translation and 3 pages of Official Copy).
Notice of Allowance received for Korean Patent Application No. 10-2020-7018655, mailed on Feb. 25, 2022, 4 pages (1 page of English Translation and 3 pages of Official Copy).
Notice of Allowance received for U.S. Appl. No. 15/411,110, mailed on May 23, 2023, 8 pages.
Notice of Allowance received for U.S. Appl. No. 16/737,372, mailed on Feb. 1, 2023, 2 pages.
Notice of Allowance received for U.S. Appl. No. 16/737,372, mailed on Feb. 10, 2023, 2 pages.
Notice of Allowance received for U.S. Appl. No. 16/737,372, mailed on Jan. 25, 2023, 7 pages.
Notice of Allowance received for U.S. Appl. No. 16/994,392, mailed on Jul. 11, 2022, 26 pages.
Notice of Allowance received for U.S. Appl. No. 17/130,674, mailed on Jun. 15, 2022, 9 pages.
Notice of Allowance received for U.S. Appl. No. 17/190,869, mailed on Jan. 10, 2022, 10 pages.
Notice of Allowance received for U.S. Appl. No. 17/321,313, mailed on Oct. 24, 2022, 9 pages.
Notice of Allowance received for U.S. Appl. No. 17/349,226, mailed on May 24, 2023, 7 pages.
Notice of Allowance received for U.S. Appl. No. 17/349,226, mailed on Sep. 20, 2022, 7 pages.
Notice of Allowance received for U.S. Appl. No. 17/521,768, mailed on Jul. 15, 2022, 10 pages.
Notice of Allowance received for U.S. Appl. No. 17/586,454, mailed on Apr. 17, 2023, 22 pages.
Notice of Allowance received for U.S. Appl. No. 17/698,979, mailed on Feb. 6, 2023, 10 pages.
Notice of Allowance received for U.S. Appl. No. 17/698,979, mailed on Jun. 28, 2023, 8 pages.
Notice of Allowance received for U.S. Appl. No. 17/894,918, mailed on Jan. 25, 2023, 9 pages.
Office Action received for Australian Patent Application No. 2021201687, mailed on Mar. 16, 2022, 5 pages.
Office Action received for Australian Patent Application No. 2022202583, mailed on Mar. 24, 2023, 4 pages.
Office Action received for Canadian Patent Application No. 3,109,701, mailed on Feb. 7, 2022, 4 pages.
Office Action received for Chinese Patent Application No. 201780033621.1, mailed on Dec. 14, 2021, 8 pages (4 pages of English Translation and 4 pages of Official Copy).
Office Action received for Chinese Patent Application No. 201780034059.4, mailed on Oct. 9, 2022, 11 pages (5 pages of English Translation and 6 pages of Official Copy).
Office Action received for Chinese Patent Application No. 201910965046.X, mailed on Dec. 5, 2022, 11 pages (5 pages of English Translation and 6 pages of Official Copy).
Office Action received for Chinese Patent Application No. 202010125835.5, mailed on Mar. 11, 2023, 11 pages (5 pages of English Translation and 6 pages of Official Copy).
Office Action received for European Patent Application No. 17810739.7, mailed on Feb. 17, 2023, 8 pages.
Office Action received for European Patent Application No. 17813879.8, mailed on Jun. 22, 2023, 7 pages.
Office Action received for European Patent Application No. 19176224.4, mailed on Jan. 18, 2022, 6 pages.
Office Action received for European Patent Application No. 20203888.1, mailed on Mar. 10, 2022, 6 pages.

(56) References Cited

OTHER PUBLICATIONS

Office Action received for Japanese Patent Application No. 2019-24663, mailed on Feb. 10, 2022, 4 pages (2 pages of English Translation and 2 pages of Official Copy).
Office Action received for Japanese Patent Application No. 2020-046707, mailed on Jan. 7, 2022, 10 pages (5 pages of English Translation and 5 pages of Official Copy).
Office Action received for Japanese Patent Application No. 2020-123882, mailed on Jul. 29, 2022, 8 pages (4 pages of English Translation and 4 pages of Official Copy).
Result of Consultation received for European Patent Application No. 14734674.6, mailed on May 27, 2022, 3 pages.
Result of Consultation received for European Patent Application No. 17810723.1, mailed on Nov. 30, 2022, 3 pages.
Summons to Attend Oral Proceedings received for European Patent Application No. 17810723.1, mailed on Jul. 5, 2022, 8 pages.
Summons to Attend Oral Proceedings received for European Patent Application No. 20203888.1, mailed on Mar. 1, 2023, 8 pages.
Summons to Attend Oral Proceedings received for German Patent Application No. 112006003600.9, mailed on Jun. 2, 2022, 33 pages (21 pages of English Translation and 12 pages of Official Copy).
Final Office Action received for U.S. Appl. No. 17/950,972, mailed on Jan. 23, 2024, 16 pages.
Notice of Allowance received for U.S. Appl. No. 17/728,725, mailed on Jan. 11, 2024, 10 pages.
Applicant-Initiated Interview Summary received for U.S. Appl. No. 18/121,539, mailed on Nov. 14, 2024, 4 pages.
Corrected Notice of Allowance received for U.S. Appl. No. 18/503,120, mailed on Dec. 2, 2024, 2 pages.
Final Office Action received for U.S. Appl. No. 18/139,311, mailed on Dec. 3, 2024, 11 pages.
Intention to Grant received for European Patent Application No. 19176224.4, mailed on Jan. 30, 2024, 9 pages.
Non-Final Office Action received for U.S. Appl. No. 18/121,539, mailed on Feb. 9, 2024, 22 pages.
Notice of Allowance received for U.S. Appl. No. 18/211,112, mailed on Feb. 21, 2024, 22 pages.
Applicant-Initiated Interview Summary received for U.S. Appl. No. 17/950,972, mailed on Nov. 17, 2023, 4 pages.
Decision to Refuse received for European Patent Application No. 20203888.1, mailed on Nov. 28, 2023, 13 pages.
Minutes of the Oral Proceedings received for European Patent Application No. 20203888.1, mailed on Nov. 24, 2023, 6 pages.
Non-Final Office Action received for U.S. Appl. No. 18/130,847, mailed on Dec. 5, 2023, 8 pages.
Summons to Attend Oral Proceedings received for European Patent Application No. 20203888.1, mailed on Oct. 10, 2023, 2 pages.
Applicant-Initiated Interview Summary received for U.S. Appl. No. 18/121,539, mailed on Mar. 31, 2025, 5 pages.
Non-Final Office Action received for U.S. Appl. No. 18/375,448, mailed on Mar. 20, 2025, 16 pages.
Shaqtech, "The FitBit Charge HR hands-on", Available Online at: https://www.youtube.com/watch?v=uWo04yzJpdg, Sep. 19, 2015, 6 pages.
Advisory Action received for U.S. Appl. No. 18/139,311, mailed on May 9, 2025, 3 pages.
Intention to Grant received for European Patent Application No. 17813879.8, mailed on Apr. 28, 2025, 9 pages.
Office Action received for European Patent Application No. 17810739.7, mailed on May 12, 2025, 7 pages.
Office Action received for Australian Patent Application No. 2024203944, mailed on Jun. 11, 2025, 5 pages.
Corrected Notice of Allowance received for U.S. Appl. No. 17/950,972, mailed on Oct. 3, 2024, 2 pages.
Notice of Allowance received for U.S. Appl. No. 15/421,865, mailed on Sep. 30, 2024, 6 pages.
Non-Final Office Action received for U.S. Appl. No. 18/236,340, mailed on Jul. 18, 2024, 8 pages.
Office Action received for Chinese Patent Application No. 202110957983.8, mailed on Jul. 6, 2024, 17 pages (11 pages of English Translation and 6 pages of Official Copy).
Office Action received for Chinese Patent Application No. 202310508332.X, mailed on Jun. 26, 2024, 13 pages (7 pages of English Translation and 6 pages of Official Copy).
Non-Final Office Action received for U.S. Appl. No. 18/121,539, mailed on Jan. 6, 2025, 51 pages.
Notice of Allowance received for Chinese Patent Application No. 202010125835.5, mailed on Jul. 27, 2023, 5 pages (1 page of English Translation and 4 pages of Official Copy).
Hughes John, "Specifying a Visual File System in Z", IEEE Xplore, Retrieved from: https://ieeexplore.ieee.org/document/199162/metrics#metrics, 2002, 3 pages.
Lin Xu, "The Mis-operation Research Based on Cognitive Psychology", China Academic Journal Electronic Publishing House. Online available at: http://www.cnki.net, 2011, 71 pages (Official Copy Only) {See Communication Under Rule 37 CFR § 1.98(a) (3)}.
Final Office Action received for U.S. Appl. No. 18/121,539, mailed on Aug. 20, 2024, 29 pages.
Minutes of the Oral Proceedings received for European Patent Application No. 14734674.6, mailed on Sep. 2, 2024, 3 pages.
Notice of Allowance received for U.S. Appl. No. 17/950,972, mailed on Sep. 10, 2024, 7 pages.
Notice of Acceptance received for Australian Patent Application No. 2024203944, mailed on Aug. 27, 2025, 3 pages.
Applicant-Initiated Interview Summary received for U.S. Appl. No. 18/139,311, mailed on Aug. 8, 2024, 4 pages.
Corrected Notice of Allowance received for U.S. Appl. No. 17/950,972, mailed on Jul. 10, 2024, 2 pages.
Notice of Allowance received for Japanese Patent Application No. 2022-145450, mailed on Jul. 1, 2024, 4 pages (1 page of English Translation and 3 pages of Official Copy).
Office Action received for European Patent Application No. 17810739.7, mailed on Jul. 8, 2024, 9 pages.
Applicant-Initiated Interview Summary received for U.S. Appl. No. 18/139,311, mailed on Mar. 5, 2025, 4 pages.
Office Action received for Chinese Patent Application No. 202310508332.X, mailed on Feb. 27, 2025, 12 pages (7 pages of English Translation and 5 pages of Official Copy).
Communication for Board of Appeal received for European Patent Application No. 14734674.6, mailed on Jun. 11, 2024, 10 pages.
Corrected Notice of Allowance received for U.S. Appl. No. 17/950,972, mailed on Jun. 10, 2024, 2 pages.
Intention to Grant received for European Patent Application No. 19176224.4, mailed on Jun. 14, 2024, 9 pages.
Non-Final Office Action received for U.S. Appl. No. 18/139,311, mailed on Jun. 20, 2024, 11 pages.
Supplemental Notice of Allowance received for U.S. Appl. No. 15/421,865, mailed on Jun. 20, 2024, 3 pages.
Advisory Action received for U.S. Appl. No. 12/689,834, mailed on Aug. 19, 2015, 3 pages.
Advisory Action received for U.S. Appl. No. 11/960,669, mailed on Nov. 3, 2011, 3 pages.
Advisory Action received for U.S. Appl. No. 12/217,029, mailed on Dec. 14, 2016, 3 pages.
Advisory Action received for U.S. Appl. No. 12/242,851, mailed on Nov. 15, 2013, 4 pages.
Advisory Action Received for U.S. Appl. No. 12/888,362, mailed on Sep. 4, 2015, 3 pages.
Advisory Action received for U.S. Appl. No. 12/888,362, mailed on May 7, 2013, 3 pages.
Advisory Action received for U.S. Appl. No. 14/261,112, mailed on Apr. 23, 2015, 3 pages.
Advisory Action received for U.S. Appl. No. 14/261,112, mailed on Nov. 30, 2017, 3 pages.
Advisory Action received for U.S. Appl. No. 14/710,125, mailed on Mar. 14, 2017, 3 pages.
Advisory Action received for U.S. Appl. No. 15/411,110, mailed on Jun. 29, 2021, 4 pages.
Advisory Action received for U.S. Appl. No. 15/421,865, mailed on Apr. 16, 2020, 7 pages.

(56) References Cited

OTHER PUBLICATIONS

Agarawala et al., “Database Compendex/EI”, Engineering Information Inc., Apr. 27, 2006, 1 page.
Agarawala et al., “Keepin' It Real: Pushing the Desktop Metaphor with Physics, Piles and the Pen”, CHI 2006 Proceedings of the SIGCHI Conference on Human Factors in Computing Systems, Montreal, Quebec, Canada, Apr. 22-27, 2006, pp. 1283-1292.
Agarwal, Amit, “iTunesInlineVideo”, Digital Inspiration—The Tech Guide, available online at: <http://labnol.blogspot.com/2006_09_17_labnol_archive.html>, 2006, 27 pages.
Ahmad et al., “Content-Based Image Retrieval on Mobile Devices”, Proceedings of SPIE-IS&T Electronic Imaging, vol. 5684, 2005, pp. 255-264.
Alam et al., “Web Document Manipulation for Small Screen Devices: A Review”, BCL Technologies Inc., Proceedings of the 2nd International Workshop on Web Document Analysis, 2003, pp. 33-36.
Alejandre, Suzanne, “Graphing Linear Equations”, Available at: <http://mathforum.org/alejandre/palm/times.palm.html>, retrieved on Jun. 12, 2006, 3 pages.
Andrew's Widgets, “Developing Dashboard Widgets—A Brief Introduction to Building Widgets for Apple's Dashboard Environment”, Available online at: <http://andrew.hedges.name/widgets/dev/>, Retrieved on Mar. 13, 2015, 6 pages.
Apparao et al., “Level 1 Document Object Model Specification (Version 1.0)”, W3C Working Draft, Available online at: <http://www.w3.org/TR/WD-DOM/>, Jul. 20, 1998, 3 pages.
Apple Computer Inc., “Dashboard Tutorial”, Apple Computer, Inc. © 2004, 2006, Jan. 10, 2006, 24 pages.
Apple Computer Inc., “Welcome to Tiger”, available at: <http://www.maths.dundee.ac.uk/software/Welcome_to_Mac_OS_X_v10.4_Tiger.pdf>, 2005, pp. 1-32.
Apple Iphone School, “Customize 1.19 Update for the iPhone”, 4:02 minutes video, available at: <http://www.youtube.com/watch?v=5ogDzOM89oc>, uploaded on Dec. 8, 2007, 2 pages.
Apple Iphone School, “SummerBoard 3.0a9 for iPhone”, 4:50 minutes video, available at: <http://www.youtube.com/watch?v=s_P_9mrZTKs>, uploaded on Oct. 21, 2007, 2 pages.
Apple, “iPhone User's Guide”, Available at <http://mesnotices.20minutes.fr/manuel-notice-mode-emploi/APPLE/IPHONE%2D%5FE#>, Retrieved on Mar. 27, 2008, Jun. 2007, 137 pages.
Apple, “Iphone User's Guide”, iPhone first generation, Available at: <http://pocketpccentral.net/iphone/products/1 g_iphone.htm>, Jun. 29, 2007, 124 pages.
Apple, “Keynote '08 User's Guide”, © Apple Inc., 2008, 204 pages.
apple.com, “Tiger Developer Overview Series—Developing Dashboard Widgets”, Available online at <http://developer.apple.com/macosx/dashboard.html>, Jun. 26, 2006, 9 pages.
Applicant-Initiated Interview Summary received for U.S. Appl. No. 15/411,110, mailed on Apr. 21, 2020, 5 pages.
Applicant-Initiated Interview Summary received for U.S. Appl. No. 15/411,110, mailed on Nov. 17, 2020, 7 pages.
Applicant-Initiated Interview Summary received for U.S. Appl. No. 15/411,110, mailed on Oct. 28, 2019, 6 pages.
Applicant-Initiated Interview Summary received for U.S. Appl. No. 15/418,537, mailed on Dec. 23, 2019, 6 pages.
Applicant-Initiated Interview Summary received for U.S. Appl. No. 15/421,865, mailed on Dec. 15, 2020, 6 pages.
Applicant-Initiated Interview Summary received for U.S. Appl. No. 15/421,865, mailed on Feb. 3, 2020, 5 pages.
Applicant-Initiated Interview Summary received for U.S. Appl. No. 15/421,865, mailed on Jun. 30, 2021, 6 pages.
Applicant-Initiated Interview Summary received for U.S. Appl. No. 16/020,804, mailed on Apr. 13, 2020, 3 pages.
Applicant-Initiated Interview Summary received for U.S. Appl. No. 16/267,817, mailed on Dec. 1, 2020, 5 pages.
Applicant-Initiated Interview Summary received for U.S. Appl. No. 16/267,817, mailed on Jul. 14, 2020, 5 pages.
Applicant-Initiated Interview Summary received for U.S. Appl. No. 16/270,801, mailed on Mar. 11, 2020, 3 pages.
Applicant-Initiated Interview Summary received for U.S. Appl. No. 16/270,902, mailed on Mar. 11, 2020, 3 pages.
Applicant-Initiated Interview Summary received for U.S. Appl. No. 16/737,372, mailed on Oct. 5, 2021, 2 pages.
Applicant-Initiated Interview Summary received for U.S. Appl. No. 16/832,285, mailed on Nov. 19, 2021, 19 pages.
Applicant-Initiated Interview Summary received for U.S. Appl. No. 16/994,392, mailed on Dec. 3, 2021, 2 pages.
Applicant-Initiated Interview Summary received for U.S. Appl. No. 17/190,869, mailed on Dec. 10, 2021, 2 pages.
“Asus Eee News, Mods, and Hacks: Asus Eee PC Easy Mode Internet Tab Options Tour”, asuseeehacks.blogspot.com, Available online at: <http://asuseeehacks.blogspot.com/2007/11/asus-eee-pc-user-interface-tour.html>, Nov. 10, 2007, 33 pages.
“Autocomplete Plugin”, Emesene Forum, available at: <http://emeseme.org/smf/index.olm?topic=1276.0>, Jun. 20, 2008, 5 pages.
Barsch, Bill, “3D Desktop! TouchScreen and XGL on Linux!”, 2:42 minutes video, available at <http://www.youtube.com/watch?v=Yx9FgLr9oTk>, uploaded on Aug. 15, 2006, 2 pages.
Baudisch et al., “Collapse-to-Zoom: Viewing Web Pages on Small Screen Devices by Interactively Removing Irrelevant Content”, Microsoft Research, Available at: <http://www.patrickbaudisch.com/publications/2004-Baudisch-UIST04-CollapseToZoom.pdf>, Oct. 27, 2004, 4 pages.
Berka, “iFuntastic 3 Opens up New iPhone Functionality”, ars technica, Available at: <http://arstechnica.com/journals/apple.ars/2007/08/30/ifuntastic-3-opens-up-new-iphone-functionality>, Aug. 30, 2007, 2 pages.
Bitstream®, “ThunderHawk Pocket PC Edition for End Users”, Available at: <http://www.bitstream.com/wireless/products/pocketpc/faq_using.html>, retrieved on Jun. 12, 2006, 2006, 4 pages.
Blickenstorfer, Conrad H., “Neonode N2 a new version of the phone that pioneered touchscreens”, Pen Computing Magazine, Online Available at: http://www.pencomputing.com/WinCE/neonode-n2-review.html, Nov. 4, 2007, 9 pages.
Blickenstorfer, Conradh. , “NeoNode N1 Can a Unique Interface Put this Compelling Smart Phone on the Map?”, available at: <http://pencomputing.com/WinCE/neonode-n1-review.html>, retrieved on Sep. 1, 2014, 5 pages.
Board Opinion received for Chinese Patent Application No. 200780041309.3, mailed on Apr. 1, 2016, 16 pages.
Board Opinion received for Chinese Patent Application No. 201480001676.0, mailed on Oct. 21, 2019, 10 pages.
Bos et al., “3 Conformance: Requirements and Recommendations”, Cascading Style Sheets, level 2 CSS2 Specification, W3C Recommendation, available at: <http://www.w3.org/TR/CSS21/conform.html#doctree>, May 12, 1998, 6 pages.
Bott et al., “Table of Contents/Chapter 20: Putting Pictures on Folder Icons”, Microsoft Windows XP Inside Out Deluxe, Second Edition, http://proquest.safaribooksonline.com/book/operating-systems/9780735642171, Oct. 6, 2004, pp. 1-8 and 669.
Buyukkokten et al., “Power Browser: Efficient Web Browsing for PDAs”, Proceedings of the SIGCHI conference on Human Factors in Computing Systems, 2000, 8 pages.
Certificate of Examination received for Australian Patent Application No. 2011101190, mailed on Nov. 23, 2011, 1 page.
Certification of Grant received for Australian Patent Application No. 2011101194, mailed on Mar. 2, 2012, 2 pages.
Cerulean Studios, “Trillian Online User Manual”, available at: <http://www.ceruleanstudios.com/support/manuaLphp?hchap=4&hsub=1&hsect=5>, 2006, 11 pages.
Cha, Bonnie, “HTC Touch Diamond (Sprint)”, CNET Reviews, available at: <http://www.cnet.com/products/htc-touch/>, updated on Sep. 12, 2008, 8 pages.
Chang et al., “Animation: From Cartoons to the User Interface”, UIST '93 Proceedings of the 6th Annual ACM Symposium on User Interface Software and Technology, Nov. 1993, pp. 45-55.
Chartier, David, “iPhone 1.1.3 Video Brings the Proof”, ars Technica, Available online at: <http://arstechnica.com/journals/apple.are/2007/12/30/iphone-1-1-3-video-brings-the-proof>, Dec. 30, 2007, 3 pages.

(56) References Cited

OTHER PUBLICATIONS

Chen et al., "A Novel Navigation and Transmission Technique for Mobile Handheld Devices", Technical Report CSE-2003-1, Department of Computer Science, University of California at Davis, 2003, 8 pages.
Chen et al., "Detecting Web Pages Structure for Adaptive Viewing on Small Form Factor Devices", Proceedings of the 12th international conference on World Wide Web, 2003, 9 pages.
Chen et al., "Dress: A Slicing Tree Based Web Representation for Various Display Sizes", Microsoft Research, Technical Report, Nov. 16, 2002, 9 pages.
Clifton, Marc, "Detect if Another Process is Running and Bring it to the Foreground", Online Available at : https://www.codeproject.com/Articles/2976/Detect-if-another-process-is-running-andbring-it, Sep. 30, 2002, 6 pages.
CNET, "Bounding Box", available at: <http://www.cnet.com/Resources/Info/Glossary/Terms/boundingbox.html>, retrieved on Dec. 29, 2008, 1 page.
CNET, "Fujitsu LifeBook B6110D", Reviews, Nov. 24, 2005, 2 pages.
CNET, "Video: Create Custom Widgets with Web Clip", CNET News, Available at: <http://news.cnet.com/1606-2-6103525.html>, Aug. 8, 2006, 3 pages.
cocoabuilder.com, "Single Instance of a Cocoa Application", Available at: http://www.cocoabuilder.com/archive/cocoa/167892-single-instance-of-cocoa-application.html, Jul. 19, 2006, 4 pages.
Collomb et al., "Improving drag-and-drop on wall-size displays", proceedings of Graphics Intertace, May 9, 2005, pp. 25-32.
Communication of the Board of Appeal received for European Patent Application No. 09170697.8, mailed on Jan. 25, 2021, 6 pages.
Communication received for European Patent Application No. 08798713.7, mailed on Apr. 28, 2010, 2 pages.
Cooper, Alan, "The Inmates Are Running the Asylum", Sams Publishing, Mar. 23, 1999, pp. 138-147.
Corrected Notice of Allowance received for U.S. Appl. No. 12/689,834, mailed on Feb. 8, 2018, 4 pages.
Corrected Notice of Allowance received for U.S. Appl. No. 12/689,834, mailed on May 17, 2018, 2 pages.
Corrected Notice of Allowance received for U.S. Appl. No. 12/888,362, mailed on Jun. 6, 2018, 3 pages.
Corrected Notice of Allowance received for U.S. Appl. No. 14/142,640, mailed on Feb. 5, 2020, 4 pages.
Corrected Notice of Allowance received for U.S. Appl. No. 14/142,648, mailed on May 20, 2020, 2 pages.
Corrected Notice of Allowance received for U.S. Appl. No. 17/002,622, mailed on Dec. 13, 2021, 2 pages.
Corrected Notice of Allowance received for U.S. Appl. No. 17/019,062, mailed on Dec. 8, 2021, 2 pages.
Corrected Notice of Allowance received for U.S. Appl. No. 12/888,362, mailed on Apr. 25, 2018, 3 pages.
Deanhill, "Run a Program or Switch to an Already Running Instance", Available Online at: <https://autohotkey.com/board/topic/7129-run-a-program-or-switch-to-an-already-running-instance/>, Feb. 1, 2006, 16 pages.
Dearman et al., "Rendezvousing with Location-Aware Devices: Enhancing Social Coordination", Interacting with Computers, vol. 17, Issue 5, available at: <http://www.dgp.toronto.edu/~dearman/publications/dearman_IWC05.pdf>, Sep. 2005, pp. 542-566.
Decision of Board of Appeal received for European Patent Application No. 09170697.8, mailed on Oct. 24, 2016, 24 pages.
Decision of Board of Appeal received for European Patent Application No. 09170697.8, mailed on Apr. 23, 2021, 17 pages.
Decision on Acceptance received for Australian Patent Application No. 2017202587, mailed on Oct. 8, 2019, 19 pages.
Decision on Appeal received for U.S. Appl. No. 14/142,640, mailed on Oct. 7, 2019, 9 pages.
Decision on Appeal received for U.S. Appl. No. 14/142,648, mailed on Feb. 28, 2020, 6 pages.
Decision on Appeal received for U.S. Appl. No. 14/261,112, mailed on Oct. 29, 2020, 20 pages.
Decision on Appeal received for U.S. Appl. No. 14/710,125, mailed on Mar. 11, 2019, 7 pages.
Decision on Appeal received for U.S. Appl. No. 16/832,285, mailed on May 15, 2023, 12 pages.
Decision to Grant received for Chinese Patent Application No. 200780001140.9, mailed on Feb. 3, 2012, 4 pages.
Decision to Grant received for Chinese Patent Application No. 200880110709.X, mailed on Aug. 6, 2012, 2 pages.
Decision to Grant received for European Patent Application No. 09700333.9, mailed on Nov. 7, 2013, 2 pages.
Decision to Grant received for European Patent Application No. 10762813.3, mailed on May 11, 2018, 3 pages.
Decision to Grant received for European Patent Application No. 12177813.8, mailed on Nov. 24, 2016, 3 pages.
Decision to Grant received for European Patent Application No. 12189764.9, mailed on Nov. 25, 2021, 2 pages.
Decision to Grant received for European Patent Application No. 12194312.0, mailed on Feb. 1, 2018, 2 pages.
Decision to Grant received for European Patent Application No. 12194315.3, mailed on Oct. 12, 2017, 2 pages.
Decision to Grant received for European Patent Application No. 13795330.3, mailed on Jan. 16, 2020, 2 pages.
Decision to Grant received for European Patent Application No. 17198398.4, mailed on Jun. 14, 2019, 3 pages.
Decision to Grant received for European Patent Application No. 17210062.0, mailed on Oct. 1, 2020, 2 pages.
Decision to Grant received for Japanese Patent Application No. 2010-524102, mailed on May 31, 2013, 3 pages.
Decision to Refusal received for European Patent Application No. 09171787.6, mailed on Dec. 14, 2011, 22 pages.
Decision to Refuse received for European Patent Application No. 06846840.4, mailed on Mar. 4, 2010, 10 pages.
Decision to Refuse received for European Patent Application No. 07814689.1, mailed on May 11, 2012, 15 pages.
Decision to Refuse received for European Patent Application No. 09170697.8, mailed on Jul. 10, 2018, 31 pages.
Decision to Refuse received for European Patent Application No. 09170697.8, mailed on Oct. 23, 2013, 12 pages.
Delltech, "Windows XP: The Complete Reference: Working with Graphics", http://web.archive.org/web/20050405151925/http:/delltech.150m.corn/XP/graphics/3.htm, Chapter 18, Apr. 5, 2005, 4 pages.
"Desktop Icon Toy-History", Available online at: <http://www.idesksoft.com/history.html>, retrieved on Jan. 2, 2010, 2 pages.
Dodge et al., "Microsoft Office Excel 2003 Office Manual", Microsoft Press, vol. 1, Jul. 12, 2004, 5 pages.
Domshlak et al., "Preference-Based Configuration of Web Page Content", Proceedings of the 17th Int'l Joint Conf. on Artificial Intelligence (IJCAI), Seattle, W A, Aug. 4-10, 2001, pp. 1451-1456.
Edwards, "iPhone 1.1.3 Firmware Feature Gallery", Gear Live, Available at: <http://www.gearlive.com/news/article/q407-iphone-113-firmware-feature-gallery/>, Dec. 28, 2007, 7 pages.
Elo, "Touchscreen User Manual, Elo Projected Capacitance Driver Software Version 1.00 (Serial)", Elo TouchSystems, Inc., Dec. 30, 2005, 37 pages.
Examiner's Answer for Appeal Brief received for U.S. Appl. No. 11/850,005, Mailed on Apr. 10, 2018, 34 pages.
Examiner's Answer to Appeal Brief received for U.S. Appl. No. 14/142,648, mailed on Apr. 10, 2018, 15 pages.
Examiner's Answer to Appeal Brief received for U.S. Appl. No. 14/261,112, mailed on Oct. 29, 2019, 10 pages.
Examiner's Answer to Appeal Brief received for U.S. Appl. No. 14/710,125, mailed on Jan. 26, 2018, 6 pages.
Examiner's Answer to Appeal Brief received for U.S. Appl. No. 16/832,285, mailed on Sep. 7, 2022, 30 pages.
Examiner's Pre-review report received for Japanese Patent Application No. 2014-253365, mailed on Dec. 12, 2017, 7 pages.
Examiner's Pre-Review Report received for Japanese Patent Application No. 2018-121118, mailed on Jun. 2, 2020, 4 pages.
Examiner's Pre-Review Report received for Japanese Patent Application No. 2019-024663, mailed on Aug. 31, 2021, 4 pages.

(56) References Cited

OTHER PUBLICATIONS

Expansystv, "HTC Touch Dual Demonstration by eXpansys", 5:26 minutes video, available at <http://www.youtube.com/watch?v=Tupk8MYLhMk>, uploaded on Oct. 1, 2007, 2 pages.
Extended European Search Report (includes Partial European Search Report and European Search Opinion) received for European Patent Application No. 09171787.6, mailed on Jan. 26, 2010, 6 pages.
Extended European Search Report (includes Partial European Search Report and European Search Opinion) received for European Patent Application No. 12169786.6, mailed on Jul. 11, 2012, 10 pages.
Extended European Search Report (includes Partial European Search Report and European Search Opinion) received for European Patent Application No. 13174706.5, mailed on Jan. 8, 2015, 8 pages.
Extended European Search Report received for European Patent Application No. 17198398.4, mailed on Feb. 8, 2018, 8 pages.
Extended European Search Report received for European Patent Application No. 09170697.8, mailed on Apr. 28, 2010, 3 pages.
Extended European Search Report received for European Patent Application No. 12177813.8, mailed on Feb. 1, 2013, 6 pages.
Extended European Search Report received for European Patent Application No. 12189764.9, mailed on Jan. 4, 2013, 6 pages.
Extended European Search Report received for European Patent Application No. 12194312.0, mailed on Jan. 16, 2013, 7 pages.
Extended European Search Report received for European Patent Application No. 12194315.3, mailed on Jan. 16, 2013, 7 pages.
Extended European Search Report received for European Patent Application No. 17210062.0, mailed on Feb. 20, 2018, 12 pages.
Extended European Search Report received for European Patent Application No. 17810723.1, mailed on Nov. 12, 2019, 9 pages.
Extended European Search Report received for European Patent Application No. 17810739.7, mailed on Mar. 22, 2019, 9 pages.
Extended European Search Report received for European Patent Application No. 17813879.8, mailed on Jan. 8, 2020, 8 pages.
Extended European Search Report received for European Patent Application No. 19176224.4, mailed on Dec. 13, 2019, 7 pages.
Extended European Search Report received for European Patent Application No. 20203888.1, mailed on Feb. 10, 2021, 8 pages.
Eyemodule Springboard Compatible, "Turn Your Handspring™ Visor™ Handheld into a Digital Camera", User's Manual, 2000, 9 pages.
Fadhley, Mohd N., "LauncherX", Online Available at: <http://www.palmx.org/mambo/index2.php?option=com_content&task=view&id=65&1temid>, Nov. 21, 2002, 3 pages.
Farber, Dan, "Jobs: Today Apple is Going to Reinvent the Phone", ZDNet, available at: <http://www.zdnet.com/blog/btl/jobs-today-apple-is-going-to-reinvent-the-phone/4249>, Jan. 9, 2007, 3 pages.
Feist, Jonathan, "Android customization—how to create a custom clock widget using Zooper Widget", Available Online at: https://www.androidauthority.com/zooper-widget-clock-366476/, May 15, 2014, 10 pages.
Final Office Action received for U.S. Appl. No. 14/261,112, mailed on Mar. 3, 2016, 31 pages.
Final Office Action received for U.S. Appl. No. 11/620,647, mailed on Dec. 23, 2010, 21 pages.
Final Office Action received for U.S. Appl. No. 11/620,686, mailed on Aug. 3, 2009, 11 pages.
Final Office Action received for U.S. Appl. No. 11/620,686, mailed on Jul. 12, 2010, 10 pages.
Final Office Action received for U.S. Appl. No. 11/620,687, mailed on Aug. 18, 2009, 7 pages.
Final Office Action received for U.S. Appl. No. 11/849,938, mailed on Jan. 30, 2013, 31 pages.
Final Office Action received for U.S. Appl. No. 11/849,938, mailed on May 27, 2011, 21 pages.
Final Office Action received for U.S. Appl. No. 11/850,005, mailed on Jul. 8, 2011, 9 pages.
Final Office Action received for U.S. Appl. No. 11/850,005, mailed on May 22, 2014, 13 pages.
Final Office Action received for U.S. Appl. No. 11/850,005, mailed on Nov. 16, 2015, 13 pages.
Final Office Action received for U.S. Appl. No. 11/850,005, mailed on Sep. 14, 2012, 9 pages.
Final Office Action received for U.S. Appl. No. 11/850,008, mailed on Dec. 29, 2010, 14 pages.
Final Office Action received for U.S. Appl. No. 11/850,010, mailed on Oct. 17, 2011, 11 pages.
Final Office Action received for U.S. Appl. No. 11/850,010, mailed on Apr. 18, 2016, 16 pages.
Final Office Action received for U.S. Appl. No. 11/850,010, mailed on Aug. 14, 2018, 21 pages.
Final Office Action received for U.S. Appl. No. 11/850,010, mailed on Feb. 15, 2013, 12 pages.
Final Office Action received for U.S. Appl. No. 11/850,010, mailed on May 8, 2014, 11 pages.
Final Office Action received for U.S. Appl. No. 11/850,010, mailed on May 11, 2018, 24 pages.
Final Office Action received for U.S. Appl. No. 11/850,011, mailed on Dec. 1, 2010, 15 pages.
Final Office Action received for U.S. Appl. No. 11/850,638, mailed on Feb. 8, 2011, 14 pages.
Final Office Action received for U.S. Appl. No. 11/850,638, mailed on May 15, 2012, 16 pages.
Final Office Action received for U.S. Appl. No. 11/960,669, mailed on Aug. 18, 2011, 13 pages.
Final Office Action received for U.S. Appl. No. 11/961,773, mailed on Nov. 2, 2011, 12 pages.
Final Office Action received for U.S. Appl. No. 11/961,773, mailed on Nov. 29, 2012, 15 pages.
Final Office Action received for U.S. Appl. No. 11/969,809, mailed on Jul. 14, 2011, 26 pages.
Final Office Action received for U.S. Appl. No. 11/969,912, mailed on Oct. 31, 2011, 11 pages.
Final Office Action received for U.S. Appl. No. 12/217,029, mailed on May 22, 2014, 12 pages.
Final Office Action received for U.S. Appl. No. 12/217,029, mailed on Oct. 5, 2012, 28 pages.
Final Office Action received for U.S. Appl. No. 12/242,851, mailed on Dec. 12, 2011, 13 pages.
Final Office Action received for U.S. Appl. No. 12/242,851, mailed on Jul. 1, 2016, 90 pages.
Final Office Action received for U.S. Appl. No. 12/242,851, mailed on May 10, 2013, 20 pages.
Final Office Action received for U.S. Appl. No. 12/274,346, mailed on Mar. 14, 2012, 39 pages.
Final Office Action received for U.S. Appl. No. 12/364,470, mailed on May 5, 2010, 16 pages.
Final Office Action received for U.S. Appl. No. 12/364,470, mailed on Oct. 19, 2011, 20 pages.
Final Office Action received for U.S. Appl. No. 12/365,887, mailed on Feb. 29, 2012, 15 pages.
Final Office Action received for U.S. Appl. No. 12/689,834, mailed on Mar. 26, 2015, 30 pages.
Final Office Action received for U.S. Appl. No. 12/689,834, mailed on May 4, 2017, 41 pages.
Final Office Action received for U.S. Appl. No. 12/689,834, mailed on Oct. 15, 2012, 22 pages.
Final Office Action received for U.S. Appl. No. 12/888,362, mailed on Apr. 29, 2015, 12 pages.
Final Office Action Received for U.S. Appl. No. 12/888,362, mailed on Jan. 3, 2013, 13 pages.
Final Office Action received for U.S. Appl. No. 12/888,375, mailed on Nov. 7, 2012, 14 pages.
Final Office Action received for U.S. Appl. No. 12/888,376, mailed on Feb. 8, 2013, 11 pages.
Final Office Action received for U.S. Appl. No. 14/142,648, mailed on Dec. 7, 2016, 12 pages.
Final Office Action received for U.S. Appl. No. 14/261,112, mailed on Aug. 10, 2017, 35 pages.
Final Office Action received for U.S. Appl. No. 14/261,112, mailed on Nov. 7, 2018, 34 pages.
Final Office Action received for U.S. Appl. No. 14/261,112, mailed on Oct. 9, 2014, 29 pages.

(56) References Cited

OTHER PUBLICATIONS

Final Office Action received for U.S. Appl. No. 14/710,125, mailed on Oct. 27, 2016, 13 pages.
Final Office Action received for U.S. Appl. No. 15/411,110, mailed on Mar. 5, 2020, 30 pages.
Final Office Action received for U.S. Appl. No. 15/411,110, mailed on Mar. 15, 2021, 28 pages.
Final Office Action received for U.S. Appl. No. 15/418,537, mailed on Sep. 23, 2019, 53 pages.
Final Office Action received for U.S. Appl. No. 15/421,865, mailed on Dec. 2, 2019, 19 pages.
Final Office Action received for U.S. Appl. No. 15/421,865, mailed on Mar. 19, 2021, 20 pages.
Final Office Action received for U.S. Appl. No. 15/426,836, mailed on Mar. 29, 2019, 49 pages.
Final Office Action received for U.S. Appl. No. 16/267,817, mailed on Aug. 24, 2020, 23 pages.
Final Office Action received for U.S. Appl. No. 16/832,285, mailed on Jan. 19, 2022, 66 pages.
Final Office Action received for U.S. Appl. No. 14/142,640, mailed on Mar. 8, 2016, 35 pages.
Fingerworks Forums, "Is the Multitouch Lemur?", Available at: <http://64233.167.104/search?q=cache:sjVdtyFBvRMJ:forums.finger>, retrieved on Nov. 16, 2005, 2 pages.
Fingerworks Inc., "Installation and Operation Guide for the TouchStream and TouchStream LP", available at <http://www.fingerworks.com>, 2002, pp. 1-25.
Fingerworks Inc., "Quick Reference Guide for iGesture Products", available at: <http://www.fingerworks.com>, 1999-2002, 2 pages.
Fingerworks Inc., "Quick Reference Guide for TouchStream ST/LP", available at: <http://www.fingerworks.com>, 2001-2003, 4 pages.
Fingerworks Inc., "TouchStream LP Silver", available at: <http://www.fingerworks.com>, Apr. 27, 2005, 18 pages.
Fondantfancies, "Dash Clipping: Don't Wait for Mac OS X 10.5 Leopard", fondantfancies.com, Available online at: <http://www.fondantfancies.com/blog/3001239/>, retrieved on Sep. 3, 2009, 9 pages.
Forsberg et al., "Aperture Based Selection for Immersive Virtual Environments", Proceedings of the ACM Symposium on User Interface Software and Technology, 1996, 2 pages.
Foxit, "Foxit Reader v. 1.3 Feature Description", available at: <http://www.foxitsoftware.com/pdf/reader 2/verhistory.htm>, 2008, 4 pages.
Fujitsu Ltd., "SX/G Manual of Icons on Desktop, Edition 14/14A V14", 1st Edition, Mar. 27, 1998, 4 pages.
Gade, Lisa, "Sprint HTC Touch", Smartphone Reviews by Mobile Tech Review, Available online at: <http://www.mobiletechreview.com/phones/HTC-Touch.htm>, Nov. 2, 2007, 7 pages.
Gears, Leigh, "Orange SPV C600 Review", Available at: <http://www.coolsmartphone.com/article569.html>, retrieved on Apr. 14, 2006, 57 pages.
Getgreg, "Jeff Han's Multiple Touch Point Display, the Stuff Dreams are Made of", Available at: <http://www.theyshoulddothat.com/2006/08/jeff_hanns_multiple_touch_poin.html>, retrieved on Dec. 17, 2007, 2 pages.
Grant for Invention Patent Received in Chinese Patent Application No. 200680053441.1, Jan. 28, 2011, 1 page.
GSM Arena, "Neonode N2 User Interface", 3:06 minutes video, available at: <https://www.youtube.com/watch?v=MfDMHmIZRLc>, uploaded on Feb. 13, 2007, 2 pages.
Gsmarena Team, "HTC Touch review", Online Available at: <twww.gsmarena.com/htc_touch-review-189p3.php>, Nov. 28, 2007, 5 pages.
Gsmarena Team, "HTC Touch Review: Smart to Touch the Spot", available at: <http://www.gsmarena.com/htc_touch-review-189.php>, Nov. 28, 2007, 18 pages.
Guan et al., "Zoom Selector: A Pen-based Interaction Technique for Small Target Selection", Transactions of the Information Processing Society of Japan, vol. 45, No. 8, Aug. 2004, pp. 2087-2097.
Han, Jeff, "Talks Jeff Han: Unveiling the Genius of Multi-touch Interface Design", Ted Ideas Worth Spreading, available at <http://www.ted.com/index.php/talks/view/id/65> Retrieved on Dec. 17, 2007, 2 pages.
Hart, Kim, "Rewriting the Web for Mobile Phones", washingtonpost.com, available at: <http://www.washingtonpost.com/wp-dyn/content/article/2006/07/25/AR2006072501517_pf.html>, Jul. 26, 2006, 2 pages.
Hayama et al., "To change images of scaled-down representation", Windows XP SP3 & SP2, Dec. 1, 2008, 6 pages.
Hesseldahl, Arik, "An App the Mac can Brag About", Forbes.com, Available at: <http://www.forbes.com/2003/12/15/cx_ah_1215tentech_print.html>, Dec. 15, 2003, 4 pages.
Higuchi, Tadahiro, "Try API!, Making a cool application with Visual Basic 6.0", 1st edition, Japan, AI Publishing, AI Mook 221, Jul. 16, 1999, 23 pages.
Hinckley et al., "Input/Output Devices and Interaction Techniques", CRC Press, Nov. 2004, pp. 1-79.
Holmquist, Lars E., "The Zoom Browser Showing Simultaneous Detail and Overview in Large Documents", Human IT, Available at: <http://www.hb.se/bhs/ith/3-98/leh.htm>, 1998, 12 pages.
Honeywell, "TH8000 Series Programmable Thermostats", Retrieved from the Internet: URL:https://ia802507.us.archive.org/1/items/generalmanual_000075065/generalmanual_000075065.pdf, 2004, 44 pages.
Huang et al., "Effects of Visual Vibratory Perception by Cross-Modali Matching with Tactile Sensation", Retrieved from the Internet: <URL: http://media.nuas.ac.jp/~robin/Research/ADC99.html>, 1999, pp. 1-7.
"ImageShack—Hosting", available at: <http://img129.imageshack.us/mv.php?image=autocompleteemoticonprexw0.jpg>, Nov. 10, 2008, 1 page.
Infoworld Video, "Two Geeks and an iPhone: Part 3", available at: <http://web.archive.org/web/20080124065641/http:/www.infoworld.com/video/interviews/Mobile-Tech-Apple-iPhone/Two-Geeks-and-an-iPhone-Part-3/video_1966.html>, Dec. 18, 2007, 2 pages.
Intention to Grant received for Chinese Patent Application No. 200910173272.0, mailed on Oct. 23, 2012, 1 page.
Intention to Grant received for European Patent Application No. 08829660.3, mailed on Dec. 17, 2021, 8 pages.
Intention to Grant received for European Patent Application No. 09170697.8, mailed on Dec. 16, 2021, 8 pages.
Intention to Grant received for European Patent Application No. 09700333.9, mailed on Jun. 20, 2013, 7 pages.
Intention to Grant received for European Patent Application No. 10762813.3, mailed on Dec. 18, 2017, 11 pages.
Intention to Grant received for European Patent Application No. 12177813.8, mailed on Jul. 6, 2016, 8 pages.
Intention to Grant received for European Patent Application No. 12189764.9, mailed on Mar. 5, 2021, 14 pages.
Intention to Grant received for European Patent Application No. 12189764.9, mailed on Sep. 28, 2021, 14 pages.
Intention to Grant received for European Patent Application No. 12194312.0, mailed on Aug. 3, 2017, 8 pages.
Intention to Grant received for European Patent Application No. 12194315.3, mailed on May 31, 2017, 8 pages.
Intention to Grant received for European Patent Application No. 13174706.5, mailed on Nov. 22, 2018, 12 pages.
Intention to Grant received for European Patent Application No. 13795330.3, mailed on Aug. 9, 2019, 13 pages.
Intention to Grant received for European Patent Application No. 17198398.4, mailed on Jan. 28, 2019, 8 pages.
Intention to Grant received for European Patent Application No. 17210062.0, mailed on Jun. 23, 2020, 8 pages.
International Preliminary Report on Patentability for PCT Patent Application No. PCT/US2008/050047, mailed on Sep. 15, 2009, 11 pages.
International Preliminary Report on Patentability received for PCT Patent Application No. PCT/US2006/062685, mailed on Jul. 1, 2008, 6 pages.
International Preliminary Report on Patentability received for PCT Patent Application No. PCT/US2007/077639, issued on Mar. 10, 2009, 6 pages.

(56) References Cited

OTHER PUBLICATIONS

International Preliminary Report on Patentability received for PCT Patent Application No. PCT/US2007/077643, issued on Mar. 10, 2009, 7 pages.

International Preliminary Report on Patentability received for PCT Patent Application No. PCT/US2008/050430, issued on Jul. 7, 2009, 10 pages.

International Preliminary Report on Patentability received for PCT Patent Application No. PCT/US2008/050431, issued on Jul. 7, 2009, 8 pages.

International Preliminary Report on Patentability received for PCT Patent Application No. PCT/US2008/074341, mailed on Mar. 9, 2010, 8 pages.

International Preliminary Report on Patentability received for PCT Patent Application No. PCT/US2008/074625, issued on Mar. 9, 2010, 6 pages.

International Preliminary Report on Patentability received for PCT Patent Application No. PCT/US2009/030225, mailed on Jul. 15, 2010, 10 pages.

International Preliminary Report on Patentability received for PCT Patent Application No. PCT/US2009/060317, issued on May 24, 2011, 5 pages.

International Preliminary Report on Patentability received for PCT Patent Application No. PCT/US2010/050056, mailed on Oct. 18, 2012, 21 pages.

International Preliminary Report on Patentability received for PCT Patent Application No. PCT/US2013/067634, mailed on May 12, 2016, 9 pages.

International Preliminary Report on Patentability received for PCT Patent Application No. PCT/US2014/040414, mailed on Dec. 23, 2015, 10 pages.

International Preliminary Report on Patentability received for PCT Patent Application No. PCT/US2017/034834, mailed on Dec. 20, 2018, 9 pages.

International Preliminary Report on Patentability received for PCT Patent Application No. PCT/US2017/035331, mailed on Dec. 20, 2018, 13 pages.

International Preliminary Report on Patentability received for PCT Patent Application No. PCT/US2017/037057, mailed on Dec. 27, 2018, 24 pages.

International Search Report and Written Opinion received for PCT Patent Application No. PCT/US2007/077638, mailed on Feb. 19, 2008, 9 pages.

International Search Report and Written Opinion received for PCT Patent Application No. PCT/US2007/077639, mailed on Jul. 8, 2008, 7 pages.

International Search Report and Written Opinion received for PCT Patent Application No. PCT/US2007/077643, mailed on May 8, 2008, 9 pages.

International Search Report and Written Opinion received for PCT Patent Application No. PCT/US2007/077644, mailed on May 30, 2008, 18 pages.

International Search Report and Written Opinion received for PCT Patent Application No. PCT/US2007/077773, mailed on Jan. 15, 2008, 8 pages.

International Search Report and Written Opinion received for PCT Patent Application No. PCT/US2007/088879, mailed on Jun. 30, 2008, 8 pages.

International Search Report and Written Opinion received for PCT Patent Application No. PCT/US2007/088893, mailed on Jul. 11, 2008, 10 pages.

International Search Report and Written Opinion received for PCT Patent Application No. PCT/US2008/050047, mailed on Sep. 3, 2009, 15 pages.

International Search Report and Written Opinion received for PCT Patent Application No. PCT/US2008/050430, mailed on Sep. 1, 2008, 13 pages.

International Search Report and Written Opinion received for PCT Patent Application No. PCT/US2008/050431, mailed on Jun. 17, 2008, 10 pages.

International Search Report and Written Opinion received for PCT Patent Application No. PCT/US2008/074341, mailed on Nov. 27, 2009, 12 pages.

International Search Report and Written Opinion received for PCT Patent Application No. PCT/US2008/074625, mailed on Jan. 8, 2009, 8 pages.

International Search Report and Written Opinion received for PCT Patent Application No. PCT/US2009/030225, mailed on Feb. 25, 2010, 15 pages.

International Search Report and Written Opinion received for PCT Patent Application No. PCT/US2010/050056, mailed on May 13, 2011, 26 pages.

International Search Report and Written Opinion received for PCT Patent Application No. PCT/US2013/067634, mailed on Apr. 16, 2014, 11 pages.

International Search Report and Written Opinion received for PCT Patent Application No. PCT/US2014/040414, mailed on Sep. 16, 2014, 12 pages.

International Search Report and Written Opinion received for PCT Patent Application No. PCT/US2017/034834, mailed on Aug. 23, 2017, 10 pages.

International Search Report and Written Opinion received for PCT Patent Application No. PCT/US2017/035331, mailed on Oct. 6, 2017, 18 pages.

International Search Report and Written Opinion received for PCT Patent Application No. PCT/US2017/037057, mailed on Aug. 29, 2017, 26 pages.

Invitation to Pay Additional Fee received for PCT Patent Application No. PCT/US2017/035331, mailed on Aug. 7, 2017, 4 pages.

Invitation to pay additional fees received for PCT Patent Application No. PCT/US2007/077644, mailed on Jan. 23, 2008, 10 pages.

Invitation to Pay Additional Fees received for PCT Patent Application No. PCT/US2008/050430, mailed on Jun. 27, 2008, 7 pages.

Invitation to Pay Additional Fees received for PCT Patent Application No. PCT/US2009/030225, mailed on Nov. 16, 2009, 4 pages.

Invitation to Pay Additional Fees received for PCT Patent Application No. PCT/US2010/050056, mailed on Jan. 5, 2011, 5 pages.

Iphone Dev Wiki, "IPhone Customization", Available at: <http://iphone.fivefony.net/wiki/index.php/Iphone_Customization>, Dec. 13, 2007, 7 pages.

Iphone Hacks, "iPhone Firmware 1.1.1: Multi-Page SpringBoard Hack", Available at: <http://www.iphonehacks.com/2007/10/springboardhack.html>, Oct. 9, 2007, 4 pages.

Iphone Hacks, "SummerBoard for iPhone OS v1.1.1: iPhone Hack Enables Scrolling of iPhone's Home Screen", Available at: <http://www.iphonehacks.com/2007/10/summerboard-v3.html>, Dec. 2007, 3 pages.

Iphone Info, "ModifYing the iPhone SpringBoard", Available at: <http://iphoneinfo.ca/modifying-the-iphone-springboard>, Dec. 2007, 6 pages.

ISO 9241-10:1996 Ergonomic Requirements for Office Work With Visual Display Terminals (VDTS)—Part 10, "Dialogue Principles", International Standard—ISO, Zurich, CH, vol. 9241-10, May 1, 1996, 17 pages.

ISO 9241-11:1998 Ergonomic Requirements for Office Work With Visual Display Terminals (VDTS)—Part 11, "Guidance on usability", International Standard—ISO, Zurich, CH, vol. 9241-11, Mar. 15, 1998, 27 pages.

ISO 9241-12:1998 Ergonomic Requirements for Office Work With Visual Display Terminals (VDTS)—Part 12, "Presentation of Information", International Standard—ISO, Zurich, CH, vol. 9241-12, Dec. 1, 1998, 52 pages.

Jazzmutant, "Jazzmutant Lemur", Available at: <http://64.233.167.104/search?a=cache:3g4wFSaZiXIJ:www.nuloop.c>, Nov. 16, 2005, 3 pages.

Jazzmutant, "The Lemur: Multitouch Control Surface", Available at: <http://64233.167.104/search?q=cache:j0_nFbNVzOcJ:www.cycling7>, retrieved on Nov. 16, 2005, 3 pages.

Jobs, Steve, "iPhone Introduction in 2007 (Complete)", available at: <https://www.youtube.com/watch?v=9hUlxyE2Ns8>, Jan. 10, 2013, 3 pages.

Joire, Myriam, "Neonode N1m Review", available at: <http://www.youtube.com/watch?v=Tj-KS2kflr0>, Jun. 29, 2007, 3 pages.

(56) References Cited

OTHER PUBLICATIONS

Karlson et al., "AppLens and LaunchTile: Two Designs for One-Handed Thumb Use on Small Devices", CHI 2005, Papers: Small Devices 1, Apr. 2-7, 2005, pp. 201-210.
Karlson et al., "AppLens and LaunchTile: Two Designs for One-Handed Thumb Use on Small Devices", Powerpoint Presentation, CHI 2005, pp. 1-17.
Khella et al., "Pocket PhotoMesa: A Zoomable Image Browser for PDAs", Proceedings of the 3rd International Conference on Mobile and Ubiquitous Multimedia, available at: <http://delivery.acm.org/10.1145/1060000/1052384/p19-khella.pdf?key1=1052384&key2=2419987911&co11=GUIDE&d1=GUIDE&CFID=47073625&CFTOKEN=65767142>, Oct. 29, 2004, 2 pages.
Kinoma, "Kinoma Player 4 EX Documentation", Available at: <http://replay.waybackmachine.org/20061101175306/http://www.kinoma.com/index/pd-player-4>, Retrieved on Apr. 4, 2011, 28 pages.
Kondo, Daisuke, "Windows XP Tablet PC Edition Quick Review Challenging by Microsoft", PCfan No. 9, No. 28, Japan, Mainichi Communication., Oct. 15, 2002, pp. 12-17.
Laakko et al., "Adapting Web Content to Mobile User Agents", IEEE Internet Computing, vol. 9, No. 2, Mar./Apr. 2005, pp. 46-53.
Landragin, Frédéric, "The Role of Gesture in Multimodal Referring Actions", Proceedings of the 4th IEEE International Conference on Multimodal Interfaces, available at <http://ieeexplore.iee.org/ie15/8346/26309/01166988pdf?arnumber=1166988>, 2002, 6 pages.
Lie, Håkon W., "Cascading Style Sheets (chpt 8 CSS for small screens)", Online Available at: <http://people.opera.com/howcome/2006/phd/css.pdf> University of Osloensis, MDCCCXI, pp. 243-247, Retrieved on Dec. 14, 2007, 8 pages.
Mac People, "Useful Technique for Web Browser", Ascii Media Works Inc., vol. 15, No. 6, Jun. 1, 2009, pp. 36-47.
"Macintosh Human Interface Guidelines (chapter 1)", Online available at: http://interface.free.fr/Archives/Apple_HIGuidelines.pdf, 1995, 14 pages.
Macworld, "First Look: Leopard first looks: Dashboard", Available at: <http://www.macworld.com/article/52297/2005/08/leodash.html>, Aug. 9, 2006, 3 pages.
Macworld, "Whip up a widget", Available at: <http://www.macworld.com/article/46622/2005/09/octgeekfactor.html>, Sep. 23, 2005, 6 pages.
Mcguffin et al., "Acquisition of Expanding Targets", ACM, Apr. 20-25, 2002, 8 pages.
Mello, Jr. J., "Tiger's Dashboard Brings Widgets to New Dimension", MacNewsWorld, Available at: <http://www.macnewsworld.com/story/42630.html>, Retrieved on Jun. 23, 2006, 3 pages.
Microsoft Help and Support, "How to Arrange or Move Icons on the Desktop", http://support.microsoft.com/kb/289587, Mar. 29, 2007, 2 pages.
Microsoft Word, "Example of Scrolling Pages in Word 2003", 2003, 3 pages.
Microsoft, "Working screenshot of Microsoft Office 2003", Aug. 19, 2003, 14 pages.
microsoft.com, "Right-Clicking with a Pen", Microsoft, Available at: http://www.microsoft.com/windowsxp/using/tabletpc/learnmore/rightclick.mspx, Nov. 7, 2002, 3 pages.
Milic-Frayling et al., "SmartView: Enhanced Document Viewer for Mobile Devices", Microsoft Technical Report, available at <ftp://ftp.research.microsoft.com/pub/tr/tr-2002-114.pdf>, Retrieved on Dec. 17, 2007, 10 pages.
Milic-Frayling et al., "SmartView: Flexible Viewing of Web Page Contents", Proceedings of the Eleventh International World Wide Web Conference, available at: <http://www2002.org/CDROM/poster/172/> Retrieved on May 5, 2008, 4 pages.
Miller, Matthew, "HTC Touch and Touch FLO Interface", 7:53 minutes video, available at: http://www.youtube.com/watch?v=6oUp4wOcUc4>, uploaded on Jun. 6, 2007, 2 pages.
Minutes of Meeting received for European Patent Application No. 09170697.8, mailed on Jul. 10, 2018, 6 pages.
Minutes of Oral Proceedings received for European Patent Application No. 17210062.0, mailed on Jun. 17, 2020, 5 pages.
Minutes of the Oral Proceedings received for European Application No. 08798713.7, mailed on Aug. 6, 2018, 4 pages.
Minutes of the Oral Proceedings received for European Patent Application No. 12189764.9, mailed on Oct. 13, 2020, 6 pages.
Minutes of the Oral Proceedings received for European Patent Application No. 13795330.3, mailed on Aug. 2, 2019, 7 pages.
mobilissimo.ro, "HTC Touch—Touch FLO Demo", Online Available at: <<https://www.youtube.com/watch?v=YQ8TQ9Rr_7E>, Jun. 5, 2007, 1 page.
Mountfocus Information Systems, "An Onscreen Virtual Keyboard: touchscreen, kiosk and Windows compatible", Available at: http://www.virtual-kevboard.com, Dec. 19, 2007, 3 pages.
"Multimedia Video Formats", Available online at: <http://www.w3sschools.com/media/media_videoformats.asp?output=print>, 2006, 2 pages.
"N1 Quick Start Guide", Version 0.5, Available at: <http://www.instructionsmanuals.com/download/telefonos_movil/Neonode-N1-en.pdf>, Jul. 29, 2004, pp. 1-24.
Nakata, Atsushi, "Tablet PC aiming at spread pen input by changing target user", Nikkei Windows for IT Professionals, Nikkei Business Publications, Inc. No. 69, Dec. 1, 2002, pp. 14-16.
Naver Blog, "iPhone iOS 4 folder management", Jun. 27, 2010, 2 pages.
Neonode Inc., "Welcome to the N1 Guide", available at: <http://www.ebookspdf.com/gadget/2818/neonode-n1m-manual/>, Jul. 2004, pp. 1-42.
Nishida et al., "Drag-and-Guess: Drag-and-Drop with Prediction", INTERACT'07 Proceedings of the 11th IFIP TC 13 International Conference on Human-Computer interaction, Sep. 10, 2007, pp. 461-474.
"Nokia 7710", https://www.nokia.com/en_int/phones/sites/default/files/user-guides/Nokia_7710_UG_en.pdf, 2005, pp. 1-153.
Non-Final Office Action received for U.S. Appl. No. 11/620,687, mailed on Dec. 22, 2008, 9 pages.
Non-Final Office Action received for U.S. Appl. No. 11/620,687, mailed on Jan. 11, 2010, 9 pages.
Non-Final Office Action received for U.S. Appl. No. 11/850,010, mailed on Dec. 17, 2014, 10 pages.
Non-Final Office Action received for U.S. Appl. No. 11/459,602, mailed on Sep. 4, 2008, 13 pages.
Non-Final Office Action received for U.S. Appl. No. 11/620,647, mailed on Jun. 24, 2010, 19 pages.
Non-Final Office Action received for U.S. Appl. No. 11/620,647, mailed on Nov. 17, 2009, 20 pages.
Non-Final Office Action received for U.S. Appl. No. 11/620,647, mailed on Oct. 13, 2011, 23 pages.
Non-Final Office Action received for U.S. Appl. No. 11/620,686, mailed on Dec. 22, 2009, 10 pages.
Non-Final Office Action received for U.S. Appl. No. 11/620,686, mailed on Dec. 31, 2008, 17 pages.
Non-Final Office Action received for U.S. Appl. No. 11/849,938, mailed on Dec. 14, 2011, 26 pages.
Non-Final Office Action received for U.S. Appl. No. 11/849,938, mailed on Oct. 12, 2010, 19 pages.
Non-Final Office Action received for U.S. Appl. No. 11/850,005, mailed on Apr. 12, 2017, 11 pages.
Non-Final Office Action received for U.S. Appl. No. 11/850,005, mailed on Dec. 31, 2018, 14 pages.
Non-Final Office Action received for U.S. Appl. No. 11/850,005, mailed on Mar. 18, 2011, 10 pages.
Non-Final Office Action received for U.S. Appl. No. 11/850,005, mailed on May 29, 2015, 12 pages.
Non-Final Office Action received for U.S. Appl. No. 11/850,005, mailed on Nov. 10, 2011, 11 pages.
Non-Final Office Action received for U.S. Appl. No. 11/850,005, mailed on Oct. 24, 2013, 11 pages.
Non-Final Office Action received for U.S. Appl. No. 11/850,008, mailed on Aug. 2, 2010, 14 pages.
Non-Final Office Action received for U.S. Appl. No. 11/850,010, mailed on May 2, 2011, 10 pages.

(56) References Cited

OTHER PUBLICATIONS

Non-Final Office Action received for U.S. Appl. No. 11/850,010, mailed on May 16, 2012, 12 pages.
Non-Final Office Action received for U.S. Appl. No. 11/850,010, mailed on Jul. 24, 2017, 19 pages.
Non-Final Office Action received for U.S. Appl. No. 11/850,010, mailed on Jun. 25, 2015, 10 pages.
Non-Final Office Action received for U.S. Appl. No. 11/850,010, mailed on Oct. 24, 2013, 13 pages.
Non-Final Office Action received for U.S. Appl. No. 11/850,011, mailed on Aug. 11, 2010, 19 pages.
Non-Final Office Action received for U.S. Appl. No. 11/850,013, mailed on Jun. 11, 2010, 32 pages.
Non-Final Office Action received for U.S. Appl. No. 11/850,638, mailed on Jan. 17, 2012, 15 pages.
Non-Final Office Action received for U.S. Appl. No. 11/850,638, mailed on Oct. 26, 2010, 17 pages.
Non-Final Office Action received for U.S. Appl. No. 11/960,669, mailed on Mar. 17, 2011, 23 pages.
Non-Final Office Action received for U.S. Appl. No. 11/961,773, mailed on Apr. 15, 2011, 21 pages.
Non-Final Office Action received for U.S. Appl. No. 11/961,773, mailed on May 10, 2012, 14 pages.
Non-Final Office Action received for U.S. Appl. No. 11/969,809, mailed on Mar. 14, 2011, 25 pages.
Non-Final Office Action received for U.S. Appl. No. 11/969,912, mailed on Apr. 13, 2011, 9 pages.
Non-Final Office Action received for U.S. Appl. No. 11/969,912, mailed on Sep. 10, 2013, 12 pages.
Non-Final Office Action received for U.S. Appl. No. 12/217,029, mailed on Apr. 18, 2011, 26 pages.
Non-Final Office Action received for U.S. Appl. No. 12/217,029, mailed on Aug. 19, 2013, 10 pages.
Non-Final Office Action received for U.S. Appl. No. 12/217,029, mailed on Jan. 25, 2012, 20 pages.
Non-Final Office Action received for U.S. Appl. No. 12/217,029, mailed on Oct. 28, 2015, 23 pages.
Non-Final Office Action received for U.S. Appl. No. 12/242,851, mailed on Apr. 15, 2011, 20 pages.
Non-Final Office Action received for U.S. Appl. No. 12/242,851, mailed on Jun. 26, 2015, 33 pages.
Non-Final Office Action received for U.S. Appl. No. 12/242,851, mailed on Oct. 6, 2014, 27 pages.
Non-Final Office Action received for U.S. Appl. No. 12/242,851, mailed on Sep. 20, 2012, 19 pages.
Non-Final Office Action received for U.S. Appl. No. 12/274,346, mailed on Aug. 26, 2011, 26 pages.
Non-Final Office Action received for U.S. Appl. No. 12/364,470, mailed on Mar. 4, 2011, 17 pages.
Non-Final Office Action received for U.S. Appl. No. 12/364,470, mailed on Nov. 13, 2009, 15 pages.
Non-Final Office Action received for U.S. Appl. No. 12/364,470, mailed on Sep. 2, 2010, 26 pages.
Non-Final Office Action received for U.S. Appl. No. 12/365,887, mailed on Aug. 31, 2011, 22 pages.
Non-Final Office Action received for U.S. Appl. No. 12/365,888, mailed on Nov. 10, 2011, 8 pages.
Non-Final Office Action received for U.S. Appl. No. 12/689,834, mailed on Aug. 26, 2016, 26 pages.
Non-Final Office Action received for U.S. Appl. No. 12/689,834, mailed on Jun. 10, 2014, 25 pages.
Non-Final Office Action received for U.S. Appl. No. 12/689,834, mailed on May 24, 2012, 21 pages.
Non-Final Office Action received for U.S. Appl. No. 12/788,278, mailed on Oct. 16, 2012, 19 pages.
Non-Final Office Action Received for U.S. Appl. No. 12/888,362, mailed on Jul. 20, 2012, 15 pages.
Non-Final Office Action received for U.S. Appl. No. 12/888,362, mailed on Sep. 4, 2014, 10 pages.
Non-Final Office Action received for U.S. Appl. No. 12/888,366, mailed on Jul. 31, 2012, 10 pages.
Non-Final Office Action Received for U.S. Appl. No. 12/888,370, mailed on Aug. 22, 2012, 13 pages.
Non-Final Office Action Received for U.S. Appl. No. 12/888,373, mailed on Sep. 10, 2012, 12 pages.
Non-Final Office Action received for U.S. Appl. No. 12/888,375, mailed on Jun. 7, 2012, 11 pages.
Non-Final Office Action received for U.S. Appl. No. 12/888,375, mailed on Sep. 30, 2013, 10 pages.
Non-Final Office Action received for U.S. Appl. No. 12/888,376, mailed on Aug. 29, 2014, 12 pages.
Non-Final Office Action received for U.S. Appl. No. 12/888,376, mailed on Oct. 2, 2012, 12 pages.
Non-Final Office Action received for U.S. Appl. No. 12/888,377, mailed on Sep. 13, 2012, 13 pages.
Non-Final Office Action received for U.S. Appl. No. 12/981,433, mailed on Oct. 11, 2012, 29 pages.
Non-Final Office Action received for U.S. Appl. No. 13/104,903, mailed on Nov. 13, 2012, 9 pages.
Non-Final Office Action received for U.S. Appl. No. 13/104,911, mailed on Feb. 20, 2013, 11 pages.
Non-Final Office Action received for U.S. Appl. No. 13/155,304, mailed on Sep. 5, 2012, 11 pages.
Non-Final Office Action received for U.S. Appl. No. 13/596,666, mailed on Jan. 14, 2015, 13 pages.
Non-Final Office Action received for U.S. Appl. No. 13/596,666, mailed on May 8, 2014, 12 pages.
Non-Final Office Action received for U.S. Appl. No. 14/142,640, mailed on Jun. 5, 2015, 29 pages.
Non-Final Office Action received for U.S. Appl. No. 14/142,648, mailed on Apr. 12, 2016, 11 pages.
Non-Final Office Action received for U.S. Appl. No. 14/261,112, mailed on Apr. 5, 2018, 40 pages.
Non-Final Office Action received for U.S. Appl. No. 14/261,112, mailed on Jul. 8, 2015, 29 pages.
Non-Final Office Action received for U.S. Appl. No. 14/261,112, mailed on Jun. 18, 2014, 25 pages.
Non-Final Office Action received for U.S. Appl. No. 14/261,112, mailed on Nov. 29, 2016, 34 pages.
Non-Final Office Action received for U.S. Appl. No. 15/033,551, mailed on May 24, 2018, 26 pages.
Non-Final Office Action received for U.S. Appl. No. 15/153,617, mailed on Apr. 2, 2018, 12 pages.
Non-Final Office Action received for U.S. Appl. No. 15/411,110, mailed on Dec. 13, 2018, 23 pages.
Non-Final Office Action received for U.S. Appl. No. 15/411,110, mailed on Jul. 22, 2019, 29 pages.
Non-Final Office Action received for U.S. Appl. No. 15/411,110, mailed on Jun. 26, 2020, 32 pages.
Non-Final Office Action received for U.S. Appl. No. 15/418,537, mailed on Dec. 13, 2018, 53 pages.
Non-Final Office Action received for U.S. Appl. No. 15/421,865, mailed on Mar. 21, 2019, 18 pages.
Non-Final Office Action received for U.S. Appl. No. 15/421,865, mailed on Oct. 7, 2020, 20 pages.
Non-Final Office Action received for U.S. Appl. No. 15/426,836, mailed on Oct. 18, 2018, 40 pages.
Non-Final Office Action received for U.S. Appl. No. 15/493,672, mailed on Nov. 6, 2018, 21 pages.
Non-Final Office Action received for U.S. Appl. No. 16/020,804, mailed on Nov. 20, 2019, 13 pages.
Non-Final Office Action received for U.S. Appl. No. 16/267,817, mailed on Apr. 15, 2020, 25 pages.
Non-Final Office Action received for U.S. Appl. No. 16/270,801, mailed on Mar. 27, 2020, 11 pages.
Non-Final Office Action received for U.S. Appl. No. 16/270,902, mailed on Mar. 27, 2020, 11 pages.
Non-Final Office Action received for U.S. Appl. No. 16/737,372, mailed on Jul. 27, 2021, 22 pages.
Non-Final Office Action received for U.S. Appl. No. 16/832,285, mailed on Jul. 26, 2021, 62 pages.

(56) References Cited

OTHER PUBLICATIONS

Non-Final Office Action received for U.S. Appl. No. 16/994,392, mailed on Jun. 9, 2021, 27 pages.
Non-Final Office Action received for U.S. Appl. No. 17/002,622, mailed on Jul. 6, 2021, 14 pages.
Non-Final Office Action received for U.S. Appl. No. 17/190,869, mailed on Sep. 27, 2021, 26 pages.
Non-Final Office Action received for U.S. Appl. No. 14/710,125, mailed on Apr. 12, 2016, 12 pages.
Notice of Acceptance received for Australia Patent Application No. 2012261534, mailed on Jan. 6, 2015, 2 pages.
Notice of Acceptance received for Australian Patent Application No. 2007292383, mailed on Jan. 4, 2012, 3 pages.
Notice of Acceptance received for Australian Patent Application No. 2008296445, mailed on Dec. 14, 2011, 4 pages.
Notice of Acceptance received for Australian Patent Application No. 2010200763, mailed on Aug. 21, 2012, 1 page.
Notice of Acceptance received for Australian Patent Application No. 2012200475, mailed on Aug. 24, 2015, 2 pages.
Notice of Acceptance received for Australian Patent Application No. 2012202140, mailed on May 28, 2014, 2 pages.
Notice of Acceptance received for Australian Patent Application No. 2013404001, mailed on Nov. 21, 2017, 3 pages.
Notice of Acceptance received for Australian Patent Application No. 2014204422, mailed on Apr. 28, 2016, 2 pages.
Notice of Acceptance received for Australian Patent Application No. 2014274556, mailed on Jul. 27, 2016, 2 pages.
Notice of Acceptance received for Australian Patent Application No. 2016203168, mailed on Feb. 14, 2018, 3 pages.
Notice of Acceptance received for Australian Patent Application No. 2016203309, mailed on Feb. 14, 2018, 3 pages.
Notice of Acceptance received for Australian Patent Application No. 2016213886, mailed on Feb. 9, 2018, 3 pages.
Notice of Acceptance received for Australian Patent Application No. 2017201768, mailed on Nov. 21, 2018, 3 pages.
Notice of Acceptance received for Australian Patent Application No. 2017202587, mailed on Nov. 6, 2019, 3 pages.
Notice of Acceptance received for Australian Patent Application No. 2017276153, mailed on Feb. 19, 2018, 4 pages.
Notice of Acceptance received for Australian Patent Application No. 2017276153, mailed on Jan. 17, 2018, 3 pages.
Notice of Acceptance received for Australian Patent Application No. 2017277813, mailed on Jun. 16, 2020, 3 pages.
Notice of Acceptance received for Australian Patent Application No. 2017277851, mailed on Dec. 9, 2019, 3 pages.
Notice of Acceptance received for Australian Patent Application No. 2018200272, mailed on Apr. 23, 2019, 3 pages.
Notice of Acceptance received for Australian Patent Application No. 2018203512, mailed on Jul. 26, 2019, 3 pages.
Notice of Acceptance received for Australian Patent Application No. 2019200692, mailed on Apr. 7, 2020, 3 pages.
Notice of Acceptance received for Australian Patent Application No. 2019204835, mailed on Dec. 7, 2020, 3 pages.
Notice of Acceptance received for Australian Patent Application No. 2019210673, mailed on Oct. 17, 2020, 3 pages.
Notice of Acceptance received for Australian Patent Application No. 2019219816, mailed on Sep. 23, 2020, 3 pages.
Notice of Acceptance received for Australian Patent Application No. 2020201723, mailed on May 6, 2021, 3 pages.
Notice of Acceptance received for Australian Patent Application No. 2021200102, mailed on Mar. 16, 2021, 3 pages.
Notice of Allowance received for Australian Patent Application No. 2010350739, mailed on Sep. 8, 2014, 2 pages.
Notice of Allowance received for Australian Patent Application No. 2015202076, mailed on Apr. 5, 2017, 3 pages.
Notice of Allowance received for Canadian Patent Application No. 2,633,759, mailed on Sep. 9, 2013, 1 page.
Notice of Allowance received for Canadian Patent Application No. 2,845,297, mailed on Nov. 10, 2014, 1 page.
Notice of Allowance received for Canadian Patent Application No. 2,890,778, mailed on Apr. 24, 2017, 1 page.
Notice of Allowance received for Canadian Patent Application No. 2,983,178, mailed on Oct. 20, 2020, 1 page.
Notice of Allowance received for Chinese Patent Application No. 200980152822.9, mailed on Jun. 5, 2014, 2 pages.
Notice of Allowance received for Chinese Patent Application No. 200780041309.3, mailed on Jul. 31, 2017, 2 pages.
Notice of Allowance received for Chinese Patent Application No. 200980000229.2, mailed on Oct. 24, 2014, 4 pages.
Notice of Allowance received for Chinese Patent Application No. 201010592864.9, mailed on Jan. 30, 2015, 4 pages.
Notice of Allowance received for Chinese Patent Application No. 201210399033.9, mailed on Jun. 20, 2016, 3 pages.
Notice of Allowance received for Chinese Patent Application No. 201310724733.5, mailed on Dec. 27, 2018, 2 pages.
Notice of Allowance received for Chinese Patent Application No. 201380080659.6, mailed on Jul. 29, 2019, 2 pages.
Notice of Allowance received for Chinese Patent Application No. 201410250648.4, mailed on Aug. 20, 2018, 2 pages.
Notice of Allowance received for Chinese Patent Application No. 201410250688.9, mailed on May 21, 2018, 3 pages.
Notice of Allowance received for Chinese Patent Application No. 201410251370.2, mailed on Jul. 31, 2018, 2 pages.
Notice of Allowance received for Chinese Patent Application No. 201410251400.X, mailed on Aug. 20, 2018, 3 pages.
Notice of Allowance received for Chinese Patent Application No. 201780033973.7, mailed on Jul. 7, 2021, 5 pages.
Notice of Allowance received for Japanese Patent Application No. 2009-051921, mailed on Jan. 20, 2014, 2 pages.
Notice of Allowance received for Japanese Patent Application No. 2011-537452, mailed on Jun. 14, 2013, 3 pages.
Notice of Allowance received for Japanese Patent Application No. 2013-127963, mailed on Oct. 9, 2015, 3 pages.
Notice of Allowance received for Japanese Patent Application No. 2013-252338, mailed on Jun. 23, 2017, 3 pages.
Notice of Allowance received for Japanese Patent Application No. 2014-139095, mailed on Apr. 1, 2016, 3 pages.
Notice of Allowance received for Japanese Patent Application No. 2014-253365, mailed on Nov. 26, 2018, 3 pages.
Notice of Allowance received for Japanese Patent Application No. 2015-532193, mailed on Jan. 23, 2017, 3 pages.
Notice of Allowance received for Japanese Patent Application No. 2016-091460, mailed on Oct. 9, 2018, 3 pages.
Notice of Allowance received for Japanese Patent Application No. 2016-092789, mailed on Feb. 3, 2017, 3 pages.
Notice of Allowance received for Japanese Patent Application No. 2016-527367, mailed on Jul. 30, 2018, 4 pages.
Notice of Allowance received for Japanese Patent Application No. 2017-042050, mailed on Apr. 24, 2017, 3 pages.
Notice of Allowance received for Japanese Patent Application No. 2017-102031, mailed on Jun. 23, 2017, 3 pages.
Notice of Allowance received for Japanese Patent Application No. 2017-142812, mailed on Jul. 19, 2019, 4 pages.
Notice of Allowance received for Japanese Patent Application No. 2017-204561, mailed on Mar. 12, 2019, 4 pages.
Notice of Allowance received for Japanese Patent Application No. 2017-223021, mailed on Dec. 18, 2020, 3 pages.
Notice of Allowance received for Japanese Patent Application No. 2018-121118, mailed on Sep. 27, 2021, 3 pages.
Notice of Allowance received for Japanese Patent Application No. 2018-201088, mailed on Sep. 18, 2020, 4 pages.
Notice of Allowance received for Japanese Patent Application No. 2019-144763, mailed on Nov. 29, 2021, 4 pages.
Notice of Allowance received for Japanese Patent Application No. 2013-011209, mailed on Jun. 13, 2016, 2 pages.
Notice of Allowance received for Korean Patent Application No. 10-2009-7007064, mailed on Sep. 30, 2011, 2 pages.
Notice of Allowance received for Korean Patent Application No. 10-2009-7007067, mailed on Dec. 1, 2011, 2 pages.
Notice of Allowance received for Korean Patent Application No. 10-2010-7007258, mailed Nov. 20, 2013, 2 pages.

(56) References Cited

OTHER PUBLICATIONS

Notice of Allowance received for Korean Patent Application No. 10-2011-7014104, mailed on Aug. 29, 2013, 2 pages.
Notice of Allowance received for Korean Patent Application No. 10-2011-7019633, mailed on May 18, 2012, 2 pages.
Notice of Allowance received for Korean Patent Application No. 10-2011-7026583, mailed on Apr. 29, 2015, 3 pages.
Notice of Allowance received for Korean Patent Application No. 10-2012-7029270, mailed on Sep. 23, 2014, 2 pages.
Notice of Allowance received for Korean Patent Application No. 10-2013-7009794, mailed on Oct. 23, 2015, 3 pages.
Notice of Allowance received for Korean Patent Application No. 10-2014-7011273, mailed on Apr. 28, 2015, 3 pages.
Notice of Allowance Received for Korean Patent Application No. 10-2014-7036624, mailed on Sep. 26, 2016, 3 pages.
Notice of Allowance received for Korean Patent Application No. 10-2015-7017527, mailed on Oct. 23, 2015, 3 pages.
Notice of Allowance received for Korean Patent Application No. 10-2016-7014051, mailed on Nov. 27, 2018, 4 pages.
Notice of Allowance received for Korean Patent Application No. 10-2017-7029054, mailed on Jan. 2, 2019, 4 pages.
Notice of Allowance received for Korean Patent Application No. 10-2019-7005262, mailed on Mar. 25, 2020, 5 pages.
Notice of Allowance received for U.S. Appl. No. 12/788,278, mailed on May 1, 2013, 8 pages.
Notice of Allowance received for U.S. Appl. No. 14/011,639, mailed on Sep. 29, 2015, 11 pages.
Notice of Allowance received for U.S. Appl. No. 11/459,602, mailed on Jan. 9, 2009, 6 pages.
Notice of Allowance received for U.S. Appl. No. 11/620,647, mailed on Mar. 2, 2012, 8 pages.
Notice of Allowance received for U.S. Appl. No. 11/849,938, mailed on Nov. 27, 2013, 2 pages.
Notice of Allowance received for U.S. Appl. No. 11/849,938, mailed on Oct. 10, 2013, 28 pages.
Notice of Allowance received for U.S. Appl. No. 11/850,008, mailed on Mar. 11, 2011, 7 pages.
Notice of Allowance received for U.S. Appl. No. 11/850,011, mailed on Feb. 11, 2011, 5 pages.
Notice of Allowance received for U.S. Appl. No. 11/850,011, mailed on Feb. 18, 2011, 4 pages.
Notice of Allowance received for U.S. Appl. No. 11/850,013, mailed on Oct. 20, 2010, 20 pages.
Notice of Allowance received for U.S. Appl. No. 11/969,809, mailed on Apr. 26, 2013, 17 pages.
Notice of Allowance received for U.S. Appl. No. 11/969,912, mailed on Jun. 11, 2014, 4 pages.
Notice of Allowance received for U.S. Appl. No. 11/969,912, mailed on Mar. 6, 2014, 12 pages.
Notice of Allowance received for U.S. Appl. No. 12/217,029, mailed on Jan. 17, 2017, 10 pages.
Notice of Allowance received for U.S. Appl. No. 12/242,851, mailed on Dec. 27, 2016, 20 pages.
Notice of Allowance received for U.S. Appl. No. 12/274,346, mailed on Jul. 17, 2013, 10 pages.
Notice of Allowance received for U.S. Appl. No. 12/274,346, mailed on Mar. 12, 2013, 18 pages.
Notice of Allowance received for U.S. Appl. No. 12/364,470, mailed on Nov. 24, 2017, 9 pages.
Notice of Allowance received for U.S. Appl. No. 12/365,887, mailed on May 23, 2012, 5 pages.
Notice of Allowance received for U.S. Appl. No. 12/689,834, mailed on Jan. 17, 2018, 9 pages.
Notice of Allowance received for U.S. Appl. No. 12/888,362, mailed on Apr. 11, 2018, 7 pages.
Notice of Allowance received for U.S. Appl. No. 12/888,366, mailed on Dec. 14, 2012, 11 pages.
Notice of Allowance received for U.S. Appl. No. 12/888,370, mailed on Feb. 12, 2013, 10 pages.
Notice of Allowance received for U.S. Appl. No. 12/888,370, mailed on Jul. 1, 2014, 8 pages.
Notice of Allowance received for U.S. Appl. No. 12/888,373, mailed on Feb. 22, 2013, 12 pages.
Notice of Allowance received for U.S. Appl. No. 12/888,373, mailed on Jul. 1, 2014, 8 pages.
Notice of Allowance received for U.S. Appl. No. 12/888,376, mailed on May 29, 2015, 14 pages.
Notice of Allowance received for U.S. Appl. No. 12/888,377, mailed on Jan. 30, 2013, 12 pages.
Notice of Allowance received for U.S. Appl. No. 13/104,903, mailed on Apr. 29, 2013, 6 pages.
Notice of Allowance received for U.S. Appl. No. 13/104,911, mailed on Jun. 10, 2013, 6 pages.
Notice of Allowance received for U.S. Appl. No. 14/011,639, mailed on Feb. 16, 2016, 5 pages.
Notice of Allowance received for U.S. Appl. No. 14/142,640, mailed on Dec. 11, 2019, 7 pages.
Notice of Allowance received for U.S. Appl. No. 14/142,648, mailed on Jul. 15, 2020, 6 pages.
Notice of Allowance received for U.S. Appl. No. 14/142,648, mailed on Mar. 13, 2020, 5 pages.
Notice of Allowance received for U.S. Appl. No. 14/261,112, mailed on Apr. 9, 2021, 2 pages.
Notice of Allowance received for U.S. Appl. No. 14/261,112, mailed on Nov. 18, 2020, 6 pages.
Notice of Allowance received for U.S. Appl. No. 14/710,125, mailed on Apr. 19, 2019, 8 pages.
Notice of Allowance received for U.S. Appl. No. 14/710,125, mailed on May 7, 2019, 9 pages.
Notice of Allowance received for U.S. Appl. No. 15/033,551, mailed on Nov. 14, 2018, 10 pages.
Notice of Allowance received for U.S. Appl. No. 15/056,913, mailed on May 24, 2017, 19 pages.
Notice of Allowance received for U.S. Appl. No. 15/153,617, mailed on Nov. 23, 2018, 10 pages.
Notice of Allowance received for U.S. Appl. No. 15/418,537, mailed on Apr. 6, 2020, 9 pages.
Notice of Allowance received for U.S. Appl. No. 15/426,836, mailed on Dec. 16, 2019, 16 pages.
Notice of Allowance received for U.S. Appl. No. 16/020,804, mailed on May 28, 2020, 18 pages.
Notice of Allowance received for U.S. Appl. No. 16/267,817, mailed on Dec. 18, 2020, 11 pages.
Notice of Allowance received for U.S. Appl. No. 16/270,801, mailed on Sep. 16, 2020, 9 pages.
Notice of Allowance received for U.S. Appl. No. 16/270,902, mailed on Sep. 22, 2020, 9 pages.
Notice of Allowance received for U.S. Appl. No. 16/378,291, mailed on Mar. 25, 2020, 11 pages.
Notice of Allowance received for U.S. Appl. No. 16/428,634, mailed on May 8, 2020, 16 pages.
Notice of Allowance received for U.S. Appl. No. 16/918,855, mailed on Apr. 6, 2021, 7 pages.
Notice of Allowance received for U.S. Appl. No. 16/926,530, mailed on Jun. 24, 2021, 10 pages.
Notice of Allowance received for U.S. Appl. No. 17/002,622, mailed on Nov. 22, 2021, 7 pages.
Notice of Allowance received for U.S. Appl. No. 17/019,062, mailed on Aug. 10, 2021, 22 pages.
Notice of Allowance received for U.S. Appl. No. 17/019,062, mailed on Nov. 24, 2021, 20 pages.
Notice of Allowance received for U.S. Appl. No. 11/850,010, mailed on Feb. 6, 2019, 25 pages.
Notification of Acceptance received for Australian Patent Application No. 2009204252, mailed on Oct. 17, 2011, 3 pages.
NTT Docomo, "i-mode Compatible Pictograms", available at: <http://www.nttdocomo.co.jp/english/service/imode/make/content/pictograph/index.html>, 2008, 2 pages.
Office Action received for Australian Patent Application No. 2014274556, mailed on Aug. 28, 2015, 2 pages.
Office Action received for Australian Patent Application No. 2007289019, mailed on Jul. 2, 2009, 3 pages.

(56) References Cited

OTHER PUBLICATIONS

Office Action received for Australian Patent Application No. 2007289019, mailed on Oct. 7, 2009, 2 pages.
Office Action received for Australian Patent Application No. 2007292383, mailed on Dec. 22, 2011, 2 pages.
Office Action received for Australian Patent Application No. 2007292383, mailed on Mar. 24, 2010, 2 pages.
Office Action received for Australian Patent Application No. 2007292383, mailed on May 12, 2011, 2 pages.
Office Action received for Australian Patent Application No. 2008296445, mailed on Oct. 29, 2010, 2 pages.
Office Action received for Australian Patent Application No. 2009100760, mailed on Sep. 28, 2009, 2 pages.
Office Action received for Australian Patent Application No. 2009100812, mailed on Sep. 14, 2009, 2 pages.
Office Action received for Australian Patent Application No. 2009100813, mailed on Sep. 14, 2009, 2 pages.
Office Action received for Australian Patent Application No. 2009204252, issued on Nov. 28, 2013, 2 pages.
Office Action received for Australian Patent Application No. 2009204252, issued on Sep. 16, 2014, 6 pages.
Office Action received for Australian Patent Application No. 2009204252, mailed on Apr. 20, 2010, 3 pages.
Office Action received for Australian Patent Application No. 2009204252, mailed on May 18, 2011, 2 pages.
Office Action received for Australian Patent Application No. 2010200763, mailed on Jul. 28, 2011, 2 pages.
Office Action received for Australian Patent Application No. 2011101194, mailed on Oct. 21, 2011, 2 pages.
Office Action received for Australian Patent Application No. 2012200475, issued on Aug. 4, 2015, 3 pages.
Office Action received for Australian Patent Application No. 2012200475, issued on Jun. 29, 2015, 3 pages.
Office Action received for Australian Patent Application No. 2012200475, issued on Nov. 19, 2013, 4 pages.
Office Action received for Australian Patent Application No. 2012202140, mailed on Aug. 12, 2013, 2 pages.
Office Action received for Australian Patent Application No. 2012261534, issued on Dec. 3, 2013, 3 pages.
Office Action Received for Australian Patent Application No. 2013404001, mailed on Aug. 3, 2017, 5 pages.
Office Action Received for Australian Patent Application No. 2013404001, mailed on Nov. 26, 2016, 3 pages.
Office Action received for Australian Patent Application No. 2014100582, issued on Aug. 7, 2014, 5 pages.
Office Action received for Australian Patent Application No. 2014100582, issued on Feb. 4, 2015, 3 pages.
Office Action received for Australian Patent Application No. 2014204422, issued on Aug. 7, 2015, 3 pages.
Office Action received for Australian Patent Application No. 2014274537, issued on Jul. 25, 2016, 3 pages.
Office Action Received for Australian Patent Application No. 2014274537, mailed on Aug. 14, 2015, 3 pages.
Office Action received for Australian Patent Application No. 2015202076, issued on May 5, 2016, 3 pages.
Office Action received for Australian Patent Application No. 2015215876, mailed on Aug. 1, 2016, 4 pages.
Office Action received for Australian Patent Application No. 2015215876, mailed on Jul. 26, 2017, 6 pages.
Office Action received for Australian Patent Application No. 2015215876, mailed on Jun. 28, 2017, 4 pages.
Office Action received for Australian Patent Application No. 2015215876, mailed on May 24, 2017, 4 pages.
Office Action received for Australian Patent Application No. 2016203168, mailed on Feb. 8, 2017, 2 pages.
Office Action received for Australian Patent Application No. 2016203309, mailed on Feb. 8, 2017, 11 pages.
Office Action received for Australian Patent Application No. 2016213886, mailed on May 18, 2017, 2 pages.
Office Action received for Australian Patent Application No. 2017201768, mailed on Feb. 28, 2018, 4 pages.
Office Action received for Australian Patent Application No. 2017202587, mailed on Apr. 26, 2019, 4 pages.
Office Action received for Australian Patent Application No. 2017202587, mailed on Jul. 4, 2018, 4 pages.
Office Action received for Australian Patent Application No. 2017202587, mailed on Jul. 4, 2019, 4 pages.
Office Action received for Australian Patent Application No. 2017277813, mailed on Jun. 11, 2019, 3 pages.
Office Action received for Australian Patent Application No. 2017277813, mailed on Mar. 20, 2020, 4 pages.
Office Action received for Australian Patent Application No. 2017277851, mailed on Jul. 5, 2019, 3 pages.
Office Action received for Australian Patent Application No. 2018200272, mailed on Jan. 17, 2019, 2 pages.
Office Action received for Australian Patent Application No. 2018203512, mailed on Apr. 15, 2019, 4 pages.
Office Action received for Australian Patent Application No. 2019200692, mailed on Dec. 24, 2019, 2 pages.
Office Action received for Australian Patent Application No. 2019204835, mailed on Sep. 16, 2020, 6 pages.
Office Action received for Australian Patent Application No. 2019210673, mailed on Jul. 28, 2020, 4 pages.
Office Action received for Australian Patent Application No. 2019210673, mailed on Sep. 28, 2020, 2 pages.
Office Action received for Australian Patent Application No. 2019219816, mailed on Apr. 17, 2020, 3 pages.
Office Action received for Australian Patent Application No. 2020201723, mailed on Feb. 4, 2021, 6 pages.
Office Action received for Australian Patent Application No. 2020239774, mailed on Jun. 28, 2021, 8 pages.
Office Action received for Australian Patent Application No. 2020239774, mailed on Oct. 5, 2021, 3 pages.
Office Action received for Canadian Patent Application No. 2,633,759, mailed on Apr. 2, 2009, 5 pages.
Office Action received for Canadian Patent Application No. 2,633,759, mailed on Aug. 12, 2010, 8 pages.
Office Action received for Canadian Patent Application No. 2,633,759, mailed on Dec. 10, 2009, 6 pages.
Office Action received for Canadian Patent Application No. 2,845,297, mailed on Apr. 23, 2014, 2 pages.
Office Action received for Canadian Patent Application No. 2,890,778, mailed on May 19, 2016, 6 pages.
Office Action received for Canadian Patent Application No. 2,983,178, mailed on Aug. 16, 2018, 5 pages.
Office Action received for Canadian Patent Application No. 2,983,178, mailed on Jul. 22, 2019, 6 pages.
Office Action received for Chinese Patent Application No. 200980152822.9, mailed on Dec. 5, 2012, 10 pages.
Office Action received for Chinese Patent Application No. 200680053441.1, mailed on Nov. 12, 2010, 4 pages.
Office Action received for Chinese Patent Application No. 200780001140.9, mailed on Jan. 15, 2010, 5 pages.
Office Action received for Chinese Patent Application No. 200780001140.9, mailed on Jun. 10, 2011, 7 pages.
Office Action received for Chinese Patent Application No. 200780041222.6, mailed on Feb. 29, 2012, 6 pages.
Office Action received for Chinese Patent Application No. 200780041222.6, mailed on Jul. 25, 2012, 3 pages.
Office Action received for Chinese Patent Application No. 200780041222.6, mailed on Oct. 13, 2010, 10 pages.
Office Action received for Chinese Patent Application No. 200780041309.3, mailed on Feb. 8, 2017, 4 pages.
Office Action received for Chinese Patent Application No. 200780041309.3, mailed on Jan. 18, 2012, 15 pages.
Office Action received for Chinese Patent Application No. 200780041309.3, mailed on Nov. 1, 2012, 5 pages.
Office Action received for Chinese Patent Application No. 200780052019.9, mailed on Feb. 29, 2012, 6 pages.
Office Action received for Chinese Patent Application No. 200880110709.X, mailed on Nov. 24, 2011, 10 pages.

(56) References Cited

OTHER PUBLICATIONS

Office Action received for Chinese Patent Application No. 200880112570.2, mailed on Aug. 24, 2011, 6 pages.
Office Action received for Chinese Patent Application No. 200910175852.3, mailed on Apr. 24, 2012, 10 pages.
Office Action received for Chinese Patent Application No. 200910175852.3, mailed on Jun. 2, 2011, 6 pages.
Office Action received for Chinese Patent Application No. 200980000229.2, issued on Jan. 6, 2014, 6 pages.
Office Action received for Chinese Patent Application No. 200980000229.2, mailed on Jun. 27, 2014, 7 pages.
Office Action received for Chinese Patent Application No. 200980000229.2, mailed on Nov. 30, 2011, 24 pages.
Office Action received for Chinese Patent Application No. 200980000229.2, mailed on Oct. 26, 2012, 22 pages.
Office Action received for Chinese Patent Application No. 200980152822.9, mailed on Oct. 21, 2013, 2 pages.
Office Action received for Chinese Patent Application No. 201210399033.9, mailed on Nov. 27, 2014, 7 pages.
Office Action received for Chinese Patent Application No. 201210399033.9, mailed on Oct. 8, 2015, 8 pages.
Office Action received for Chinese Patent Application No. 201310724733.5, mailed on Apr. 9, 2018, 11 pages.
Office Action received for Chinese Patent Application No. 201310724733.5, mailed on Apr. 12, 2016, 14 pages.
Office Action received for Chinese Patent Application No. 201310724733.5, mailed on Apr. 21, 2017, 18 pages.
Office Action received for Chinese Patent Application No. 201310724733.5, mailed on Aug. 15, 2018, 2 pages.
Office Action received for Chinese Patent Application No. 201310724733.5, mailed on Aug. 28, 2018, 6 pages.
Office Action received for Chinese Patent Application No. 201310724733.5, mailed on Dec. 30, 2016, 13 pages.
Office Action received for Chinese Patent Application No. 201310724733.5, mailed on Oct. 30, 2017, 14 pages.
Office Action received for Chinese Patent Application No. 201380080659.6, mailed on Apr. 4, 2018, 15 pages.
Office Action received for Chinese Patent Application No. 201380080659.6, mailed on Mar. 4, 2019, 9 pages.
Office Action received for Chinese Patent Application No. 201380080659.6, mailed on Oct. 26, 2018, 11 pages.
Office action received for Chinese Patent Application No. 201410250648.4, mailed on Feb. 14, 2018, 6 pages.
Office Action received for Chinese Patent Application No. 201410250648.4, mailed on Jun. 29, 2017, 13 pages.
Office Action received for Chinese Patent Application No. 201410250648.4, mailed on Oct. 9, 2016, 6 pages.
Office Action received for Chinese Patent Application No. 201410250688.9, mailed on Jun. 1, 2017, 12 pages.
Office Action received for Chinese Patent Application No. 201410250688.9, mailed on Nov. 16, 2017, 6 pages.
Office Action received for Chinese Patent Application No. 201410250688.9, mailed on Sep. 28, 2016, 7 pages.
Office Action received for Chinese Patent Application No. 201410251370.2, mailed on Feb. 11, 2018, 14 pages.
Office Action received for Chinese Patent Application No. 201410251370.2, mailed on May 12, 2017, 8 pages.
Office Action received for Chinese Patent Application No. 201410251370.2, mailed on Sep. 5, 2016, 7 pages.
Office Action received for Chinese Patent Application No. 201410251400.X, mailed on Feb. 8, 2018, 6 pages.
Office Action Received for Chinese Patent Application No. 201410251400.X, mailed on Jul. 4, 2016, 8 pages.
Office Action Received for Chinese Patent Application No. 201410251400.X, mailed on May 26, 2017, 11 pages.
Office Action received for Chinese Patent Application No. 201480001676.0, mailed on Mar. 20, 2018, 12 pages.
Office Action received for Chinese Patent Application No. 201480001676.0, mailed on May 12, 2017, 15 pages.
Office Action received for Chinese Patent Application No. 201480001676.0, mailed on Nov. 27, 2018, 8 pages.
Office Action received for Chinese Patent Application No. 201780033621.1, mailed on Dec. 22, 2020, 30 pages.
Office Action received for Chinese Patent Application No. 201780033621.1, mailed on May 24, 2021, 18 pages.
Office Action received for Chinese Patent Application No. 201780033973.7, mailed on Jan. 22, 2021, 27 pages.
Office Action received for Danish Patent Application No. PA201670595, mailed on Aug. 23, 2018, 5 pages.
Office Action received for Danish Patent Application No. PA201670595, mailed on May 31, 2017, 3 pages.
Office Action received for Danish Patent Application No. PA201670595, mailed on Nov. 25, 2016, 9 pages.
Office Action received for Danish Patent Application No. PA201670595, mailed on Nov. 30, 2017, 4 pages.
Office Action received for European Patent Application No. 07814689.1, mailed on Mar. 4, 2011, 6 pages.
Office Action received for European Patent Application No. 07814690.9, mailed on Jun. 21, 2010, 5 pages.
Office Action received for European Patent Application No. 07814690.9, mailed on Oct. 19, 2010, 8 pages.
Office Action received for European Patent Application No. 07841980.1, mailed on Feb. 23, 2012, 5 pages.
Office Action received for European Patent Application No. 07869929.5, mailed on Dec. 27, 2010, 6 pages.
Office Action received for European Patent Application No. 08705639.6, mailed on Dec. 19, 2013, 7 pages.
Office Action received for European Patent Application No. 08798713.7, mailed on Feb. 9, 2012, 7 pages.
Office Action received for European Patent Application No. 08798713.7, mailed on Jul. 29, 2014, 18 pages.
Office Action received for European Patent Application No. 08798713.7, mailed on Jun. 22, 2011, 10 pages.
Office Action received for European Patent Application No. 08829660.3, mailed on Aug. 2, 2013, 7 pages.
Office Action received for European Patent Application No. 08829660.3, mailed on Jan. 3, 2020, 6 pages.
Office Action received for European Patent Application No. 08829660.3, mailed on Jan. 11, 2019, 7 pages.
Office Action received for European Patent Application No. 08829660.3, mailed on Jul. 5, 2016, 5 pages.
Office Action received for European Patent Application No. 08829660.3, mailed on Oct. 15, 2010, 8 pages.
Office Action received for European Patent Application No. 09170697.8, mailed on Dec. 13, 2011, 4 pages.
Office Action received for European Patent Application No. 09170697.8, mailed on Jul. 6, 2021, 3 pages.
Office Action received for European Patent Application No. 09170697.8, mailed on Mar. 3, 2017, 8 pages.
Office Action received for European Patent Application No. 09171787.6, mailed on Jul. 12, 2011, 5 pages.
Office Action received for European Patent Application No. 09700333.9, mailed on Jun. 10, 2011, 5 pages.
Office Action received for European Patent Application No. 09700333.9, mailed on Nov. 26, 2010, 5 pages.
Office Action received for European Patent Application No. 10762813.3, mailed on Mar. 21, 2016, 6 pages.
Office Action Received for European Patent Application No. 12189764.9, mailed on Jan. 21, 2019, 7 pages.
Office Action received for European Patent Application No. 12189764.9, mailed on Mar. 1, 2016, 6 pages.
Office Action received for European Patent Application No. 12194312.0, mailed on Jan. 13, 2014, 4 pages.
Office Action received for European Patent Application No. 12194312.0, mailed on Oct. 8, 2013, 5 pages.
Office Action received for European Patent Application No. 12194315.3, mailed on Jan. 13, 2014, 4 pages.
Office Action received for European Patent Application No. 12194315.3, mailed on Oct. 8, 2013, 5 pages.
Office Action received for European Patent Application No. 13174706.5, mailed on Oct. 16, 2017, 8 pages.

(56) References Cited

OTHER PUBLICATIONS

Office Action received for European Patent Application No. 13795330.3, mailed on Oct. 9, 2017, 8 pages.
Office Action received for European Patent Application No. 14734674.6, mailed on Aug. 30, 2019, 6 pages.
Office Action received for European Patent Application No. 14734674.6, mailed on Oct. 5, 2017, 6 pages.
Office Action received for European Patent Application No. 17210062.0, mailed on Jan. 3, 2019, 6 pages.
Office Action received for European Patent Application No. 17810723.1, mailed on Jul. 9, 2021, 8 pages.
Office Action received for European Patent Application No. 17810739.7, mailed on Nov. 25, 2020, 4 pages.
Office Action received for European Patent Application No. 17813879.8, mailed on Oct. 20, 2021, 7 pages.
Office Action received for German Patent Application No. 112007002107.1, mailed on Jun. 7, 2010, 3 pages.
Office Action received for Japanese Patent Application No. 2009-051921, mailed on May 31, 2013, 7 pages.
Office Action received for Japanese Patent Application No. 2009-527541, mailed on May 21, 2012, 3 pages.
Office Action received for Japanese Patent Application No. 2009-527541, mailed on Sep. 26, 2011, 3 pages.
Office Action received for Japanese Patent Application No. 2009-527566, mailed on Aug. 15, 2011, 3 pages.
Office Action received for Japanese Patent Application No. 2009-527566, mailed on Sep. 21, 2012, 3 pages.
Office Action received for Japanese Patent Application No. 2010-524102, mailed on Feb. 13, 2012, 2 pages.
Office Action received for Japanese Patent Application No. 2010-524102, mailed on Oct. 26, 2012, 4 pages.
Office Action received for Japanese Patent Application No. 2011-537452, mailed on Jan. 25, 2013, 7 pages.
Office Action received for Japanese Patent Application No. 2013-011209, mailed on Feb. 7, 2014, 3 pages.
Office Action received for Japanese Patent Application No. 2013-011209, mailed on Nov. 2, 2015, 9 pages.
Office Action received for Japanese Patent Application No. 2013-011209, mailed on Oct. 27, 2014, 3 pages.
Office Action received for Japanese Patent Application No. 2013-127963, mailed on Aug. 15, 2014, 8 pages.
Office Action received for Japanese Patent Application No. 2013-127963, mailed on Mar. 10, 2014, 7 pages.
Office Action received for Japanese Patent Application No. 2013-144822, mailed on Jun. 30, 2014, 3 pages.
Office Action received for Japanese Patent Application No. 2013-252338, mailed on Dec. 4, 2015, 4 pages.
Office Action received for Japanese Patent Application No. 2013-252338, mailed on Jan. 27, 2017, 10 pages.
Office Action received for Japanese Patent Application No. 2013-252338, mailed on Jan. 30, 2015, 4 pages.
Office Action received for Japanese Patent Application No. 2013-252338, mailed on Jun. 24, 2016, 4 pages.
Office Action received for Japanese Patent Application No. 2013-503721, mailed on Feb. 14, 2014, 8 pages.
Office Action Received for Japanese Patent Application No. 2013-503721, mailed on Jun. 6, 2014, 3 pages.
Office Action Received for Japanese Patent Application No. 2014-139095, mailed on Aug. 17, 2015, 6 pages.
Office Action received for Japanese Patent Application No. 2014-253365, mailed on Aug. 31, 2018, 6 pages.
Office Action received for Japanese Patent Application No. 2014-253365, mailed on Dec. 14, 2015, 6 pages.
Office Action received for Japanese Patent Application No. 2014-253365, mailed on Jul. 18, 2017, 9 pages.
Office Action received for Japanese Patent Application No. 2014-253365, mailed on Oct. 17, 2016, 11 pages.
Office Action received for Japanese Patent Application No. 2015-532193, mailed on Mar. 22, 2016, 7 pages.
Office Action received for Japanese Patent Application No. 2016-042767, mailed on Mar. 3, 2017, 10 pages.
Office Action received for Japanese Patent Application No. 2016-091460, mailed on Jun. 1, 2018, 3 pages.
Office Action received for Japanese Patent Application No. 2016-091460, mailed on Jun. 26, 2017, 6 pages.
Office Action received for Japanese Patent Application No. 2016-091460, mailed on Nov. 4, 2016, 6 pages.
Office Action received for Japanese Patent Application No. 2016-091460, mailed on Nov. 27, 2017, 7 pages.
Office Action received for Japanese Patent Application No. 2016-527367, mailed on Feb. 26, 2018, 15 pages.
Office Action received for Japanese Patent Application No. 2016-527367, mailed on Jul. 7, 2017, 16 pages.
Office Action received for Japanese Patent Application No. 2017-142812, mailed on Nov. 2, 2018, 6 pages.
Office Action received for Japanese Patent Application No. 2017-204561, mailed on Aug. 6, 2018, 7 pages.
Office Action received for Japanese Patent Application No. 2017-204561, mailed on Nov. 6, 2018, 8 pages.
Office Action received for Japanese Patent Application No. 2017-223021, mailed on Apr. 8, 2019, 7 pages.
Office Action received for Japanese Patent Application No. 2017-223021, mailed on Jul. 30, 2018, 12 pages.
Office Action received for Japanese Patent Application No. 2017-223021, mailed on Sep. 11, 2020, 20 pages.
Office Action received for Japanese Patent Application No. 2017-223021, mailed on Sep. 24, 2019, 6 pages.
Office Action received for Japanese Patent Application No. 2018-121118, mailed on Feb. 19, 2021, 17 pages.
Office Action received for Japanese Patent Application No. 2018-121118, mailed on May 14, 2019, 10 pages.
Office Action received for Japanese Patent Application No. 2018-121118, mailed on Nov. 18, 2019, 10 pages.
Office Action received for Japanese Patent Application No. 2018-201088, mailed on Oct. 11, 2019, 9 pages.
Office Action received for Japanese Patent Application No. 2019-024663, mailed on Apr. 27, 2020, 8 pages.
Office Action received for Japanese Patent Application No. 2019-024663, mailed on Feb. 19, 2021, 8 pages.
Office Action received for Japanese Patent Application No. 2019-024663, mailed on Oct. 5, 2020, 7 pages.
Office Action received for Japanese Patent Application No. 2019-144763, mailed on Jul. 2, 2021, 6 pages.
Office Action received for Japanese Patent Application No. 2019-144763, mailed on Oct. 2, 2020, 6 pages.
Office Action received for Japanese Patent Application No. 2020-046707, mailed on Mar. 5, 2021, 8 pages.
Office Action received for Japanese Patent Application No. 2020-123882, mailed on Sep. 3, 2021, 8 pages.
Office Action received for Korean Patent Application No. 10-2009-7007067, mailed on Aug. 30, 2011, 2 pages.
Office Action received for Korean Patent Application No. 10-2009-7007067, mailed on Nov. 12, 2010, 3 pages.
Office Action received for Korean Patent Application No. 10-2010-7007258, mailed on Aug. 8, 2011, 2 pages.
Office Action received for Korean Patent Application No. 10-2010-7007258, mailed on Jan. 30, 2013, 8 pages.
Office Action received for Korean Patent Application No. 10-2011-7014104, mailed on Jan. 17, 2013, 4 pages.
Office Action received for Korean Patent Application No. 10-2011-7026583, mailed on Aug. 14, 2014, 6 pages.
Office Action received for Korean Patent Application No. 10-2011-7026583, mailed on Oct. 25, 2013, 4 pages.
Office Action received for Korean Patent Application No. 10-2012-7029270, mailed on Dec. 4, 2013, 4 pages.
Office Action received for Korean Patent Application No. 10-2013-7009794, mailed on Dec. 30, 2014, 4 pages.
Office Action received for Korean Patent Application No. 10-2014-7011273, mailed on Aug. 14, 2014, 5 pages.
Office Action received for Korean Patent Application No. 10-2014-7036624, mailed on Jan. 29, 2016, 10 pages.

(56) References Cited

OTHER PUBLICATIONS

Office Action received for Korean Patent Application No. 10-2016-7014051, mailed on Apr. 30, 2018, 14 pages.
Office Action received for Korean Patent Application No. 10-2016-7014051, mailed on Jun. 20, 2017, 16 pages.
Office Action received for Korean Patent Application No. 10-2019-7005262, mailed on May 3, 2019, 5 pages.
Office Action received for Korean Patent Application No. 10-2020-7018655, mailed on Apr. 26, 2021, 9 pages.
Office Action received for Korean Patent Application No. 10-2020-7018655, mailed on Oct. 13, 2020, 5 pages.
Office Action received for Taiwan Patent Application No. 097100075, mailed on Dec. 29, 2011, 5 pages.
Office Action received from Canadian Patent Application No. 2,633,759, mailed on Apr. 18, 2013, 2 pages.
Office Action received from Chinese Patent Application No. 200680053441.1, mailed on Mar. 30, 2010, 5 pages.
Office Action received from Chinese Patent Application No. 200780041309.3, mailed on Jul. 2, 2013, 12 pages.
Office Action received from Chinese Patent Application No. 200880112570.2, mailed on Feb. 20, 2013, 7 pages.
Office Action received from Chinese Patent Application No. 200910173272.0, mailed on Nov. 30, 2011, 8 pages.
Office Action received from Chinese Patent Application No. 200980000229.2, mailed on Jul. 2, 2013, 4 pages.
Office Action received from European Patent Application No. 06846840.4, mailed on Oct. 13, 2008, 3 pages.
Office Action received from German Patent Application No. 112006003600.9, mailed on Aug. 9, 2011, 4 pages.
Office Action received from German Patent Application No. 112006003600.9, mailed on Oct. 27, 2009, 9 pages.
Office Action received from Japanese Patent Application No. 2008-548858, mailed on May 30, 2011, 3 pages.
Office Action received from Japanese Patent Application No. 2008-548858, mailed on Jan. 20, 2012, 5 pages.
Office Action received from Japanese Patent Application No. 2009-51921, mailed on Jan. 20, 2012, 5 pages.
Office Action received from Japanese Patent Application No. 2009-051921, mailed on Jun. 27, 2011, 6 pages.
Office Action received from Japanese Patent Application No. 2009-051921, mailed on Sep. 24, 2012, 3 pages.
O'Hara, "Absolute Beginner's Guide to Microsoft Window XP", Que Publishing, 2003, 1 page.
Oliver, Dick, "Adding Multimedia to Your Web Site", Chapter 22, Web Publishing Professional Reference Edition, Available online at: <http://www.ssuet.edu.pk/taimoor/books/1-57521-198-X/index.htm>, 1997, 14 pages.
Opera Software, "Download the Opera Mobile™ Browser", Available at: <http://www.opera.com/products/mobile/products/>, retrieved on Oct. 19, 2006, 5 pages.
Opera Software, "Opera 7.60 for Series 60 Mobile", Available at: <http://jp.opera.com/support/tutorials/s60/760/O760manual.pdf>, 2009, 14 pages.
Opera Software, "Opera 8.5 Beta 2 for Windows Mobile, Pocket PC", Available at: <http://www.opera.com/products/mobile/products/winmobileppc>, retrieved on Apr. 5, 2006, 2 pages.
Opera Software, "Opera 8.5 for S60 Phones—Get the Full Internet Experience on Your Mobile Phone", Available at: <http://www.symbian-freak.com/news/1105/opera.htm>, Oct. 14, 2005, 3 pages.
Opera Software, "Opera for Mobile, The Full Web Anytime, Anywhere", Available at: <www.opera.com/mobile>, Jan. 2006, 7 pages.
Opera Software, "Opera for S60 Tutorial", Available at: <http://www.xmarks.com/site/www.opera.com/support/tutorials/s60/>, retrieved on Apr. 5, 2006, 5 pages.
Opera Software, "Opera for Windows Mobile Smartphone 2003 Tutorial", Available at: <http://www.opera.com/support/tutorials/winmobile>, retrieved on Apr. 5, 2005, 4 pages.
Opera Software, "The New Opera Browser for Series 60 Features Zoom and Password Manager", Press Releases Database, Available at: <http://pressreleases.techwhack.com/1334/1411-opera-browser-features-zoom-and-password>, Nov. 14, 2005, 3 pages.
Opera Software, "Welcome to Widgetize", Copyright ® 2006 Opera Software ASA, Available at: <http://widgets.opera.com/widgetize>, 2006, 1 page.
Palme et al., "MIME Encapsulation of Aggregate Documents, such as HTML", Network Working Group, 1999, 24 pages.
Palmone, "Your Mobile Manager", Chapter 2, LifeDrive™ User's Guide, available at: <http://www.palm.com/us/support/handbooks/lifedrive/en/lifedrive_handbook.pdf>, 2005, 23 pages.
Park, Will, "Apple iPhone v1.1.1 SpringBoard Hacked to Display Multiple Pages", available at <http://www.intomobile.com/2007/10/09/apple-iphone-v111-springboard-hacked-to-display-multiple-pages/>, Oct. 9, 2007, 5 pages.
Park, Will, "Neonode N2 Unboxing Pics!", available at: <http://www.intomobile.com/2007/07/18/neonode-n2-unboxing-pics/>, Jul. 18, 2007, 7 pages.
Patent Grant received for Japanese Patent Application No. 2008-548858, mailed on Sep. 24, 2012, 3 pages.
PC Fan, "Boot Camp Introduction/Data Transition/Operability/Ability Truth Derived from Gap Mac&Win Dual Boot Hard Verification", Daily Communications, vol. 13, No. 14, Jun. 15, 2006, 4 pages.
"Playing QuickTime Movies", Available online at: <http://www.3schools.com/media/media_quicktime.asp?output=print>, 2006, 2 pages.
"Playing Videos on the Web", Available online at: <http://www.w3schools.com/media/media_browservideos.asp?out=print>, 2006, 3 pages.
pocketgear.com, "Software Keyboards: Efzy-Japanese (Eng/Jp) 4.0", TimeSpacesystem Co. Ltd, available at <http://classic.pocketgear.com/softwaredetail.asp?id=9115>, updated on Sep. 23, 2008, 9 pages.
Potter, "Graffiti Smilies", PalmInfocenter Forums, available at: <http://www.palminfocenter.com/forum/viewtopic.php?t=11307>, Feb. 9, 2003, 5 pages.
Pre-Interview First Office Action received for U.S. Appl. No. 16/270,801, mailed on Feb. 10, 2020, 5 pages.
Pre-Interview First Office Action received for U.S. Appl. No. 16/270,902, mailed on Feb. 10, 2020, 5 pages.
"Qualcomm Toq—smartwatch—User Manual", Available Online at: URL: https://toq.qualcomm.com/sites/default/files/qualcomm_toq_user_manual.pdf [retrieved on Jun. 25, 2015], Nov. 27, 2013, pp. 1-38.
Raman et al., "Application-Specific Workload Shaping in Multimedia-Enabled Personal Mobile Devices", CODES+ISSS, Oct. 22-25, 2006, pp. 4-9.
Realnetworks, "Transition Effects", RealNetworks Production Guide, Available at: <http://service.real.com/help/library/guides/productionguidepreview/HTML/htmflles/transit.htm>, 2001, 21 pages.
Record of Oral Hearing received for U.S. Appl. No. 14/142,640, mailed on Nov. 20, 2019, 15 pages.
Record of Oral Hearing received for U.S. Appl. No. 14/142,648, mailed on Mar. 2, 2020, 13 pages.
Record of Oral Hearing received for U.S. Appl. No. 14/261,112, mailed on Sep. 28, 2020, 20 pages.
Record of Oral Hearing received for U.S. Appl. No. 16/832,285, mailed on Apr. 25, 2023, 15 pages.
Ren et al., "The Adaptive Hybrid Cursor: A Pressure-Based Target Selection Technique for Pen-Based User interfaces", INTERACT '07, Proceedings of the 11th IFIP TC 13 International Conference on Human-Computer Interaction, Sep. 10, 2007, 14 pages.
Response to Notice of Opposition filed for Australian Patent Application No. 2009204252, mailed on Apr. 28, 2014, 4 pages.
Result of Consultation received for European Patent Application No. 08829660.3, mailed on Nov. 18, 2020, 5 pages.
Result of Consultation received for European Patent Application No. 17210062.0, mailed on Apr. 20, 2020, 2 pages.
Robie, Jonathan, "What is the Document Object Model?", Texcel Research, available at <http://www.w3.org/TR-DOM/introduction.html>, 2006, 5 pages.

(56) References Cited

OTHER PUBLICATIONS

Rohrer, Tim, "Metaphors We Compute by: Bringing Magic into Interface Design", Available online at: http://www.uoregon.edu/-uophil/metaphor/gui4web.htm>, retrieved on Jun. 13, 2006, 7 pages.

Roto et al., "Minimap—A Web Page Visualization Method for Mobile Phones", Proceedings of the SIGCHI Conference on Human Factors in Computing Systems, Apr. 22-27, 2006, pp. 35-44.

Sadun, "Erica's Documentation: Applications and Utilities for the iPhone and iPod Touch", Copyright 2007, Available at: <http://ericasadun.com/ftp/Deprecated/Documentation/Manual-0.04.pdf>, 2007, 22 pages.

Sadun, Erica, "1.1.1 iPhone Multipage Springboard Hack", Available at: <http://www.tuaw.com/2007/10/09/1-1-1-iphone-multipage-springboard-hack/>, on Oct. 9, 2007, 3 pages.

Sadun, Erica, "Found Footage: Scrolling iPhone Dock Smashes Through 16-icon Home Screen Limit", The Unofficial Apple Weblog, available at: <http://www.tuaw.com/2007/08/30/found-footage-scrolling-iphone-dock-smashes-through-16-icon-hom/>, Aug. 30, 2007, 3 pages.

Salmre I., "Characteristics of Mobile Applications", Chapter 2, Salmre_02.fm, Dec. 20, 2004, pp. 19-36.

Schreiner, Tony, "High DPI in IE: Tip & Mystery Solved", Tony Schreiner's Blog, available at: <http://blogs.msdn.com/tonyschr/archive/2004/05/05/126305.aspx>, May 2004, 2 pages.

Sharewareconnection, "Handy Animated Emoticons", available at: <http://www.sharewareconnection.com/handy-animated-emoticons.htm>, Jul. 2007, 3 pages.

Shima et al., "Android Application-Development", From basics of development to mashup/hardwareinteraction, a road to "takumi" of Android application-development, Section I, difference from prior platforms, things which can be done with Android, SoftwareDesign, Japan, Gijutsu-Hyohron Co. Ltd., Issue vol. 287 (No. 221), Mar. 18, 2009, pp. 58-65.

Shiota, Shinji, "Special Developer's Story", DOS / V magazine, vol. 13, No. 10, Jun. 1, 2004, 12 pages.

"SilverScreen Theme Library", Online Available at: <https://web.archive.org/web/20061113121041/http://www.pocketsensei.com/ss_themes.htm>, Nov. 13, 2006, 3 pages.

"SilverScreen User Guide", Online Available at: <https://web.archive.org/web/20061113121032/http://www.pocketsensei.com/ss_guide.htm>,, Nov. 13, 2006, 12 pages.

"Smiley Conversion Table", available at: <http://surf-style.us/manual3.htm>, Dec. 5, 2008, 8 pages.

snapfiles.com, "Dexpot", Snapfiles, Oct. 10, 2007, 3 pages.

Stampfli, Tracy, "Exploring Full-Screen Mode in Flash Player 9", Available online at: <http://www.adobe.com/devnet/flashplayer/articles/full_screen_mode.html>, Nov. 14, 2006, 2 pages.

Stanek et al., "Video and Animation Plug-Ins", Chapter 9, Web Publishing Professional Reference Edition, available online at: <http://www.ssuet.edu.pk/taimoor/books/1-57521-198-X/index.htm>, 1997, 18 pages.

Stinson, Craig, "Windows 95 Official Manual, ASCII Ltd.", ver.1, Mar. 1, 1996, 6 pages.

Summons to attend Oral Proceedings received for European Application No. 09170697.8, mailed on Apr. 22, 2013, 6 pages.

Summons to Attend oral proceedings received for European Application No. 09170697.8, mailed on Jul. 29, 2016, 9 pages.

Summons to Attend Oral Proceedings received for European Application No. 09170697.8, mailed on Oct. 19, 2017, 12 pages.

Summons to Attend Oral proceedings received for European Patent Application No. 06846840.4, mailed on May 18, 2009, 7 pages.

Summons to Attend Oral Proceedings received for European Patent Application No. 07814689.1, mailed on Dec. 1, 2011, 11 pages.

Summons to Attend Oral Proceedings received for European Patent Application No. 07814690.9, mailed on Nov. 22, 2011, 4 pages.

Summons to Attend Oral Proceedings received for European Patent Application No. 07841980.1, mailed on Sep. 28, 2012, 8 pages.

Summons to Attend Oral Proceedings received for European Patent Application No. 07869929.5, mailed on Dec. 13, 2011, 6 pages.

Summons to Attend Oral Proceedings received for European Patent Application No. 07869929.5, mailed on Jan. 23, 2012, 1 page.

Summons to Attend Oral Proceedings received for European Patent Application No. 08798713.7, mailed on Aug. 30, 2013, 15 pages.

Summons to Attend Oral Proceedings received for European Patent Application No. 08798713.7, mailed on Mar. 26, 2018, 11 pages.

Summons to Attend Oral Proceedings received for European Patent Application No. 09700333.9, mailed on Sep. 21, 2012, 4 pages.

Summons to Attend Oral Proceedings Received for European Patent Application No. 10762813.3, mailed on Nov. 9, 2016, 9 pages.

Summons to Attend Oral Proceedings received for European Patent Application No. 12189764.9, mailed on Mar. 12, 2020, 11 pages.

Summons to Attend Oral Proceedings received for European Patent Application No. 12189764.9, mailed on May 20, 2020, 11 pages.

Summons to Attend Oral Proceedings received for European Patent Application No. 13795330.3, mailed on Oct. 19, 2018, 13 pages.

Summons to Attend Oral Proceedings received for European Patent Application No. 14734674.6, mailed on Nov. 23, 2021, 7 pages.

Summons to Attend Oral Proceedings received for European Patent Application No. 17210062.0, mailed on Oct. 30, 2019, 7 pages.

Summons to Oral Proceedings received for European Patent Application No. 09170697.8, mailed on Dec. 17, 2020, 4 pages.

Summons to Oral Proceedings received for European Patent Application No. 12194312.0, mailed on Dec. 8, 2016, 9 pages.

Summons to Oral Proceedings received for European Patent Application No. 12194315.3, mailed on Dec. 8, 2016, 9 pages.

Supplemental Notice of Allowance received for U.S. Appl. No. 11/850,011, mailed on Feb. 24, 2011, 6 pages.

Surfin'safari, "XUL", Available online at: <http://weblogs.mozillazine.org/hyatt.archives/2003_10.html>, Oct. 2003, 7 pages.

Synergy Solutions, "Launch 'Em Version 3.1", Retrieved from the Internet: http://www.fladnag.net/downloads/telephone/palm/APPS/Inchem31/Documentation/LaunchEm.pdf, 2001, pp. 1-39.

Takahashi, Masaaki, "Inside Macintosh, Mystery of File V, Mystery of Drag & Drop", NikkeiMAC, Nikkei Business Publications Inc., vol. 17, Aug. 15, 1994, 9 pages.

Third Party Proceedings received for European Patent Application No. 17210062.0, mailed on Apr. 23, 2020, 6 pages.

Thomas et al., "Applying Cartoon Animation Techniques to Graphical User Interfaces", ACM Transactions on Computer-Human Interaction, vol. 8, No. 3, Sep. 2001, pp. 198-222.

Tidwell, Jenifer, "Animated Transition", Designing Interfaces, Patterns for effective Interaction Design, First Edition, Nov. 2005, 4 pages.

Tidwell, Jenifer, "Designing Interfaces, Animated Transition", Archieved by Internet Wayback Machine, Available at: <https://web.archive.org/web/20060205040223/http://designinginterfaces.com:80/Animated_ Transition>, Retrieved on Mar. 20, 2018, 2005, 2 pages.

Tooeasytoforget, "iPhone—Demo of SummerBoard & Its Features", 5:05 minutes video, available at <http://www.youtube.com/watch?v=CJOb3ftQLac>, uploaded on Sep. 24, 2007, 2 pages.

tuaw.com, "1.1.1 iPhone Multi page Springboard Hack", Available at: <http://www.tuaw.com/2007110/09/1-1-1-iohone-multioaoe-sorinQ"board-hack/>, Oct. 9, 2007, 5 pages.

tuaw.com, "Springboard Scrolling", mid-scroll, Available at: <http://www.tuaw.com/photos/springboard-scrolling/431348/>, Oct. 9, 2007, 3 pages.

tuaw.com, "Springboard Scrolling", mostly unpopulated page, Available at: <http://www.tuaw.com/photos/springboard-scrolling/431349/>, Oct. 9, 2007, 3 pages.

tuaw.com, "Springboard Scrolling", new page dot feature, Available at: <http://www.tuaw.com/gallerv/soringboard-scrolling/431347/>, Oct. 9, 2007, 3 pages.

tuaw.com, "Tuaw Hack: Mess with Your iPhone Settings", Available at: http://www/tuaw.com/tag/SpringBoard/, Dec. 18, 2007, 1 page.

Turetta, Jonathan, "Steve Jobs iPhone 2007 Presentation (HD)", Retrieved from the Internet: URL:https://www.youtube.com/watch?v=vN4U5FqrOdQ&feature=youtu.be, May 13, 2013, 2 pages.

Versiontracker, "Photogather-7.2.6. Hi-res Image Viewer & Editor for Palm", Available online at: <http://www.versiontracker.com/dyn/moreinfo/palm/4624>, retrieved on Jun. 12, 2006, 2006, 5 pages.

(56) References Cited

OTHER PUBLICATIONS

Vrba J., "iPhone Customizations and Applications", Ezine Articles, Available at: <http://ezinearticles.com/?iPhone-Customizations-and-Applications&id=815807&opt=print>, Nov. 2007, 2 pages.
Warabino et al., "Video Transcoding Proxy for 3Gwireless Mobile Internet Access", IEEE Communications Magazine, vol. 38, No. 10, Oct. 2000, pp. 66-71.
Wave Technologies International Inc., "Certified Internet Webmaster Foundations Study Guide", A Thomson Learning Company, CIWF-SGMN-0101A, copyright 1988-2000, 88 pages.
Weblogs, "An Overview of WebCore", Chapter 2, WebCore Documentation, available at <http:/lweblogs.mozillazine.org/hyatt/WebCore/chapter2.html>, 2006, 3 pages.
Weblogs, "Downloading and Building WebCore", Chapter 1, WebCore Documentation, available at <http://weblogs.mozillazine.org/hyatt/WebCore/chapter1.html>, 2006, 2 pages.
webmasterworld.com, "Page Zooming with IE-Hidden Feature!", Available at <http://www.webmasterworld.com/forum83/4179.htm>, Jul. 2004, 7 pages.
Widgipedia, "I Need a Blog and a Forum Please?", available at: <http://www.widgipedia.com/widgets/details/adni18/hyalo-weather_27.html>, retrieved on Oct. 19, 2006, 2 pages.
Wikipedia, "Comparison of Layout Engines", The free encyclopedia, available at: <http://en.wikipedia.org/wiki/Comparison_of_layout_engines>, 2006, 3 pages.
Wikipedia, "History of YouTube", The Free Encyclopedia, available at: <http://en.wikipedia.org/wiki/History_of_YouTube>, retrieved on Mar. 15, 2011, 4 pages.
Wikipedia, "KDE", The free encyclopedia, available at: <http://en.wikipedia.org/wiki/KDE>, 2006, 9 pages.
Wikipedia, "KHTML", The free encyclopedia, available at: <http://en.wikipedia.org/wiki/KHTML>, 2006, 3 pages.
Wikipedia, "List of Layout Engines", The Free Encyclopedia, available at: <http://en.wikipedia.org/wiki/List_of_layout_engines>, 2006, 1 page.
Wildarya, "iDesksoft Desktop Icon Toy v2.9", Available at: <http://www.dl4all.com/2007/10/16/idesksoft_desktoo_icon_toy_v2.9.html>, Oct. 16, 2007, 4 pages.
Williams, Martyn, "LG's Cell Phone Can Pause Live TV", PC World, Oct. 11, 2005, 2 pages.
Windows XP, "Enable or disable AutoArrange desktop icons in Windows XP", Windows Tutorials, http://www.freemailtutorials.com/microsoftWindows/autoArrangeIconsOnTheDesktop.php, Nov. 19, 2009, 3 pages.
Wobbrock et al., "WebThumb: Interaction Techniques for Small-Screen Browsers", UIST'02, Paris France, Oct. 27-30, 2002, pp. 205-208.
Wright, Ben, "Palm OS PDA Application Mini-Reviews", Online Available at: <http://library.indstate.edu/newsletter/feb04/palmmini.htm>, Feb. 3, 2015, 11 pages.
Xiao et al., "Slicing*-Tree Based Web Page Transformation for Small Displays", International Conference on Information and Knowledge Management, Oct. 31-Nov. 5, 2005, 2 pages.
Xie et al., "Efficient Browsing of Web Search Results on Mobile Devices Based on Block Importance Model", Microsoft Research Asia, 2005, 10 pages.
Yin et al., "Using Link Analysis to Improve Layout on Mobile Devices", Proceedings of the 13th international conference on World Wide Web, available at: <http://www.iw3c2.org/WWW2004/docs/1p338.pdf>, May 17-22, 2004, pp. 338-344.
Youtube, "Broadcast Yourself", Available at <www.youtube.com>, Nov. 1, 2005, 2 pages.
Youtube, "Broadcasting Ourselves", The Official Youtube blog Available at: <http://youtube-global.blogspot.in/2005_11_01_archive.html>, Nov. 15, 2005, 5 pages.
Zhang et al., "An Ergonomics Study of Menu-Operation on Mobile Phone Interface", In Proceedings of the workshop on Intelligent Information Technology Application, 2007, pp. 247-251.
Zytronic, "Touchscreen User Manual Zytronic X-Y Controller (Serial and USB)", XP007916436, Nov. 17, 2006, pp. 1-51.
Office Action received for Chinese Patent Application No. 202310508332.X, mailed on Dec. 7, 2024, 14 pages (7 pages of English Translation and 7 pages of Official Copy).
Intention to Grant received for European Patent Application No. 17810739.7, mailed on Oct. 29, 2025, 9 pages.

* cited by examiner

Figure 5F
Portable Multifunction Device
100
206
208
208
3900F
Speaker 111
Optical Sensor 164
Proximity Sensor 166
402
Current Time 404
406
3902
Welcome 3904
3906
http://www.company.com/start 3908
3910
Block 4 3914-4
Block 5
3914-5
3972
Create Web-Clip Widget 3973
Add Bookmark 3974
E-mail Link To This Page 3975
Cancel 3976
Microphone 113
Home 204

750

790

7000

900

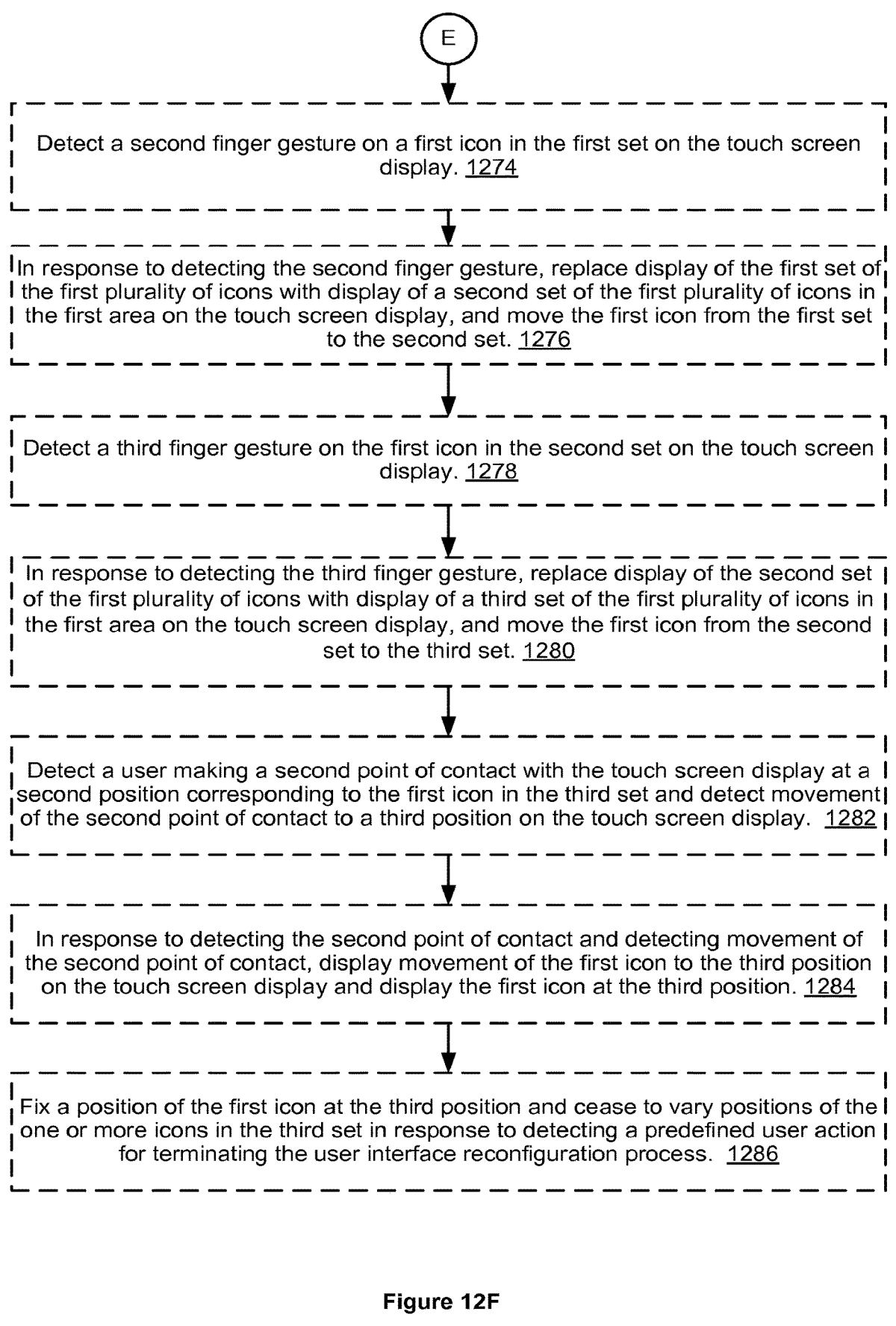

E

Detect a second finger gesture on a first icon in the first set on the touch screen display. 1274

In response to detecting the second finger gesture, replace display of the first set of the first plurality of icons with display of a second set of the first plurality of icons in the first area on the touch screen display, and move the first icon from the first set to the second set. 1276

Detect a third finger gesture on the first icon in the second set on the touch screen display. 1278

In response to detecting the third finger gesture, replace display of the second set of the first plurality of icons with display of a third set of the first plurality of icons in the first area on the touch screen display, and move the first icon from the second set to the third set. 1280

Detect a user making a second point of contact with the touch screen display at a second position corresponding to the first icon in the third set and detect movement of the second point of contact to a third position on the touch screen display. 1282

In response to detecting the second point of contact and detecting movement of the second point of contact, display movement of the first icon to the third position on the touch screen display and display the first icon at the third position. 1284

Fix a position of the first icon at the third position and cease to vary positions of the one or more icons in the third set in response to detecting a predefined user action for terminating the user interface reconfiguration process. 1286

Figure 12F

PORTABLE MULTIFUNCTION DEVICE WITH INTERFACE RECONFIGURATION MODE

RELATED APPLICATIONS

This application is a continuation of U.S. patent application Ser. No. 16/832,285, "REPLACING DISPLAY OF ICONS IN RESPONSE TO A GESTURE," filed Mar. 27, 2020, which is a continuation of U.S. patent application Ser. No. 15/426,836, now U.S. Pat. No. 10,628,028, "REPLACING DISPLAY OF ICONS IN RESPONSE TO A GESTURE," filed Feb. 7, 2017, which is a continuation of U.S. patent application Ser. No. 12/242,851, now U.S. U.S. Pat. No. 9,619,143, "DEVICE, METHOD, AND GRAPHICAL USER INTERFACE FOR PERFORMING A GESTURE IN AN AREA TO REPLACE A DISPLAY OF APPLICATION LAUNCH ICONS IN THE AREA WITH A DISPLAY OF INFORMATION CUSTOMIZED TO A USER WHILE MAINTAINING A DISPLAY OF APPLICATION LAUNCH ICONS IN A DIFFERENT AREA," filed Sep. 30, 2008, which claims priority to U.S. Provisional Patent Application No. 61/010,208, "Portable Multifunction Device with Interface Reconfiguration Mode," filed Jan. 6, 2008, which are incorporated by reference herein in their entireties.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. patent application Ser. No. 11/367,749, "Multi-Functional Hand-Held Device," filed Mar. 3, 2006; (10) U.S. patent application Ser. No. 11/850, 011, "Web Clip Widgets on a Portable Multifunction Device," filed Sep. 4, 2007; (11) U.S. patent application Ser. No. 11/969,912, "Web-Clip Widgets on a Portable Multifunction Device," filed Jan. 6, 2008; (12) U.S. patent application Ser. No. 11/459,602, "Portable Electronic Device with Interface Reconfiguration Mode," filed Jul. 24, 2006; and (13) U.S. patent application Ser. No. 11/850,635, "Touch Screen Device, Method, and Graphical User Interface for Determining Commands by Applying Heuristics," filed Sep. 5, 2007. All of these applications are incorporated by reference herein in their entirety.

TECHNICAL FIELD

The disclosed embodiments relate generally to portable electronic devices, and more particularly, to user interfaces on portable multifunction devices with touch-sensitive displays that include an interface reconfiguration mode and to creating widgets for displaying specified areas of web pages (i.e., creating web-clip widgets) on portable multifunction devices.

BACKGROUND

As portable electronic devices become more compact, and the number of functions performed by a given device increases, it has become a significant challenge to design a user interface that allows users to easily interact with a multifunction device. This challenge is particularly significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of pushbuttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Some conventional user interfaces can be configured by users, thereby allowing at least partial customization. Unfortunately, the process of modifying such conventional user interfaces is often as cumbersome and complicated as the use of the conventional user interface itself. In particular, the required behaviors during configuration of such conventional user interfaces are often counterintuitive and the corresponding indicators guiding user actions are often difficult to understand. These challenges are often a source of additional frustration for users.

Accordingly, there is a need for more transparent and intuitive user interfaces for portable devices that enable a user to easily configure the user interface.

In addition, as a result of the small size of display screens on portable electronic devices, frequently only a portion of a web page of interest to a user can be displayed on the screen at a given time. Furthermore, the scale of display may be too small for comfortable or practical viewing. Users thus will frequently need to scroll and to scale a web page to view a portion of interest each time that they access the web page. However, the limitations of conventional user interfaces can cause this scrolling and scaling to be awkward to perform.

Accordingly, there is a need for portable multifunction devices with more transparent and intuitive user interfaces for creating widgets for displaying specified areas of web pages (i.e., for creating web-clip widgets) that are easy to use, configure, and/or adapt. In addition, once the web-clip widgets are created, there is a need for transparent and intuitive methods for configuring user interfaces that include icons for activating web-clip widgets.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer readable storage medium or other computer program product configured for execution by one or more processors.

In one aspect of the invention, a computer-implemented method at a computing device with a touch screen display includes: displaying a first set of a first plurality of icons in a first area of the touch screen display, wherein the first plurality of icons includes a plurality of sets of icons that are separately displayed in the first area of the touch screen display; displaying a second plurality of icons in a second area on the touch screen display, wherein the second area is different from the first area; detecting a first finger gesture on the touch screen display in the first area; and in response to detecting the first finger gesture on the touch screen display in the first area, replacing display of the first set of the first plurality of icons with display of a second set of the first plurality of icons in the first area on the touch screen display while maintaining the display of the second plurality of icons in the second area on the touch screen display.

In another aspect of the invention, a computer-implemented method at a computing device with a touch screen display includes: displaying a first set of a first plurality of icons in a first area of the touch screen display, wherein the first plurality of icons includes a plurality of sets of icons that are separately displayed in the first area of the touch screen display; displaying a second plurality of icons in a second area on the touch screen display, wherein the second area is different from the first area; detecting a first finger gesture on the touch screen display; in response to detecting the first finger gesture, initiating a user interface reconfiguration process, and varying positions of one or more icons in the first set of the first plurality of icons about respective average positions.

Thus, interface reconfiguration in accordance with the disclosed embodiments allows a user to reposition displayed icons (e.g., icons for activating applications and/or web-clip widgets) in a simple, intuitive manner with finger gestures.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 12A-12F flow diagrams of icon reconfiguration processes in accordance with some embodiments.

DESCRIPTION OF EMBODIMENTS

Figure 1A:
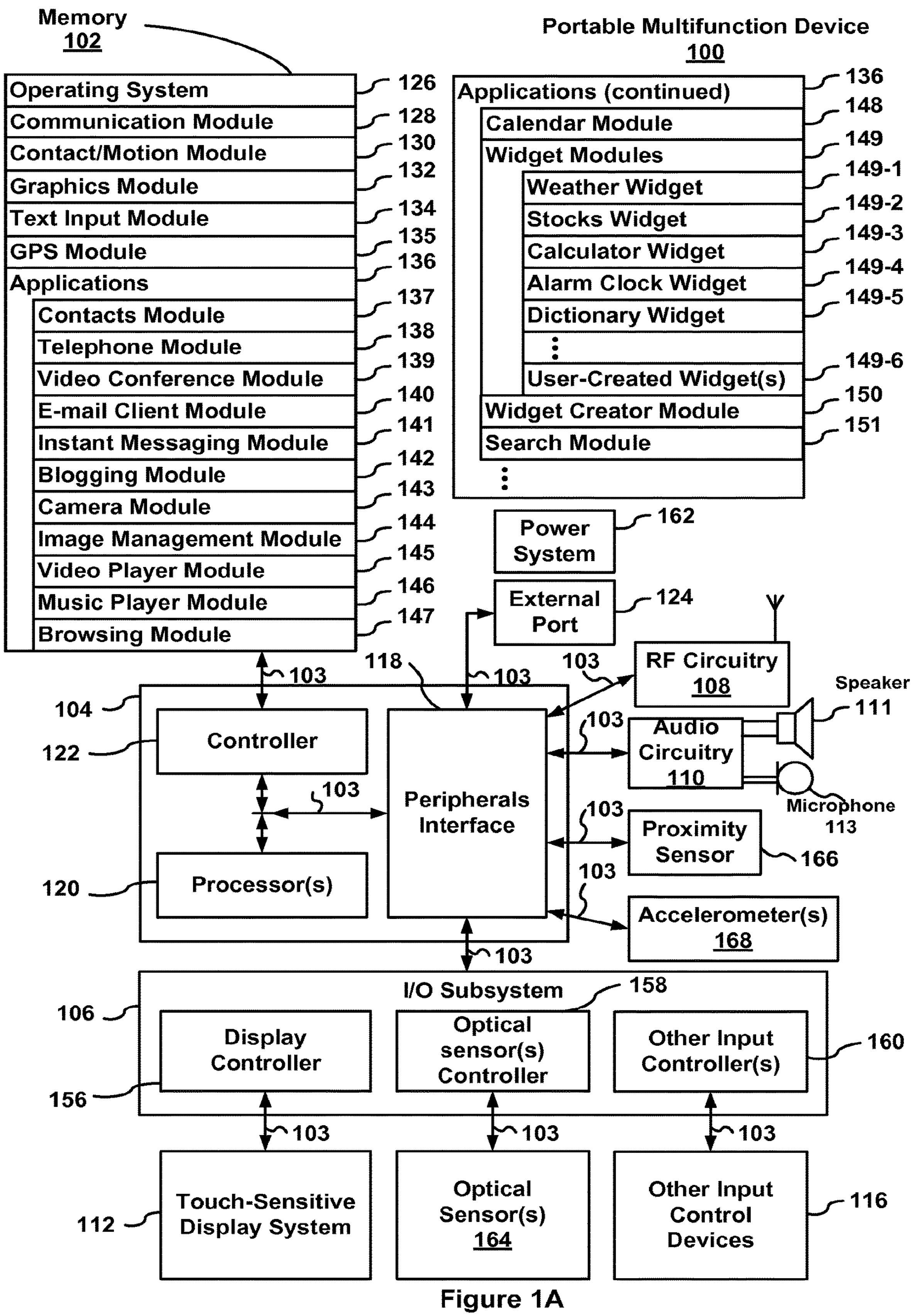
FIGS. 1A and 1B are block diagrams illustrating a portable multifunction device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

The device supports a variety of applications, such as one or more of the following: a telephone application, a video conferencing application, an e-mail application, an instant messaging application, a blogging application, a photo management application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
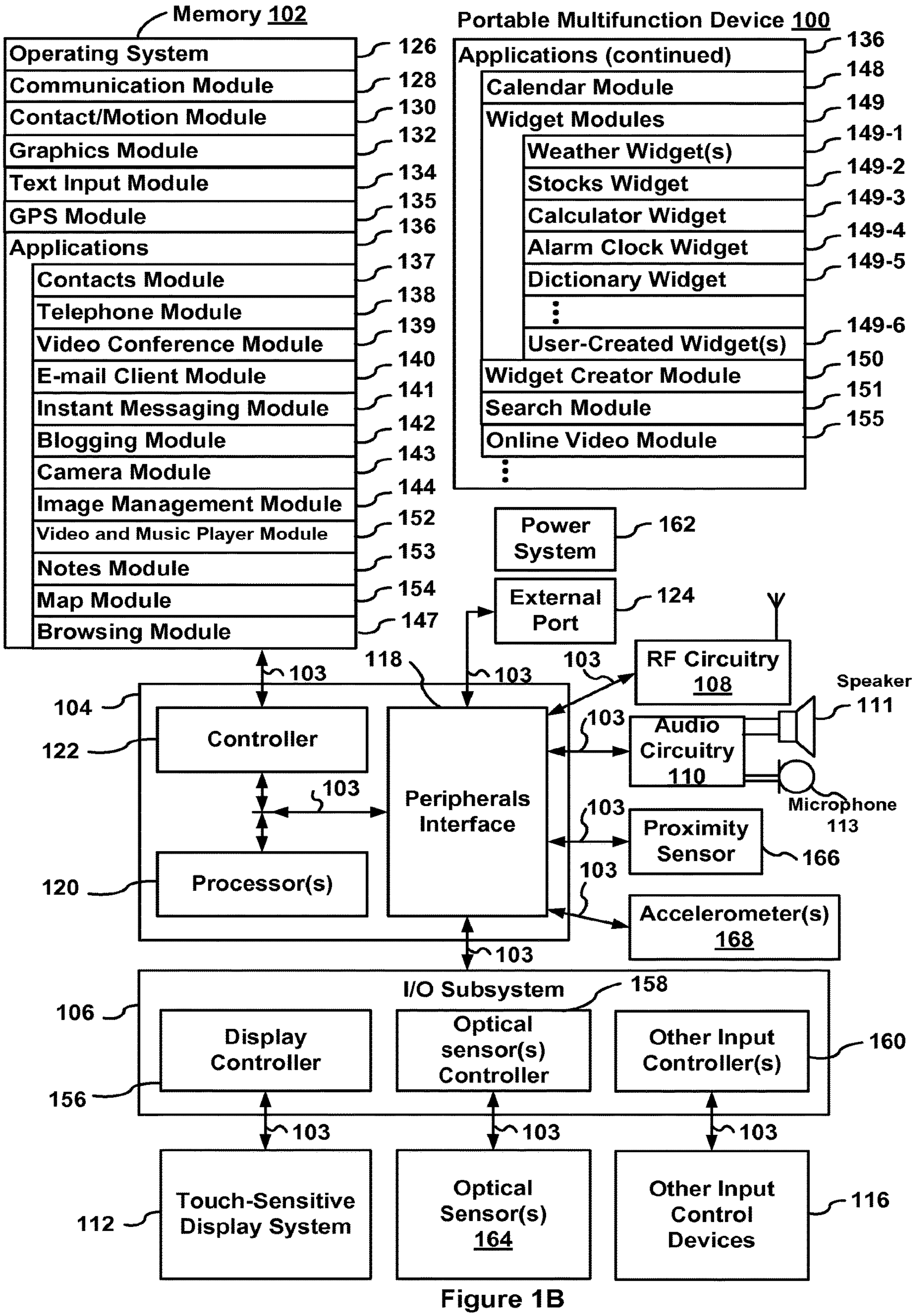

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 80211b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPG (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 200210015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," tiled Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference in their entirety herein.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," Sep. 30, 2005; Ser. No. 11/240,788, "Proximity Detector In Handheld Device," Sep. 30, 2005; Ser. No. 11/620,702, "Using Ambient Light Sensor To Augment Proximity Sensor Output"; Ser. No. 11/586,862, "Automated Response To And Sensing Of User Activity In Portable Devices." filed Oct. 24, 2006; and Ser. No. 11/638,251, "Methods And Systems For Automatic Configuration Of Peripherals," which are hereby incorporated by reference herein in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the 1/0 subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated herein by reference in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. An animation in this context is a display of a sequence of images that gives the appearance of movement, and informs the user of an action that has been performed (such as expanding a user-selected web-page portion to fill a browser window). In this context, a respective animation that executes an action, or confirms an action by the user of the device, typically takes a predefined, finite amount of time, typically between 0.2 and 1.0 seconds, and generally less than two seconds.

The text input module 134, which may be a component of graphics module 132, provides soft keyboards for entering text in various applications (e.g., contacts module 137, e-mail client module 140, instant messaging (IM) module 141, blogging module 142, browser module 147, and any other application that needs text input).

The GPS module 135 determines the location of the device and provides this information for use in various applications (e.g., to telephone module 138 for use in location-based dialing, to camera module 143 and/or blogging module 142 as picture/video metadata, and to applications that provide location-based services such as weather widgets, local yellow page widgets, and map/navigation widgets).

The applications 136 may include the following modules (or sets of instructions), or a subset or superset thereof:

- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conferencing module 139, e-mail client module 140, or IM module 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages. Embodiments of user interfaces and associated processes using browser module 147 are described further below.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets). Embodiments of user interfaces and associated processes using widget modules 149 are described further below.

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a web-clip widget). In some embodiments, a web-clip widget comprises a file containing an XML property list that includes a URL for the web page and data indicating the user-specified portion of the web page. In some embodiments, the data indicating the user-specified portion of the web page includes a reference point and a scale factor. In some embodiments, the data indicating the user-specified portion of the web page includes a set of coordinates within the web page or an identification of a structural element within the web page. Alternatively, in some embodiments a web-clip widget includes an HTML (Hypertext Markup Language) file, a CSS (Cascading Style Sheets) file, and a JavaScript file. Alternatively, in some embodiments a web-clip widget includes an XML (Extensible Markup Language) file and a JavaScript file.

In some embodiments a web-clip widget includes an image file (e.g., a png file) of an icon corresponding to the widget. In some embodiments, a web-clip widget corresponds to a folder containing the image file and a file that includes the URL for the web page and data indicating the user-specified portion of the web page. In some embodiments, a web-clip widget corresponds to a folder containing the image file and an executable script.

Embodiments of user interfaces and associated processes using widget creator module 150 are described further below.

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, the content of which is hereby incorporated by reference in its entirety.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
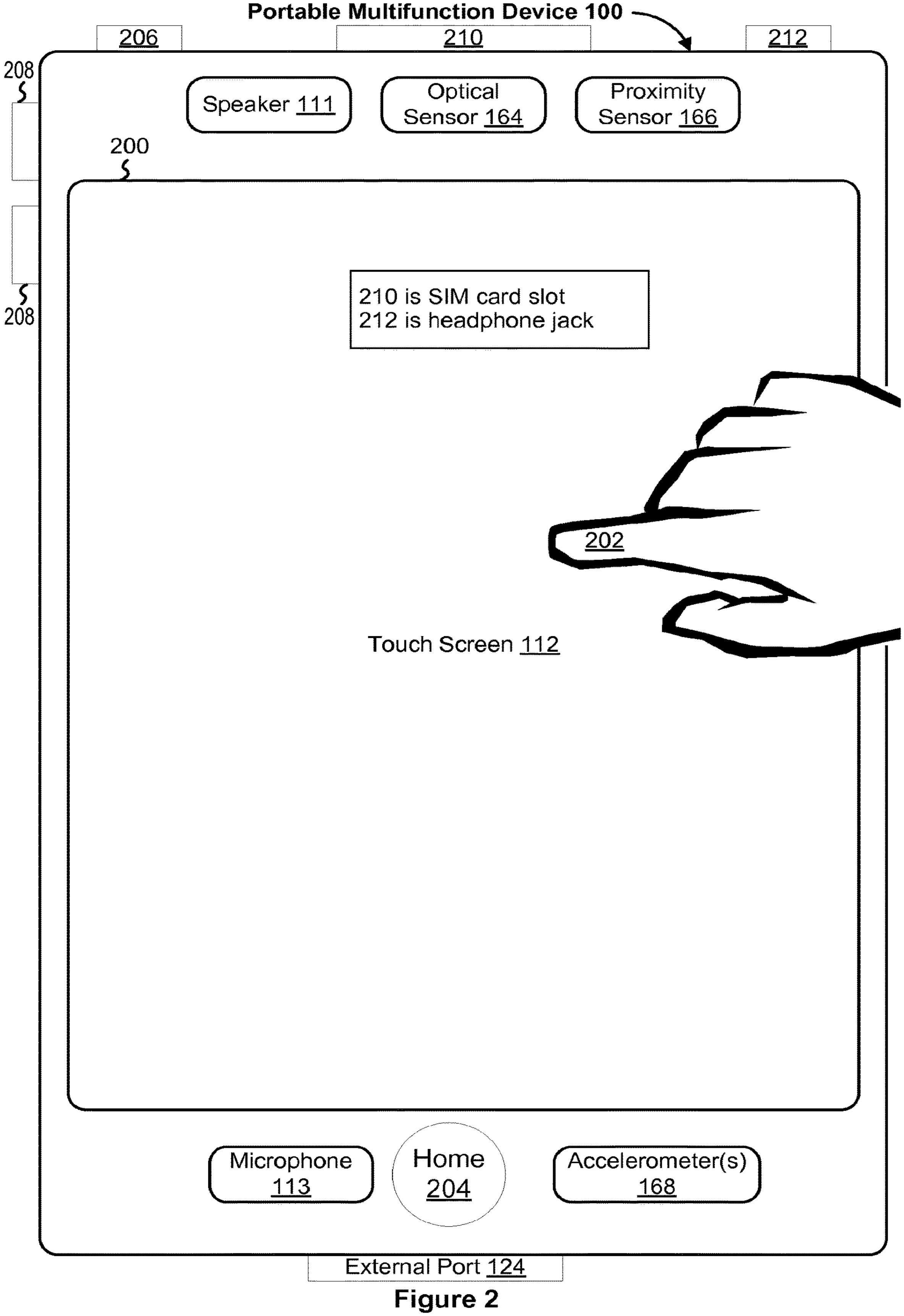
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from tight to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("Ur) and associated processes that may be implemented on a portable multifunction device 100.

Figure 3:
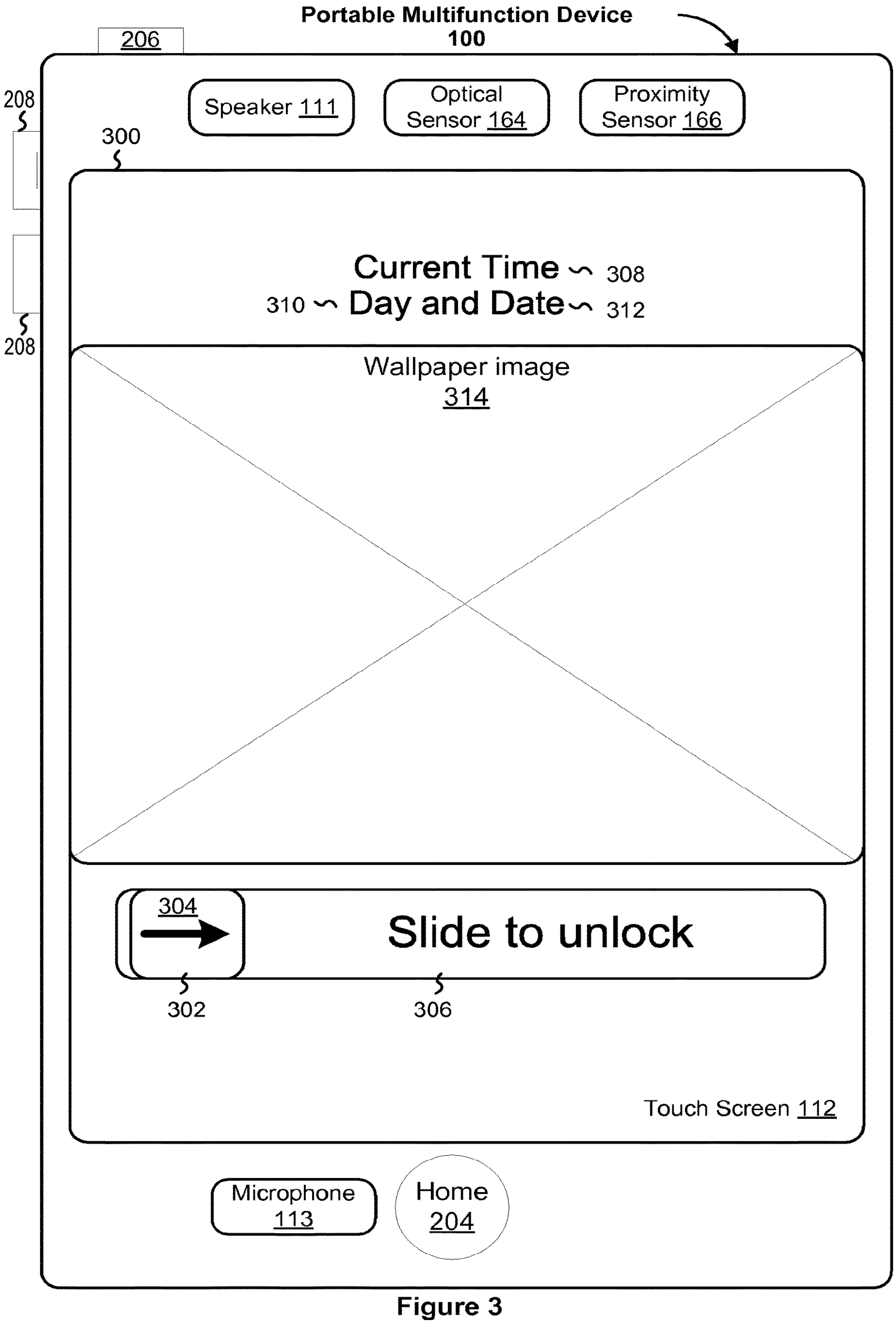
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

- Unlock image 302 that is moved with a finger gesture to unlock the device;
- Arrow 304 that provides a visual cue to the unlock gesture;
- Channel 306 that provides additional cues to the unlock gesture;
- Time 308;
- Day 310;
- Date 312; and
- Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. This process saves battery power by ensuring that the device is not accidentally awakened. This process is easy for users to perform, in part because of the visual cue(s) provided on the touch screen.

As noted above, processes that use gestures on the touch screen to unlock the device are described in U.S. patent application Ser. No. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference in their entirety.

Figure 4A:
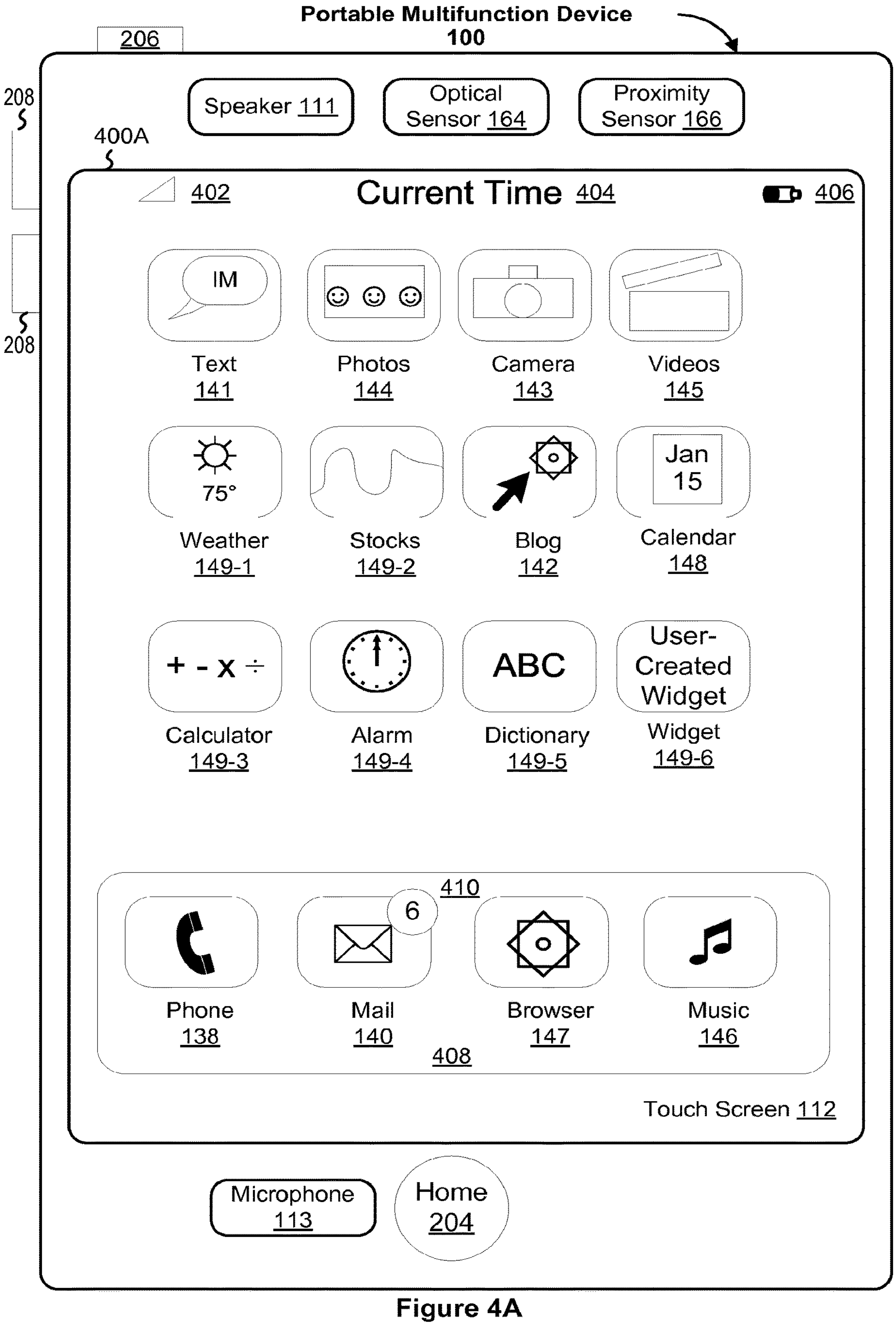
FIGS. 4A-4B illustrate exemplary user interfaces having menus of applications and/or widgets on a portable multifunction device in accordance with some embodiments.

FIG. 4A illustrates an exemplary user interface for a menu of applications on a portable multifunction device in accordance with some embodiments. In some embodiments, user interface 400A includes the following elements, or a subset or superset thereof:

- Signal strength indicator 402 for wireless communication;
- Time 404;
- Battery status indicator 406;
- Tray 408 with icons for frequently used applications, such as:
  - Phone 138;
  - E-mail client 140, which may include an indicator 410 of the number of unread e-mails;
  - Browser 147; and
  - Music player 146; and
- Icons for other applications, such as:
  - IM 141;
  - Image management 144;
  - Camera 143;
  - Video player 145;
  - Weather 149-1;
  - Stocks 149-2;
  - Blog 142;
  - Calendar 148;
  - Calculator 149-3;
  - Alarm clock 149-4;
  - Dictionary 149-5;
  - User-created widget 149-6; and
  - Other applications (not shown) (e.g., map 154 and online video 155).

In some embodiments, UI 400A displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A provides integrated access to both widget-based applications and non-widget-based applications. In some embodiments, all of the widgets, whether user-created or not, are displayed in UI 400A. In other embodiments, activating the icon for user-created widget 149-6 may lead to another UI that displays the user-created widgets or icons corresponding to the user-created widgets. For example, UI 400B (FIG. 4B) displays a menu of six icons corresponding to six user-created widgets 149-6-1 through 149-6-6 in accordance with some embodiments. A user may activate a particular widget by gesturing on the corresponding icon. Alternatively, user-created widgets may be displayed in a list. UI 400C (FIG. 4C) illustrates a list of names of six user-created widgets 149-6-1 through 149-6-6 along with corresponding icons in accordance with some embodiments. A user may activate a particular widget by gesturing on the corresponding name or icon.

In some embodiments, a user may rearrange the icons in UI 400A, UI 400B, or UI 400C, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400A includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

Making and Using Web-Clip Widgets

FIGS. 5A-51 illustrate an exemplary user interface for a browser in accordance with some embodiments.

Figure 5A:
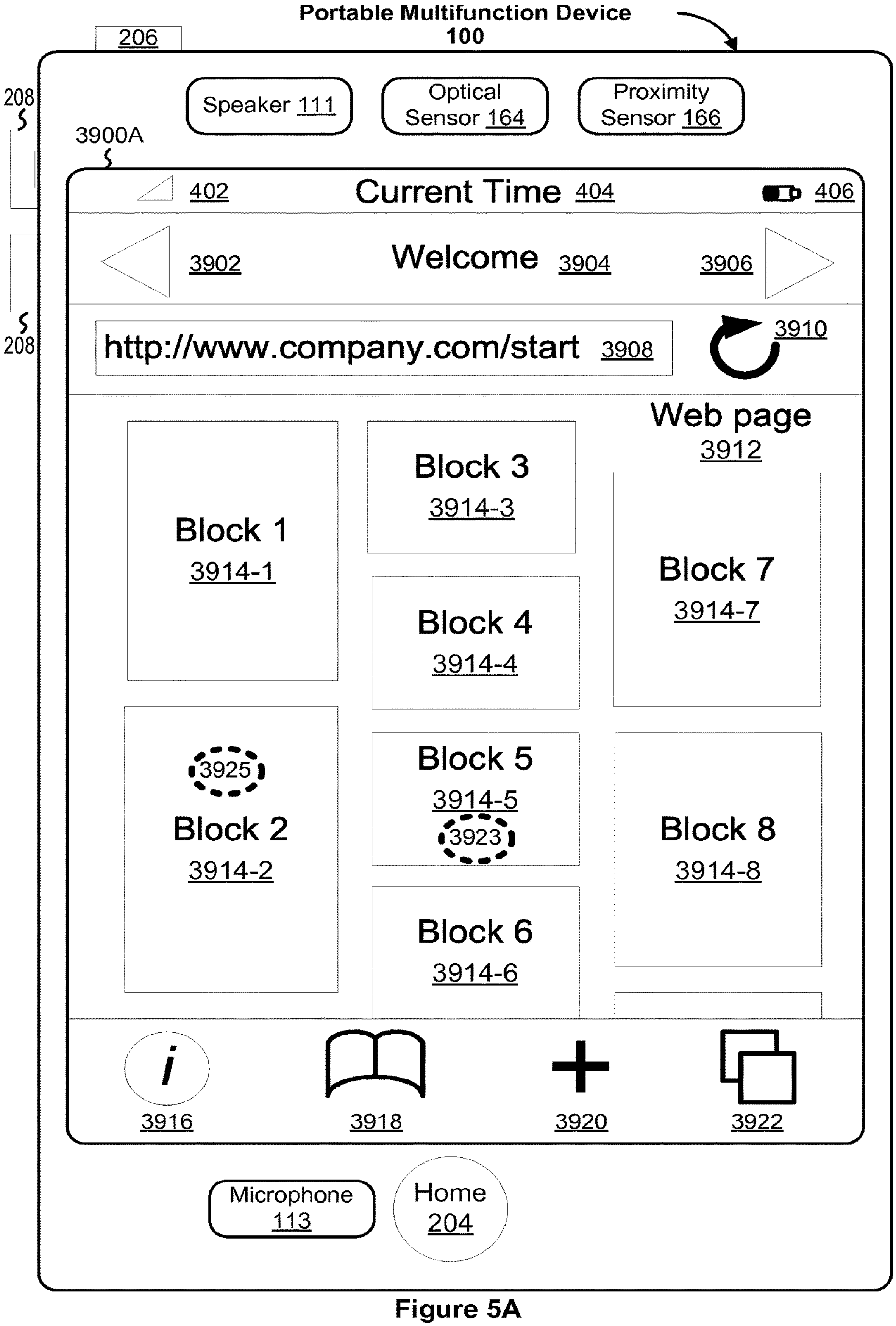
FIGS. 5A-5K illustrate an exemplary user interface for a browser in accordance with some embodiments.
Figure 5B:
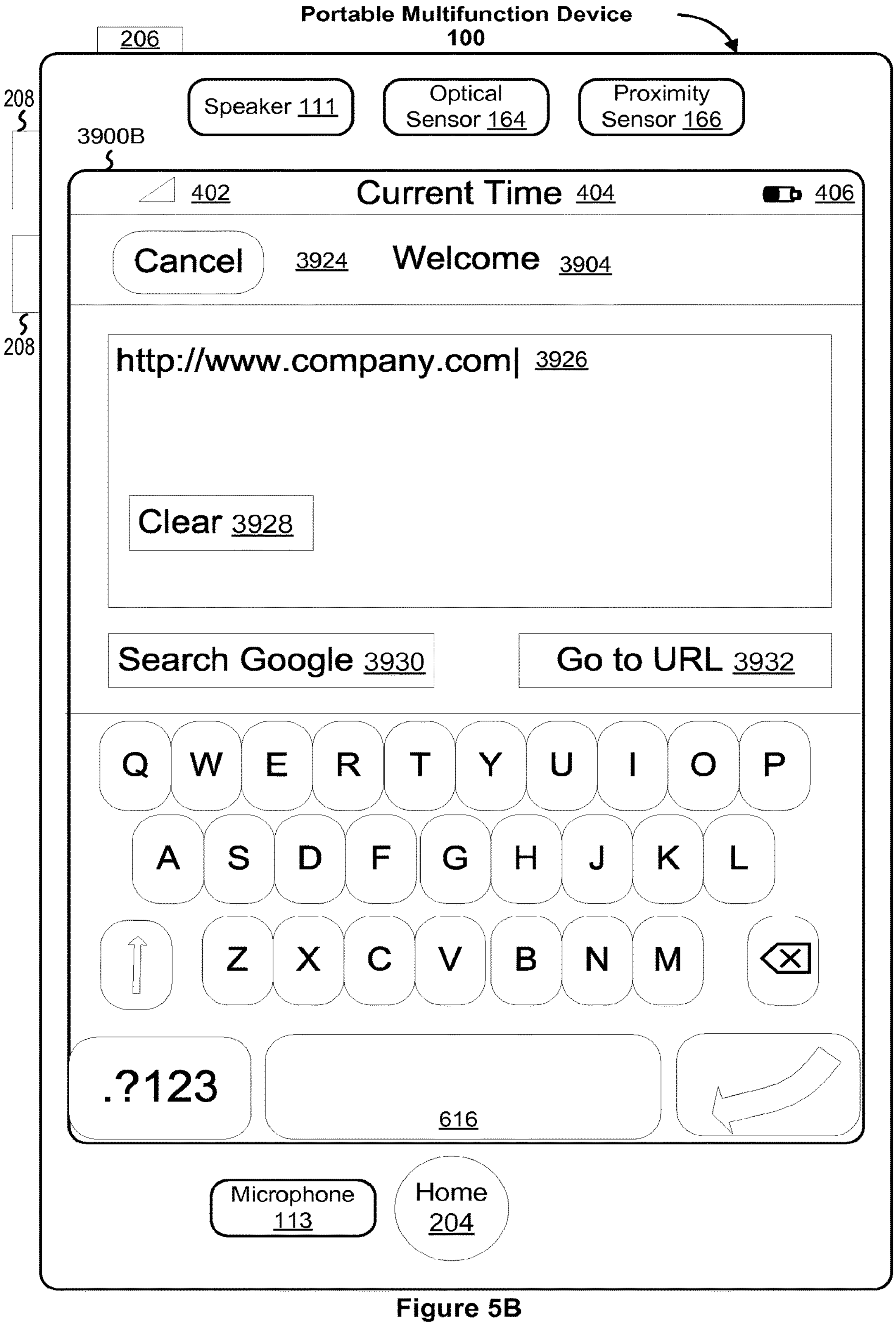
Figure 5C:
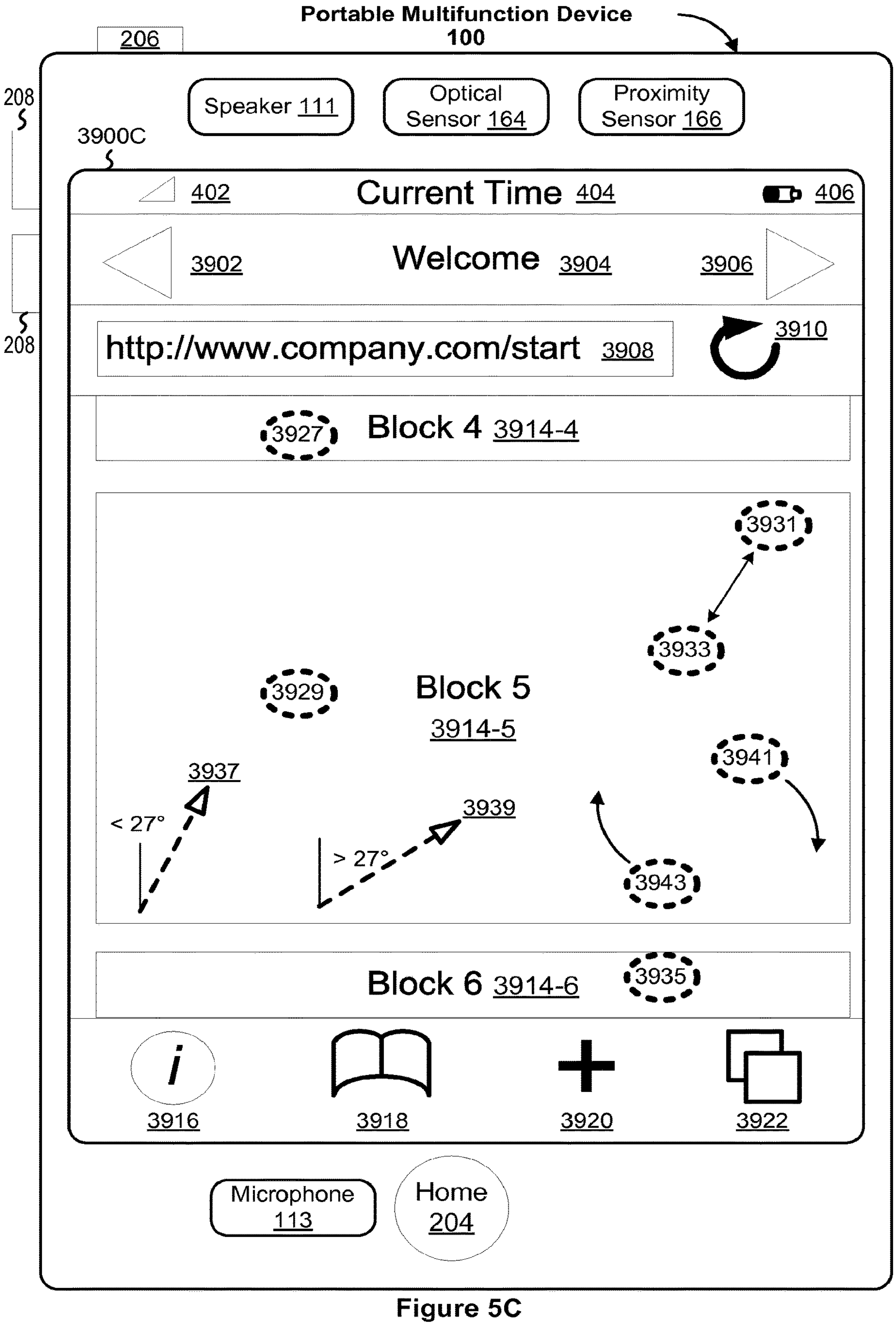
Figure 5D:
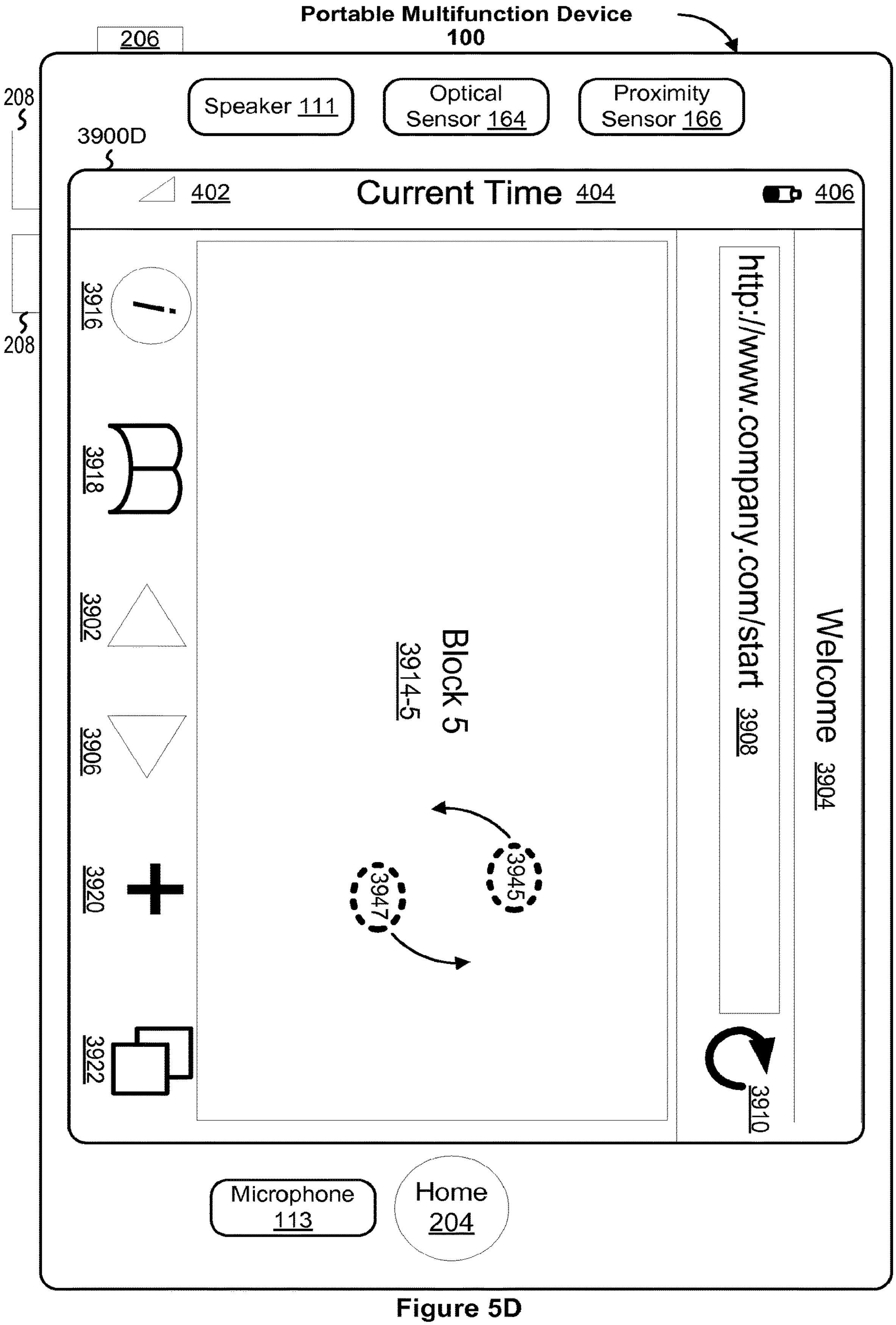
Figure 5E:
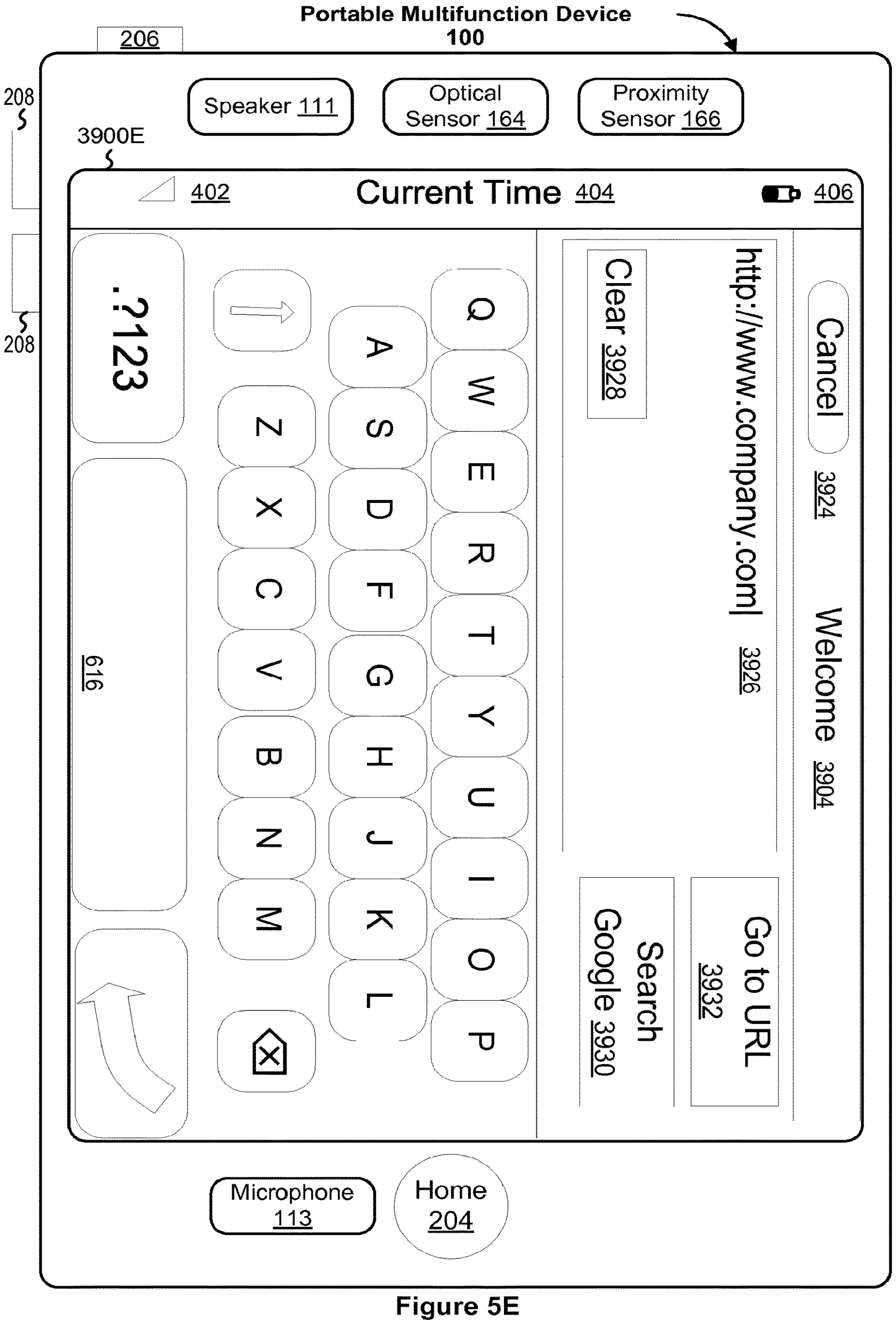
Figure 5F:
Figure 5G:
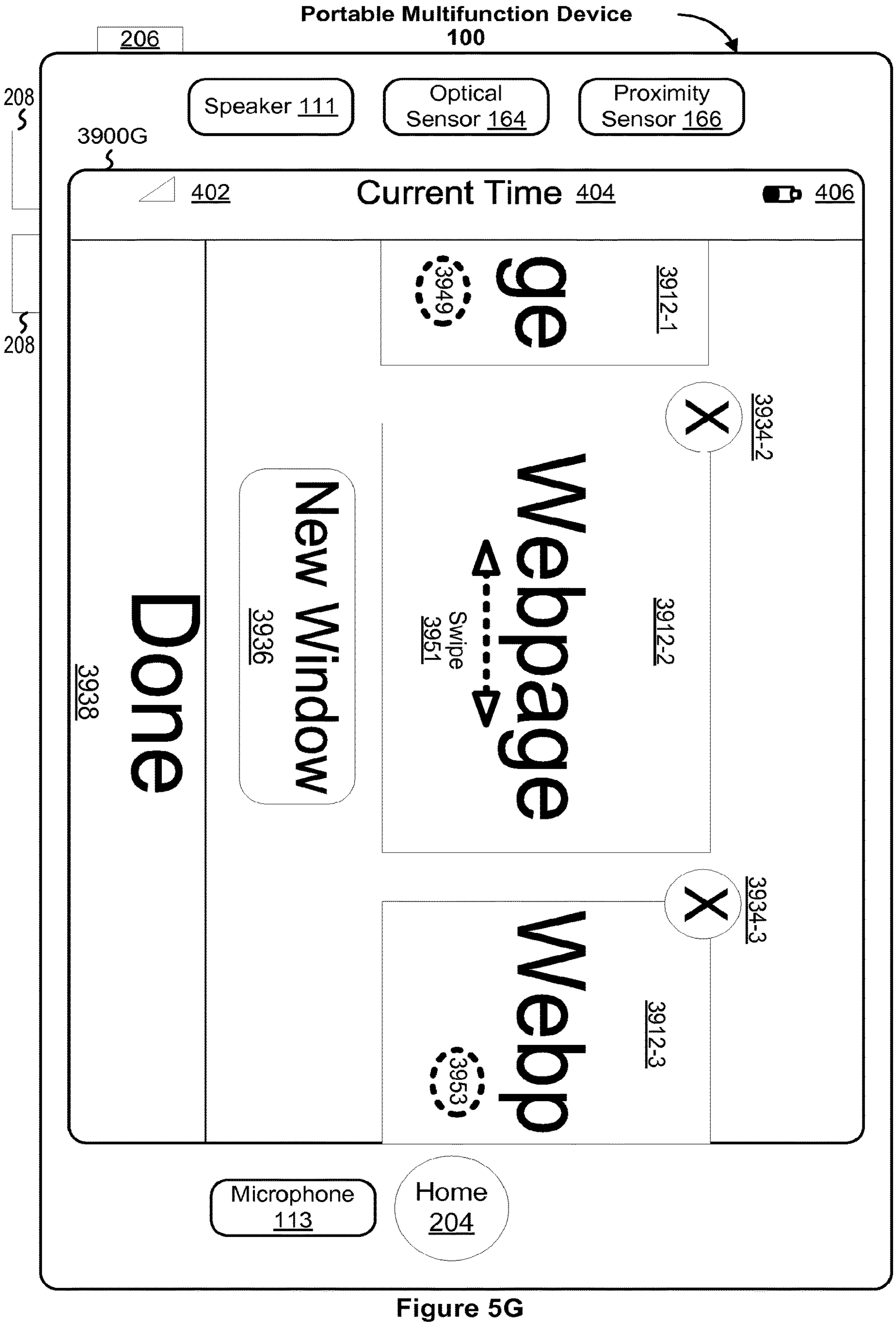
Figure 5H:
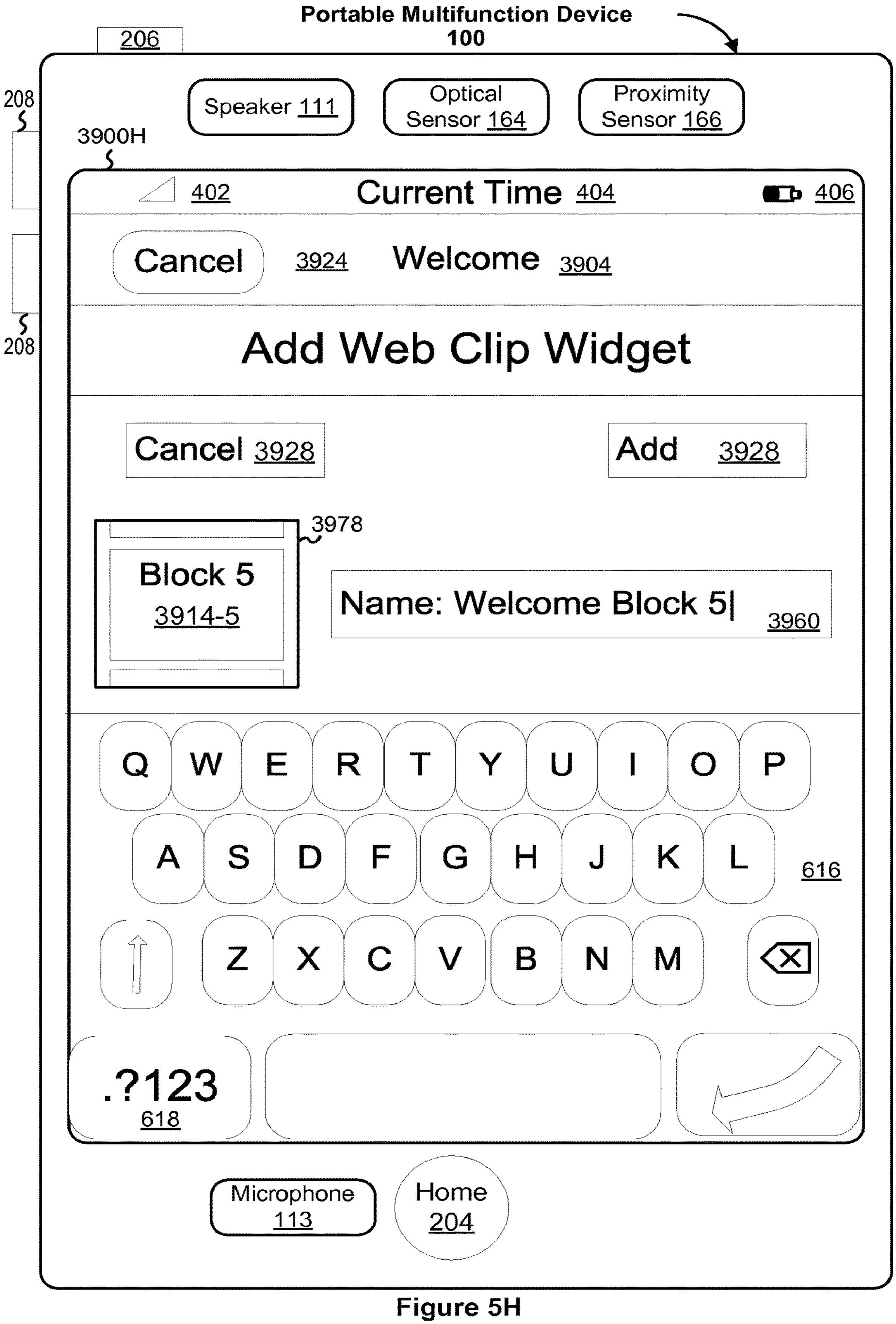
Figure 5I:
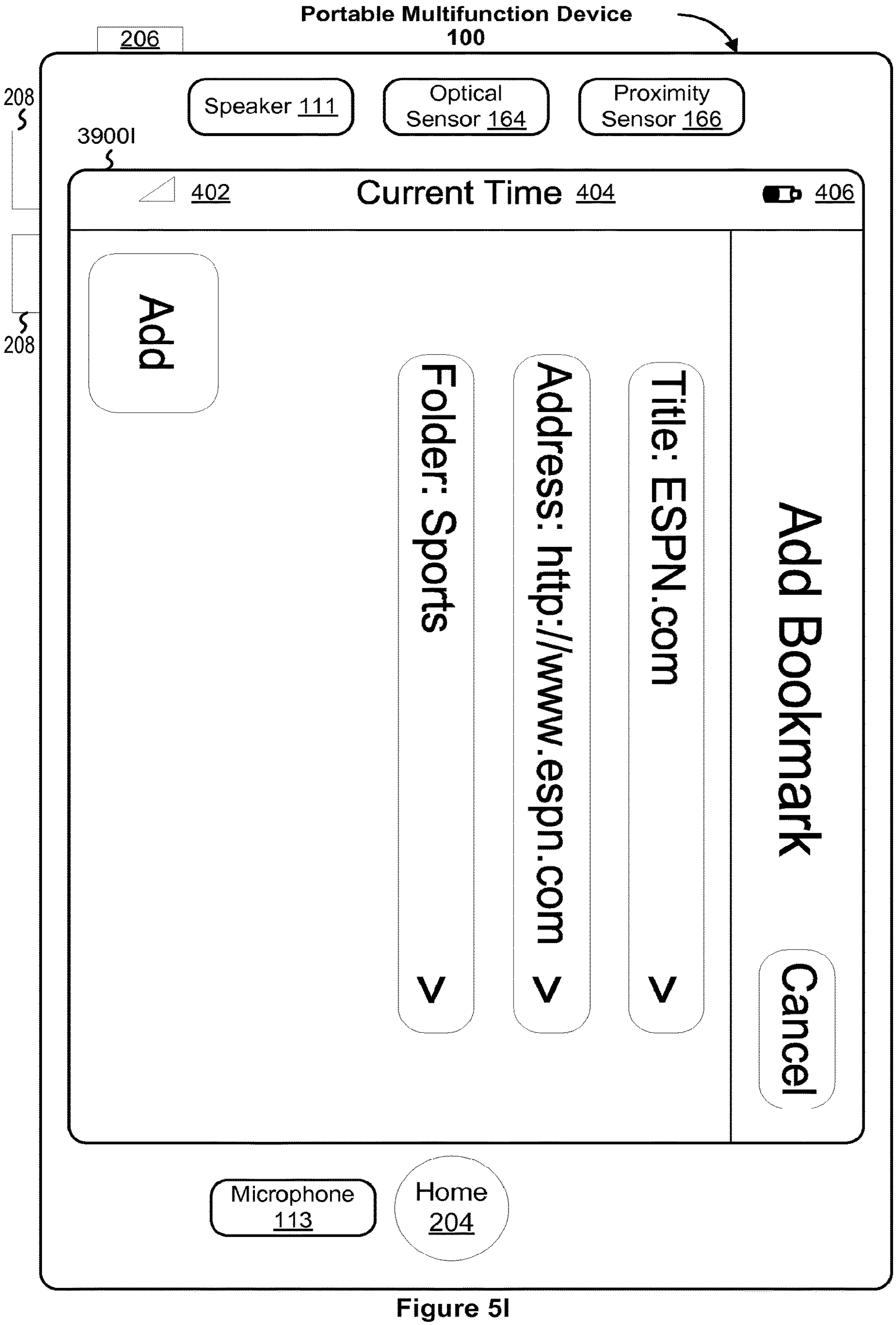
Figure 5J:
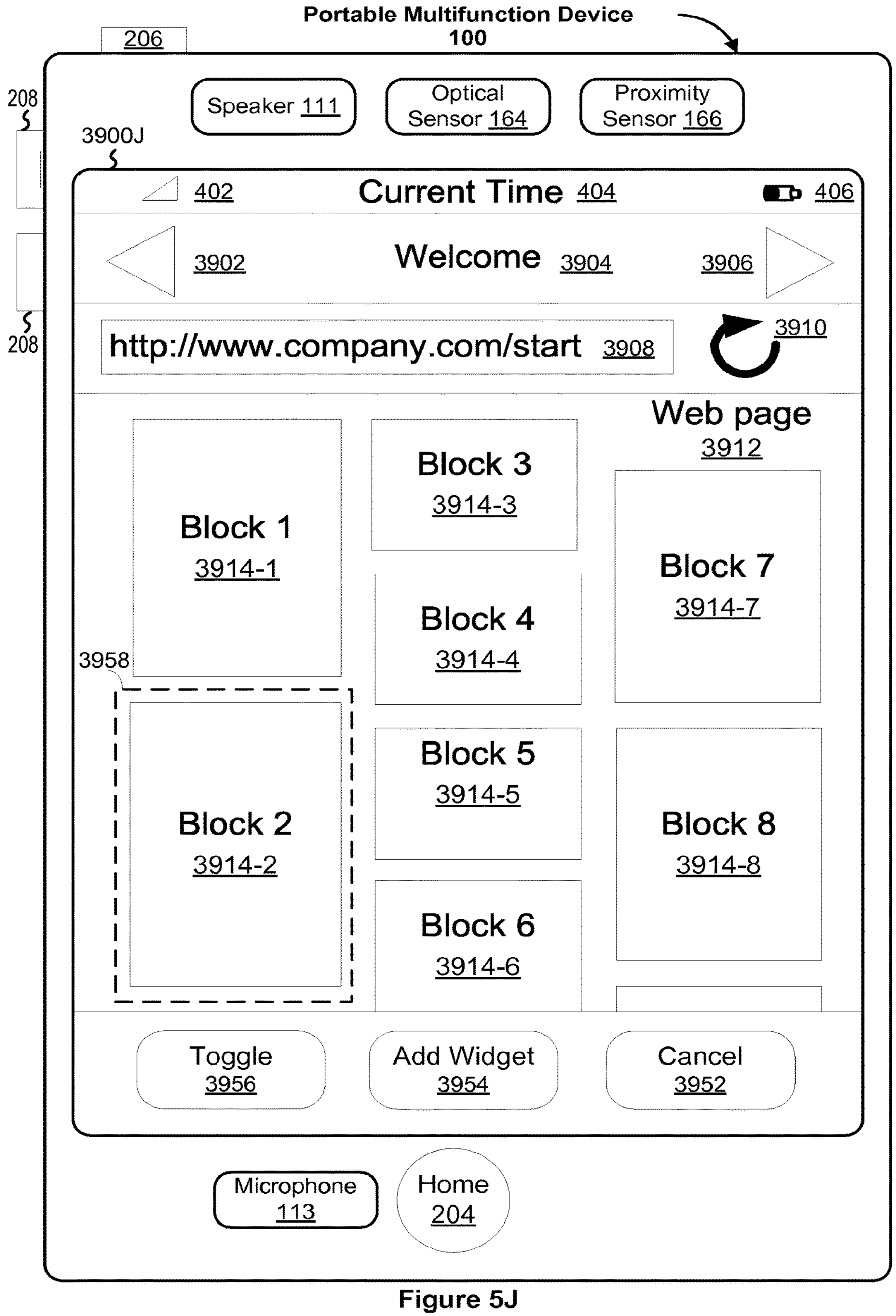
Figure 5K:
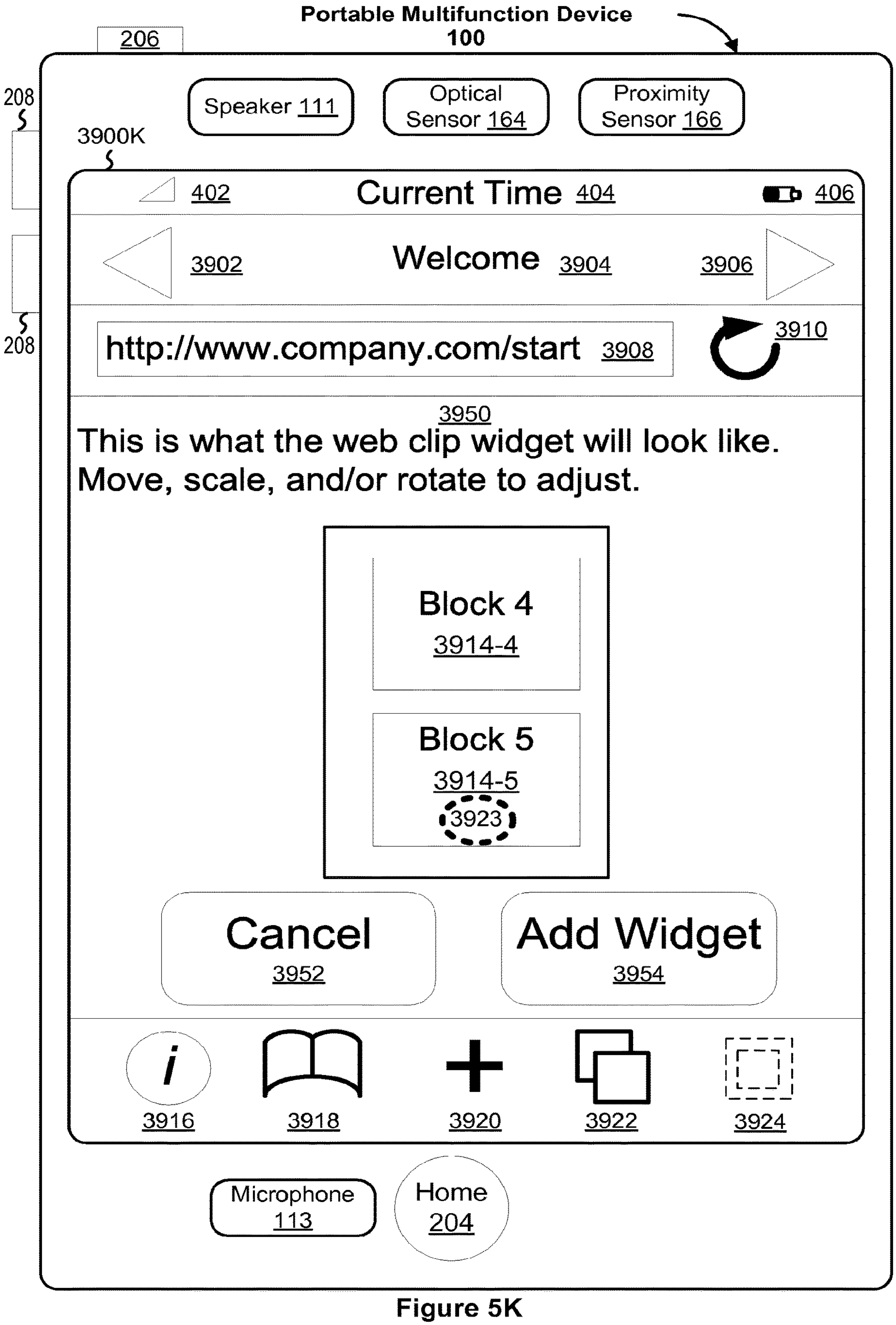
Figure 5L:
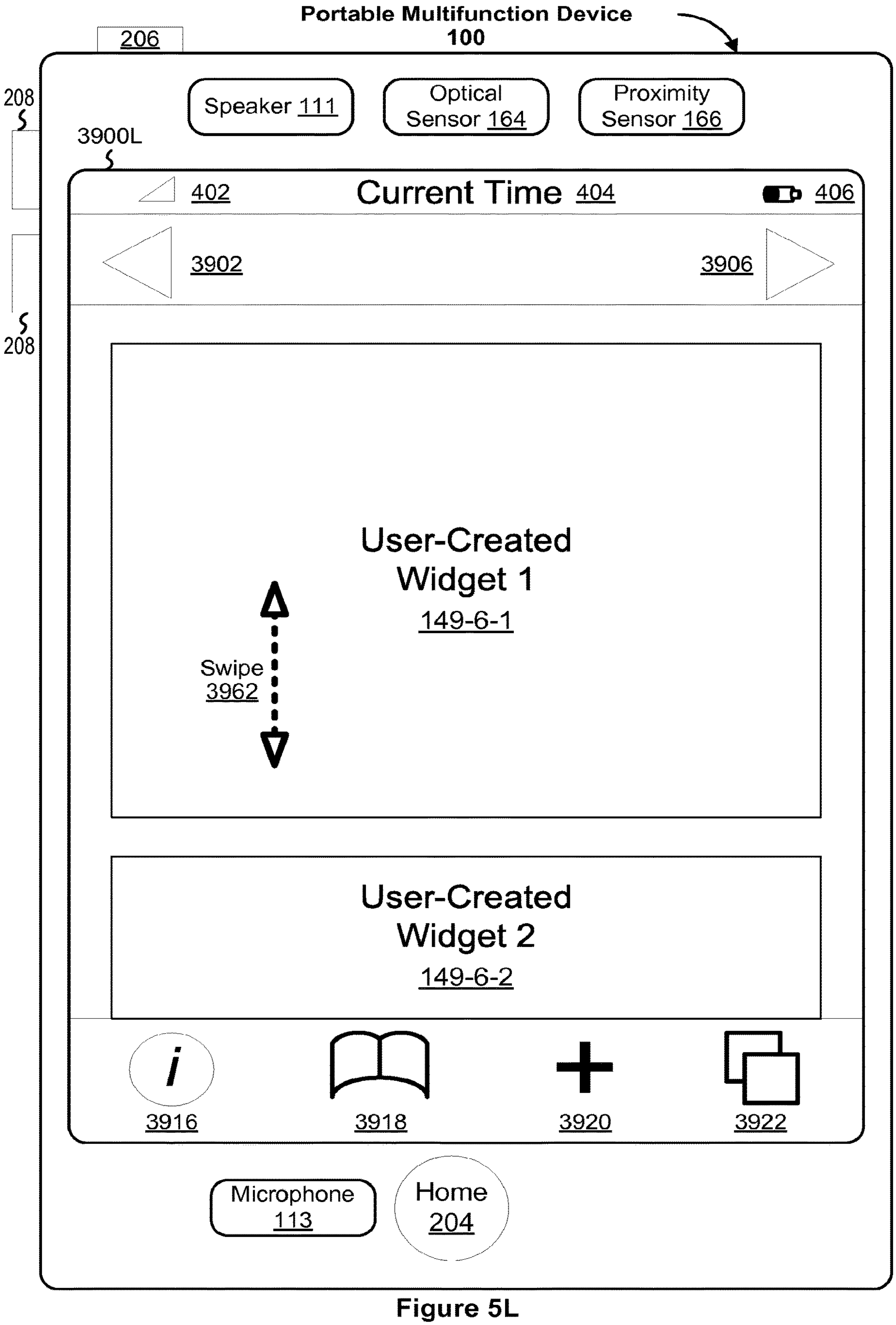
FIGS. 5L and 5M illustrate exemplary user interfaces for displaying web-clip widgets in accordance with some embodiments.

In some embodiments, user interface 3900A (FIG. 5A) includes the following elements, or a subset or superset thereof:

- 402, 404, and 406, as described above;
- Previous page icon 3902 that when activated (e.g., by a finger tap on the icon) initiates display of a previous web page (if any);
- Web page name 3904;
- Next page icon 3906 that when activated (e.g., by a finger tap on the icon) initiates display of a next web page (if any);
- URL (Uniform Resource Locator) entry box 3908 for inputting URLs of web pages;
- Refresh icon 3910 that when activated (e.g., by a finger tap on the icon) initiates a refresh of the web page;
- Web page 3912 or other structured document, which includes a plurality of blocks 3914 of text content and other graphics (e.g., images);
- Settings icon 3916 that when activated (e.g., by a finger tap on the icon) initiates display of a settings menu for the browser;
- Bookmarks icon 3918 that when activated (e.g., by a finger tap on the icon) initiates display of a bookmarks list or menu for the browser;
- Options icon 3920 that when activated (e.g., by a finger tap on the icon) initiates display of a plurality of options, including options for creating a web-clip widget, adding a bookmark, and emailing a link to the displayed web page 3912 (e.g., UI 3900F, FIG. 5F, which like other UIs and pages, can be displayed in either portrait or landscape view); and
- New window icon 3922 that when activated (e.g., by a finger tap on the icon) initiates display of a UI for adding new windows to the browser (e.g., UI 3900G, FIG. 5G).

In some embodiments, in response to a predefined gesture by the user on a block 3914 (e.g., a single tap gesture or a double tap gesture), the block is enlarged and centered (or substantially centered) in the web page display. For example, in response to a single tap gesture 3923 on block 3914-5, the user-selected block 3914-5 may be enlarged and centered in the display, as shown in UI 3900C (FIG. 5C). In some embodiments, the width of the user-selected block is scaled to fill the touch screen display. In some embodiments, the width of the user-selected block is scaled to fill the touch screen display with a predefined amount of padding along the sides of the display. In some embodiments, a zooming animation of the user-selected block is displayed during enlargement of the block. Similarly, in response to a single tap gesture 3925 on block 3914-2, block 3914-2 may be enlarged with a zooming animation and two-dimensionally scrolled to the center of the display (not shown).

In some embodiments, the device analyzes the render tree of the web page 3912 to determine the blocks 3914 in the web page. In some embodiments, a block 3914 corresponds to a render node that is: replaced; a block; an inline block; or an inline table.

In some embodiments, in response to the same predefined gesture by the user on a block 3914 (e.g., a single tap gesture or a double tap gesture) that is already enlarged and centered, the enlargement and/or centering is substantially or completely reversed. For example, in response to a single tap gesture 3929 on block 3914-5 (FIG. 5C), the web page image may zoom out and return to UI 3900A (FIG. 5A).

In some embodiments, in response to a predefined gesture (e.g., a single tap gesture or a double tap gesture) by the user on a block 3914 that is already enlarged but not centered, the block is centered (or substantially centered) in the web page display. For example, in response to a single tap gesture 3927 on block 3914-4 (FIG. 5C), block 3914-4 may be centered (or substantially centered) in the web page display. Similarly, in response to a single tap gesture 3935 on block 3914-6, block 3914-6 may be centered (or substantially centered) in the web page display. Thus, for a web page display that is already enlarged, in response to a predefined gesture, the device may display in an intuitive manner a series of blocks that the user wants to view. This same gesture may initiate different actions in different contexts (e.g., (1) zooming and/or enlarging in combination with scrolling when the web page is reduced in size, UI 3900A and (2) reversing the enlargement and/or centering if the block is already centered and enlarged).

In some embodiments, in response to a multi-touch (3931 and 3933) de-pinching gesture by the user (FIG. 5C), the web page may be enlarged. Conversely, in response to a multi-touch pinching gesture by the user, the web page may be reduced.

In some embodiments, in response to a substantially vertical upward (or downward) swipe gesture by the user, the web page (or, more generally, other electronic documents) may scroll one-dimensionally upward (or downward) in the vertical direction. For example, in response to an upward swipe gesture 3937 by the user that is within a predetermined angle (e.g.,) 27° of being perfectly vertical, the web page may scroll one-dimensionally upward in the vertical direction.

Conversely, in some embodiments, in response to a swipe gesture that is not within a predetermined angle (e.g., 27°) of being perfectly vertical, the web page may scroll two-dimensionally (i.e., with simultaneous movement in both the vertical and horizontal directions). For example, in response to an upward or diagonal swipe gesture 3939 by the user that is not within a predetermined angle (e.g., 27°) of being perfectly vertical, the web page may scroll two-dimensionally along the direction of the swipe 3939.

In some embodiments, in response to a multi-touch (3941 and 3943) rotation gesture by the user, the web page may be rotated exactly 90° (UI 3900D, FIG. 5D) for landscape viewing, even if the amount of rotation in the multi-touch (3941 and 3943) rotation gesture is substantially different from 90°. Similarly, in response to a multi-touch (3945 and 3947) rotation gesture by the user (U1 3900D, FIG. 5D), the web page may be rotated exactly 90° for portrait viewing, even if the amount of rotation in the multi-touch (3945 and 3947) rotation gesture is substantially different from 90°.

Thus, in response to imprecise gestures by the user, precise movements of graphics occur. The device behaves in the manner desired by the user despite inaccurate input by the user. Also, note that the gestures described for UI 3900C, which has a portrait view, are also applicable to UIs with a landscape view (e.g., UI 3900D, FIG. 5D) so that the user can choose whichever view (portrait or landscape) the user prefers for web browsing.

In some embodiments, in response to a tap or other predefined user gesture on URL entry box 3908 (UI 3900A, FIG. 5A), the touch screen displays an enlarged entry box 3926 and a keyboard 616 (e.g., UI 3900B, FIG. 5B in portrait viewing and LTI 3900E, FIG. 5E in landscape viewing). In some embodiments, the touch screen also displays:

- Contextual clear icon 3928 that when activated (e.g., by a finger tap on the icon) initiates deletion of all text in entry box 3926;
- a search icon 3930 that when activated (e.g., by a finger tap on the icon) initiates an Internet search using the search terms input in box 3926; and
- Go to URL icon 3932 that when activated (e.g., by a finger tap on the icon) initiates acquisition of the web page at the URL in box 3926;

Thus, the same entry box 3926 may be used for inputting both search terms and URLs. In some embodiments, whether or not clear icon 3928 is displayed depends on the context.

UI 3900G (FIG. 5G) is a UI for adding new windows to an application, such as the browser 147. LTI 3900G displays an application (e.g., the browser 147), which includes a displayed window (e.g., web page 3912-2) and at least one hidden window (e.g., web pages 3912-1 and 3912-3 and possibly other web pages that are completely hidden off-screen). LTI 3900G also displays an icon for adding windows to the application (e.g., new window or new page icon 3936). In response to detecting activation of the icon 3936 for adding windows, the browser adds a window to the application (e.g., a new window for a new web page 3912).

In response to detecting a gesture on the touch screen display, a displayed window in the application is moved off the display and a hidden window is moved onto the display. For example, in response to detecting a tap gesture 3949 on the left side of the screen, the window with web page 3912-2 is moved partially or fully off-screen to the right, the window with web page 3912-3 is moved completely off-screen, partially hidden window with web page 3912-1 is moved to the center of the display, and another completely hidden window (not shown in FIG. 5G) with a web page may be moved partially onto the display. Alternatively, detection of a left-to-right swipe gesture 3951 may achieve the same effect.

Conversely, in response to detecting a tap gesture 3953 on the right side of the screen, the window with web page 3912-2 is moved partially or fully off-screen to the left, the window with web page 3912-1 is moved completely off-screen, partially hidden window with web page 3912-3 is moved to the center of the display, and another completely hidden window (not shown in FIG. 50) with a web page may be moved partially onto the display. Alternatively, detection of a right-to-left swipe gesture 3951 may achieve the same effect.

In some embodiments, in response to a tap or other predefined gesture on a delete icon 3934 (e.g., 3934-2 or 3934-3), the corresponding window 3912 is deleted. In some embodiments, in response to a tap or other predefined gesture on Done icon 3938, the window in the center of the display (e.g., 3912-2) is enlarged to fill the screen.

A user may create a web-clip widget in accordance with some embodiments. Activation of the user-created web-clip widget displays a previously specified area in a web page (having a specified URL) at a specified display size or scale factor. In some embodiments, the area in the web page is specified by scaling and/or translating the display of the web page. For example, a specified area in the web page is enlarged and centered. The specified area may be displayed in a browser application (e.g., the browser 147) or other application. For example, activation of the web-clip widget may display a particular block that is of interest to the user within the web page; furthermore, the block may be enlarged. Activation of the web-clip widget thus enables the user to view the particular block of interest without having to enlarge and center the web page area that is of interest each time the user visits the web page. In some embodiments, after activation of the web-clip widget, the user may manipulate the display to view other portions of the web page by scaling and/or translating the display. Alternatively, in some embodiments, the user may not be permitted to manipulate the display.

Web-clip widgets provide more functionality than mere bookmarks: activation of a bookmark only displays a specified web page, while activation of a web-clip widget displays a specified area of a web page at a specified display size or scale factor in accordance with some embodiments. Similarly, a web-clip widget is distinguishable from a hyperlink. To view a web page or portion thereof specified by a hyperlink, the user must activate the browser application, navigate to a web page containing the hyperlink, activate the hyperlink, and then potentially scroll and/or scale the resulting web page. In contrast, to view an area of a web page specified by a web-clip widget, the user merely activates the widget.

In some embodiments, the web-clip widget corresponds to a block or other structural element of the web page. As described in U.S. patent application Ser. No. 11/620,492, "Selecting and Manipulating Web Content," filed on Jan. 5, 2007, which application is incorporated by reference herein in its entirety, structural elements that are displayed in a web page may be identified during the web-clip widget creation process. In some embodiments, if the dimensions of a selected structural element change after creation of a web-clip widget, the area that is displayed upon activation of the web-clip widget is changed accordingly.

In some embodiments, a web-clip widget comprises a URL for the web page and data (e.g., metadata) indicating the user-specified portion of the web page. For example, in some embodiments the web-clip widget comprises a file containing an XML property list that includes the URL and the data indicating the user-specified portion of the web page. In some embodiments, the data indicating the user-specified portion of the web page includes a reference point (e.g., a corner point or center point for the widget) and a scale factor. In some embodiments, the data indicating the user-specified portion of the web page includes a set of coordinates within the web page (e.g., a user-defined rectangle) or an identification of a structural element within the web page. The application for viewing the web-clip widget (e.g., the browser 147) is configured to process the data indicating the user-specified portion of the web page and to display the corresponding portion.

In some embodiments a web-clip widget comprises an executable script. In some embodiments, the widget includes an HTML (Hypertext Markup Language) file, a CSS (Cascading Style Sheets) file, and a JavaScript file. In some embodiments, the widget includes an XML (Extensible Markup Language) file and a JavaScript file (e.g., Yahoo! Widgets).

To the extent that any application incorporated by reference herein includes a definition of web-clip widgets that contradicts the definition in the preceding five paragraphs, the definition in the preceding five paragraphs is to be considered controlling for purposes of interpreting the specification and claims of the present application.

Figure 7A:
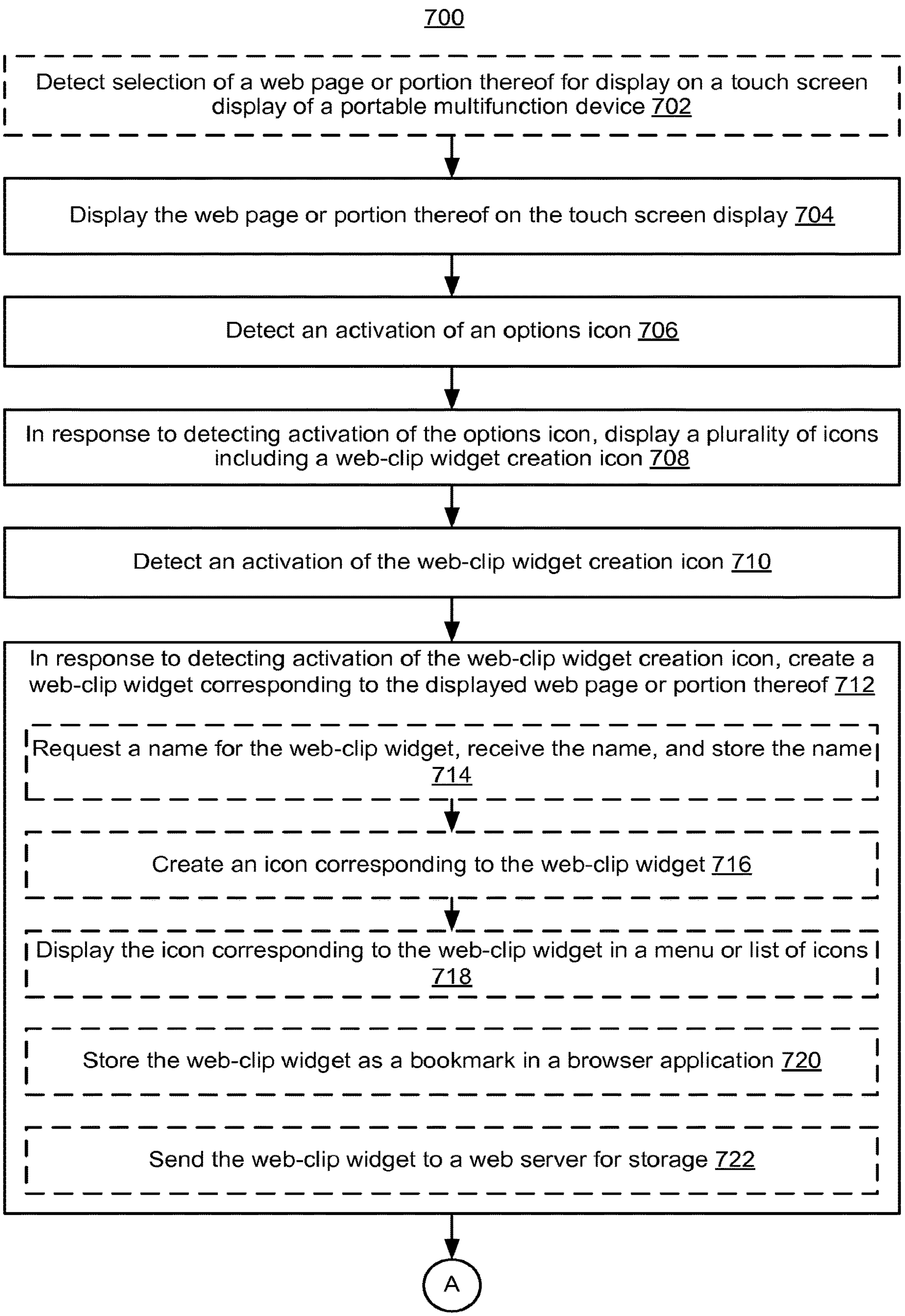
FIGS. 7A-7E are flow diagrams illustrating processes for creating and using a web-clip widget in accordance with some embodiments.

Referring to FIG. 5C, in some embodiments, once a user has centered and/or enlarged an area of a web page (e.g., block 3914-5), the user may initiate creation of a web-clip widget by activating the options icon 3920. The options icon 3920 is an example of an options icon referenced in operation 706 of process 700 (FIG. 7A, below). In some embodiments, the user activates the options icon 3920 by performing a tap or other predefined gesture on the options icon 3920.

As a result of activating the options icon 3920, a user interface such as UI 3900F (FIG. 5F) is displayed (e.g., operation 708, FIG. 7A), which includes a plurality of icons 3972. In some embodiments, the plurality of icons 3972 includes an icon 3973 for creating a web-clip widget, an icon 3974 for adding a bookmark (e.g., via UI 39001, FIG. 51), an icon 3975 for emailing a link corresponding to the displayed web page 3912, and a cancel icon 3976 for returning to the previous UI. If the user activates the "create web-clip widget" icon 3973, a web-clip widget corresponding to the centered and/or enlarged area of the web page (e.g., block 3914-5 or the entire displayed portion of the web page 3912), will be created (e.g., operations 710 and 712, FIG. 7A). Text and/or graphics displayed for the icon 3973 may vary. In some embodiments, for example, the icon 3973 may be labeled "Add to Home Screen."

In some embodiments, in response to user activation of the "create web-clip widget" icon 3973 (Figure SF), UI 3900H (FIG. 5H) will appear and will prompt the user to enter the widget name in text entry box 3960 using the contextual keyboard 616. In some embodiments, the user can access other keyboards that display other symbols by activating the alternate keyboard selector icon 618. In some embodiments, UI 3900H includes an image 3978 of the selected area of the web page. Once the user has completed entering the widget name in the text entry box 3960, the user activates the add-widget icon 3928 and the widget is created. Alternately, the user may activate the cancel icon 3928 to avoid creating the widget.

In some embodiments, as a result of activating the "create web-clip widget" icon 3973, a web-clip widget corresponding to the centered and/or enlarged area of the web page will be created and assigned a name without any further actions by a user. In some embodiments, instead of displaying a user interface such as UI 3900H (FIG. 5H) for receiving a name, the newly created web-clip widget may be assigned the same name as the web page name 3904.

Figure 4B:
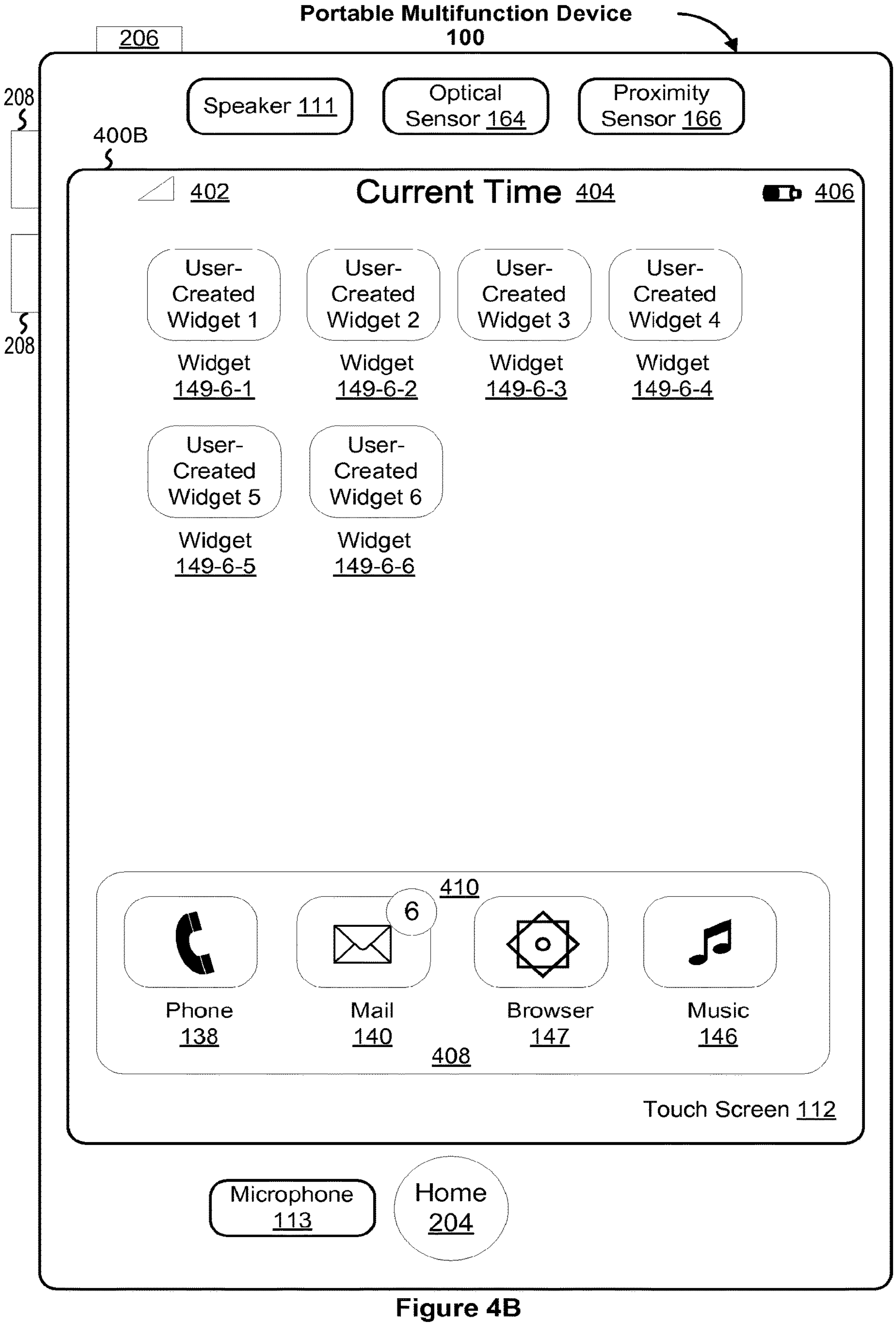

An icon corresponding to the newly created widget may be created and displayed on a menu in a UI such as UI 400A or UI 400B (FIG. 4A or 4B). Alternatively, the icon and/or the name of the newly created widget may be listed on a UI such as UI 400C (FIG. 4*q*. Subsequent activation of the newly created widget will launch an application (e.g., the browser 147) that will display the web-clip widget. In some embodiments, the web-clip widget is displayed within the browser UI (e.g., UI 3900C, FIG. 5C). In some embodiments, the web-clip widget is displayed without other elements of the browser UI (e.g., without elements 3902, 3906, 3908, and/or 3910), such that the web-clip widget appears to be its own mini-application rather than a portion of a web page displayed in a browser. In some embodiments, the web-clip widget is displayed with decorative features such as a decorative frame or a border resembling a torn page. In some embodiments, the decorative features are user-customizable.

Figure 4C:
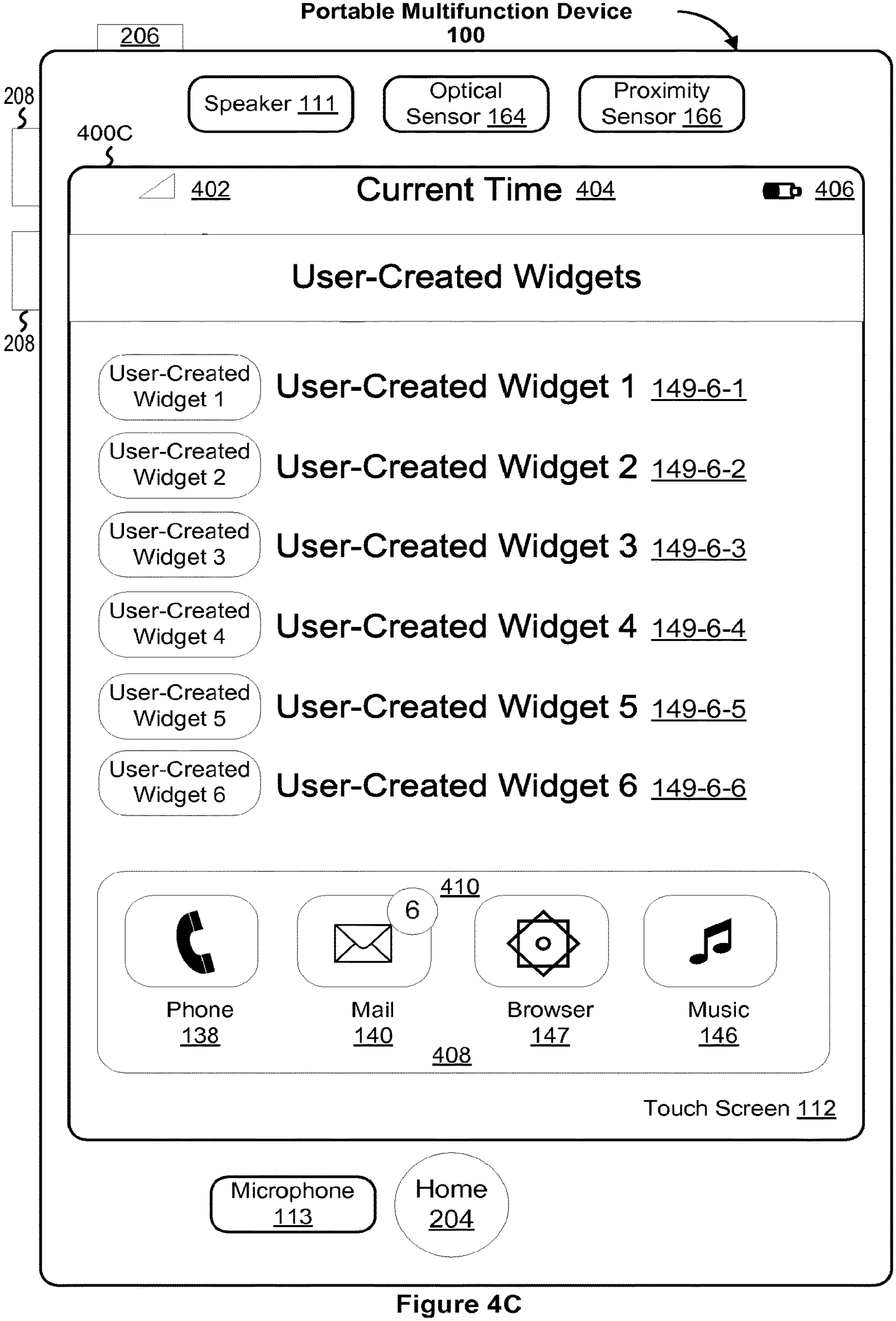
FIG. 4C illustrates an exemplary user interface having a list of user-created widgets on a portable multifunction device in accordance with some embodiments.

For example, as described above, a user viewing web page 3912 (FIG. 5A) may enlarge and center block 3914-5 by performing a tap gesture 3923 (e.g., a single tap or a double tap) on block 3914-5. As a result, block 3914-5 appears enlarged and centered in the browser window, as shown in FIG. 5C. The user then may perform gestures (e.g., taps) on the options icon 3920 and the web-clip widget creation icon 3973 (FIG. 5F) to create a widget corresponding to block 3914-5, in accordance with some embodiments. In some embodiments, the user then enters a widget name in the text entry box 3960 (FIG. 5H) and activates the add-widget icon 3928. A corresponding icon may be created and displayed on a menu such as in UI 400A or 400B (FIG. 4A or 4B) or in a list such as in UI 400C (FIG. 4C). In some embodiments, subsequent activation of the newly created widget will launch the browser 147, which will display block 3914-5, as shown in UI 3900C (FIG. 5C).

In some embodiments, instead of or in addition to performing a tap gesture 3923 (FIG. 5A) to center and enlarge a block, a user may define the area of a web page to be associated with a widget by performing one or more other gestures. Examples of gestures that may be used to define the area of the web page include a tap gesture 3927 or 3935 (FIG. 5C) to center an adjacent enlarged block; a multi-touch depinching gesture (3931 and 3933) (FIG. 5C) to enlarge the web page; a multi-touch pinching gesture (not shown) to reduce the web page; swipe gestures such as a substantially vertical swipe 3937 (Figure SC), an upward or diagonal swipe 3939 (FIG. 5C), and/or other swipe gestures (not shown) to scroll the web page; and/or a multi-touch rotation gesture (3941 and 3943) to select a portrait or landscape view (FIG. 5C).

In some embodiments, instead of first defining the area of the web page to be associated with the web-clip widget and then activating the options icon 3920 (e.g., FIG. 5C) and the "create web-clip widget" icon 3973 (FIG. 5F), a user may first activate the icons 3920 and 3973 and then define the area by performing gestures that are detected by the touch screen display, such as those described above. Once the area has been selected and/or scaled, the user may make a gesture on the touch screen to indicate that the area of the web page to be associated with the widget has been defined.

In some embodiments, in response to the user activating the "create web-clip widget" icon 3973 (FIG. 5F), the device displays a user interface (e.g., UI 3900K, FIG. 5K) that lets the user define the area of the web page to be associated with the widget. The user may define the area using gestures such as the gestures described above with reference to UIs 3900A, 3900C, and 3900D (FIGS. 5A, 5C, and 5D). In some embodiments, the user interface may include information 3950 to help guide the user. In some embodiments, the user may activate a cancel icon 3952 to abort the widget creation process and may activate an add widget icon 3954 to complete the widget creation process. In some embodiments, a rotation gesture such as multi-touch rotation gesture (3941 and 3943, FIG. 5C) rotates the entire UI 3900K, and not just the defined area, from portrait viewing to landscape viewing or vice versa.

In some embodiments, in response to the user activating the "create web-clip widget" icon 3973 (FIG. 5F), the device displays a user interface (e.g., UI 3900J, FIG. 5J) that lets the user define the area of a web page to be associated with a widget by toggling between frames. The frames are successively overlaid on the web page to frame or highlight successive blocks and other structural elements of the web page. For example, in UI 3900J a frame 3958 frames block 2 3914-2. The user may activate a toggle icon 3956 to toggle between successive blocks. Once a block of interest is framed, the user may activate an add widget icon 3954 to create a widget corresponding to the framed block. The user may activate a cancel icon 3952 to end the widget creation process.

Figure 6A:
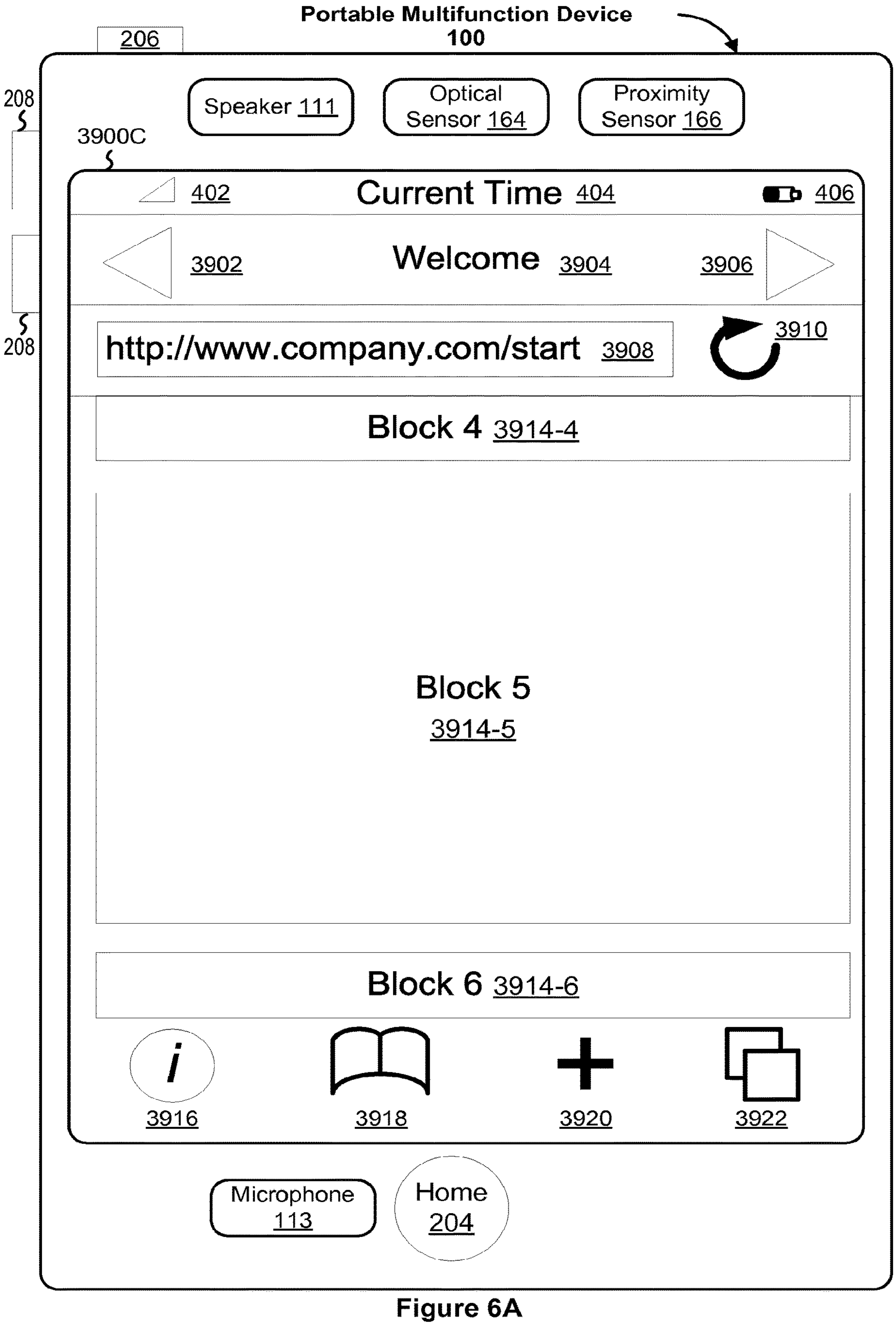
FIGS. 6A-6D illustrate an animation for creating and displaying an icon corresponding to a web-clip widget in accordance with some embodiments.
Figure 6B:
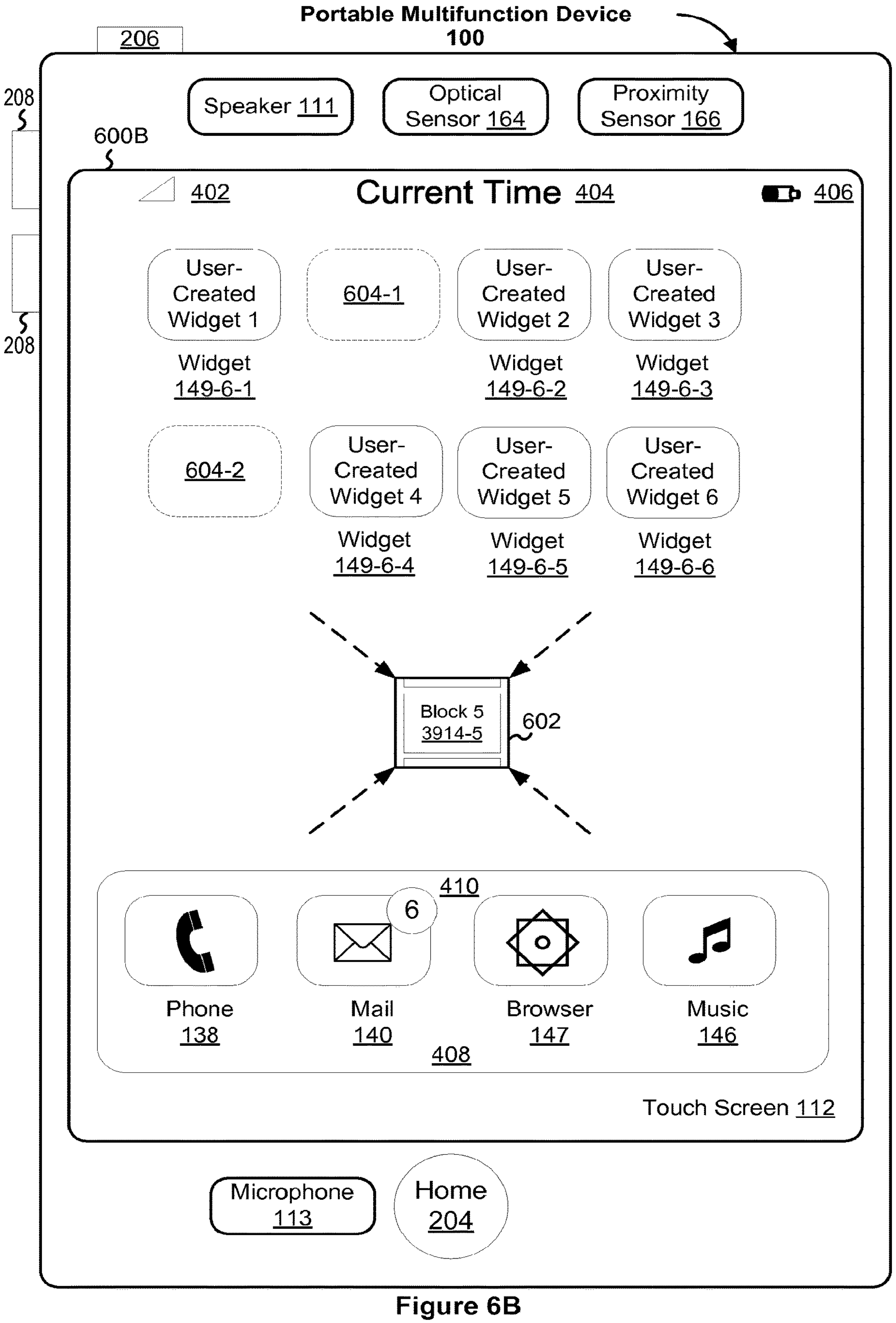
Figure 6C:
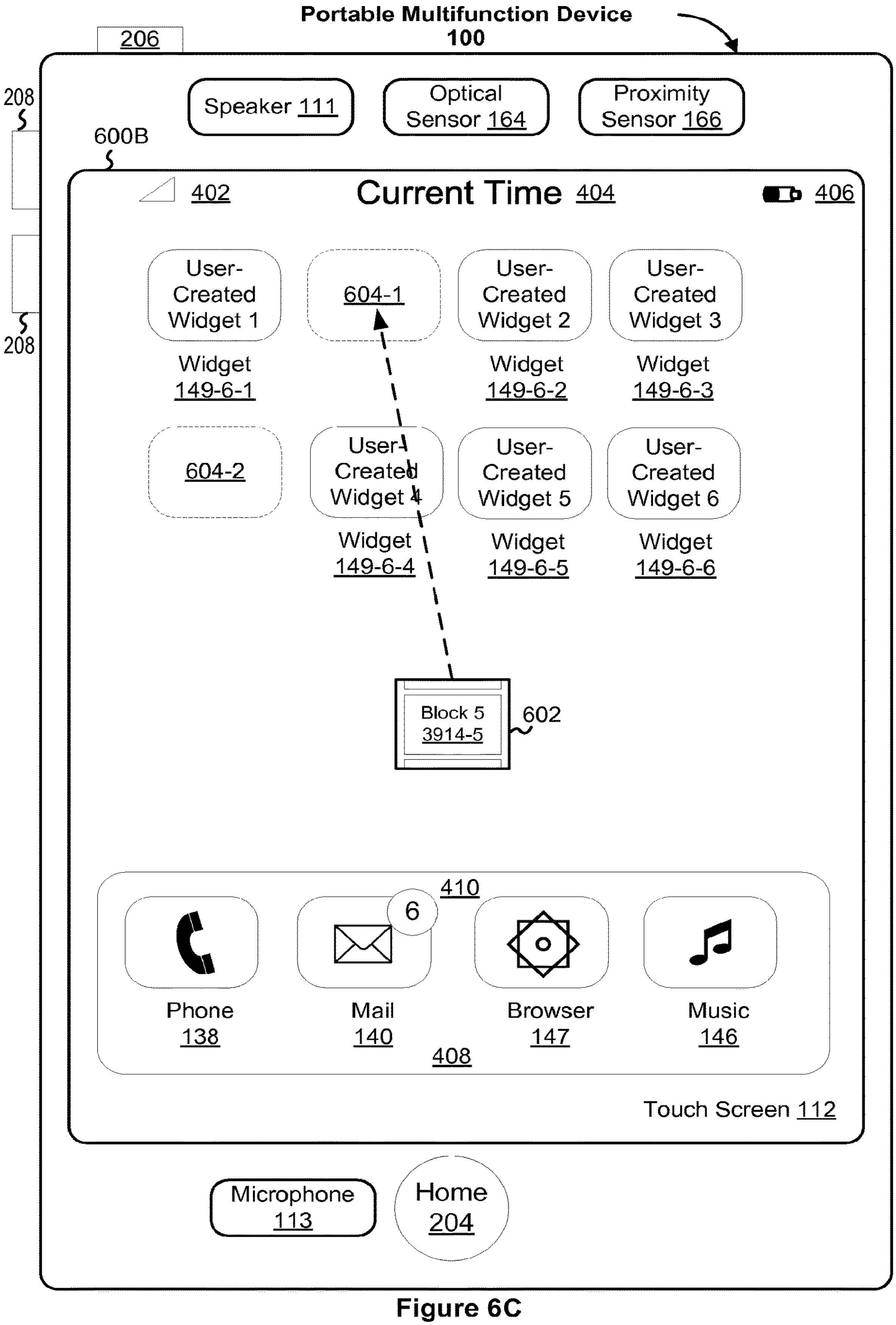
Figure 6D:
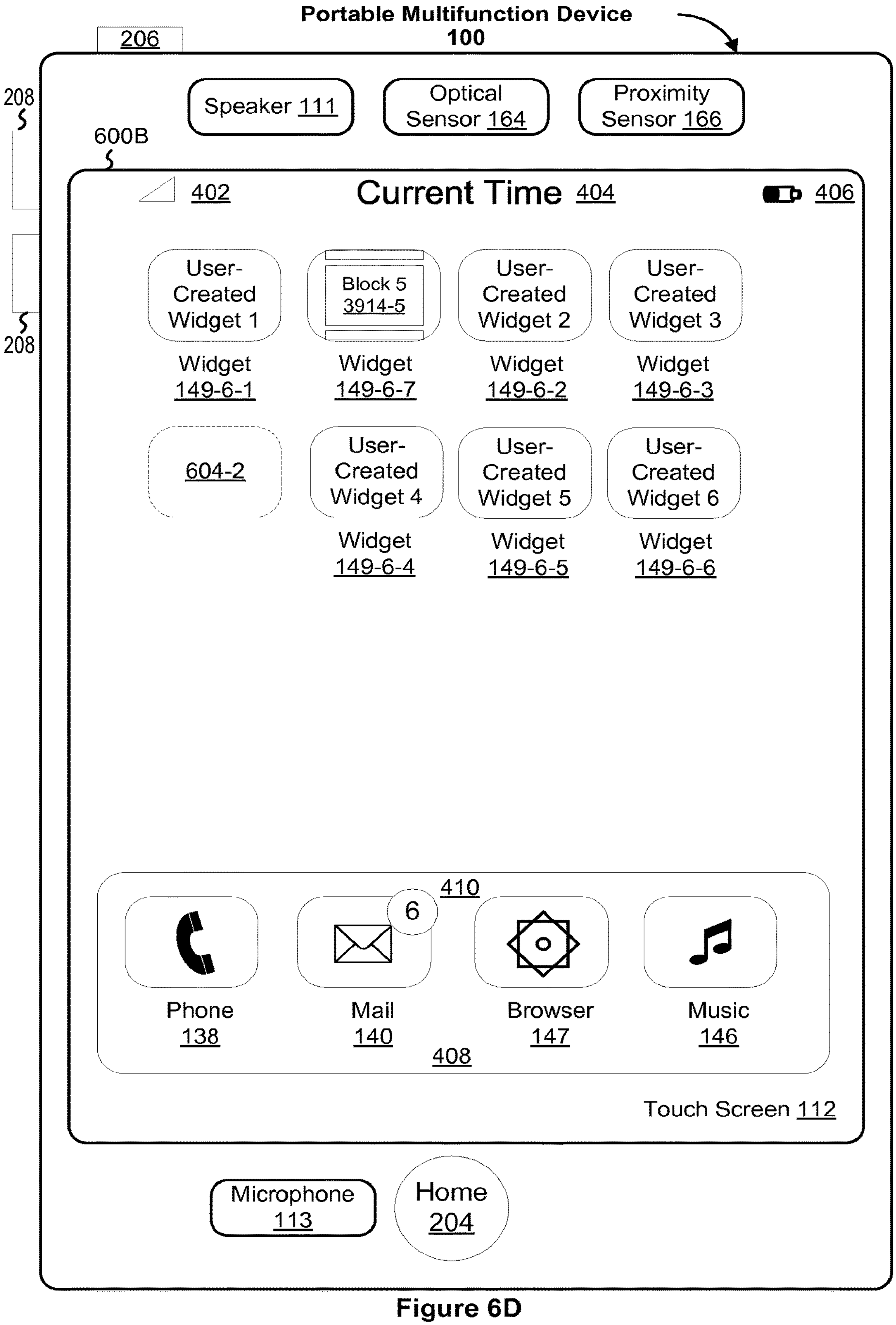
Figure 6E:
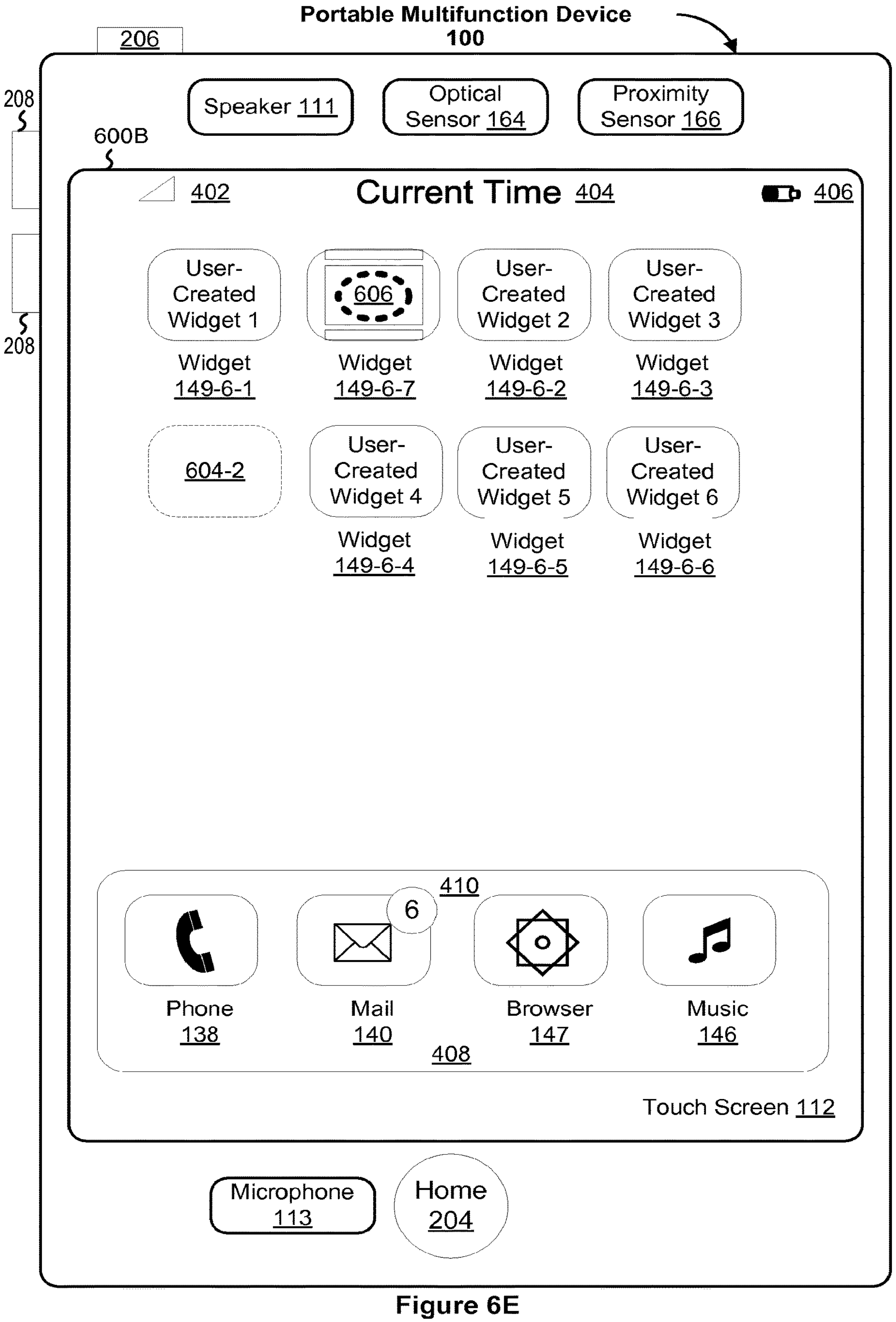
FIG. 6E illustrates an exemplary user interface for activating a web-clip widget in accordance with some embodiments.

In some embodiments, creating and displaying an icon corresponding to the newly created web-clip widget includes displaying an animation, as illustrated in FIGS. 6A-6D in accordance with some embodiments. The animation may be displayed, for example, after activation of the add-widget icon 3928 (FIG. 5H) or after activation of the "create web-clip widget" icon 3973 (FIG. 5F). In the animation, the selected area of the web page 3912 corresponding to the newly created web-clip widget (e.g., block 3914-5 in UI 3900C) is displayed, as illustrated in FIG. 6A. The displayed image is shrunk down, as illustrated for image 602 (FIG. 6B), and displayed over a menu of icons. In some embodiments, the menu of icons includes vacant areas (e.g., 604-1 and 604-2, FIG. 6B) in which an icon could be displayed but is not currently displayed. The image 602 may be moved (FIG. 6C) into the first available vacancy 604-1, where it is displayed as an icon corresponding to the new web-clip widget 149-6-7 (FIG. 6D). In some embodiments, the first available vacancy is the left-most vacancy in the highest row with a vacancy. In other embodiments, the image is moved into another vacancy or is appended to the menu after the last (e.g., lowest and right-most) vacancy.

In some embodiments, instead of displaying an animation, the icon corresponding to the newly created web-clip widget is simply displayed in a first available vacancy in a menu of icons or in another available vacancy in the menu, or is appended to the menu.

Activation of the icon corresponding to the newly created web-clip widget 149-6-7 (e.g., by a gesture 606 (FIG. 6E) on the icon, such as a tap gesture) results in display of the corresponding web-clip widget (e.g., display of block 3914-5, as shown in FIG. 6A) in the browser application or in its own mini-application without other elements of the browser UI.

UI 3900L (FIG. 5L) is a UI for displaying a portion of two or more web-clip widgets, in accordance with some embodiments. The displayed portion may include a first web-clip widget (e.g., 149-6-1), and may include all or a portion of additional web-clip widgets (e.g., 149-6-2). The displayed portion is scrolled in response to detecting a gesture on the touch screen display, such as a swipe gesture 3962.

UI 3900M (FIG. 5M) is a UI for displaying a web-clip widget (e.g., 149-6-2) in accordance with some embodiments. In response to detecting a gesture on the touch screen display, display of the web-clip widget is ceased and another web-clip widget is displayed. For example, in response to detecting a downward swipe 3962 or a tap gesture 3964 at the top of the displayed widget 149-6-2, display of the web-clip widget 149-6-2 is ceased and a previous user-created widget 149-6-1 is displayed. In response to detecting an upward swipe 3962 or a tap gesture 3966 at the bottom of the displayed widget 149-6-2, display of the web-clip widget 149-6-2 is ceased and a next user-created widget 149-6-3 is displayed. Alternatively, in response to detecting a substantially horizontal right-to-left swipe 3963 or a tap gesture 3965 at the right side of the displayed widget 149-6-2, display of the web-clip widget 149-6-2 is ceased and a next user-created widget 149-6-3 is displayed. In response to detecting a substantially horizontal left-to-right swipe 3963 or a tap gesture 3967 at the left side of the displayed widget 149-6-2, display of the web-clip widget 149-6-2 is ceased and a previous user-created widget 149-6-1 is displayed.

FIG. 7A is a flow diagram illustrating a process 700 for creating a web-clip widget from a web page or portion thereof on a portable multifunction device with a touch screen display in accordance with some embodiments. While the web-clip widget creation process 700 described below includes a number of operations that appear to occur in a specific order, it should be apparent that the process 700 can include more or fewer operations, which can be executed serially or in parallel (e.g., using parallel processors or a multi-threading environment), an order of two or more operations may be changed, and/or two or more operations may be combined into a single operation.

In some embodiments, selection of a web page or portion thereof for display is detected (702). For example, one or more finger gestures are detected on the touch screen display to select the web page or portion thereof. In some embodiments, the one or more finger gestures include one or more finger gestures to scale an area in the web page. In some embodiments, the one or more finger gestures include one or more finger gestures to center an area in the web page. Examples of finger gestures used to select, center, and/or scale an area in the web page include a tap gesture 3923 or 3925 to center and enlarge a block (FIG. 5A); a tap gesture 3927 or 3935 to center an adjacent enlarged block; a multi-touch depinching gesture (3931 and 3933) to enlarge the web page; a multi-touch pinching gesture (not shown) to reduce the web page; swipe gestures such as a substantially vertical swipe 3937, an upward or diagonal swipe 3939, and/or other swipe gestures (not shown) to translate the web page; and/or a multi-touch rotation gesture (3941 and 3943) to select a portrait or landscape view (FIG. 5C).

The web page or portion thereof is displayed (704) on the touch screen display. In the example of FIG. 5C, block 3914-5 is displayed on the touch screen display.

An activation of an options icon (e.g., icon 3920) is detected (706). In some embodiments, detecting activation of the options icon includes detecting a finger gesture (e.g., a tap gesture) on the options icon.

In response to detecting activation of the options icon, a plurality of icons (e.g., 3972, FIG. 5F) is displayed (708) including a web-clip widget creation icon (e.g., icon 3973, FIG. 5F). In some embodiments, the web-clip widget creation icon includes text, such as "Create Web-Clip Widget" or "Add to Home Screen."

An activation of the web-clip widget creation icon (e.g., 3973) is detected (710). In some embodiments, detecting activation of the web-clip widget creation icon includes detecting a finger gesture (e.g., a tap gesture) on the web-clip widget creation icon.

In response to detecting activation of the web-clip widget creation icon, a web-clip widget is created (712) corresponding to the displayed web page or portion thereof.

In some embodiments, the web-clip widget corresponds to a structural element of the web page, such as a particular block within the web page. In some embodiments, the web-clip widget corresponds to a user-specified rectangle in the web page.

In some embodiments, creating the web-clip widget includes (714) requesting a name for the web-clip widget, receiving the name, and storing the name. In some embodiments, requesting the name includes displaying a keyboard to receive input for the name. For example, in UI 390011 (FIG. 5H), the user is prompted to enter the widget name in the text entry box 3960 using the keyboard 616.

In some embodiments, creating the web-clip widget includes creating (716) an icon corresponding to the web-clip widget and displaying (718) the icon corresponding to the web-clip widget in a menu (e.g., UI 400A or 400B, FIG. 4A or 4B) or list (e.g., UT 400C, FIG. 4C) of icons. In some embodiments, the icon corresponding to the web-clip widget is created in response to detecting an activation of an add-widget icon (e.g., icon 3928, FIG. 5H). In some embodiments, the icon corresponding to the web-clip widget is created in response to detecting an activation of the web-clip widget creation icon (e.g., 3973, FIG. 5F).

In some embodiments, the menu or list of icons comprises a menu or list of applications and widgets (e.g., UI 400A, FIG. 4A) on the multifunction device. In some embodiments, the menu or list of icons comprises a menu or list of widgets on the multifunction device. In some embodiments, the menu or list of icons comprises a menu or list of user-created widgets (e.g., UI 400B or 400C, FIG. 4B or 4C) on the multifunction device.

In some embodiments, the icon corresponding to the web-clip widget is displayed in a previously vacant area in the menu of icons. In some embodiments, the previously vacant area is a first available vacancy (e.g., 604-1, FIG. 6B) in the menu of icons. In some embodiments, an animation is displayed of the icon corresponding to the web-clip widget moving into the previously vacant area. For example, FIGS. 6A-6D illustrate an animation in which an icon corresponding to the web-clip widget 149-6-7 is created and moved into a previously vacant area in UI 600B.

In some embodiments, the web-clip widget is stored (720) as a bookmark in a browser application. In some embodiments, as described in U.S. patent application Ser. No. 11/469,838, "Presenting and Managing Clipped Content," filed on Sep. 1, 2006, which application is incorporated by reference herein in its entirety, the web-clip widget is encoded as a URL associated with the bookmark.

In some embodiments, the web-clip widget is sent (722) to a web server for storage. In some embodiments, the web-clip widget stored on the web server is publicly accessible. Storing a user-created web-clip widget on a publicly accessible server allows the user to share the web-clip widget with other users.

Figure 7B:
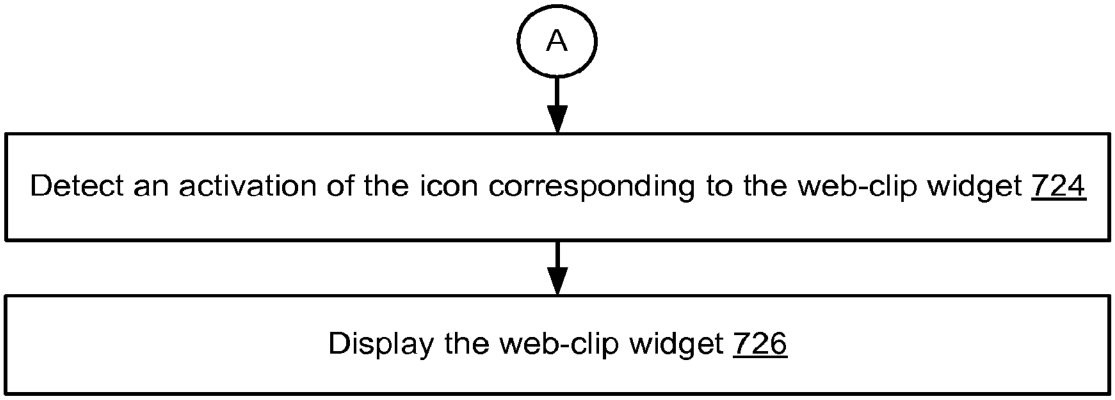

In some embodiments, as illustrated in FIG. 7B, an activation of the icon corresponding to the web-clip widget is detected (724). For example, a finger gesture (e.g., a tap gesture 606, FIG. 6E) is detected on the icon. In response, the web-clip widget is displayed (726). For example, in response to detecting the tap gesture 606, block 3914-5 is displayed, as illustrated in FIG. 6A in the browser application or, as described above, as its own mini-application without other elements of the browser UI.

Figure 7C:
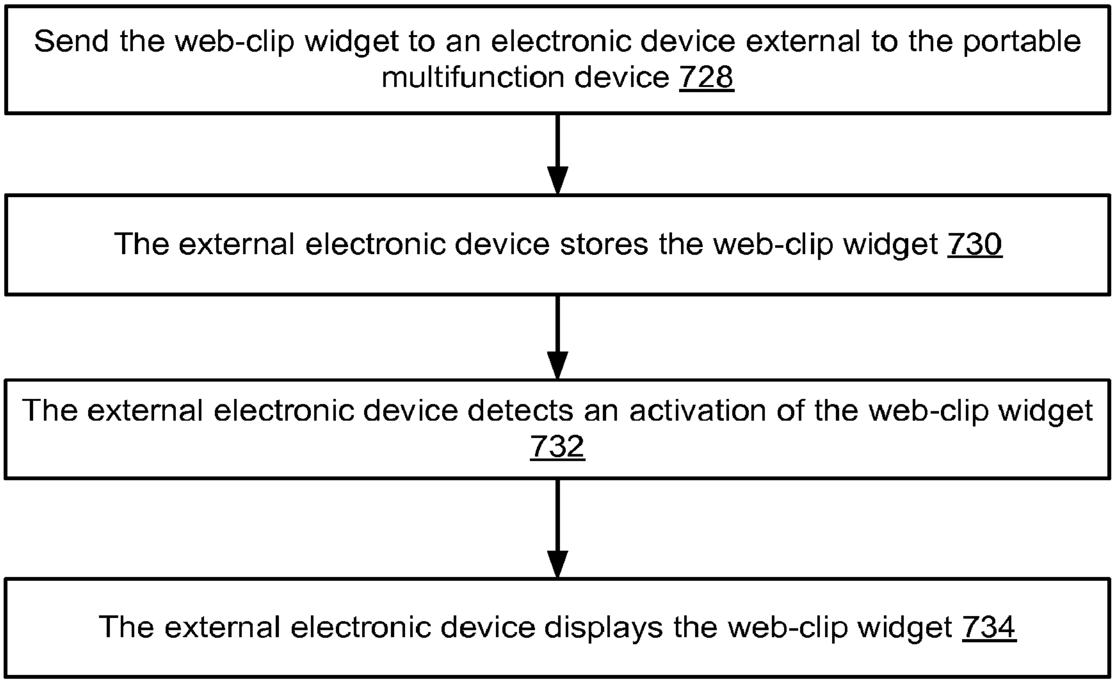

In some embodiments, as illustrated in FIG. 7C, the web-clip widget is sent (728) to an electronic device external to the portable multifunction device. For example, the web-clip widget may be sent to another portable multifunction device 100. The external electronic device stores (730) the web-clip widget, detects an activation (732) of the web-clip widget, and displays the web-clip widget (734). In some embodiments, the web-clip widget is sent to the external electronic device via email. In some embodiments, the web-clip widget is sent to the external electronic device via instant messaging. As used herein, "instant messaging" refers to both telephony-based messages (e.g., messages sent using Multimedia Message Service (MMS)) and Internet-based messages (e.g., messages sent using Extensible Messaging and Presence Protocol (XMPP), Session Initiation Protocol for Instant Messaging and Presence Leveraging Extensions (SIMPLE), or Instant Messaging and Presence Service (IMPS)). Sending a user-created web-clip widget to another electronic device provides the user with a way to share the web-clip widget with other users. Operations 728-734 of FIG. 7C may be performed as part of process 700 or may be performed as an independent process.

Figure 7D:
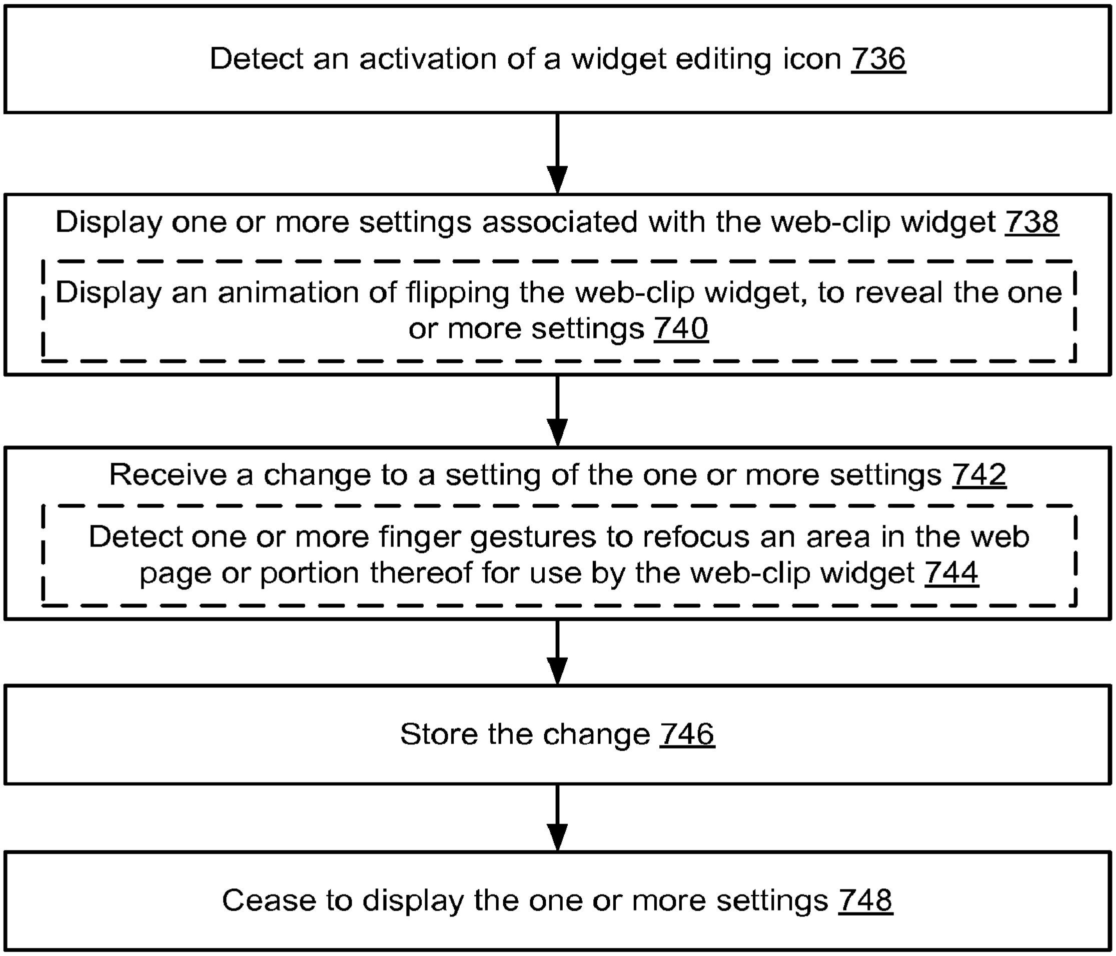

In some embodiments, as illustrated in FIG. 7D, an activation of a widget editing icon (e.g., edit widget icon 3970, FIG. 5M) is detected (736). In response to detecting the activation of the widget editing icon, one or more settings associated with the web-clip widget are displayed (738). In some embodiments, an animation is displayed (740) of flipping the web-clip widget, to reveal the one or more settings. As described in U.S. patent application Ser. No. 11/145,561, "Presenting Clips of Content," filed on Jun. 3, 2005, which application is incorporated by reference herein in its entirety, settings (e.g., preferences) associated with a web-clip widget may be displayed by flipping the widget to reveal a user interface to edit the settings. A change to a setting of the one or more settings is received (742). In some embodiments, one or more finger gestures are detected to refocus (744) an area in the web-clip or portion thereof for use by the web-clip widget. As described in the "Presenting Clips of Content" application, the user interface revealed by flipping the widget may include a refocus preference to allow redefinition of the selected area of the web page for use by the web-clip widget. The change is stored (746) and display of the one or more settings is ceased (748). Operations 736-748 of FIG. 7D may be performed as part of process 700 or may be performed as an independent process.

In some embodiments, each operation of process 700 is performed by a portable multifunction device. In some embodiments, however, one or more operations of process 700 are performed by a server system in communication with a portable multifunction device via a network connection. The portable multifunction device may transmit data associated with the widget creation process to the server system and may receive information corresponding to the widget in return. For example, code (e.g., an HTML file, a CSS file, and/or a JavaScript file, in accordance with some embodiments, or an XML file and/or a JavaScript file, in accordance with some other embodiments) associated with the widget may be generated by the server system and then transmitted to the portable multifunction device. In general, operations in the widget creation process may be performed by the portable multifunction device, by the server system, or by a combination thereof.

Process 700 creates a widget that allows a user to view a specified area in a web page upon activation of the widget. The user thus is spared from having to enlarge and center the area of the web page that is of interest, such as a particular block of interest, each time the user visits the web page.

Figure 7E:
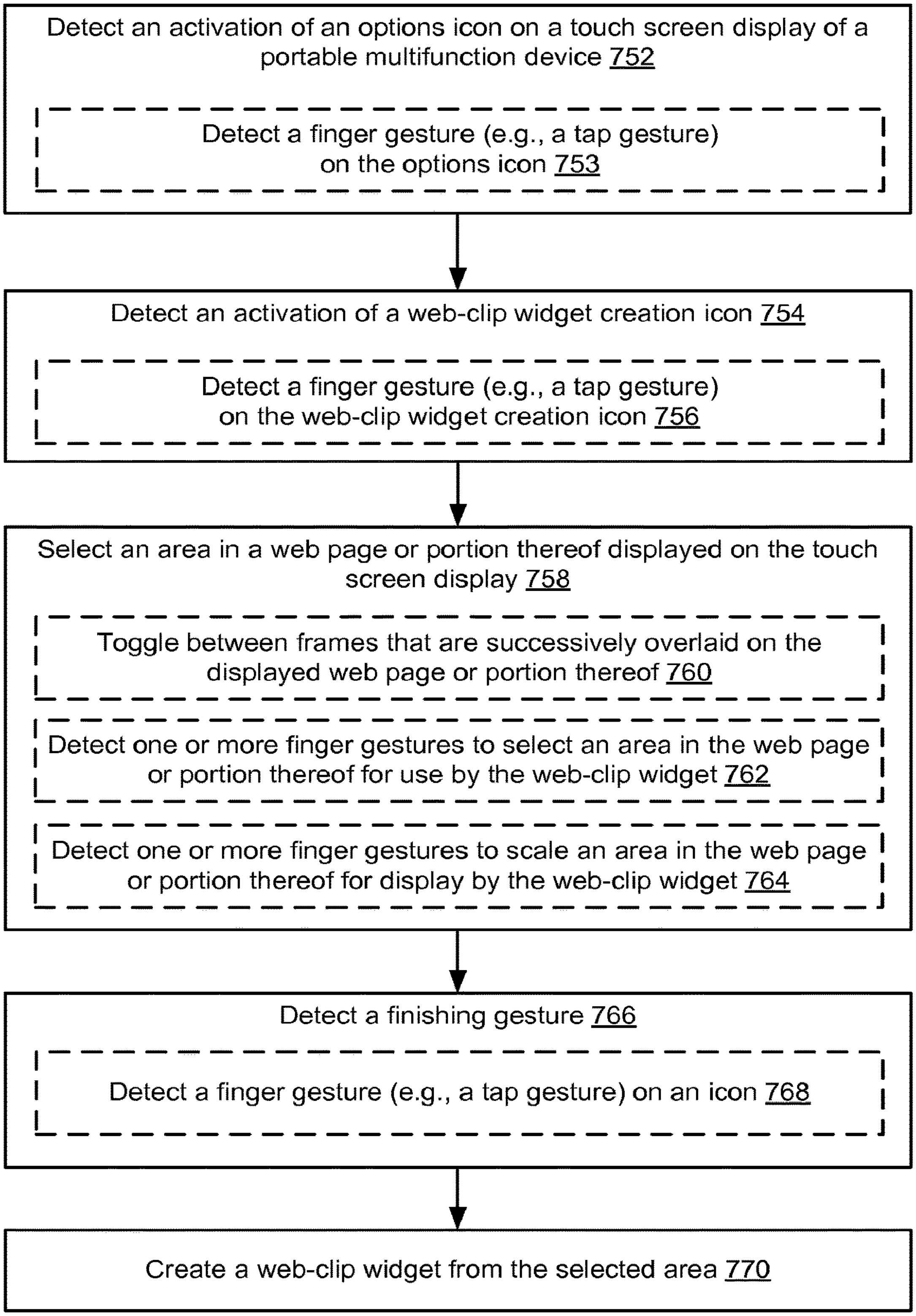

FIG. 7E is a flow diagram illustrating a process 750 for creating a web-clip widget from a web page or portion thereof in accordance with some embodiments. While the web-clip widget creation process 750 described below includes a number of operations that appear to occur in a specific order, it should be apparent that the process 750 can include more or fewer operations, which can be executed serially or in parallel (e.g., using parallel processors or a multi-threading environment), an order of two or more operations may be changed and/or two or more operations may be combined into a single operation.

On a touch screen display of a portable multifunction device, an activation of an options icon (e.g., icon 3920, FIG. 5A) is detected (752). In some embodiments, a finger gesture (e.g., a tap gesture) is detected (753) on the options icon.

An activation of a web-clip widget creation icon (e.g., icon 3973, FIG. 5F) is detected (754). In some embodiments, a finger gesture (e.g., a tap gesture) is detected (756) on the web-clip widget creation icon.

An area in a web page or portion thereof displayed on the touch screen display is selected (758). In some embodiments, selecting the area includes toggling (760) between frames that are successively overlaid on the displayed web page or portion thereof. For example, in UI 3900J (FIG. 5J), a frame 3958 is displayed overlaid on the web page 3912 such that it frames block 2 3914-2. Upon activation of a toggle icon 3956, display of the frame 3958 is ceased and another frame is displayed overlaid on the web page 3912 such that it frames another block (e.g., block 3 3914-3). Thus, in some embodiments, the frames successively highlight blocks and other structural elements of the web page. As described in U.S. patent application Ser. No. 11/620,492, "Selecting and Manipulating Web Content," filed on Jan. 5, 2007, which application is incorporated by reference herein in its entirety, structural elements that are displayed in a web page can be identified during the web-clip widget creation process.

In some embodiments, selecting the area includes detecting (762) one or more finger gestures to select an area in the web page or portion thereof for use by the web-clip widget. In some embodiments, selecting the area includes detecting (764) one or more finger gestures to scale an area in the web page or portion thereof for display by the web-clip widget. Examples of finger gestures used to select and/or scale an area in the web page or portion thereof include a single tap gesture 3923 or 3925 to center and enlarge a block (FIG. 5A); a single tap gesture 3927 or 3935 to center an adjacent enlarged block; a multi-touch depinching gesture (3931 and 3933) to enlarge the web page; a multi-touch pinching gesture (not shown) to reduce the web page; swipe gestures such as a substantially vertical swipe 3937, an upward or diagonal swipe 3939, and/or other swipe gestures (not shown) to scroll the web page; and/or a multi-touch rotation gesture (3941 and 3943) to select a portrait or landscape view (FIG. 5C).

A finishing gesture is detected (766). In some embodiments, a finger gesture (e.g., a tap gesture) on an icon (e.g., add widget icon 3954, FIG. 5J or 5K) is detected (768). A web-clip widget is created (770) from the selected area.

In some embodiments, creating the web-clip widget includes requesting a name for the web-clip widget, receiving the name, and storing the name, in accordance with operation 714 of process 700 (FIG. 7A).

In some embodiments, creating the web-clip widget includes creating an icon corresponding to the web-clip widget, in accordance with operation 716 of process 700. In some embodiments, the icon corresponding to the web-clip widget is displayed in a menu or list of icons, in accordance with operation 718 of process 700. In some embodiments, the menu or list of icons comprises a menu or list of applications and widgets on the multifunction device. In some embodiments, the menu or list of icons comprises a menu or list of widgets on the multifunction device. In some embodiments, the menu or list of icons comprises a menu or list of user-created widgets on the multifunction device.

In some embodiments, an activation of the icon corresponding to the web-clip widget is detected and the web-clip widget is displayed, in accordance with operations 724 and 726 (FIG. 6B) of process 700.

In some embodiments, settings associated with the web-clip widget are edited, in accordance with operations 736-748 (FIG. 7D) of process 700.

In some embodiments, the web-clip widget is stored as a bookmark in a browser application, in accordance with operation 720 of process 700 (FIG. 7A).

In some embodiments, the web-clip widget is sent to a web server for storage, in accordance with operation 722 of process 700. In some embodiments, the web-clip widget is sent to an external electronic device, in accordance with operations 728-734 (FIG. 7C) of process 700.

In some embodiments, each operation of process 750 is performed by a portable multifunction device. In some embodiments, however, one or more operations of process 750 are performed by a server system in communication with a portable multifunction device via a network connection. The portable multifunction device may transmit data associated with the widget creation process to the server system and may receive information corresponding to the widget in return. For example, code (e.g., an HTML file, a CSS file, and/or a JavaScript file, in accordance with some embodiments, or an XML file and/or a JavaScript file, in accordance with some other embodiments) associated with the widget may be generated by the server system and then transmitted to the portable multifunction device. In general, operations in the widget creation process may be performed by the portable multifunction device, by the server system, or by a combination thereof.

Process 750, like process 700, creates a widget that allows a user to view a specified area in a web page upon activation of the widget, thus sparing the user from having to enlarge and center the area of the web page that is of interest each time the user visits the web page.

Figure 7F:
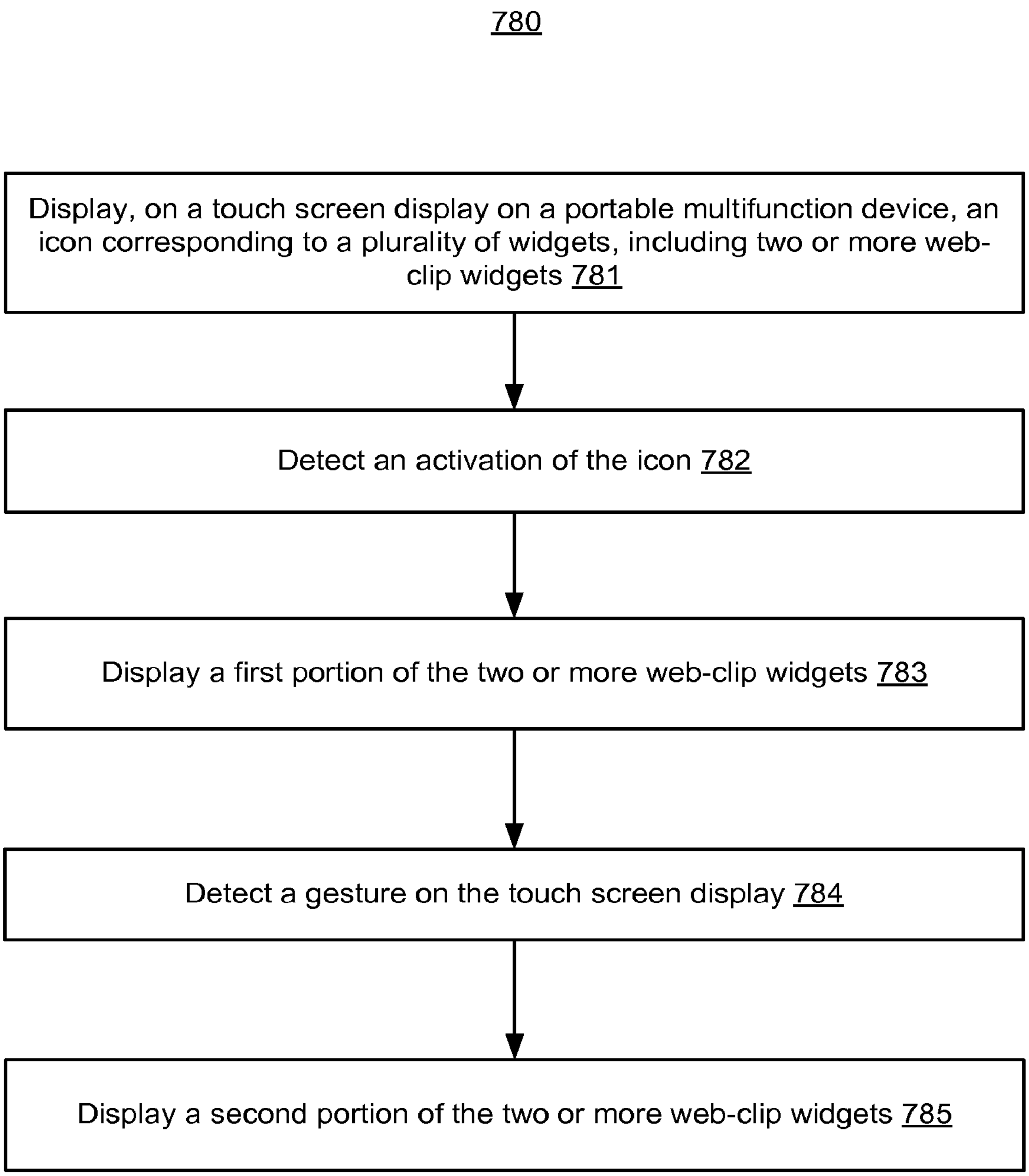
FIGS. 7F-7H are flow diagrams illustrating processes for displaying web-clip widgets in accordance with some embodiments.

FIG. 7F is a flow diagram illustrating a process 780 for displaying web-clip widgets in accordance with some embodiments. On a touch screen display on a portable multifunction device, an icon is displayed (781) corresponding to a plurality of widgets, including two or more web-clip widgets. For example, in some embodiments, the icon for user-created widget 149-6 (FIG. 4A) corresponds to multiple widgets including multiple web-clip widgets.

An activation of the icon is detected (782). For example, a finger gesture (e.g., a tap gesture) on the icon is detected.

In response to detecting the activation, a first portion of the two or more web-clip widgets is displayed (783). For example, UI 3900L (FIG. 5L) displays a first portion that includes a first user-created widget 149-6-1 and a portion of a second user-created widget 149-6-2. In another example, UI 3900M (FIG. 5M) displays a first portion that includes the second user-created widget 149-6-2 and no other widgets or portions thereof. Thus, in some embodiments, the first portion is a first web-clip widget.

A gesture is detected (784) on the touch screen display. In some embodiments, the gesture is a scrolling gesture. For example, a swipe gesture 3962 (FIGS. 5L and 5M) or 3963 (FIG. 5M) is detected on the touch screen display.

In response to detecting the gesture, a second portion of the two or more web-clip widgets is displayed (785). In some embodiments, in response to detecting the gesture, a displayed portion of the two or more web-clip widgets is scrolled from the first portion to the second portion. For example, in response to detecting an upward scroll gesture 3962 in UI 3900L (FIG. 5L), a second portion is displayed that includes more or all of the second user-created widget 149-6-2 and less or none of the first user-created widget 149-6-1. In some embodiments, the second portion is a second web-clip widget (e.g., the second user-created widget 149-6-2).

In some embodiments, the gesture is a de-pinching gesture (e.g., gestures 3931 and 3933, FIG. 5C). In response to detecting the de-pinching gesture, a displayed portion of the two or more web-clip widgets is zoomed in from the first portion to the second portion.

In some embodiments, the gesture is a finger tap on an area within the first portion (e.g., a finger tap analogous to gesture 3923, FIG. 5A), and the displayed second portion is centered on the area and is zoomed in with respect to the first portion.

Figure 7G:
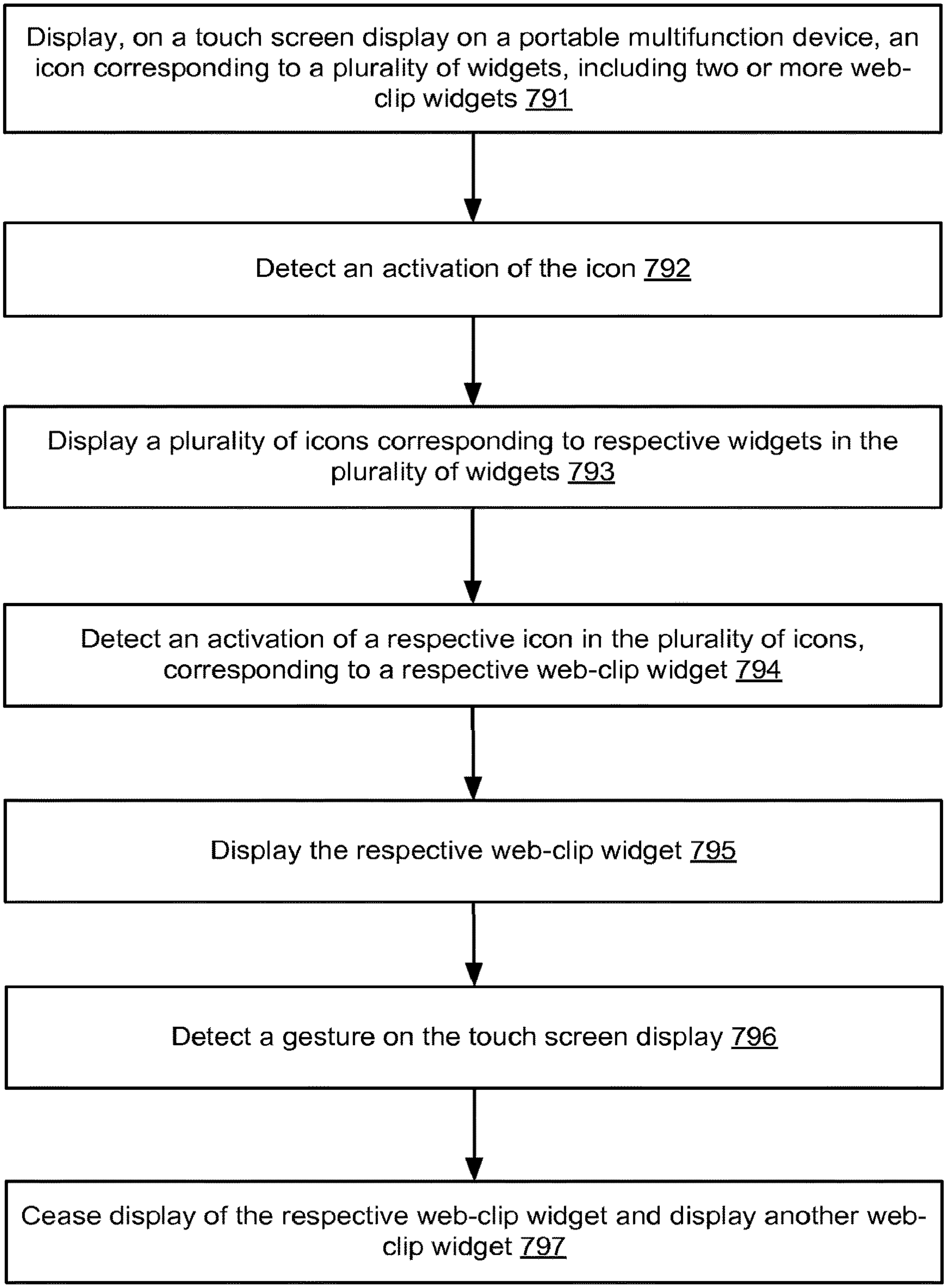

FIG. 7G is a flow diagram illustrating a process 790 for displaying web-clip widgets in accordance with some embodiments. On a touch screen display on a portable multifunction device, an icon is displayed (791) corresponding to a plurality of widgets, including two or more web-clip widgets. For example, in some embodiments, the icon for user-created widget 149-6 (FIG. 4A) corresponds to multiple widgets including multiple web-clip widgets.

An activation of the icon is detected (792). For example, a finger gesture (e.g., a tap gesture) on the icon is detected.

In response to detecting the activation of the icon, a plurality of icons corresponding to respective widgets in the plurality of widgets is displayed (793). In some embodiments, the plurality of icons is displayed in a menu, or in a list. For example, UI 400B (FIG. 4B) displays a menu of icons corresponding to user-created widgets 149-6-1 through 149-6-6, and UI 400C (FIG. 4C) displays a list of icons corresponding to user-created widgets 149-6-1 through 149-6-6.

Figure 5M:
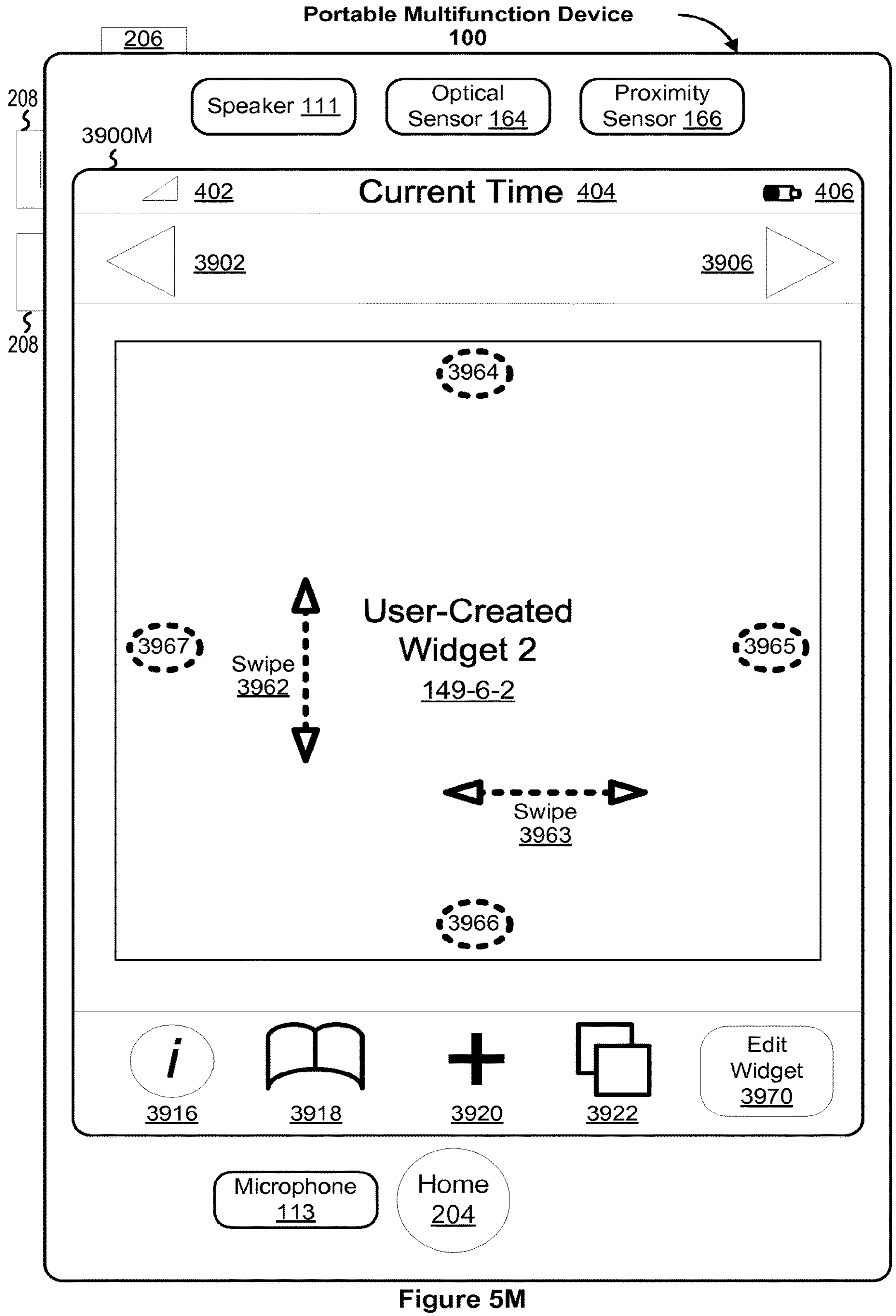

An activation is detected (794) of a respective icon in the plurality of icons corresponding to a respective web-clip widget. In response to detecting the activation of the respective icon, the respective web-clip widget is displayed (795). For example, in response to detecting an activation of an icon corresponding to user-created widget 149-6-2 in UI 400B or UI 400C, user-created widget 149-6-2 is displayed in UI 3900M (FIG. 5M).

A gesture is detected (796) on the touch screen display. For example, a swipe gesture 3962 or 3963 (FIG. 5M) is detected on the touch screen display. Alternately, a tap gesture 3964 at the top or a tap gesture 3966 at the bottom of the displayed widget 149-6-2 is detected. In another example, a tap gesture 3965 at the right side or a tap gesture 3967 at the left side of the displayed widget 149-6-2 is detected.

In response to detecting the gesture, display of the respective web-clip widget is ceased and another web-clip widget is displayed (797). For example, in response to detecting a downward swipe 3962, a substantially horizontal left-to-right swipe 3963, a tap gesture 3967 at the left side of the displayed widget 149-6-2, or a tap gesture 3964 at the top of the displayed widget 149-6-2, a previous user-created widget 149-6-1 is displayed. In response to detecting an upward swipe 3962, a substantially horizontal right-to-left swipe 3963, a tap gesture 3965 at the right side of the displayed widget 149-6-2, or a tap gesture 3966 at the bottom of the displayed widget 149-6-2, a next user-created widget 149-6-3 is displayed.

Processes 780 and 790 thus provide user-friendly ways to view multiple specified areas in web pages without having to surf between successive web pages and without having to enlarge and center an area of interest in each web page.

Figure 7H:
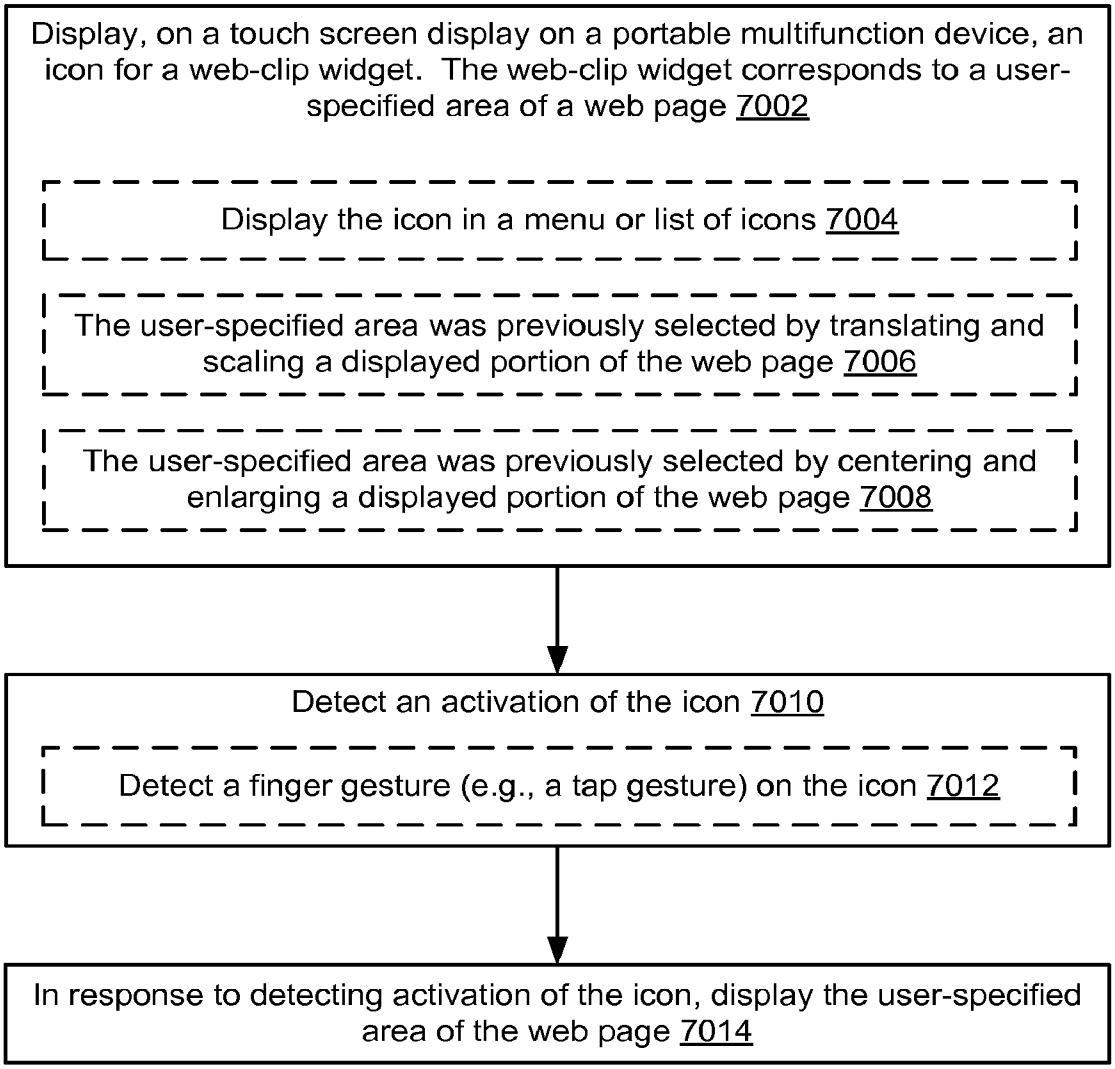

FIG. 7H is a flow diagram illustrating a process 7000 for displaying a web-clip widget in accordance with some embodiments. On a touch screen display on a portable multifunction device, an icon for a web-clip widget (e.g., 149-6-7, FIG. 6E) is displayed (7002). The web-clip widget corresponds to a user-specified area of a web page (e.g., block 3914-5, FIG. 6A).

In some embodiments, the icon is displayed (7004) in a menu or list of icons. In some embodiments, the menu or list of icons comprises a menu or list of applications and widgets (e.g., UI 400A, FIG. 4A) on the multifunction device. In some embodiments, the menu or list of icons comprises a menu or list of widgets on the multifunction device. In some embodiments, the menu or list of icons comprises a menu or list of user-created widgets (e.g., UI 400B or 400C, FIG. 4B or 4C) on the multifunction device.

In some embodiments, the user-specified area was previously selected by translating and scaling (7006) a displayed portion of the web page. In some embodiments, the user-specified area was previously selected by centering and enlarging (7008) a displayed portion of the web page. Examples of finger gestures used to translate, scale, center, and/or enlarge an area in the web page include a tap gesture 3923 or 3925 to center and enlarge a block (FIG. 5A); a tap gesture 3927 or 3935 to center an adjacent enlarged block; a multi-touch depinching gesture (3931 and 3933, FIG. 5C) to enlarge the web page; a multi-touch pinching gesture (not shown) to reduce the web page; swipe gestures such as a substantially vertical swipe 3937, an upward or diagonal swipe 3939, and/or other swipe gestures (not shown) to translate the web page; and/or a multi-touch rotation gesture (3941 and 3943, FIG. 5C) to select a portrait or landscape view.

An activation of the icon is detected (7010). In some embodiments, a finger gesture (e.g., a tap gesture 606, FIG. 6E) is detected (7012) on the icon.

In response to detecting activation of the icon, the user-specified area of the web page is displayed (7014). For example, in response to activation of the icon for the web-clip widget 149-6-7 (FIG. 6E), block 3914-5 is displayed (FIG. 6A).

The process 7000 allows a user to view a specified area in a web page upon activation of the corresponding icon. The user thus is spared from having to enlarge and center the area of the web page that is of interest, such as a particular block of interest, each time the user visits the web page.

Icon Display and Interface Reconfiguration

FIGS. 8A-8D illustrate exemplary user interfaces for displaying icons in accordance with some embodiments. FIGS. 9A and 9B are flow diagrams of an icon display process 900 in accordance with some embodiments. The process is performed by a computing device with a touch screen display (e.g., portable multifunction device 100). The process provides a simple intuitive way for a user to view a large number of icons (e.g., multiple pages of application icons and web-clip widget icons) on a touch screen display.

Figure 8A:
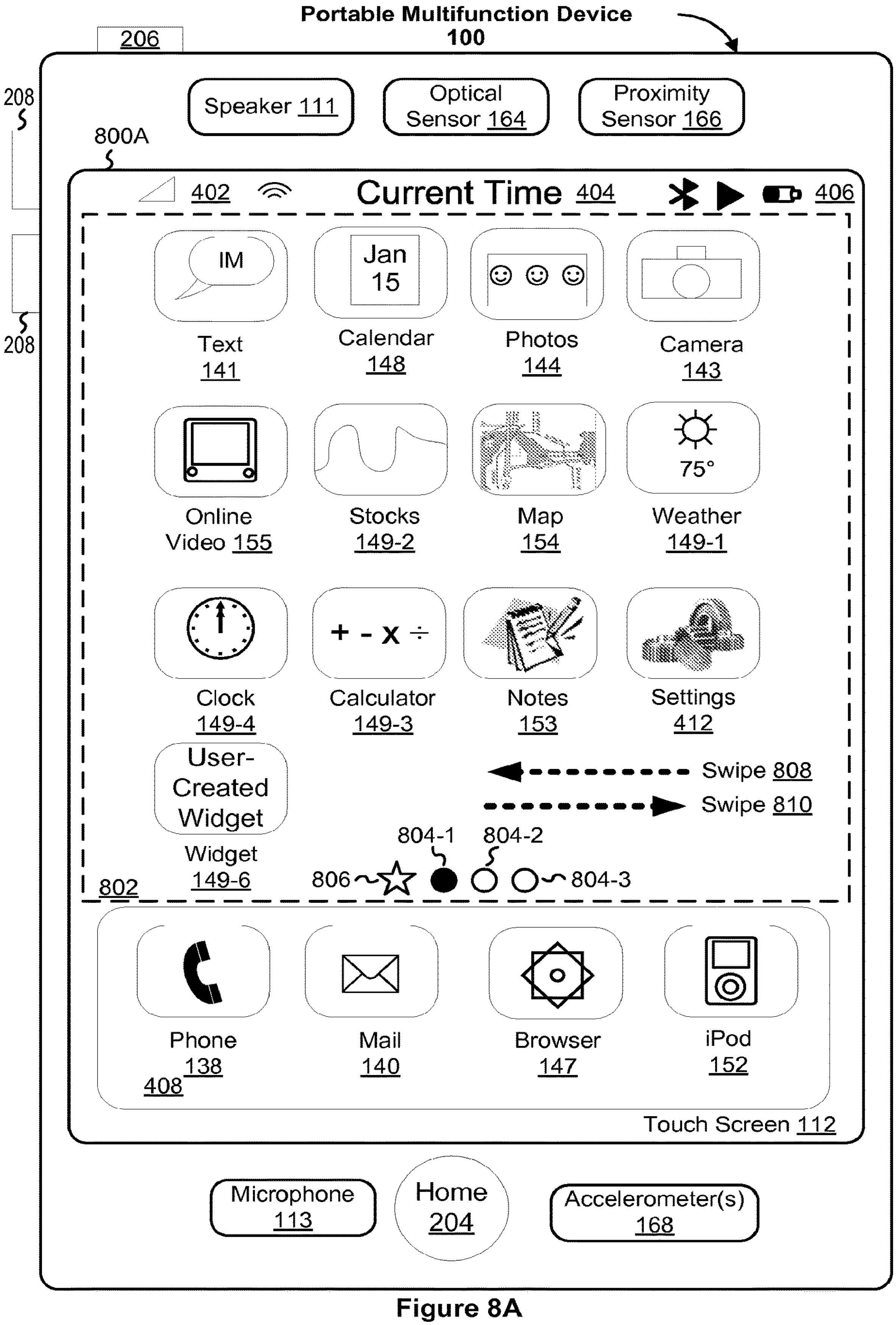
FIGS. 8A-8D illustrate exemplary user interfaces for displaying icons in accordance with some embodiments.

The computing device displays (902) a first set of a first plurality of icons in a first area of the touch screen display (e.g., area 802, FIG. 8A). The first plurality of icons includes a plurality of sets of icons that are separately displayed in the first area of the touch screen display. For example, in FIGS. 8A-8C, icons 141, 148, 144, 143, 155, 149-2, 154, 149-1, 149-4, 149-3, 153, 412, 149-6, 149-6-1, 149-6-2, 149-6-3, 149-6-4, 149-6-5, 149-6-6, 149-6-7, 149-6-8, 149-6-9, 149-6-10, 149-6-11, 149-6-12, 149-6-13, 149-6-14, and 149-6-6 are a first plurality of icons in area 802. Icons 141, 148, 144, 143, 155, 149-2, 154, 149-1, 149-4, 149-3, 153, 412, and 149-6 form a first set in area 802 in FIG. 8A; icons 149-6-1, 149-6-2, 149-6-3, 149-6-4, 149-6-5, and 149-6-6 form a second set in area 802 in FIG. 8B; and icons 149-6-7, 149-6-8, 149-6-9, 149-6-10, 149-6-11, 149-6-12, 149-6-13, 149-6-14, and 149-6-15 form a third set in area 802 in FIG. 8C. In this context, "separately displayed" means when one of the sets is displayed, the other sets are not concurrently displayed, except possibly during a brief transition from one set of icons to the next (e.g., an animation). As this example illustrates, the first and second sets of the first plurality of icons are distinct sets of icons.

In some embodiments, the first plurality of icons includes a plurality of application launch icons, wherein in response to detecting activation of an application launch icon in the plurality of application icons, an application that corresponds to the activated application icon is launched and displayed. In some embodiments, the applications include a default set of applications, third-party applications, and/or web-clip widget applications. The application launch icons are not for issuing commands or subcommands with an application. Rather, they are for launching applications. If an application is already launched, then activation of the corresponding application launch icon results in display of the application.

In some embodiments, the first plurality of icons includes one or more web-clip widget icons (e.g., widget icon 149-6, FIG. 8A), wherein in response to detecting activation of a web-clip widget icon, a portion of a web page that corresponds to the activated web-clip widget icon is displayed.

The computing device displays (904) a second plurality of icons in a second area (e.g., tray 408, FIG. 8A) on the touch screen display while displaying icons in the first plurality of icons in the first area. For example, in FIGS. 8A-8C, application launch icons 138, 140, 147, and 152 are displayed in tray 408. The second area is different (e.g., visually distinct) from the first area. For example, tray 408 is different from area 802 in FIG. 8A. In some embodiments, the second plurality of icons correspond to applications or functions that are frequently used by a user.

In some embodiments, the second plurality of icons includes a plurality of application launch icons, wherein in response to detecting activation of an application icon in the plurality of application icons, an application that corresponds to the activated application icon is launched and/or displayed, as explained above. In some embodiments, the applications include a default set of applications, third-party applications, and/or web-clip widget applications.

The computing device detects (906) a first finger gesture on the touch screen display in the first area. In some embodiments, the first finger gesture is a swipe gesture (e.g., swipe 808, FIG. 8A). In some embodiments, the swipe gesture is a horizontal (or substantially horizontal) swipe gesture on the touch screen display, from left to right or from right to left on the touch screen display. In some embodiments, the swipe gesture is a vertical (or substantially vertical) swipe gesture on the touch screen display.

Figure 8B:
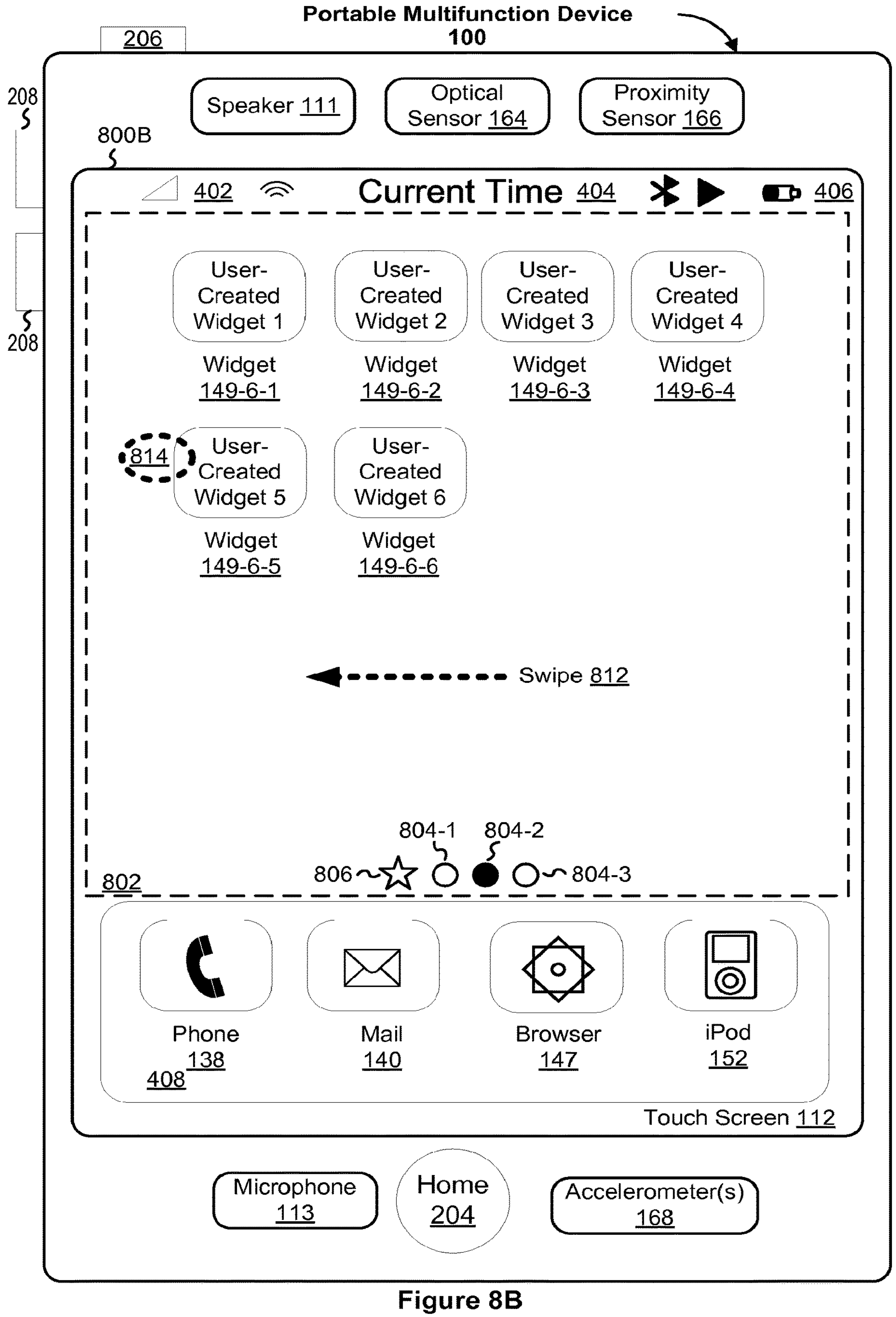
Figure 8C:
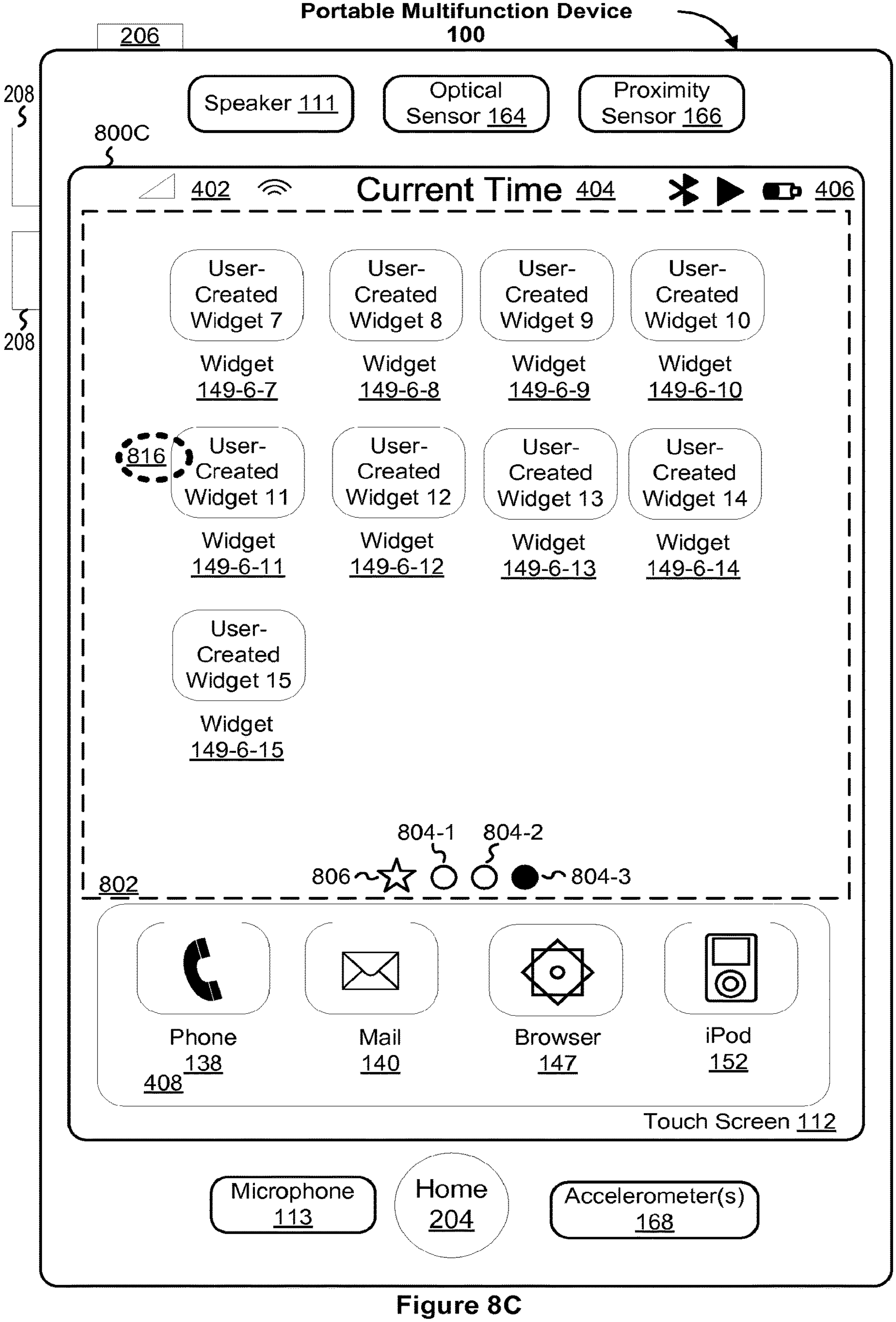
Figure 8D:
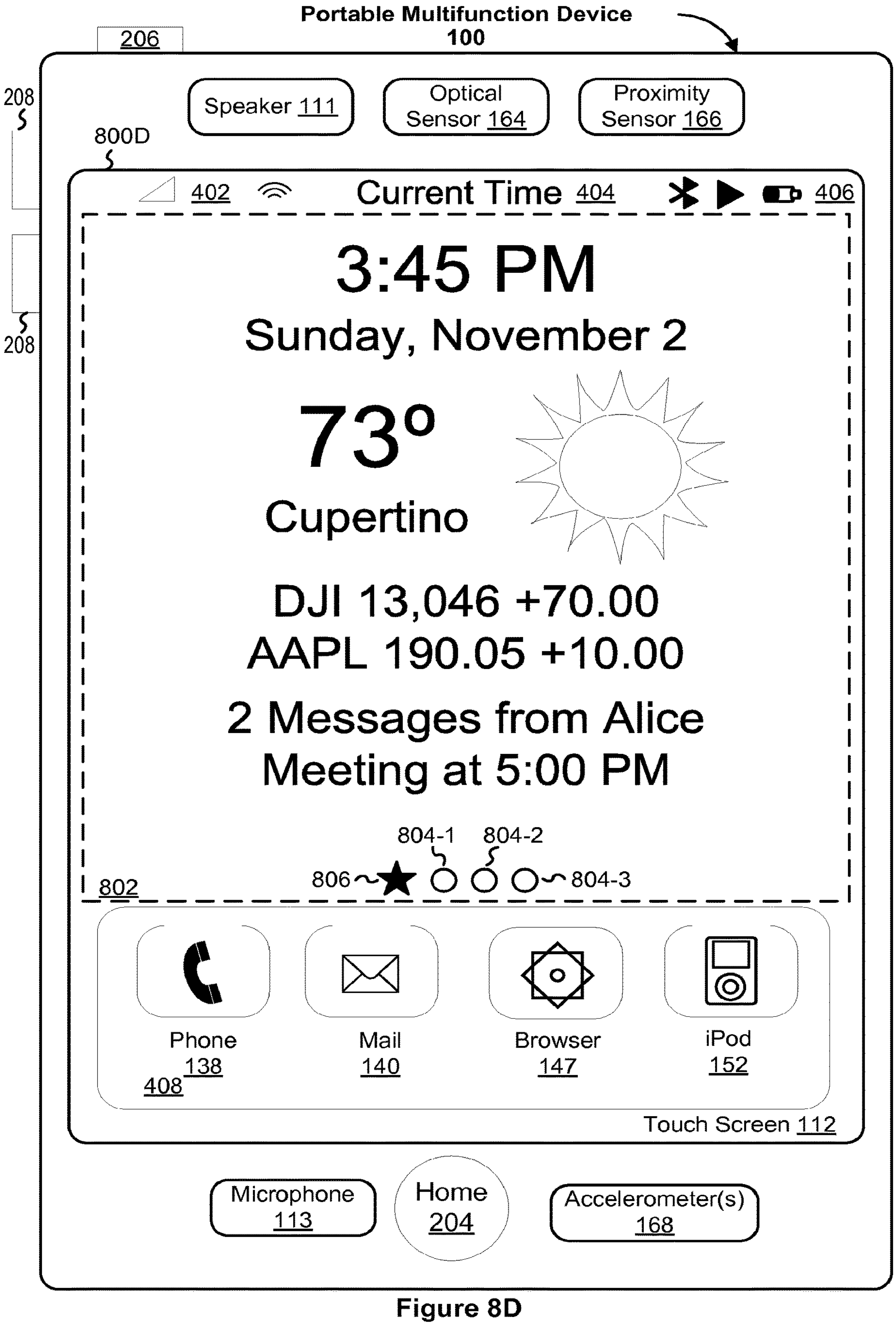
Figure 9A:
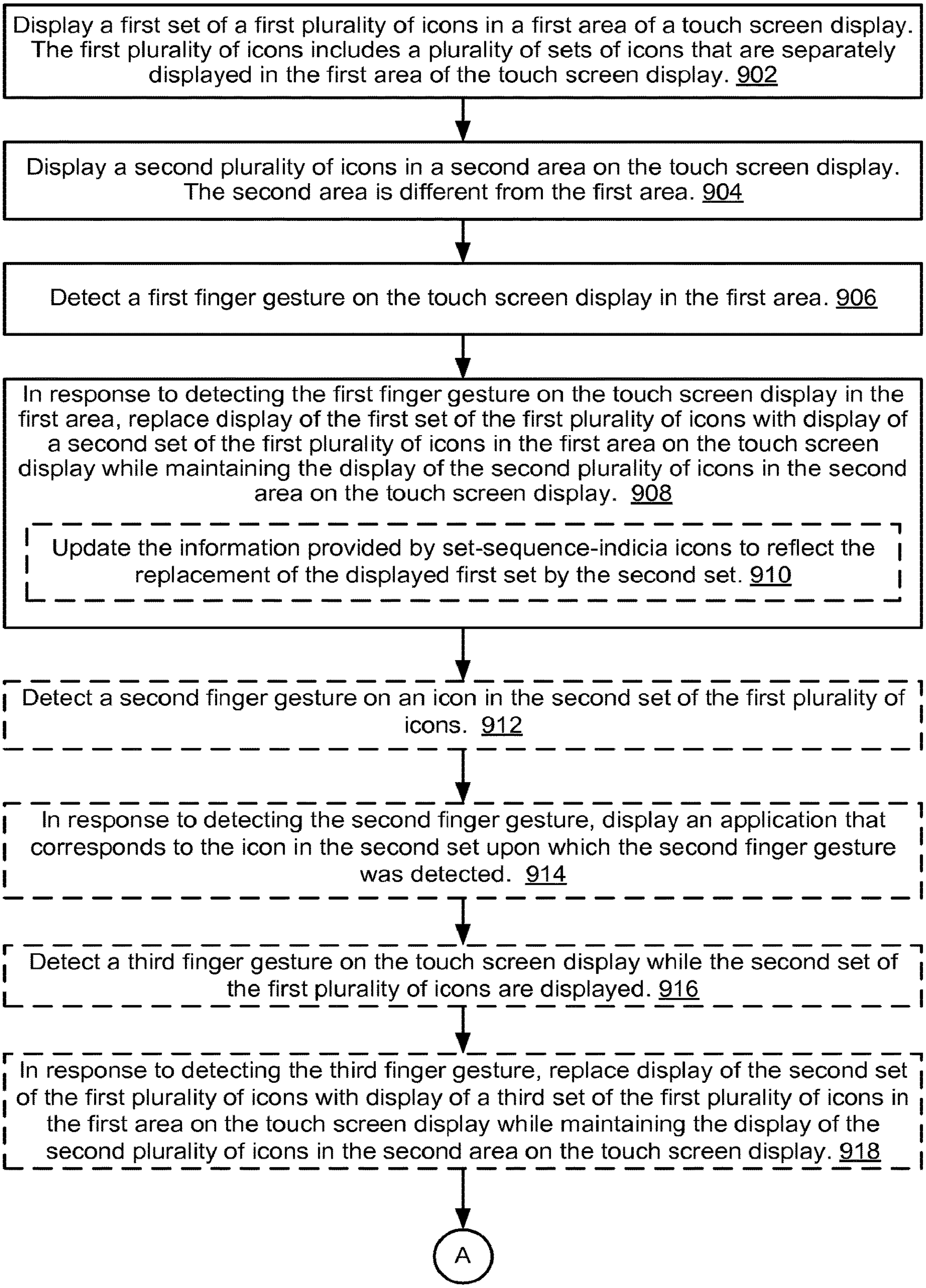
FIGS. 9A and 9B are flow diagrams of an icon display process in accordance with some embodiments.
Figure 9B:
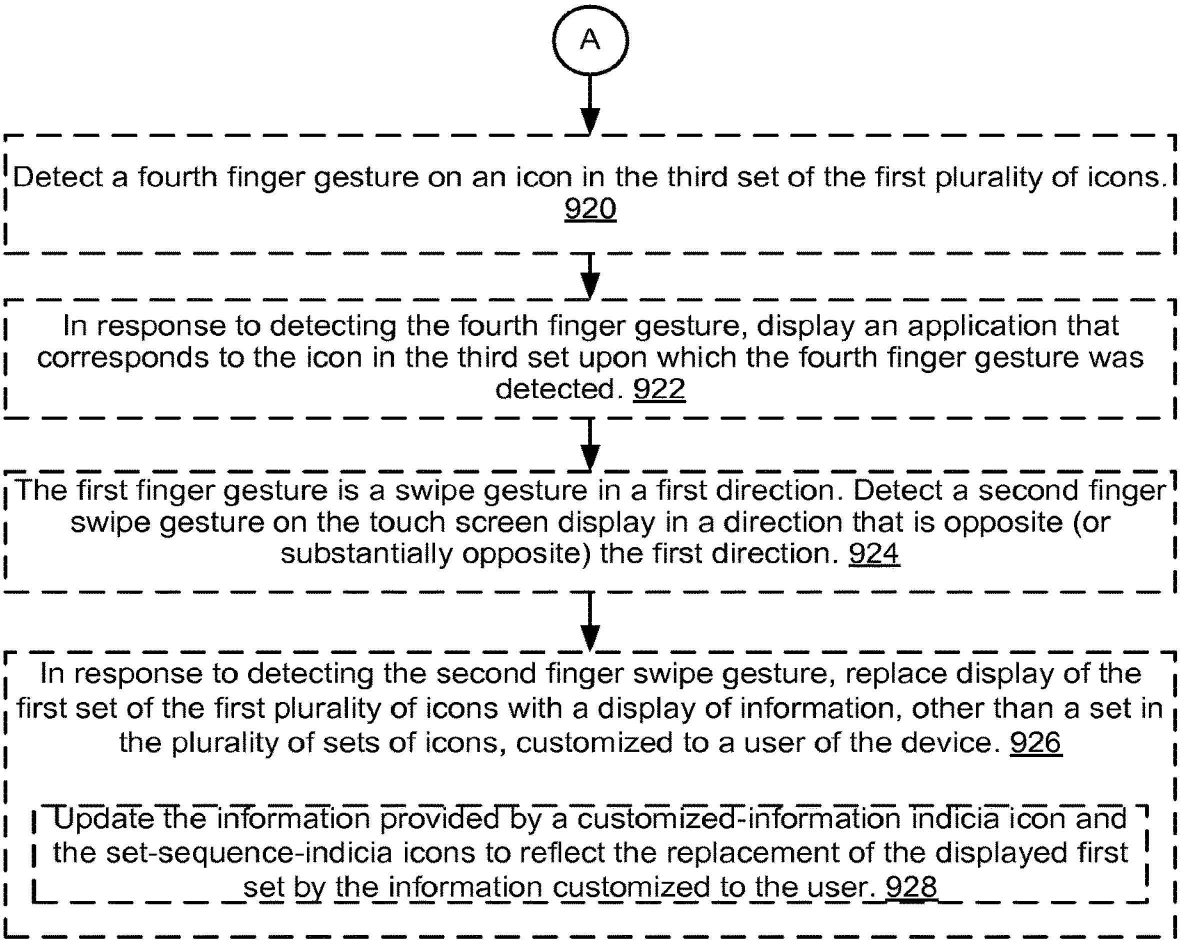

In response to detecting the first finger gesture on the touch screen display in the first area, the computing device replaces (908) display of the first set of the first plurality of icons with display of a second set of the first plurality of icons in the first area on the touch screen display while maintaining the display of the second plurality of icons in the second area on the touch screen display. For example, in response to swipe 808, 1.11 800A (FIG. 8A) transitions to UI 800B (FIG. 8B). The first set of icons (141, 148, 144, 143, 155, 149-2, 154, 149-1, 149-4, 149-3, 153, 412, and 149-6 in area 802, FIG. 8A) are replaced by a second set of icons (149-6-1, 149-6-2, 149-6-3, 149-6-4, 149-6-5, and 149-6-6 in area 802, FIG. 8B) while the display of the second plurality of icons (138, 140, 147, and 152) is maintained.

In some embodiments, replacing display of the first set of the first plurality of icons with display of a second set of the first plurality of icons in the first area on the touch screen display comprises an animation that moves the first set out of the first area and the second set into the first area.

In some embodiments, the plurality of sets of icons includes a number of sets of icons that are configured to be separately displayed as a sequence of sets of icons in the first area of the touch screen display. In some embodiments, the computing device displays two or more set-sequence-indicia icons (e.g., icons 804-1, 804-2, and 804-3 in FIGS. 8A-8D). The set-sequence-indicia icons provide information about the number of sets of icons in the plurality of sets of icons and a position of a displayed set of icons in the sequence of sets of icons. In response to detecting the first finger gesture, the computing device updates (910) the information provided by the set-sequence-indicia icons to reflect the replacement of the displayed first set by the second set. For example, set-sequence-indicia icons 804-1, 804-2, and 804-3 in FIGS. 8A-8D indicate that there are three sets of icons in the plurality of sets of icons. The set-sequence-indicia icons 804-1, 804-2, and 804-3 also indicate a position of a displayed set of icons in the sequence of sets of icons. For example, the set-sequence-indicia icons are displayed in a sequence, with the icon that corresponds to the set that is currently displayed being visually distinguished from the other set-sequence-indicia icons (e.g., icon 804-1 is darkened in FIG. 8A when the first set is displayed, icon 804-2 is darkened in FIG. 8B when the second set is displayed, and icon 804-3 is darkened in FIG. 8C when the third set is displayed).

In some embodiments, the computing device detects (912) a second finger gesture on an icon in the second set of the first plurality of icons. In response to detecting the second finger gesture, the computing device displays (914) an application that corresponds to the icon in the second set upon which the second finger gesture was detected. For example, in response to a finger tap gesture 814 (FIG. 8B), user-created widget 149-6-5 is displayed.

In some embodiments, the computing device detects (916) a third finger gesture on the touch screen display while the second set of the first plurality of icons are displayed. In response to detecting the third finger gesture, the computing device replaces (918) display of the second set of the first plurality of icons with display of a third set of the first plurality of icons in the first area on the touch screen display while maintaining the display of the second plurality of icons in the second area on the touch screen display. For example, in response to detecting swipe 812 (FIG. 8B), the computing device replaces (918) display of the second set of the first plurality of icons (icons 149-6-1, 149-6-2, 149-6-3, 149-6-4, 149-6-5, and 149-6-6, FIG. 8B) with display of a third set of the first plurality of icons (icons 149-6-7, 149-6-8, 149-6-9, 149-6-10, 149-6-11, 149-6-12, 149-6-13, 149-6-14, and 149-6-15, FIG. 8C) in area 802 on the touch screen display while maintaining the display of the second plurality of icons in the second area on the touch screen display (icons 138, 140, 147, and 152 in tray 408).

In some embodiments, the computing device detects (920) a fourth finger gesture on an icon in the third set of the first plurality of icons. In response to detecting the fourth finger gesture, the computing device displays (922) an application that corresponds to the icon in the third set upon which the fourth finger gesture was detected. For example, in response to a finger tap gesture 816 (FIG. 8C), user-created widget 149-6-11 is displayed.

In some embodiments, the first finger gesture is a swipe gesture in a first direction and the computing device detects (924) a second finger swipe gesture on the touch screen display in a direction that is opposite (or substantially opposite) the first direction. In response to detecting the second finger swipe gesture, the computing device replaces (926) display of the first set of the first plurality of icons with a display of information, other than a set in the plurality of sets of icons, customized to a user of the device. In some embodiments, the customized information includes: local time, location, weather, stocks, calendar entries, and/or recent messages for the user. For example, in response to detecting finger swipe gesture 810 (FIG. 8A), the computing device replaces (926) display of the first set of the first plurality of icons (icons 141, 148, 144, 143, 155, 149-2, 154, 149-1, 149-4, 149-3, 153, 412, and 149-6, FIG. 8A) with a display of information, other than a set in the plurality of sets of icons, customized to a user of the device (e.g., local time, location, weather, stocks, calendar entries, and recent messages for the user in area 802, FIG. 8D).

In some embodiments, the first finger gesture is a swipe gesture (e.g., swipe 808, FIG. 8A) in a first direction and the computing device detects (924) a second finger swipe gesture (e.g., swipe 810, FIG. 8A) on the touch screen display in a direction that is opposite (or substantially opposite) the first direction. In response to detecting the second finger swipe gesture, the computing device replaces (926) display of the first set of the first plurality of icons with a display of information, other than a set in the plurality of sets of icons, customized to a user of the device, and updates (928) the information provided by a customized-information indicia icon (e.g., icon 806, FIGS. 8A-8D) and the set-sequence-indicia icons (e.g., icons 804) to reflect the replacement of the displayed first set by the information customized to the user (e.g., icon 806 is darkened in FIG. 8D and none of the set-sequence-indicia icons 804 are darkened). In some embodiments, the customized-information indicia icon and the set-sequence-indicia icons have the same visual appearance (e.g., all are circles, not shown). In some embodiments, the customized-information indicia icon and the set-sequence-indicia icons are visually distinct (e.g., the customized-information indicia icon 806 is a star and the set-sequence-indicia icons 804 are circles). In some embodiments, the customized-information indicia icon 806 and the set-sequence-indicia icons 804 are adjacent to each other (e.g., as shown in FIGS. 8A-8D).

Attention is now directed towards interface reconfiguration. In response to a user initiating an interface reconfiguration mode, positions of one or more icons displayed on the portable device may be varied about respective average positions. The varying of the positions of the one or more icons may include animating the one or more icons to simulate floating of the one or more icons on a surface corresponding to a surface of a display in the portable device. The display may be a touch-sensitive display, which responds to physical contact by a stylus or one or more fingers at one or more contact points. While the following embodiments may be equally applied to other types of displays, a touch-sensitive display is used as an illustrative example.

The varying of the positions of the one or more icons may intuitively indicate to the user that the positions of the one or more icons may be reconfigured by the user. The user may modify, adapt and/or reconfigure the positions of the one or more icons. In embodiments where the portable device includes a touch-sensitive display, the user may make contact with the touch-sensitive display proximate to a respective icon at a first position. Upon making contact with the touch-sensitive display, the respective icon may cease varying its position. The user may drag the respective icon to a second position. Upon breaking contact with the touch-sensitive display, the respective icon may resume varying its position. In some embodiments, the respective icon can be "thrown," so that the final position of the respective icon is different from the point at which the icon is released. In this embodiment, the final position can depend on a variety of factors, such as the speed of the "throw," the parameters used in a simulated equation of motion for the "throw" (e.g., coefficient of friction), and/or the presence of a lay out grid with simulated attractive forces. In some embodiments, the display may include two regions. During the interface reconfiguration mode, positions of one or more icons displayed in the first region may be varied while positions of one or more icons displayed in the second region may be stationary.

The user may similarly modify, adapt and/or reconfigure the positions of additional icons during the interface reconfiguration mode. When the user has completed these changes (at least for the time being), he or she may terminate the interface reconfiguration mode. In response to this user action, the portable device may return to a normal mode of operation and the varying of the displayed positions of the one or more icons will cease.

The user may initiate or terminate the interface reconfiguration process by selecting one or more appropriate physical buttons on the portable device (e.g., menu button 204, FIG. 2), by a gesture (such as making contact and swiping one or more fingers across the touch-sensitive display or making contact and holding for more than a predefined time period) and/or by selecting one or more soft buttons (such as one or more icons that are displayed on the touch-sensitive display). As used herein, a gesture is a motion of the object/appendage making contact with the touch screen display surface. Exemplary gestures include finger tap gestures and finger swipe gestures. In some embodiments, the interface reconfiguration process terminates a predefined time after the interface reconfiguration process is initiated, i.e., there is a time out.

The one or more icons displayed on the portable device may be graphical objects. In some embodiments, the one or more icons may be on-screen representations of controls that may be manipulated by the user, such as bars, buttons and text boxes. In some embodiments, the one or more icons correspond to application programs (email, browser, address book, etc.) and/or web-clip widgets that may be selected by the user by contacting the touch-sensitive display proximate to an icon of interest.

Figure 10:
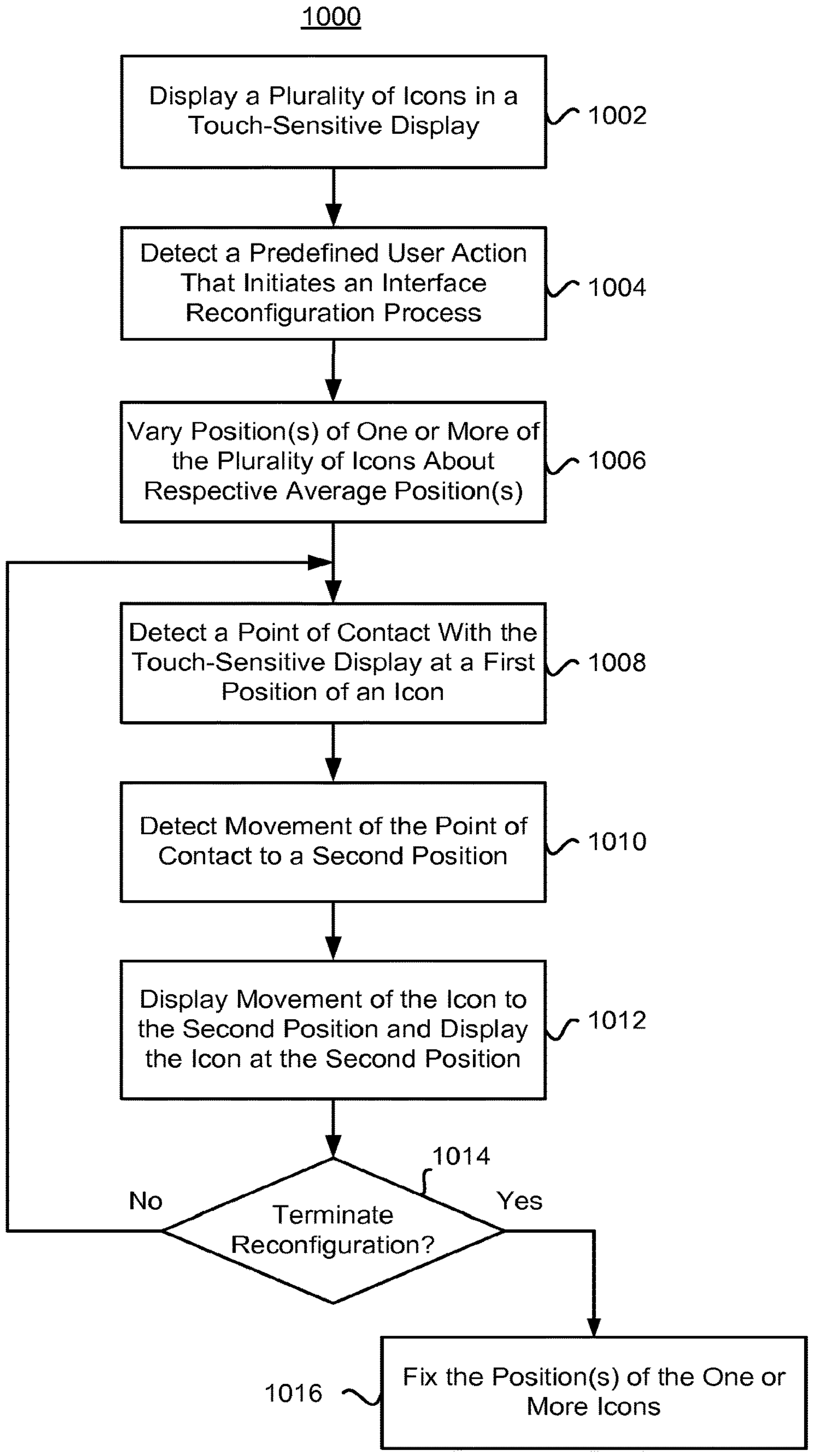
FIG. 10 is a flow diagram of a position adjustment process for a portable multifunction device in accordance with some embodiments.

FIG. 10 is a flow diagram of a position adjustment process 1000 for a portable multifunction device in accordance with some embodiments. While the position adjustment process 1000 described below includes a number of operations that appear to occur in a specific order, it should be apparent that the process 1000 can include more or fewer operations, which can be executed serially or in parallel (e.g., using parallel processors or a multi-threading environment), an order of two or more operations may be changed and/or two or more operations may be combined into a single operation.

In the position adjustment process 1000, a plurality of icons are displayed in a GUI in a touch-sensitive display (1002). A first predefined user action that initiates an interface reconfiguration process is detected (1004). Exemplary predefined user actions include selecting a physical button on the portable device, making a predefined gesture on the touch screen display surface, or selecting a soft button. Position(s) of one or more of the plurality of displayed icons are varied about respective average position(s) (1006). A point of contact with the touch-sensitive display at a first position of a respective icon is detected (1008). Movement of the point of contact to a second position is detected (1010). Movement of the respective icon to the second position is displayed and the respective icon is displayed at the second position (1012).

If a second predefined user action that terminates the interface reconfiguration process is detected (1014—yes), the position(s) of the one or more icons is fixed (1016). Exemplary predefined user actions include selecting or deselecting a physical button on the portable device (e.g., menu button 204, FIG. 2), making another predefined gesture on the touch screen display surface, or selecting or deselecting a soft button. The fixed position(s) may correspond to a respective average position(s) for the one or more icons. If a second predefined user action that terminates the interface reconfiguration process is not detected (1014—no), the process may continue when a point of contact proximate to the same or another icon is detected (1008).

Figure 11A:
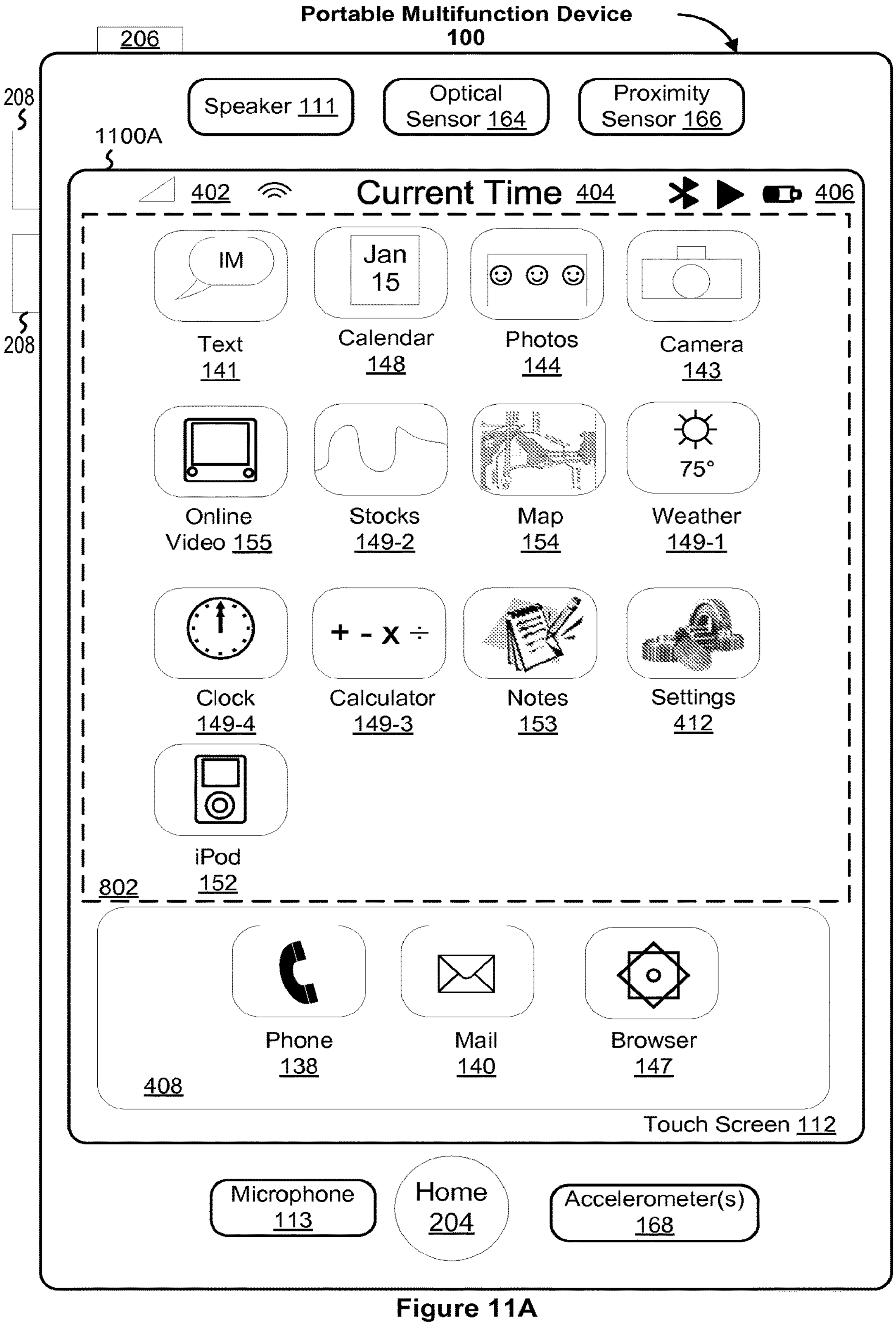
FIGS. 11A-11OO illustrate exemplary user interfaces during interface reconfiguration in accordance with some embodiments.
Figure 11B:
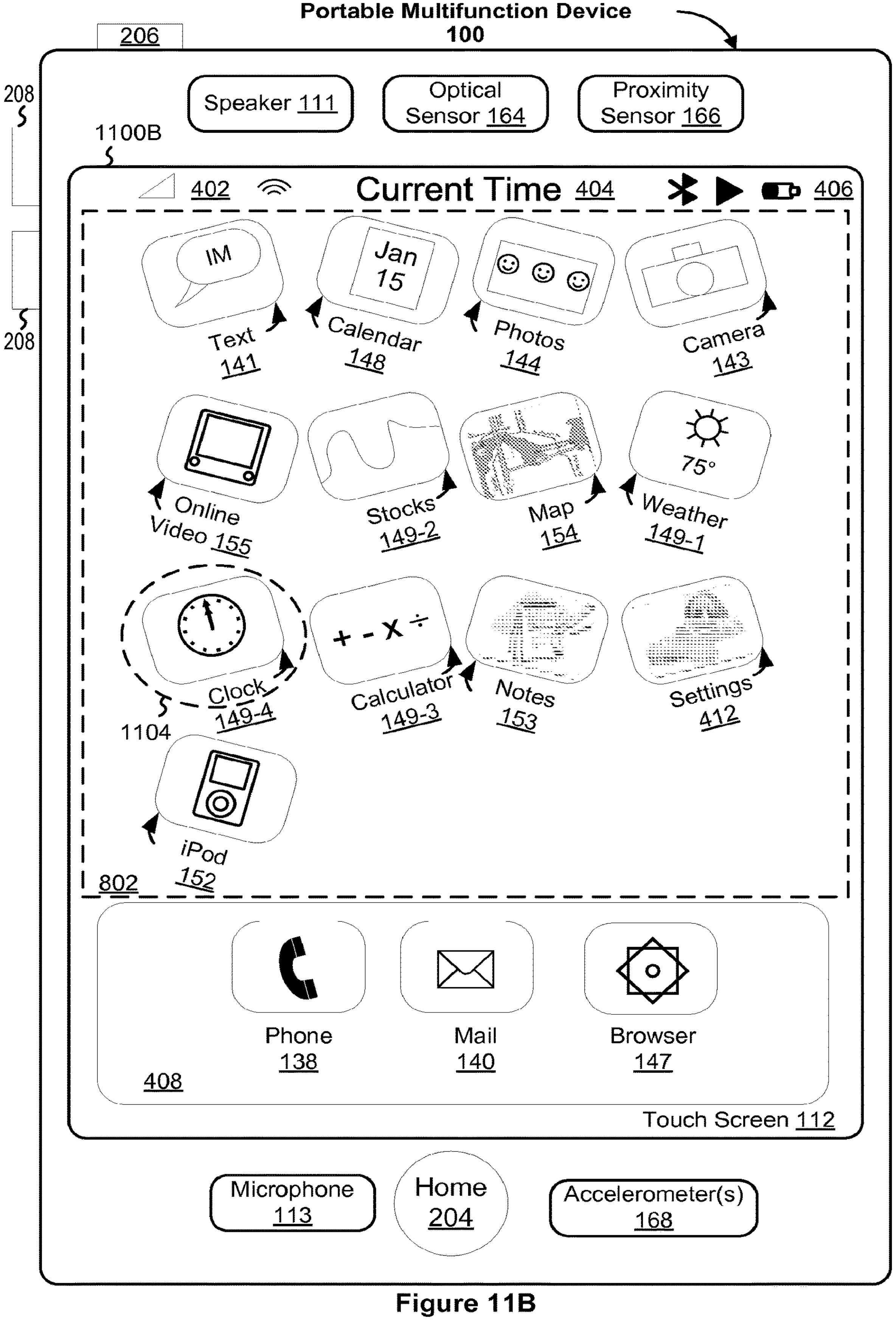
Figure 11C:
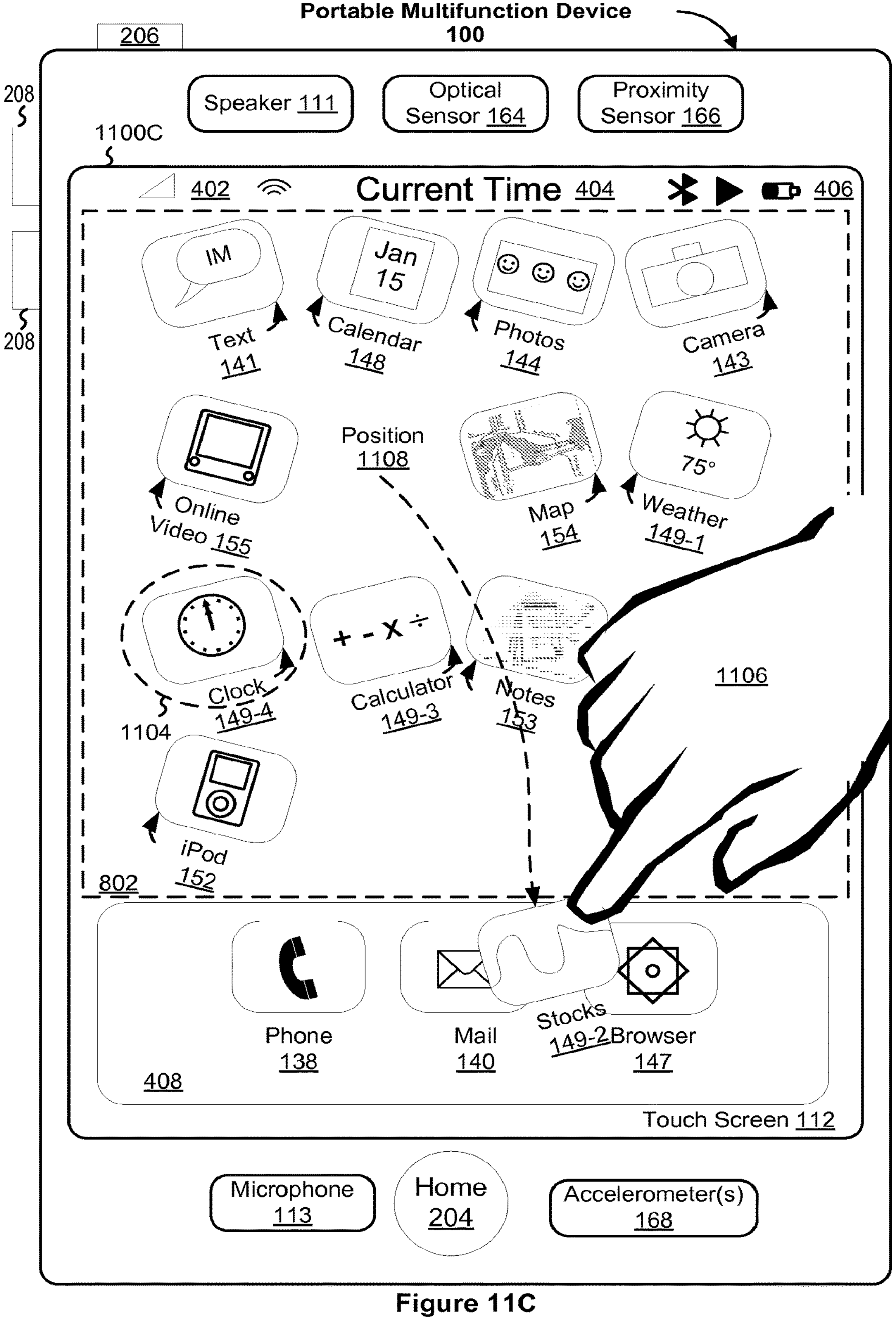
Figure 11D:
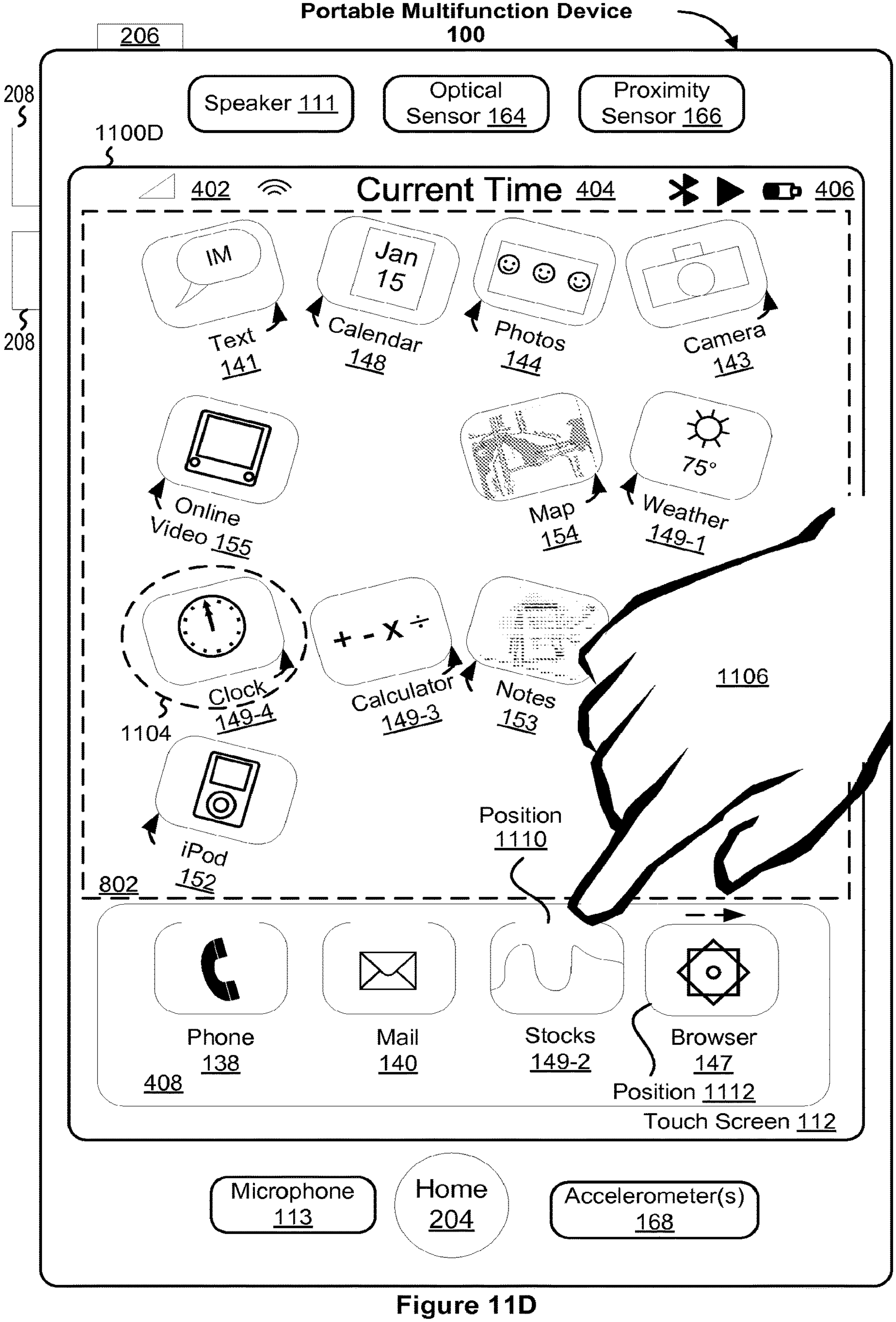
Figure 11E:
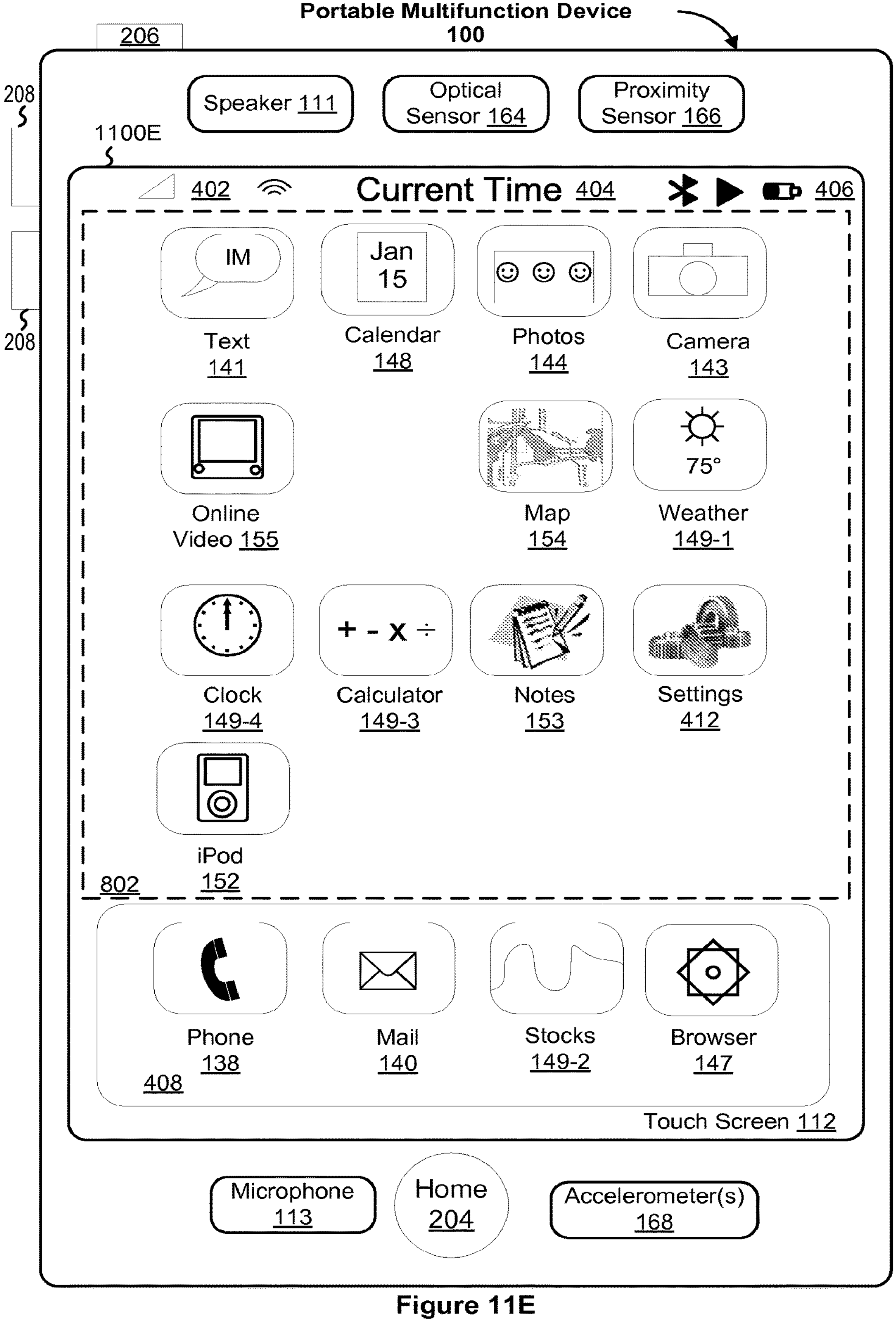
Figure 11F:
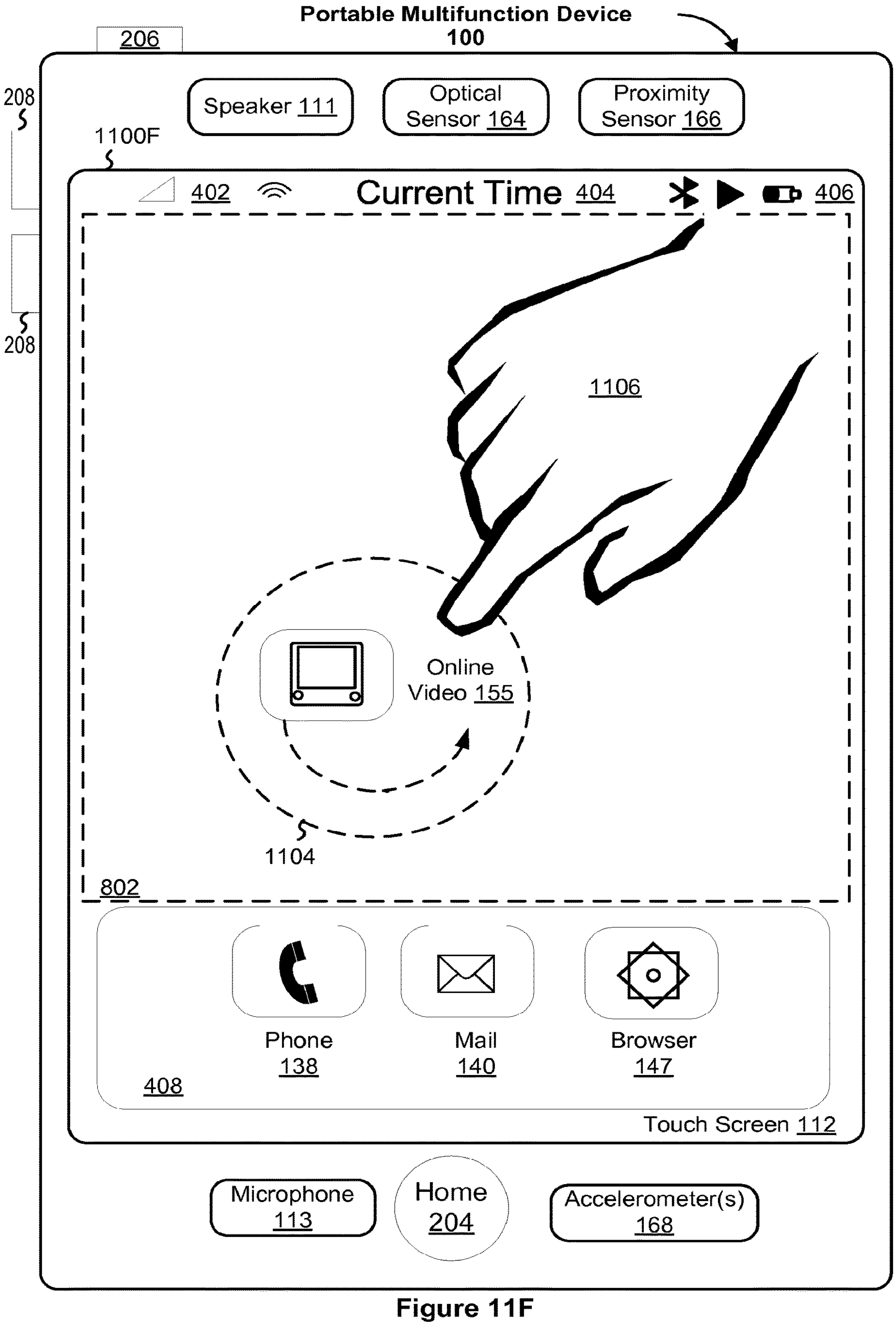
Figure 11G:
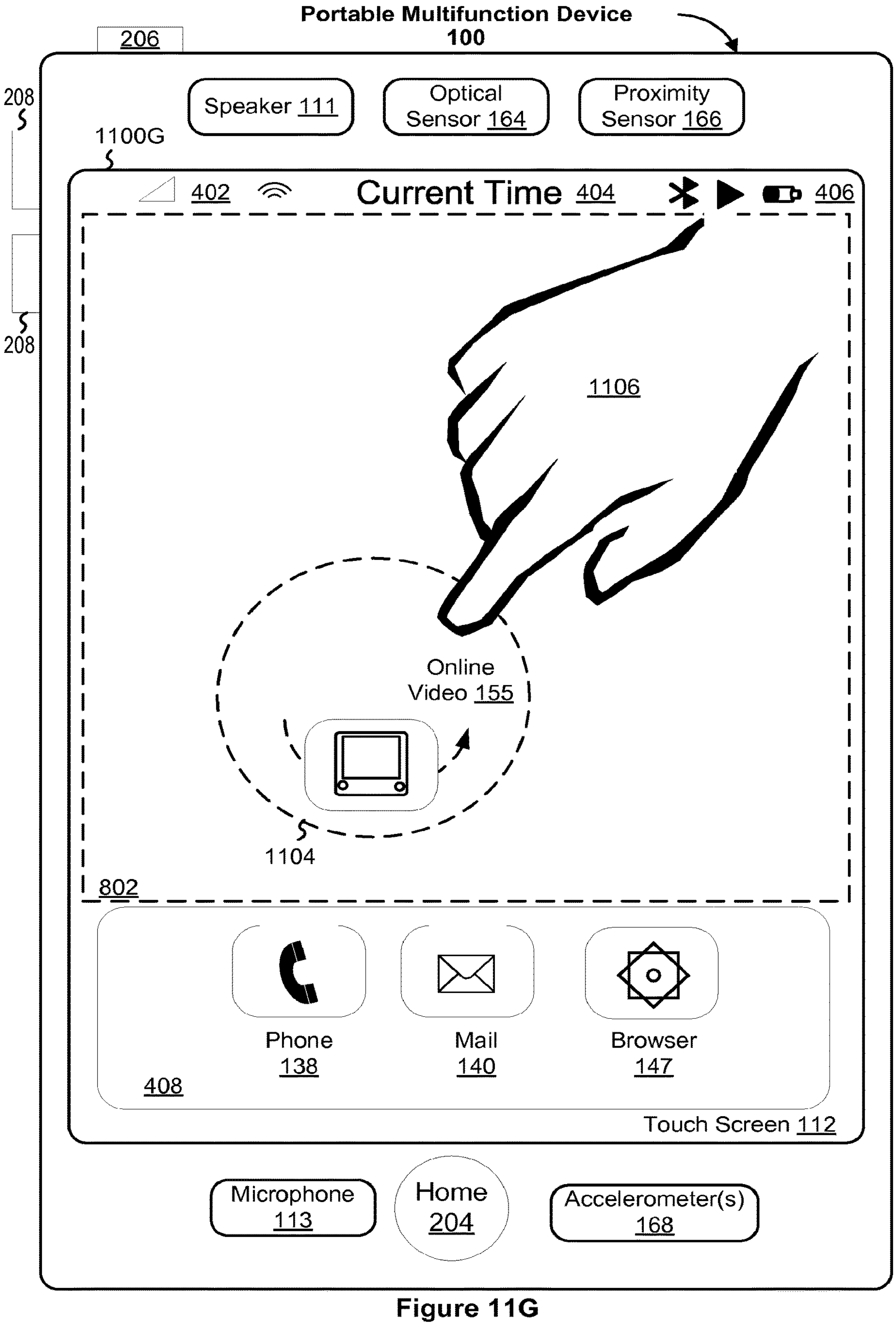
Figure 11H:
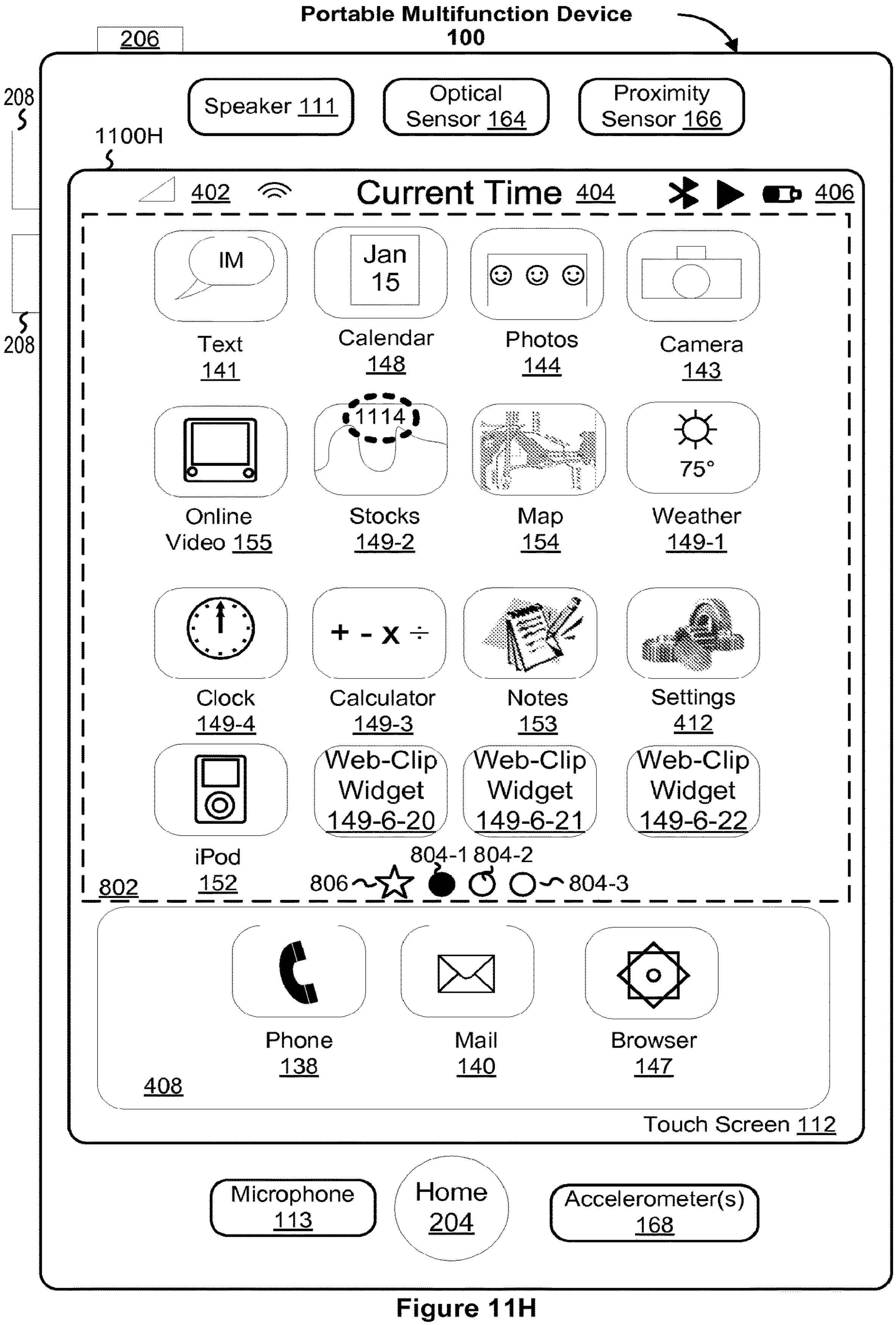
Figure 11I:
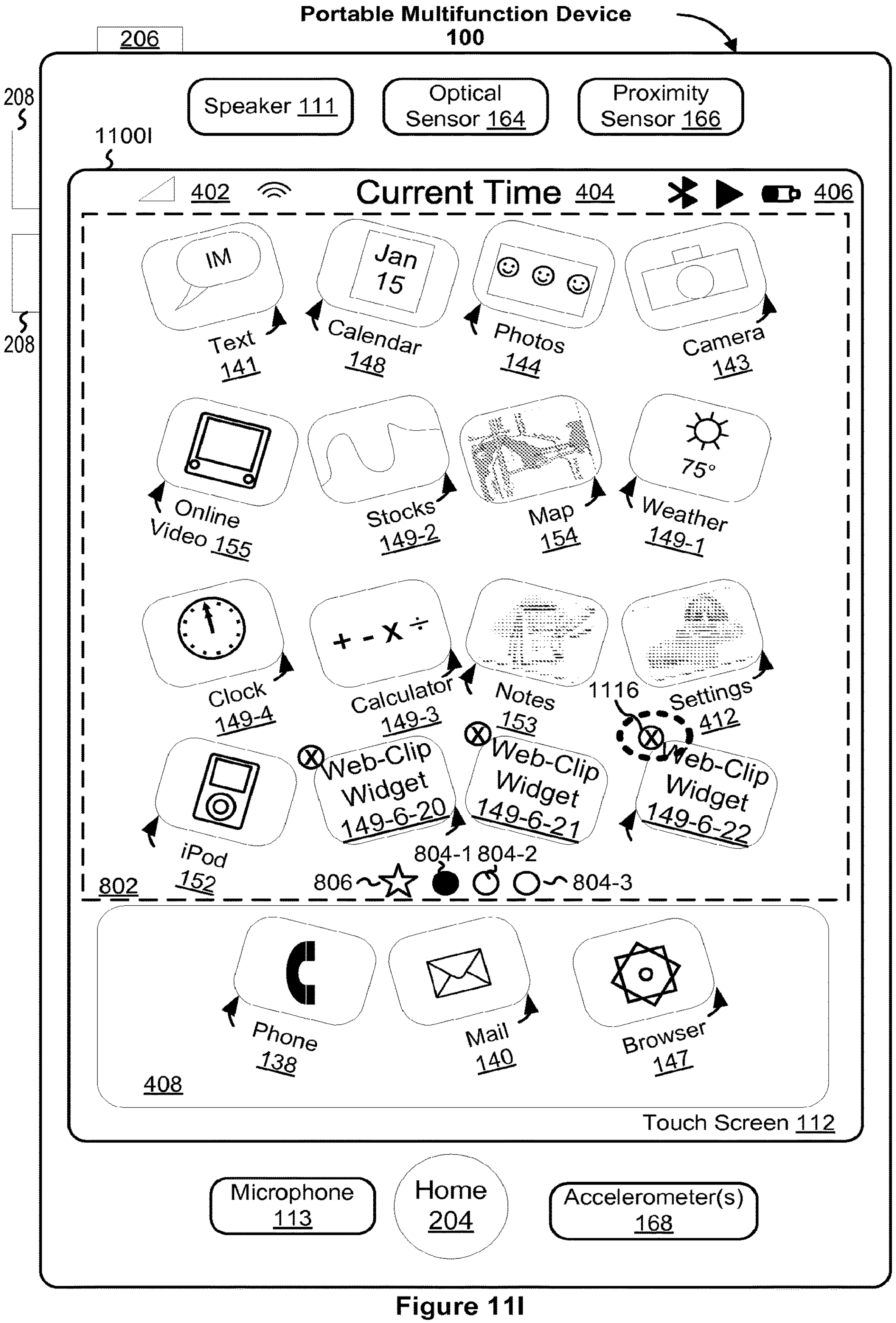
Figure 11J:
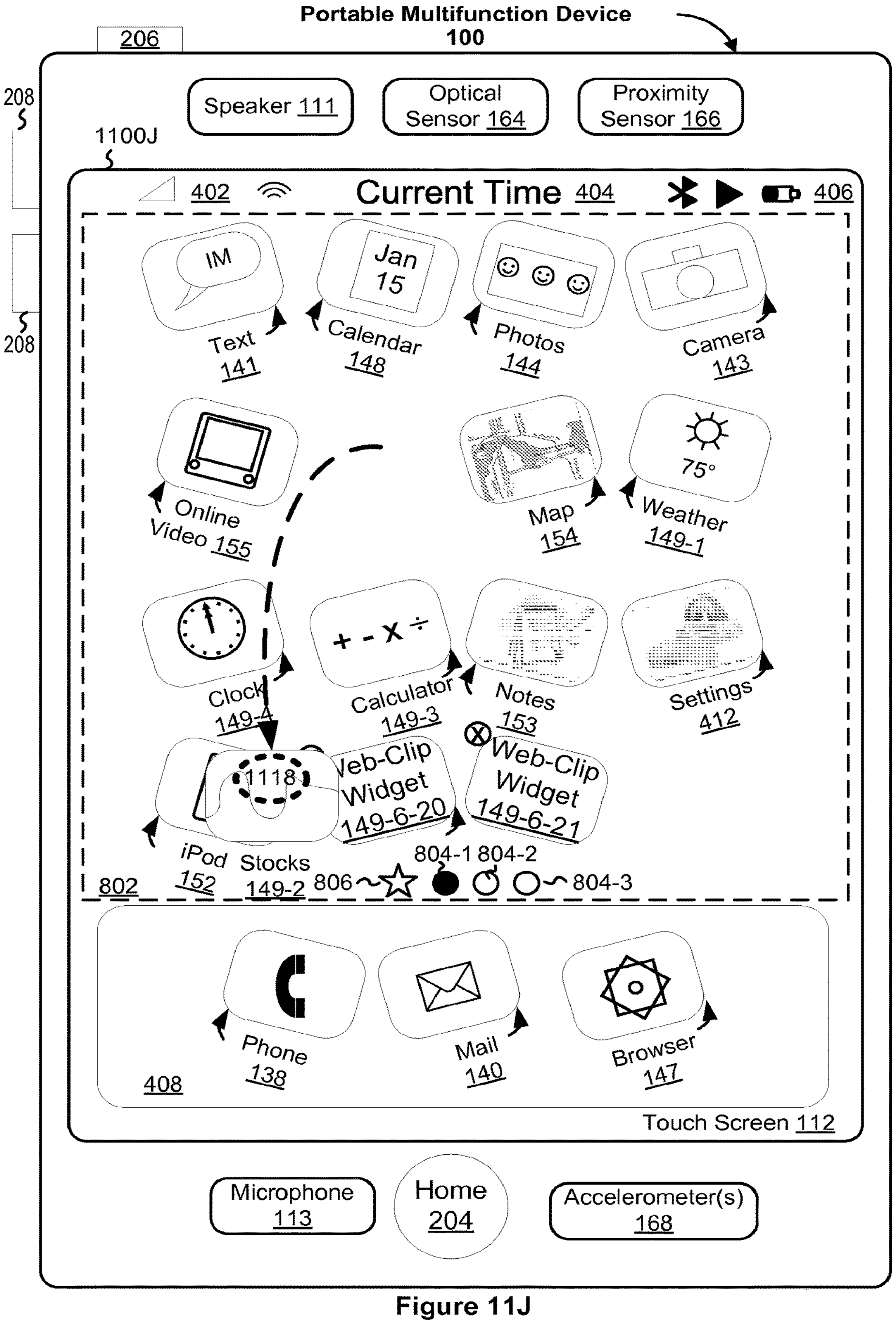
Figure 11K:
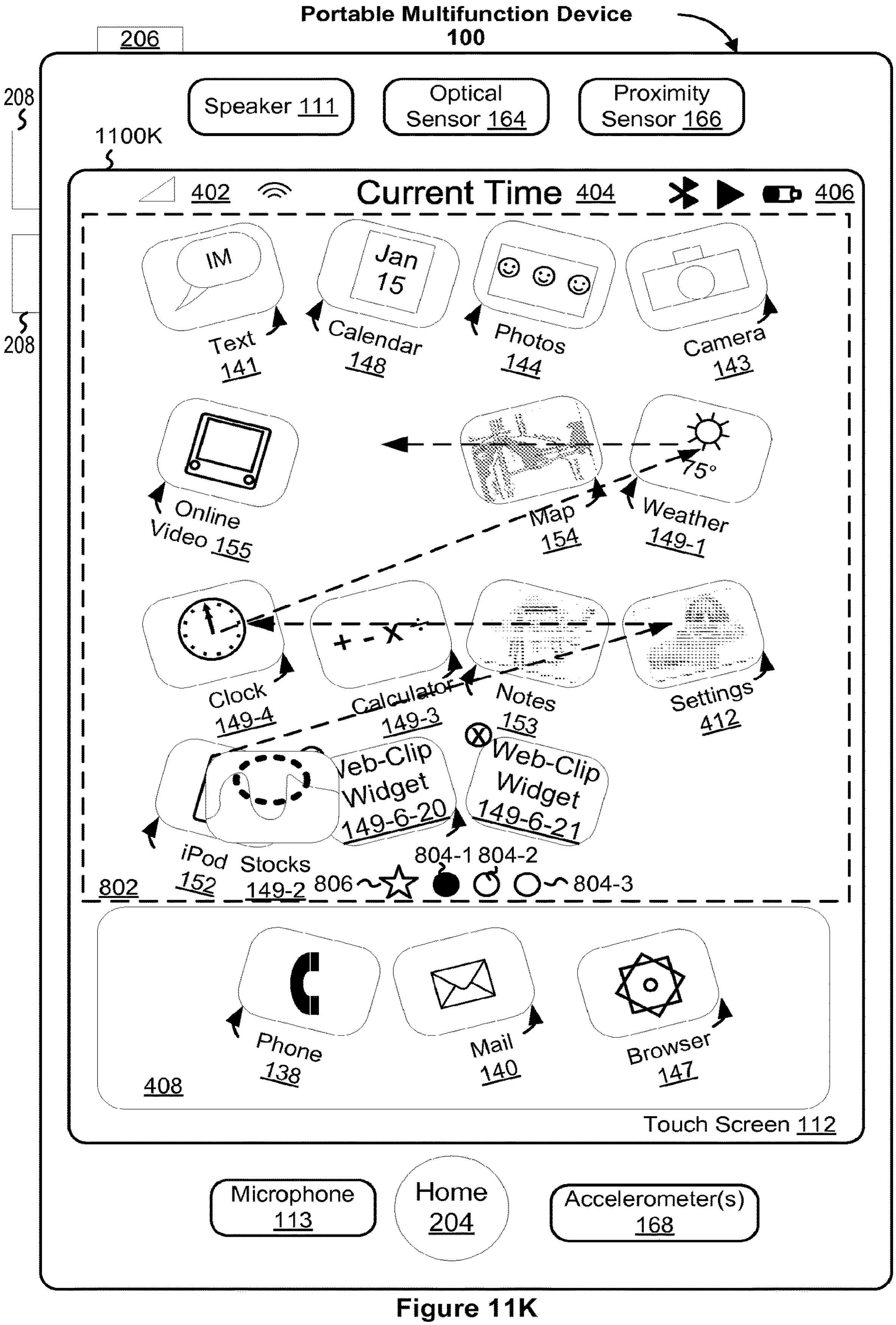
Figure 11L:
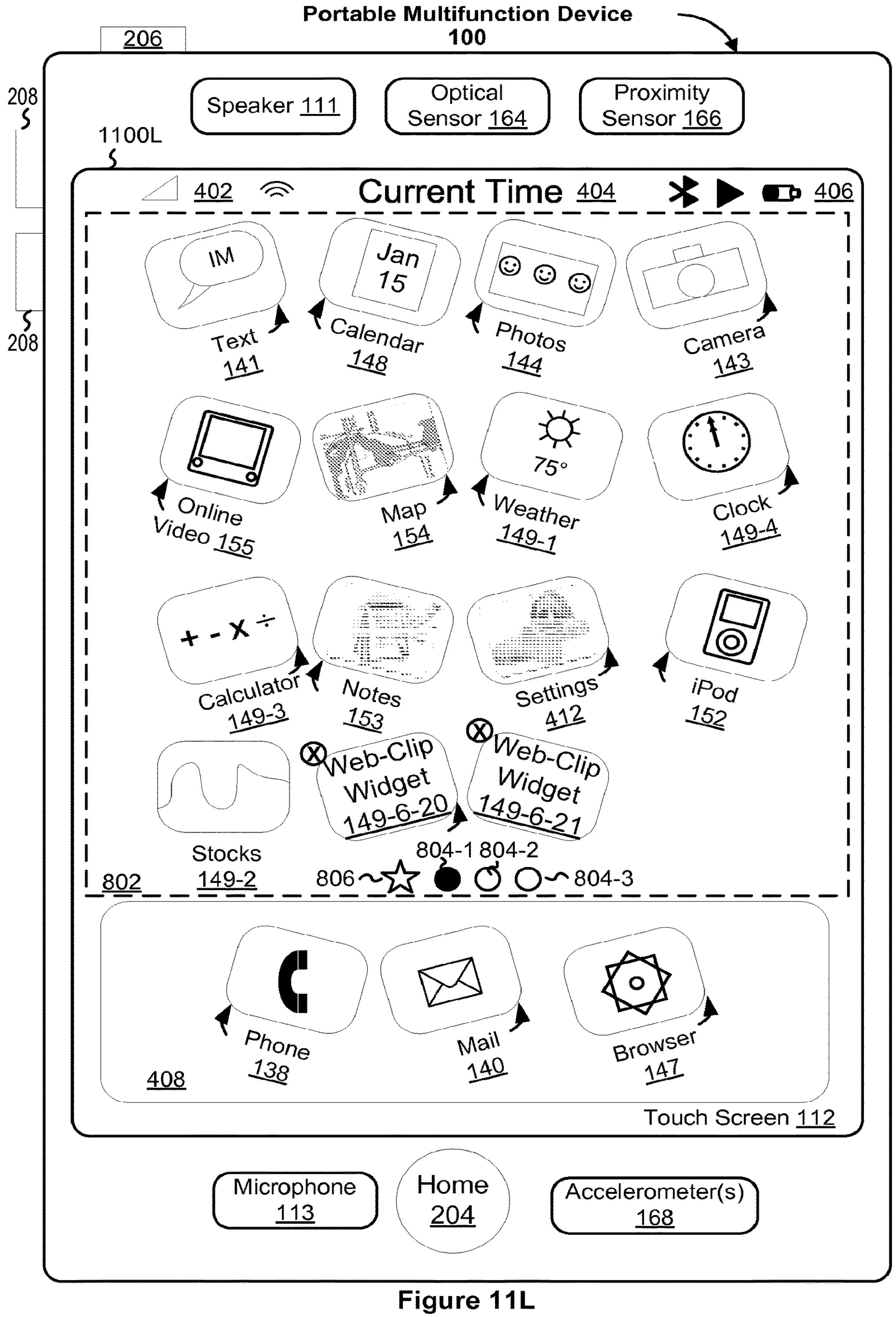
Figure 11M:
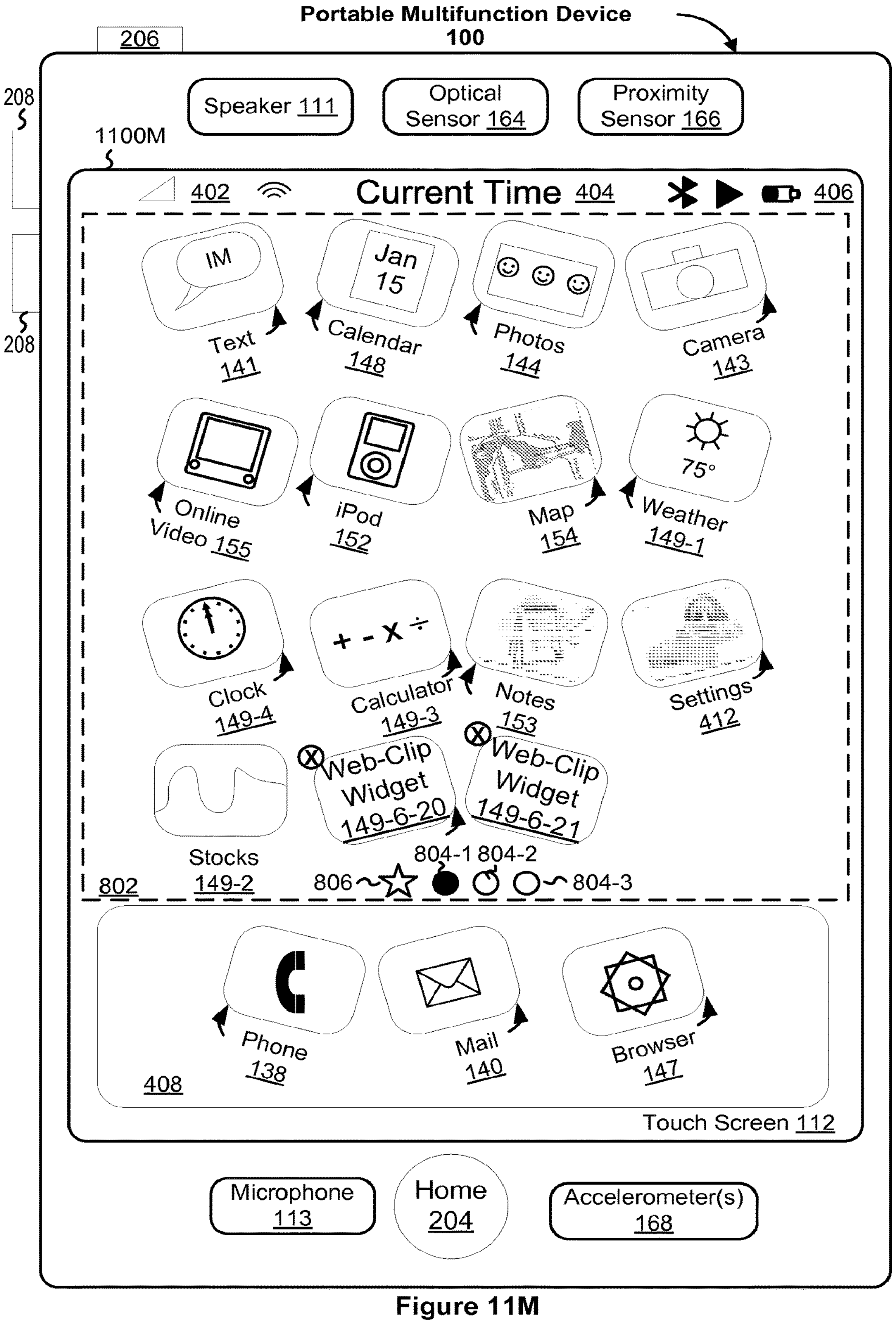
Figure 11N:
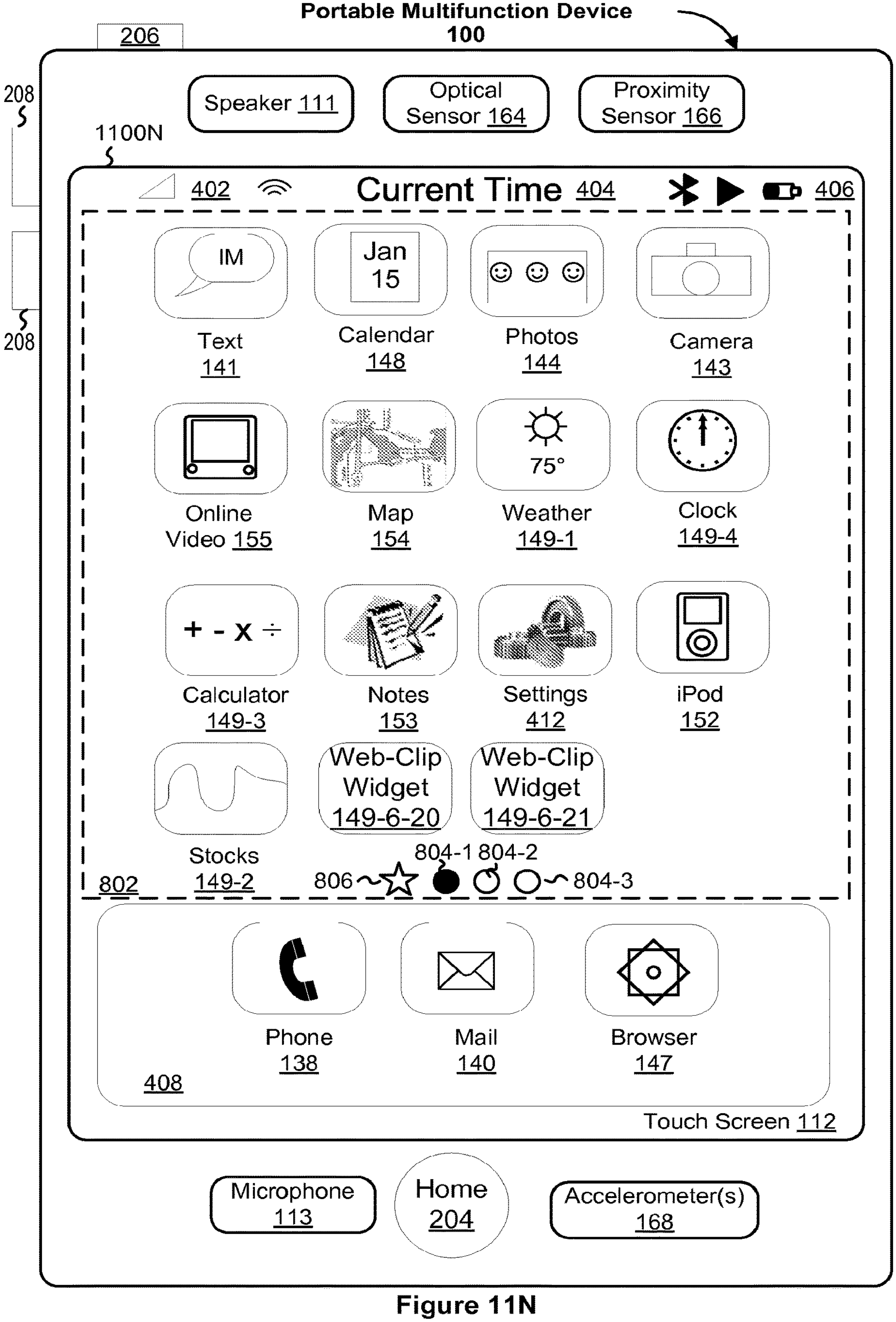
Figure 11O:
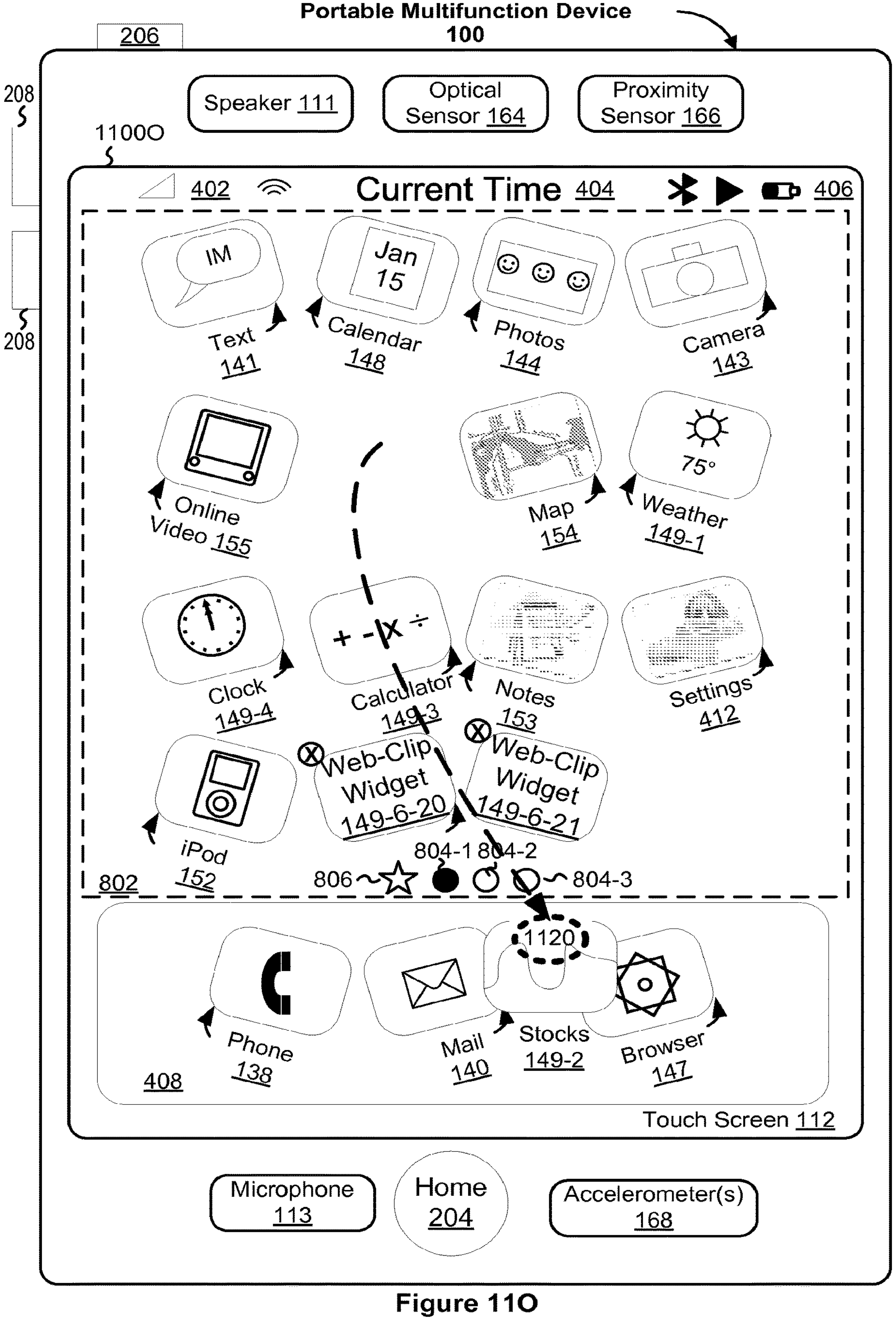

FIGS. 11A-11OO illustrate exemplary user interfaces during interface reconfiguration in accordance with some embodiments.

In some embodiments, the user interface on the touch screen display 112 is divided into multiple sections or windows. For example, in FIG. 11A, a region of UI 1100A may include a tray 408 for holding icons or graphical objects representing functions that are frequently used by the user (e.g., phone 138, mail 140, and browser 147) and a region or area 802 for holding icons or graphical objects representing functions that are used less frequently by the user (e.g., IM 141, calendar 148, image management 144, etc.).

FIGS. 11B-11D illustrate the portable multifunction device 100 during the interface reconfiguration mode in accordance with some embodiments. After the interface reconfiguration mode is initiated, the display of one or more of the icons in the area 802 is modified from the previous stationary positions to time-varying positions. As noted previously, the display may include animating one or more of the icons to simulate floating of one or more of the icons on a surface corresponding to the display surface. For example, the animated varying of the positions of one or more of the icons during the interface reconfiguration mode may resemble that of a hockey puck in an air hockey game. The displayed position(s) of a respective icon in the icons may be varied in a region 1104 (FIG. 11B) centered on the average position of the respective icon.

While FIGS. 11B-11D illustrate movement of one or more of the icons in the area 802, in other embodiments positions of one or more of the icons in another region of the user interface, such as tray 408, may be varied separately or in addition to those of one or more of the icons in area 802.

The time-varying position(s) of one or more of the icons in area 802 intuitively indicate to the user that the positions of one or more of the icons may be modified. This is illustrated in FIGS. 11C-11D, which show the repositioning of an icon during the interface reconfiguration mode. The user makes contact with one of the icons that is moving at a position 1108 and moves the point of contact across the display surface. The contact and the motion are detected by the portable multifunction device 100. As a consequence, the displayed icon, in this example corresponding to a stocks application 149-2, is moved accordingly.

As shown in FIG. 11D, the user moves the stocks application icon 149-2 to position 1110 and breaks contact with the display surface. The stocks application icon 149-2 is now displayed at the position 1110. While the displayed position of the stocks application icon 149-2 is shown as stationary in FIG. 11D, in some embodiments the position of the stocks application icon 149-2 may be varied once the user breaks contact with the display surface. In some embodiments, only icons displayed in one or more subsections of the user interface are displayed with a varying position during the interface reconfiguration mode. Thus, if the stocks application icon 149-2 had been dragged to another position in the area 802, it may be displayed with a varying position after the user breaks contact with the display. In some embodiments, the device may provide audio and/or tactile feedback when an icon is moved to a new position, such as an audible chime and/or a vibration.

FIG. 11D also illustrates the optional displacement of the browser icon 147 to position 1112. The browser icon 147 was displaced from its initial position to its new position 1112 due to at least partial overlap with the stocks application icon 149-2, i.e., when the portable multifunction device 100 determined that the user positioned the stocks application icon 149-2 over the browser icon 147, the displayed position of the browser icon 147 was changed.

In other embodiments, an icon may be evicted or removed from the tray 408 when an additional icon, such as the iPod icon 152, is added to the tray 408. For example, the tray 408 may be configured to accommodate a finite number of icons, such as 4 icons. If an additional icon is added to the tray 408, a nearest icon to the additional icon or an icon that at least partially overlaps the additional icon may be evicted or removed from the tray 408. In some embodiments, the evicted icon floats or zooms from its position in tray 408 to a new position in area 802, where it may join a sorted list of icons. In some embodiments, if the eviction process is not completed (e.g., the additional icon is not added to fray 408), the evicted icon may halt its progress towards its new position in area 802 and return to its position in tray 408.

FIG. 11E illustrates the user interface after the interface reconfiguration mode has been terminated or has terminated (due to a time out) in accordance with some embodiments. The icons in UI 1100E have stationary positions. The stocks application icon 149-2 and the browser icon 147 are displayed in their new positions in the tray 408.

The animated effects during the interface reconfiguration mode, such as the varying position(s) of one or more of the icons, may be in accordance with corresponding equations of motion for one or more of the icons in a plane substantially coincident with the touch screen display surface. The equations of motion may have a coefficient of friction less than a threshold allowing the simulation and/or animation of floating or sliding of one or more of the icons. The equation of motion for the respective icon may have a non-zero initial velocity, a non-zero angular velocity, and/or a restoring force about the respective average position of the respective icon such that the position of the respective icon oscillates in the region 1104 (FIG. 11B) substantially centered on the respective average position of the respective icon.

In some embodiments, the position of the respective icon may be varied during the interface reconfiguration mode in such a way that the respective icon rotates about the respective average position of the respective icon while maintaining a fixed orientation with respect to the user interface and the portable electronic device 100. This is illustrated in FIGS. 11F and 11G. In this example, the position of the online video icon 155 in area 802 is varied in such a way that it maintains a fixed orientation in region 1104. This may make it easier for the user to determine the function of the respective icon during the interface reconfiguration mode.

FIGS. 12A-12F are flow diagrams of icon reconfiguration processes 1200 in accordance with some embodiments. The processes are performed by a computing device with a touch screen display (e.g., portable multifunction device 100). While the icon reconfiguration processes 1200 described below include a number of operations that appear to occur in a specific order, it should be apparent that the processes 1200 can include more or fewer operations, which can be executed serially or in parallel (e.g., using parallel processors or a multi-threading environment), an order of two or more operations may be changed and/or two or more operations may be combined into a single operation.

The computing device displays (1202) a first set of a first plurality of icons in a first area of the touch screen display (e.g., area 802, FIG. 11H). The first plurality of icons includes a plurality of sets of icons that are separately displayed in the first area of the touch screen display. For example, in FIGS. 11H-11OO, icons 141, 148, 144, 143, 155, 149-2, 154, 149-1, 149-4, 149-3, 153, 412, 152, 149-6-20, 149-6-21, 149-6-22, 149-6-30, 149-6-31, 149-6-32, 149-6-33, 149-6-34, 149-6-35, 149-6-40, 149-6-41, 149-6-42, 149-6-43, 149-6-44, and 149-6-45 are a first plurality of icons in area 802. Icons 141, 148, 144, 143, 155, 149-2, 154, 149-1, 149-4, 149-3, 153, 412, 152, 149-6-20, 149-6-21, and 149-6-22 form a first set in area 802 in FIG. 11H; icons 149-6-30, 149-6-31, 149-6-32, 149-6-33, 149-6-34 and 149-6-35 form a second set in area 802 in FIG. 11Z; and icons 149-6-40, 149-6-41, 149-6-42, 149-6-43, 149-6-44, and 149-6-45 form a third set in area 802 in FIG. 11KK. In this context, "separately displayed" means when one of the sets is displayed, the other sets are not concurrently displayed, except possibly during a brief transition from one set of icons to the next (e.g., an animation). As this example illustrates, respective sets in the first plurality of icons are distinct sets of icons, although an icon can be moved from one set to another set during the icon reconfiguration process (e.g., as described below using calculator icon 149-3 as an example).

In some embodiments, the first plurality of icons includes a plurality of application launch icons, wherein in response to detecting activation of an application icon in the plurality of application icons when the user interface reconfiguration process is not active, an application that corresponds to the activated application icon is launched and displayed. In some embodiments, the applications include a default set of applications, third-party applications, and/or web-clip widget applications. As noted above, the application launch icons are not for issuing commands or subcommands with an application. Rather, they are for launching applications. If an application is already launched, then activation of the corresponding application launch icon results in display of the application.

In some embodiments, the first plurality of icons includes one or more web-clip widget icons (e.g., web-clip widget icons 149-6-20, 149-6-21, and 149-6-22, FIG. 11H), wherein in response to detecting activation of a web-clip widget icon when the user interface reconfiguration process is not active, a portion of a web page that corresponds to the activated web-clip widget icon is displayed.

The computing device displays (1204) a second plurality of icons in a second area on the touch screen display (e.g., tray 408, FIG. 11H) while displaying icons in the first plurality of icons in the first area. The second area is different (e.g., visually distinct) from the first area. For example, tray 408 is different from area 802 in FIG. 11H. In some embodiments, the second plurality of icons correspond to applications or functions that are frequently used by a user.

In some embodiments, the second plurality of icons includes a plurality of application launch icons, wherein in response to detecting activation of an application icon in the plurality of application icons when the user interface reconfiguration process is not active, an application that corresponds to the activated application icon is launched and/or displayed, as explained above. In some embodiments, the applications include a default set of applications, third-party applications, and/or web-clip widget applications.

The computing device detects (1206) a first finger gesture on the touch screen display. In some embodiments, the first finger gesture is a stationary (or substantially stationary) contact with an icon in the first set of the first plurality of icons (e.g., gesture 1114 on stocks icon 149-2, FIG. 11H) for greater than a predetermined time (e.g., 0.5-2.0 seconds). In some embodiments, the first finger gesture is on an edit icon (not shown). In some embodiments, the first finger gesture is on any application icon.

In response to detecting the first finger gesture, the computing device initiates a user interface reconfiguration process, and varies positions of one or more icons in the first set of the first plurality of icons about respective average positions (1208). In some embodiments, in response to detecting the first finger gesture, the computing device also varies (1210) positions of one or more icons in the second plurality of icons about respective average positions (e.g., UI 1100I, FIG. 11I).

In some embodiments, the varying includes animating the one or more icons to simulate floating of the one or more icons on a surface corresponding to a surface of the touch screen display.

In some embodiments, the varying position of a respective icon in the one or more icons corresponds to an equation of motion in a plane substantially coincident with the touch screen display, the equation of motion having a coefficient of friction less than a threshold. In some embodiments, the equation of motion for the respective icon has a non-zero initial velocity. In some embodiments, the equation of motion for the respective icon has a restoring force about a respective average position of the respective icon such that the position of the respective icon oscillates in a region substantially centered on the respective average position of the respective icon. In some embodiments, the equation of motion for the respective icon includes a, non-zero angular velocity. In some embodiments, the respective icon rotates about the respective average position of the respective icon while maintaining a fixed orientation with respect to the touch screen display.

In some embodiments, the varying includes randomly varying each icon in the first set of the first plurality of icons about a respective average position.

In some embodiments, icons displayed in at least one of the first area and the second area include icons that may be deleted by a user and icons that may not be deleted by the user. In some embodiments, the computing device visually distinguishes (1212) the icons that may be deleted by the user from the icons that may not be deleted by the user; detects (1214) one or more finger gestures corresponding to a request to delete an icon that may be deleted by the user; and, in response to detecting the one or more finger gestures corresponding to the request to delete the icon, deletes (1216) the icon. For example, in FIG. 111, only the web clip widgets 149-6 may be deleted, so these icons have a circled "X" deletion icons 1116 next to them to visually indicate that these icons may be deleted. In response to detecting a finger gesture on the deletion icon 1116 (FIG. 11I) for icon 149-6-22 (FIG. 11I), icon 149-6-22 is deleted (FIG. 11J).

In some embodiments, third party applications and web clip widgets may be deleted, but core or default applications may not be deleted. In some embodiments, if the device is reset, the default applications are displayed in the first set in area 802 and in tray 408, with the third party applications and web clip widgets deleted. In some embodiments, if the device is reset, the default applications are displayed in the first set in area 802 and in tray 408, with the third party applications and web clip widgets displayed after the default applications in the first set in area 802. In some embodiments, if the device is reset, the default applications are displayed in the first set in area 802 and in tray 408, with the third party applications and web clip widgets displayed in a second set in area 802.

In some embodiments, the computing device detects (1218) a user making a point of contact with the touch screen display at a first position corresponding to a first icon in the first set and detects movement of the point of contact to a second position on the touch screen display. In response to detecting the point of contact and detecting movement of the point of contact, the computing device displays (1220) movement of the first icon to the second position on the touch screen display and displays the first icon at the second position. In some embodiments, the second position is in the first area. For example, in response to detecting point of contact 1118 on stocks icon 149-2 (FIG. 11J) and detecting movement of the point of contact, the computing device displays (1220) movement of the stocks icon 149-2 to the second position (FIG. 11J) on the touch screen display and displays the stocks icon 149-2 at the second position (FIG. 11L).

In some embodiments, the computing device moves (1222) a second icon from a respective initial position to a respective new position when the second position of the first icon at least partially overlaps with the respective initial position of the second icon. For example, the iPod icon 152, which overlaps with the stocks icon 149-2 (FIG. 11J), is moved to a new position (FIGS. 11K-11L). In some embodiments, the second icon is either in the first area (e.g., area 902) or the second area (e.g., tray 408).

In some embodiments, the second position is in the first area and the computing device rearranges (1224) icons in the first set other than the first icon to accommodate display of the first icon at the second position in the first area (e.g., as shown in FIGS. 11K-11L).

In some embodiments, rearranging (1224) icons in the first set other than the first icon includes compacting (1226) at least some of the icons in the first set other than the first icon to place an icon in the first position, which was previously occupied by the first icon (e.g., as shown in FIGS. 11K-11L).

In some embodiments, rearranging (1224) icons in the first set other than the first icon includes snaking (1228) at least some of the icons in the first set other than the first icon to place an icon in the first position, which was previously occupied by the first icon (e.g., as shown in FIGS. 11K-11L).

In some embodiments, rearranging (1224) icons in the first set other than the first icon includes moving (1230) an icon in the first set to the first position, which was previously occupied by the first icon, wherein the moved icon was at the second position prior to movement of the first icon (e.g., as shown in FIG. 11M). In other words, the icons in the first position and the second position are swapped.

In some embodiments, the computing device fixes (1232) a position of the first icon at the second position and ceases to vary positions of the one or more icons in the first set in response to detecting a predefined user action for terminating the user interface reconfiguration process (e.g., as shown in FIG. 11N). In some embodiments, the predefined user action is activation of a physical button (e.g., menu button 204, FIG. 11N) or a soft button (e.g., a done icon, not shown).

Figure 11P:
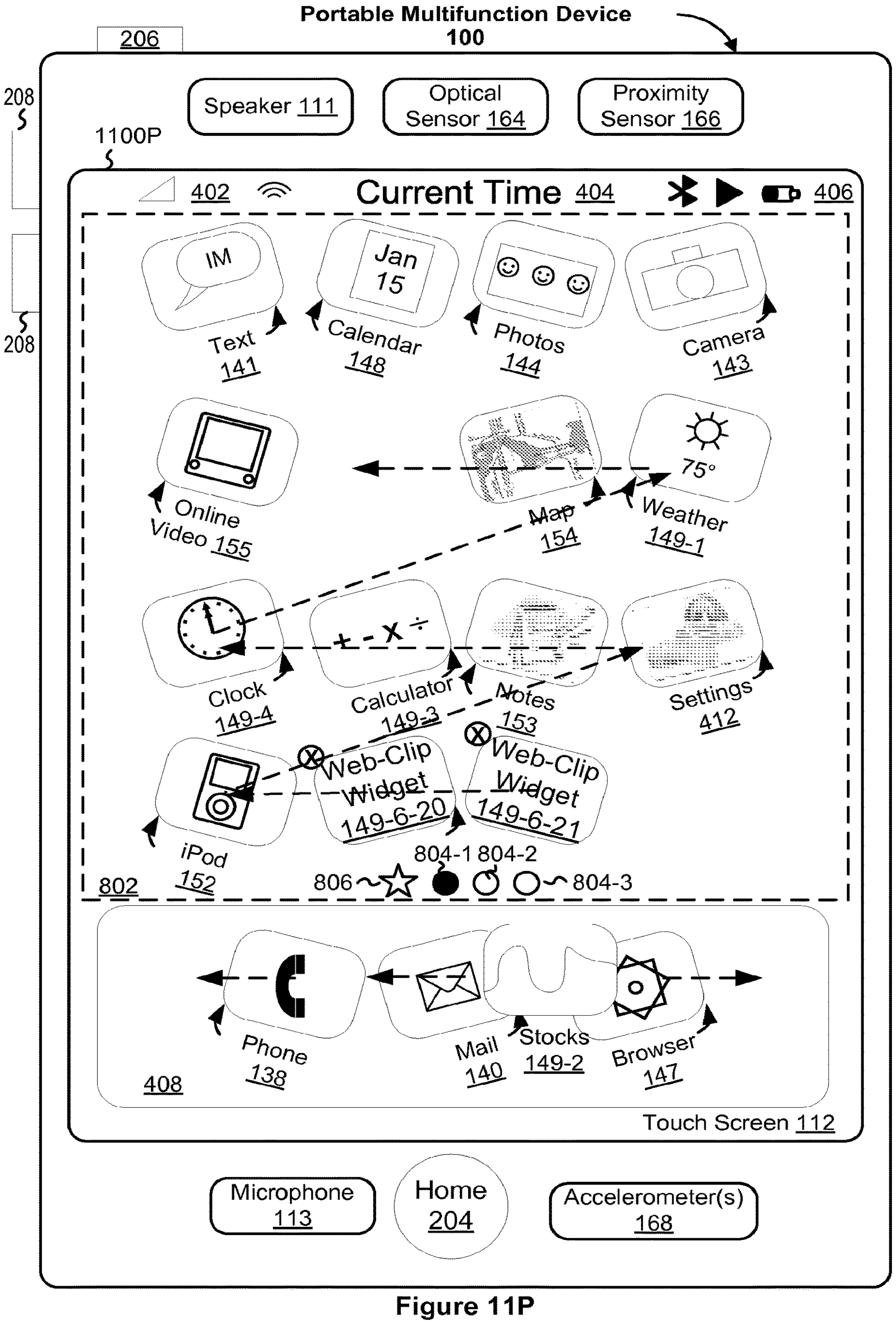
Figure 11Q:
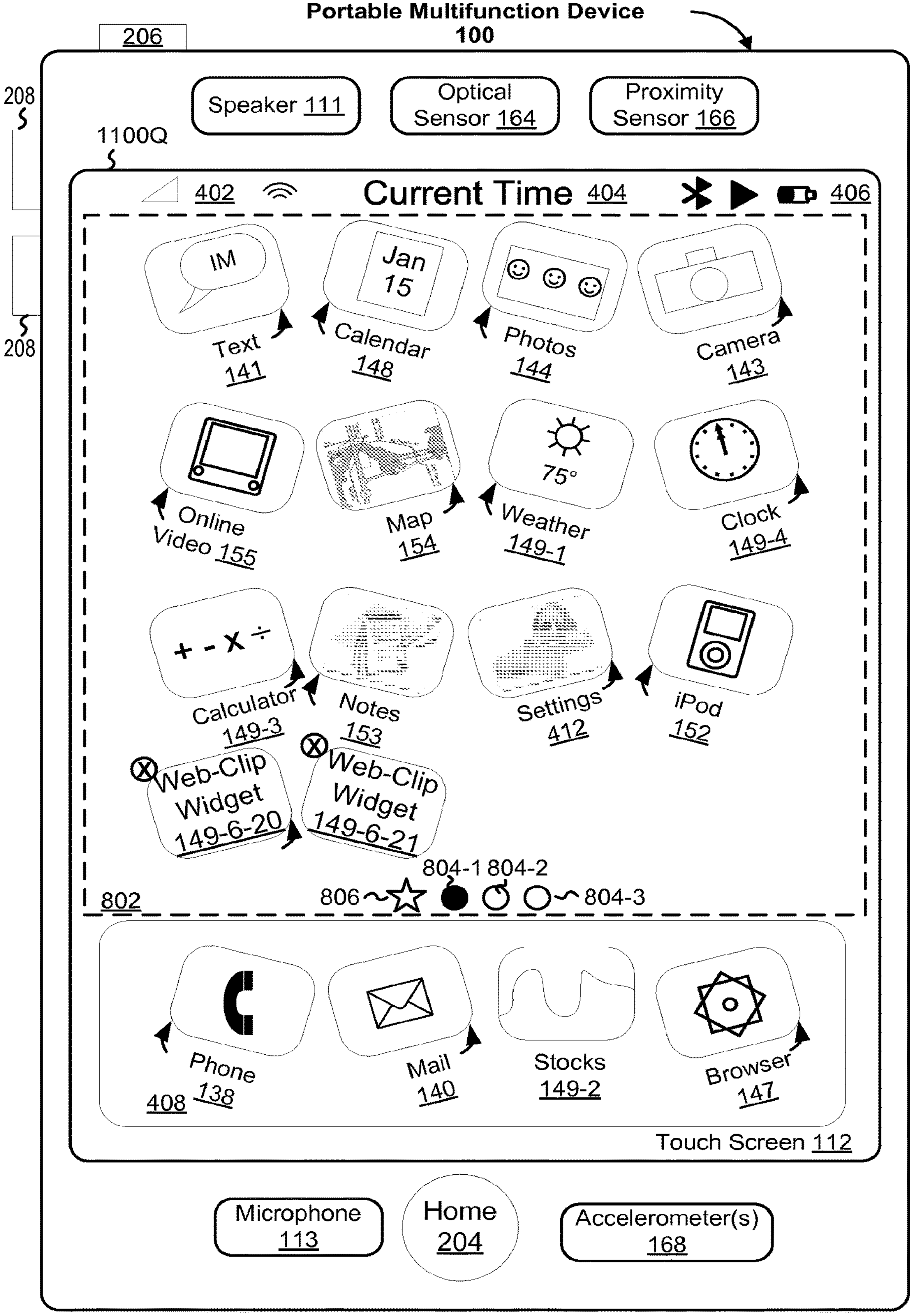
Figure 11R:
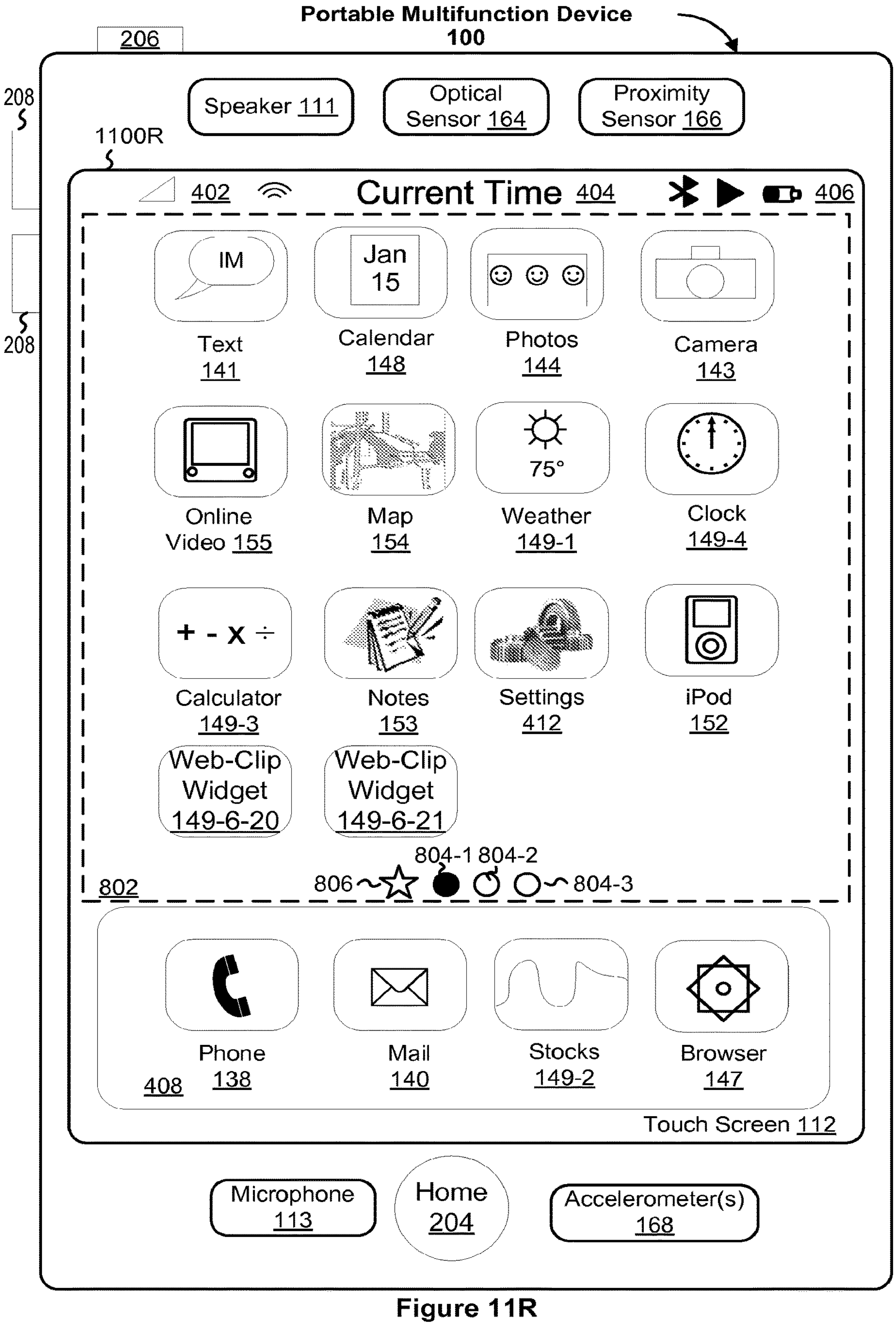
Figure 11S:
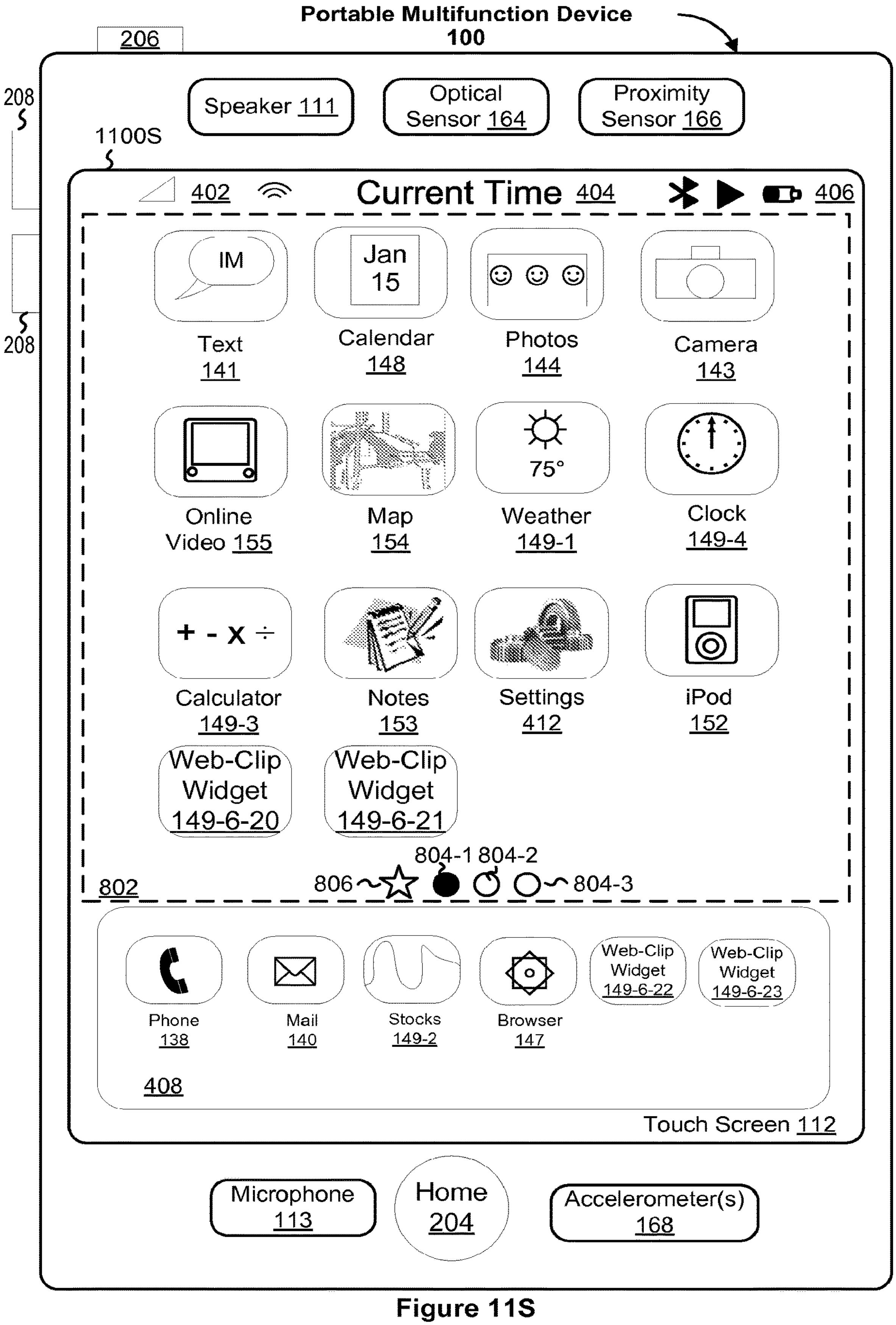

In some embodiments, the computing device detects (1234) a user making a first point of contact (e.g., contact 1120, FIG. 110) with the touch screen display at a first position corresponding to a first icon in the first set and detects movement of the first point of contact to a second position in the second area on the touch screen display (e.g., as shown in FIG. 110). In response to detecting the first point of contact and detecting movement of the first point of contact, the computing device displays (1236) movement of the first icon to the second position in the second area on the touch screen display and displays the first icon at the second position (e.g., as shown in FIG. 11Q). In some embodiments, icons in the second area are symmetrically distributed about the center of the second area (e.g., as shown in FIG. 11R), In some embodiments, the computing device moves (1238) a third icon in the second plurality of icons from a respective initial position to a respective new position when the new position of the first icon at least partially overlaps with the respective initial position of the third icon (e.g., as shown in FIGS. 11P-11R, where mail icon 140 and browser icon 147 move to new positions). In some embodiments, the size of the icons in the second area (e.g., tray 408) is reduced as more icons are added, until a predetermined maximum number (e.g., 6 icons) is reached (e.g., as shown in FIG. 11S). In some embodiments, after the maximum is reached, icons must be removed from the second area prior to adding more icons to the second area. In some embodiments, after the maximum is reached, icons in the second area are evicted from the second area when more icons are added to the second area.

Figure 11T:
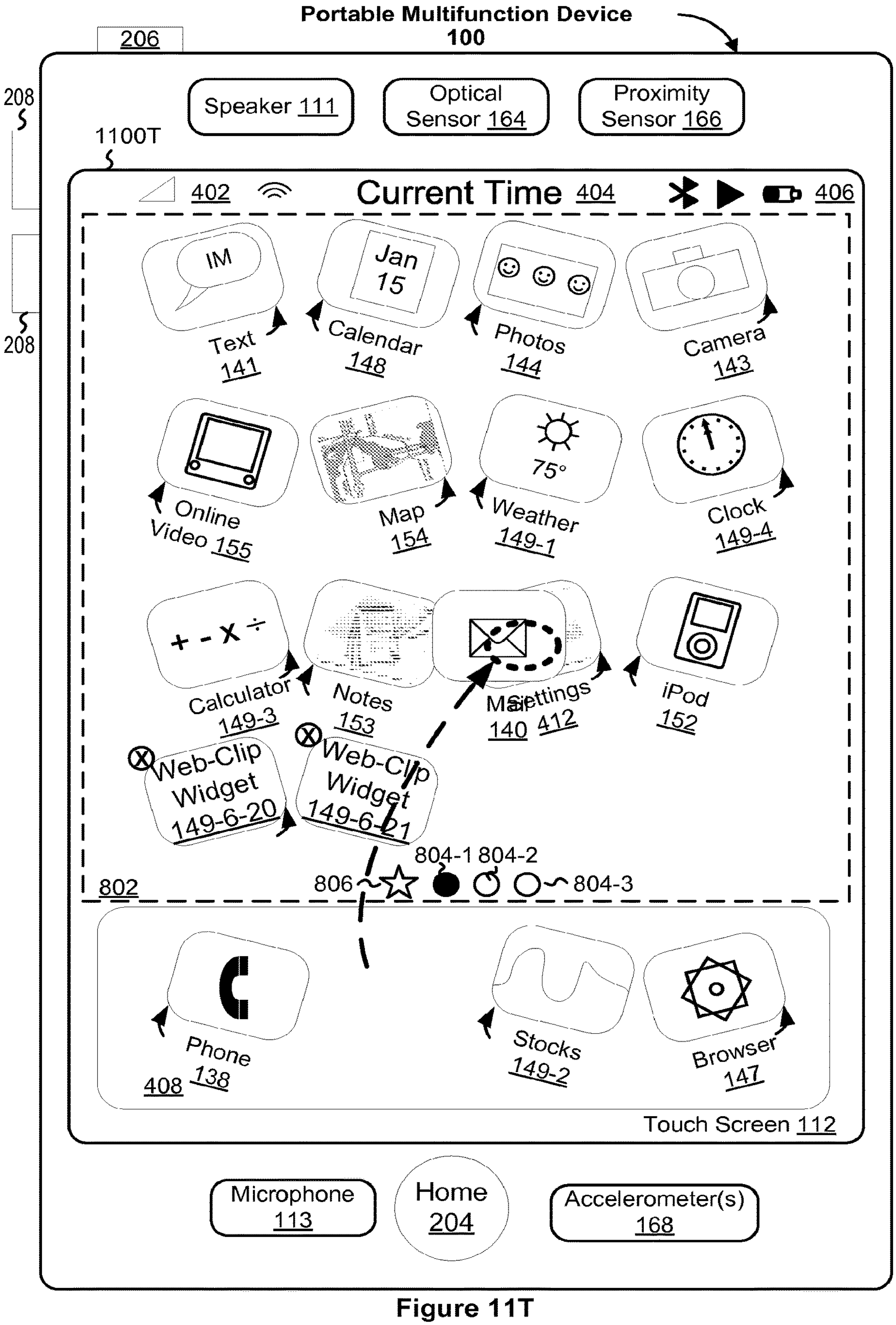
Figure 11U:
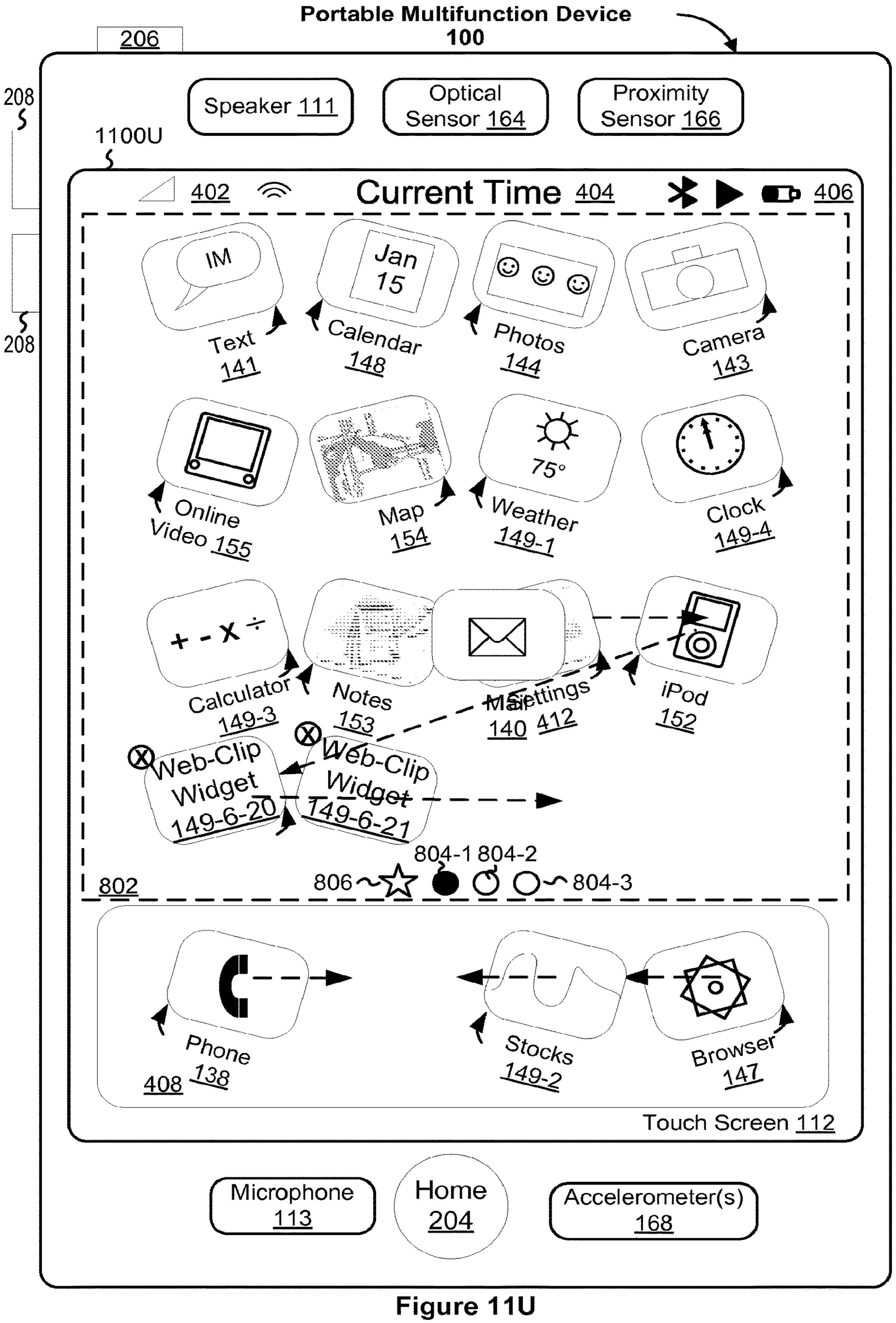
Figure 11V:
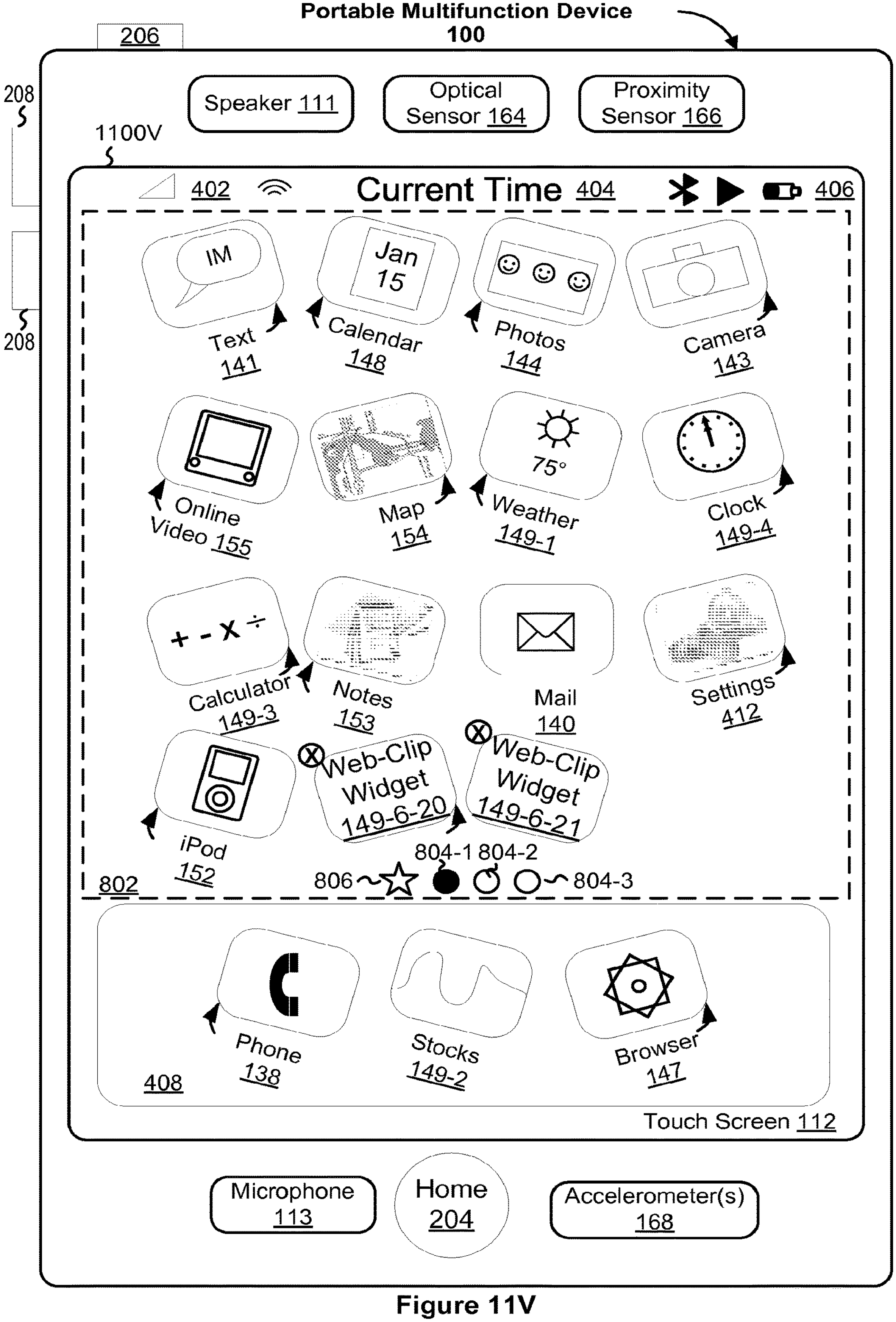
Figure 11W:
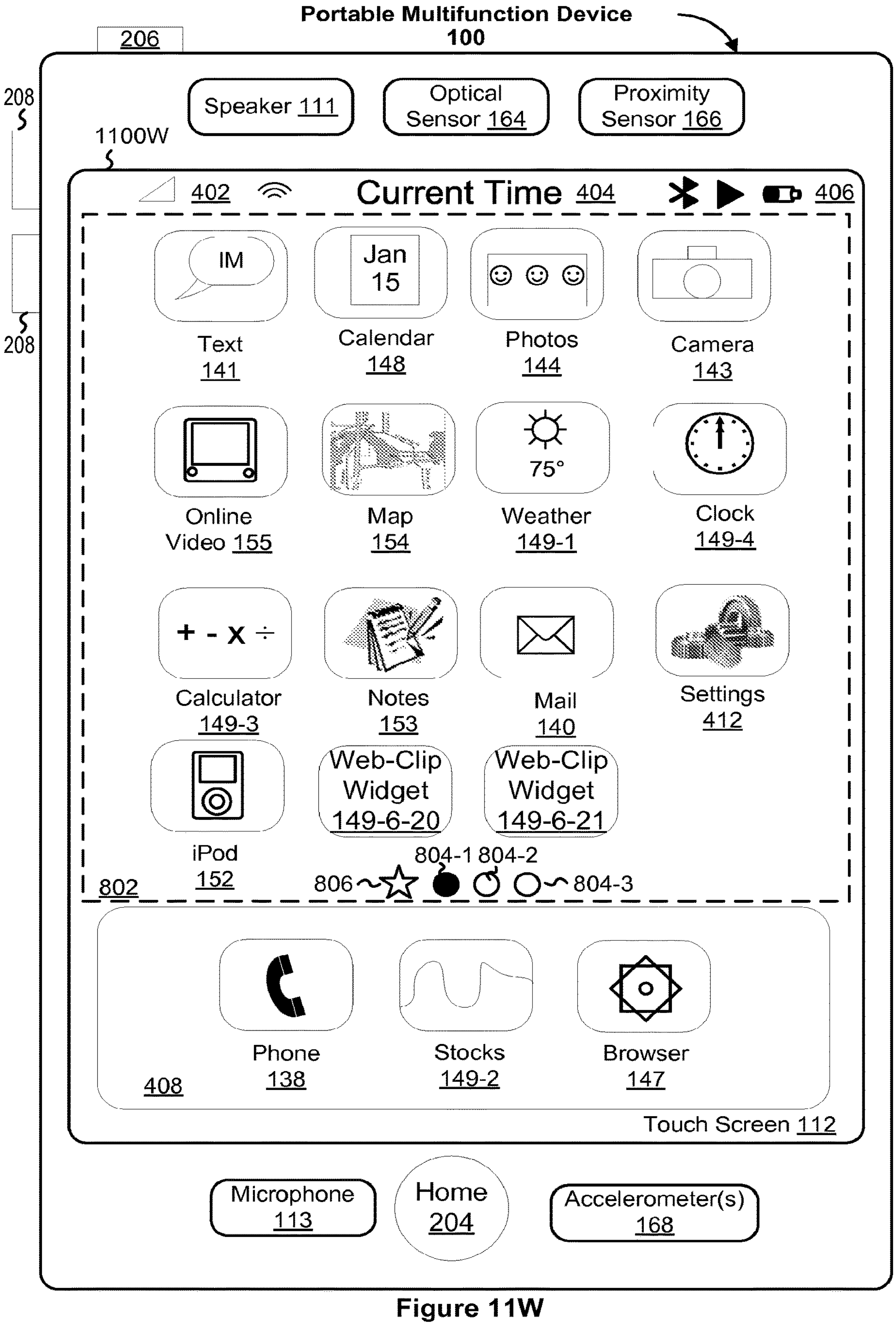

In some embodiments, the computing device detects (1240) the user making a second point of contact (e.g., contact 1122, FIG. 11T) with the touch screen display at a third position corresponding to a second icon in the second plurality of icons in the second region on the touch screen display and detects movement of the second point of contact to a fourth position in the first region on the touch screen display (e.g., as shown in FIG. 11T). The computing device responds (1242) to detecting the second point of contact and detecting movement of the second point of contact by displaying movement of the second icon to the fourth position of the touch screen display and displaying the second icon at the fourth position (e.g., as shown in FIGS. 11T-11V, where mail icon 140 moves from the tray 408 to the first area 802). In some embodiments, the computing device fixes (1244) a position of the second icon at the fourth position and ceases to vary positions of the one or more icons in the first set in response to detecting a predefined user action for terminating the predefined user interface reconfiguration process (e.g., as shown in FIG. 11W). In some embodiments, the predefined user action is activation of a physical button (e.g., menu button 204, FIG. 11W) or a soft button (e.g., a done icon, not shown).

In some embodiments, the computing device detects (1246) a second finger gesture on a first icon in the first set on the touch screen display. In response to detecting the second finger gesture, the computing device replaces (1256) display of the first set of the first plurality of icons with display of a second set of the first plurality of icons in the first area on the touch screen display, and moves the first icon from the first set to the second set (e.g., as shown in FIGS. 11X-11Z, where the first set of icons (141, 148, 144, 143, 155, 149-2, 154, 149-1, 149-4, 149-3, 153, 412, 152, 149-6-20, 149-6-21, and 149-6-22) is replaced by the second set of icons (149-6-30, 149-6-31, 149-6-32, 149-6-33, 149-6-34 and 149-6-35) and the calculator icon 149-3 is moved from the first set to the second set).

Figure 11X:
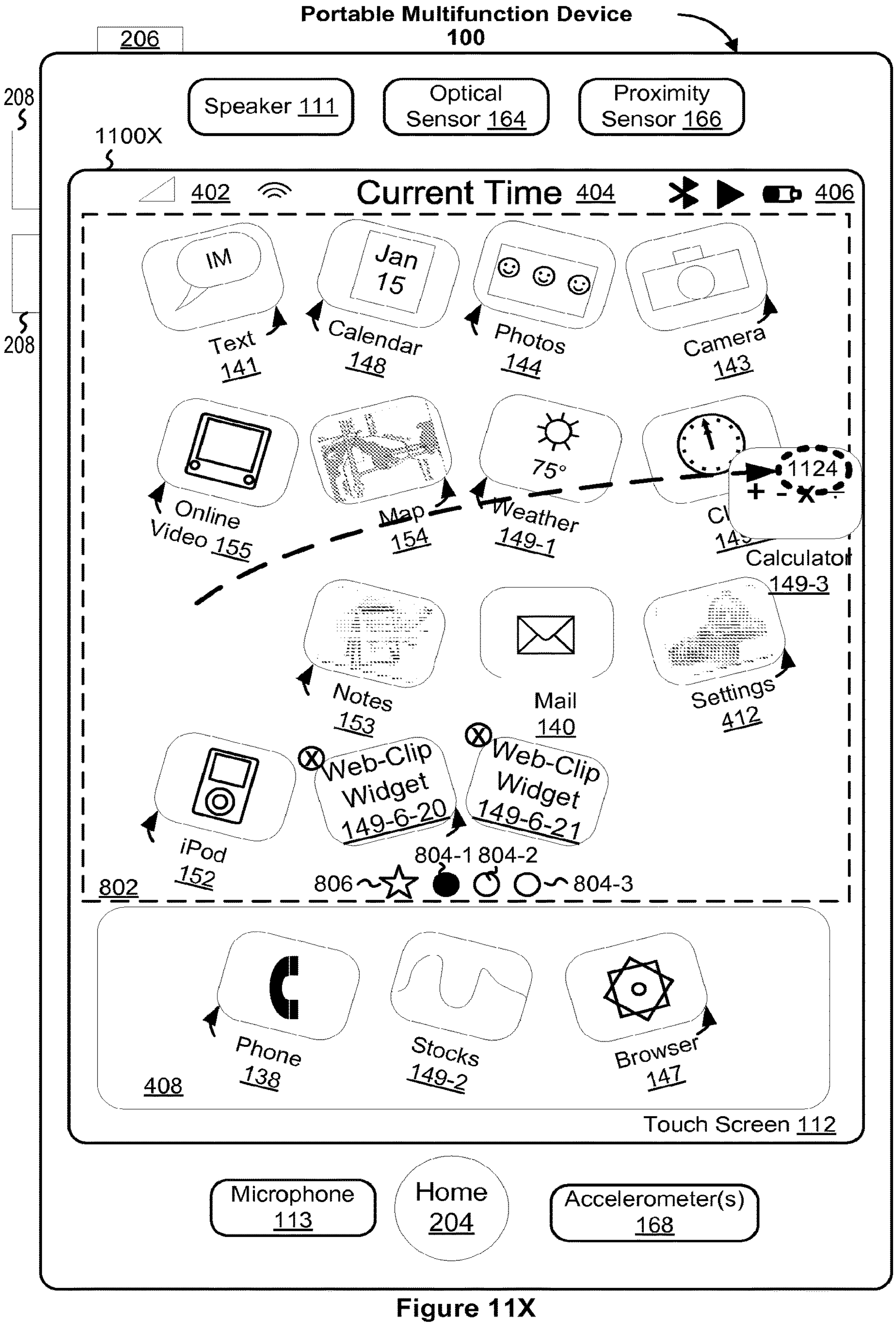
Figure 11Y:
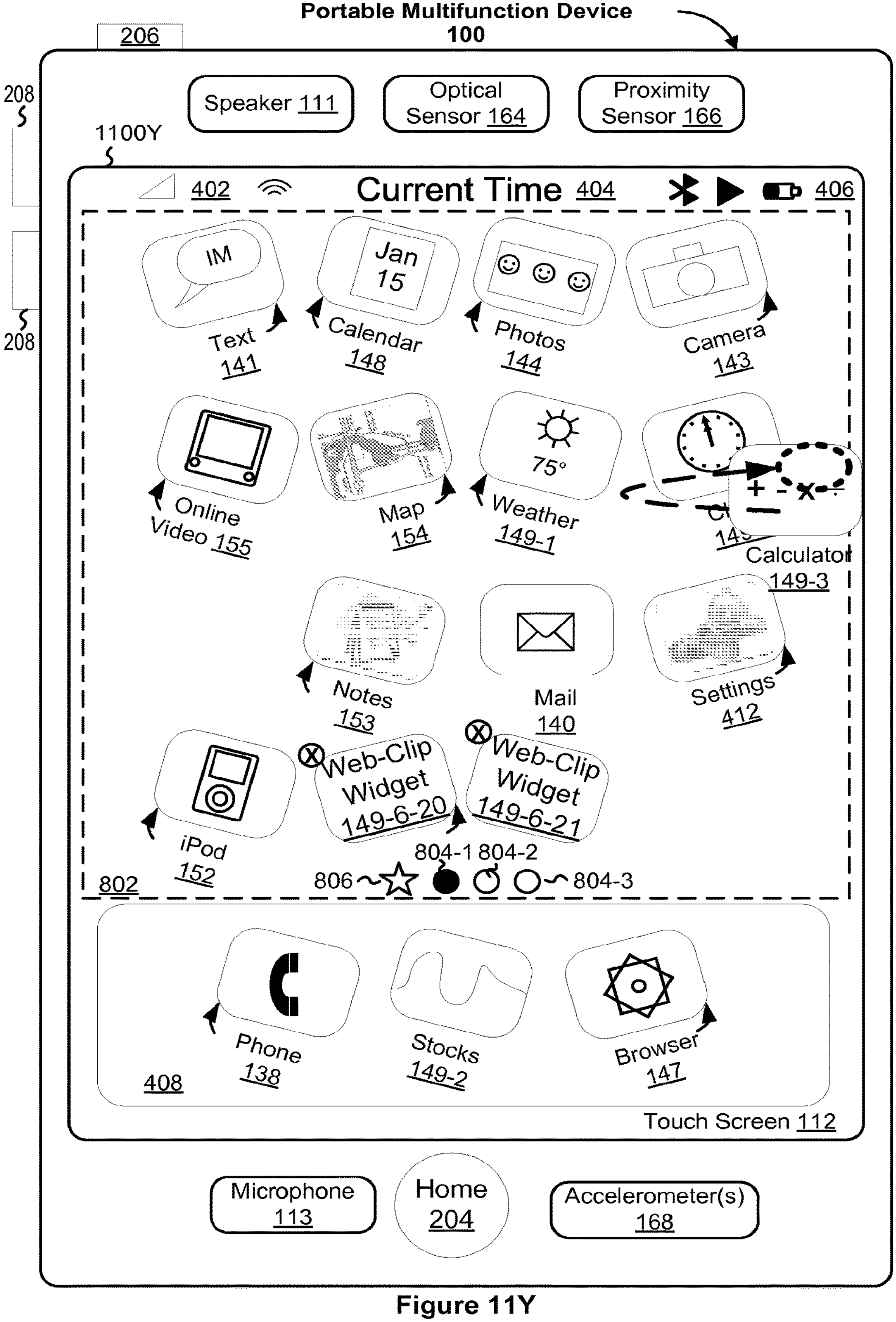
Figure 11Z:
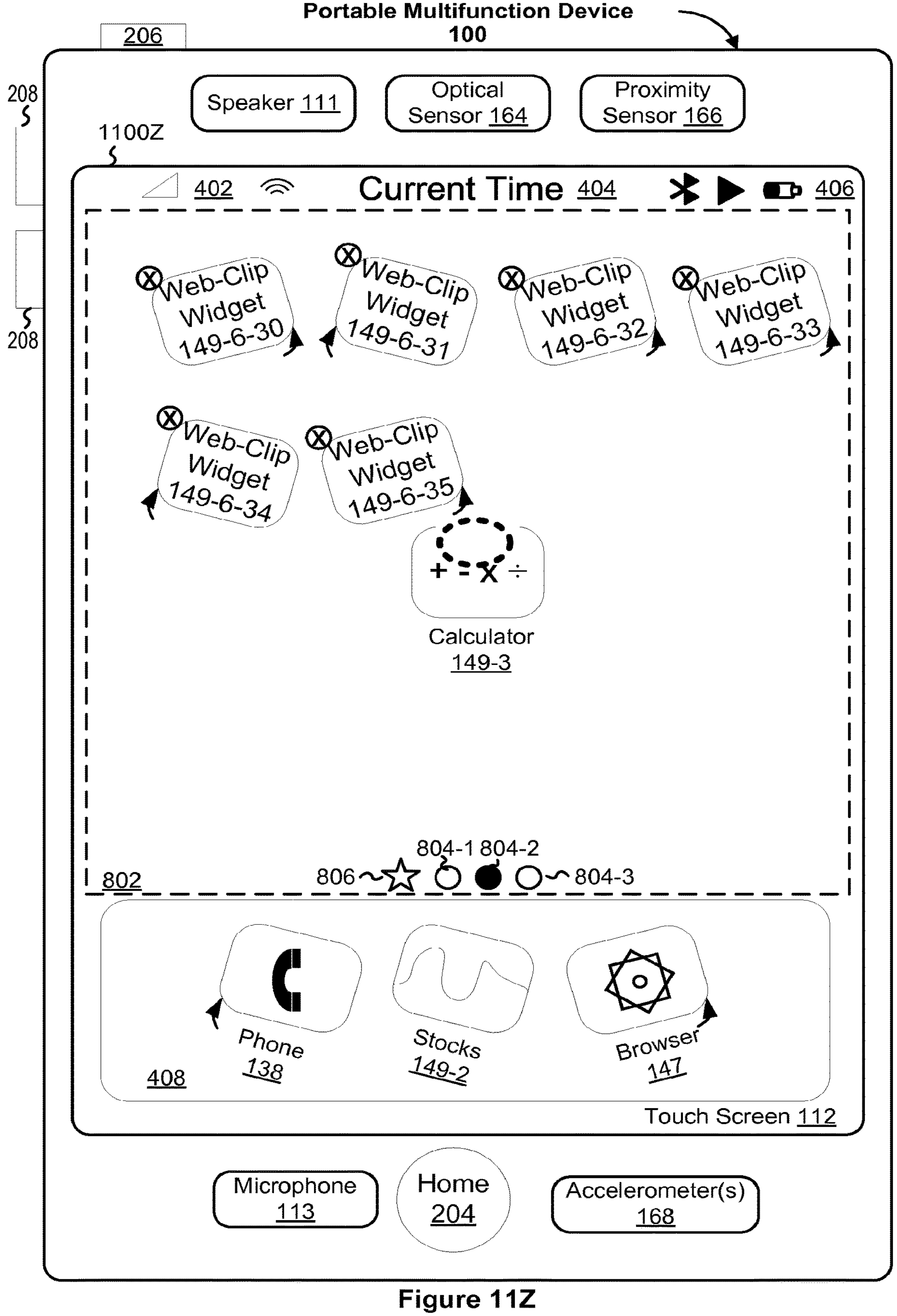
Figure 11A:
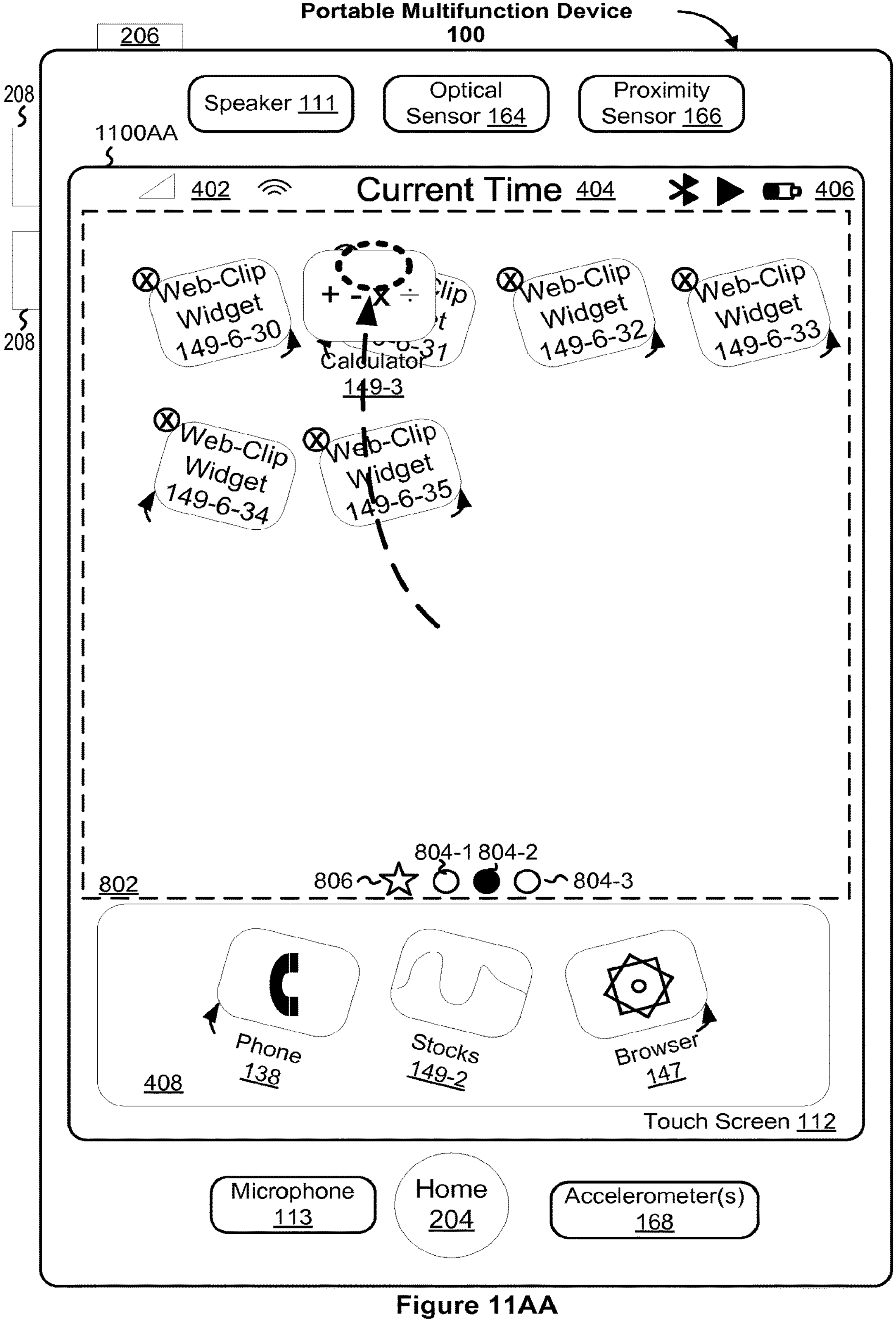
Figure 11B:
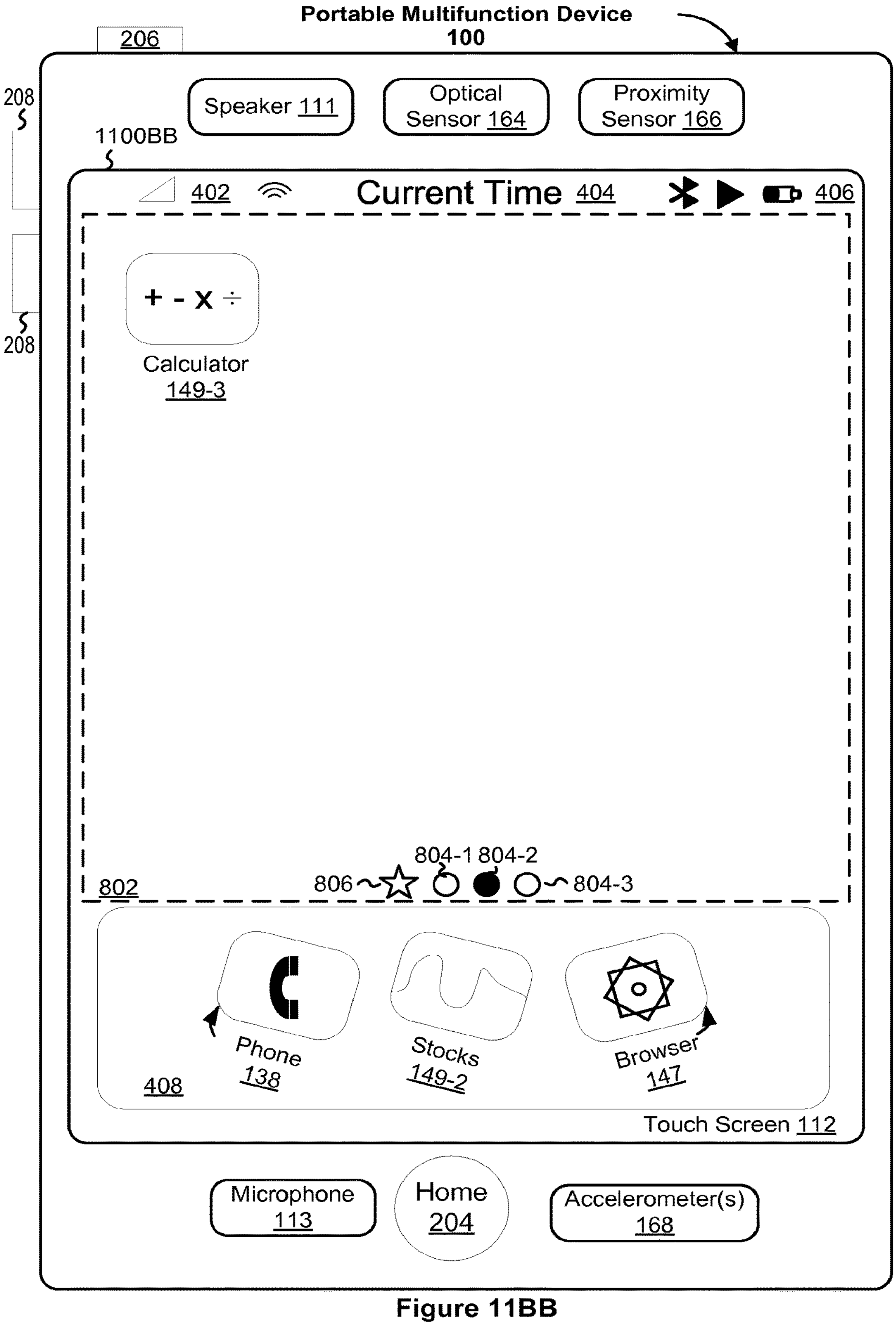
Figure 11C:
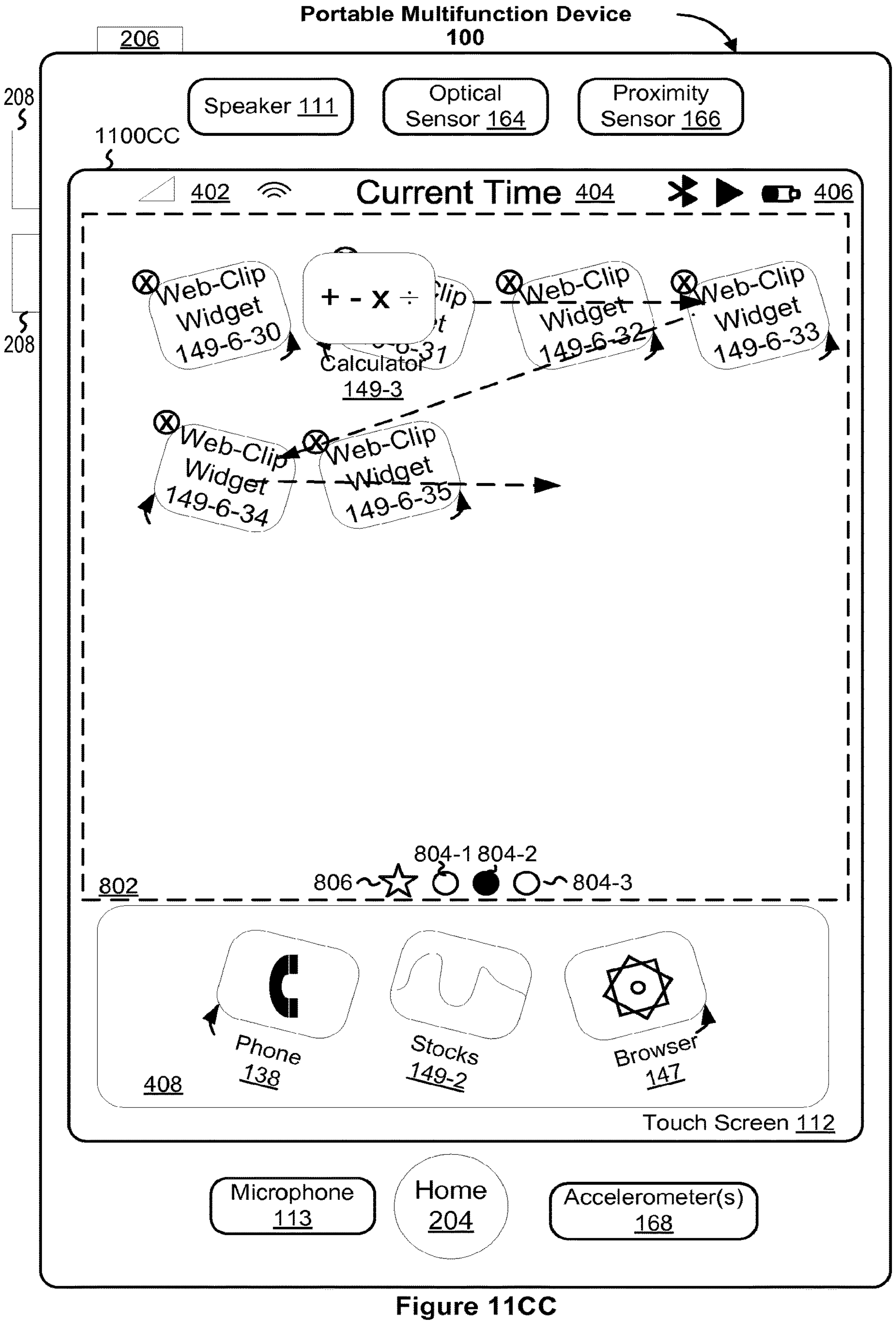
Figure 11D:
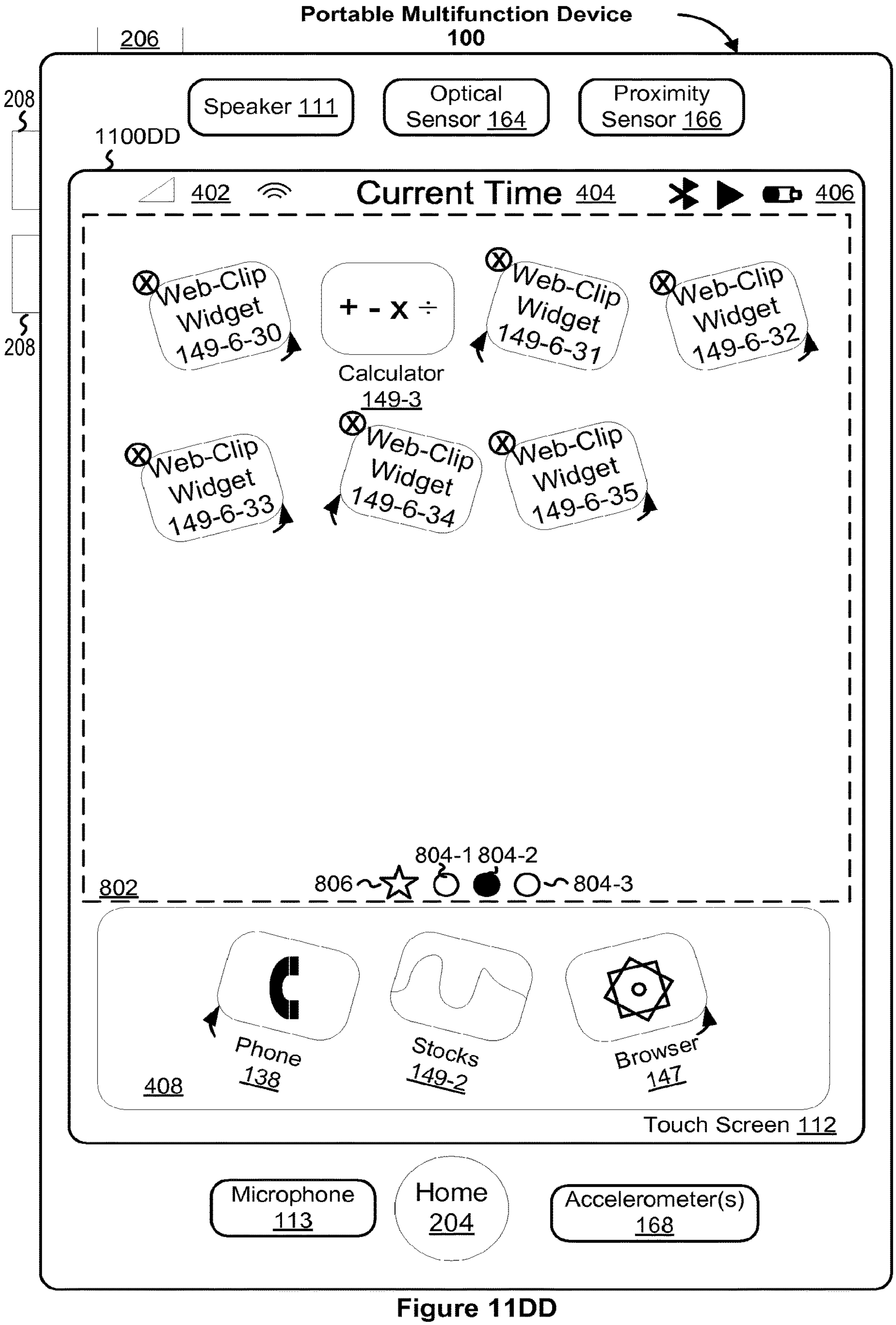
Figure 11E:
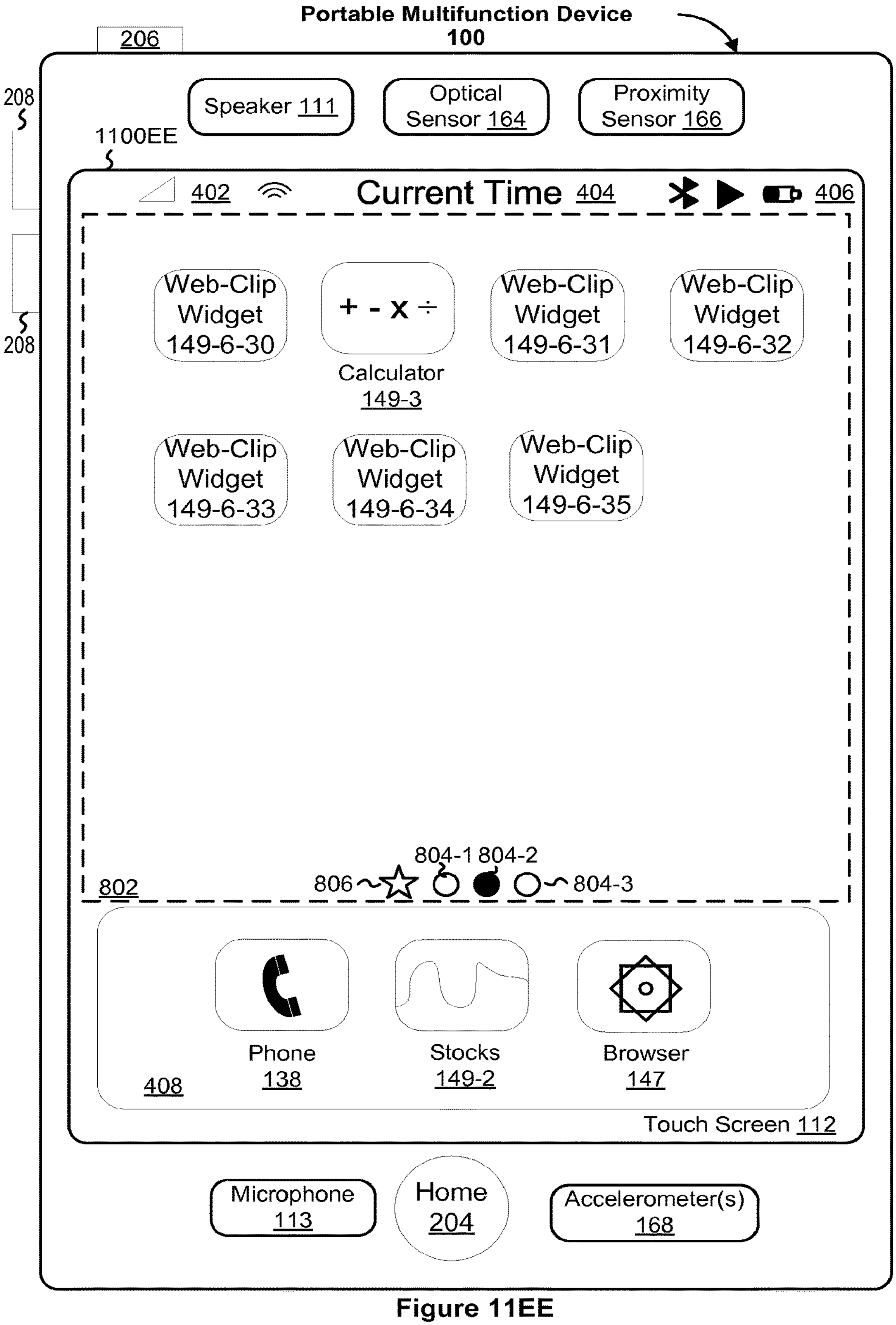
Figure 11F:
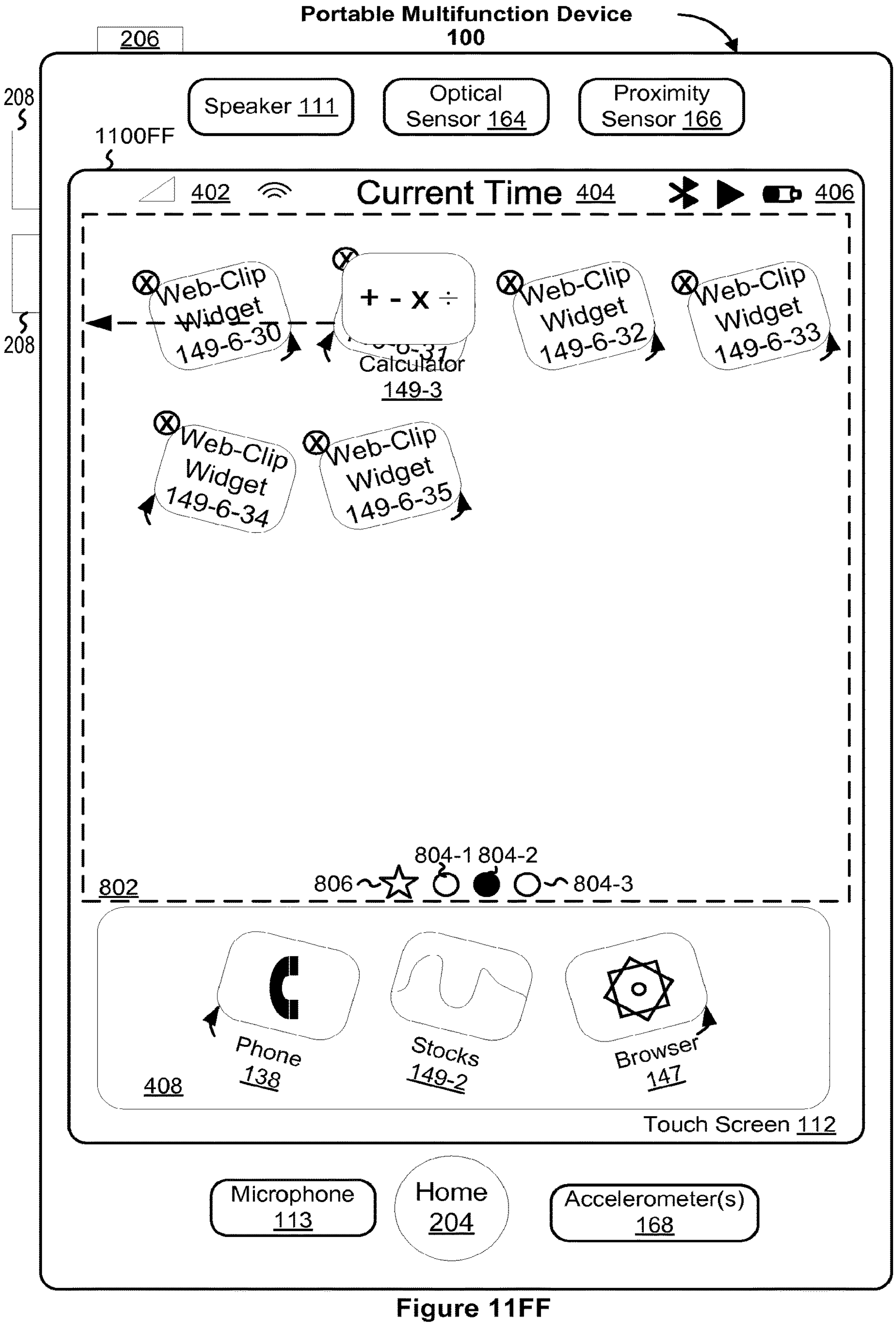
Figure 11G:
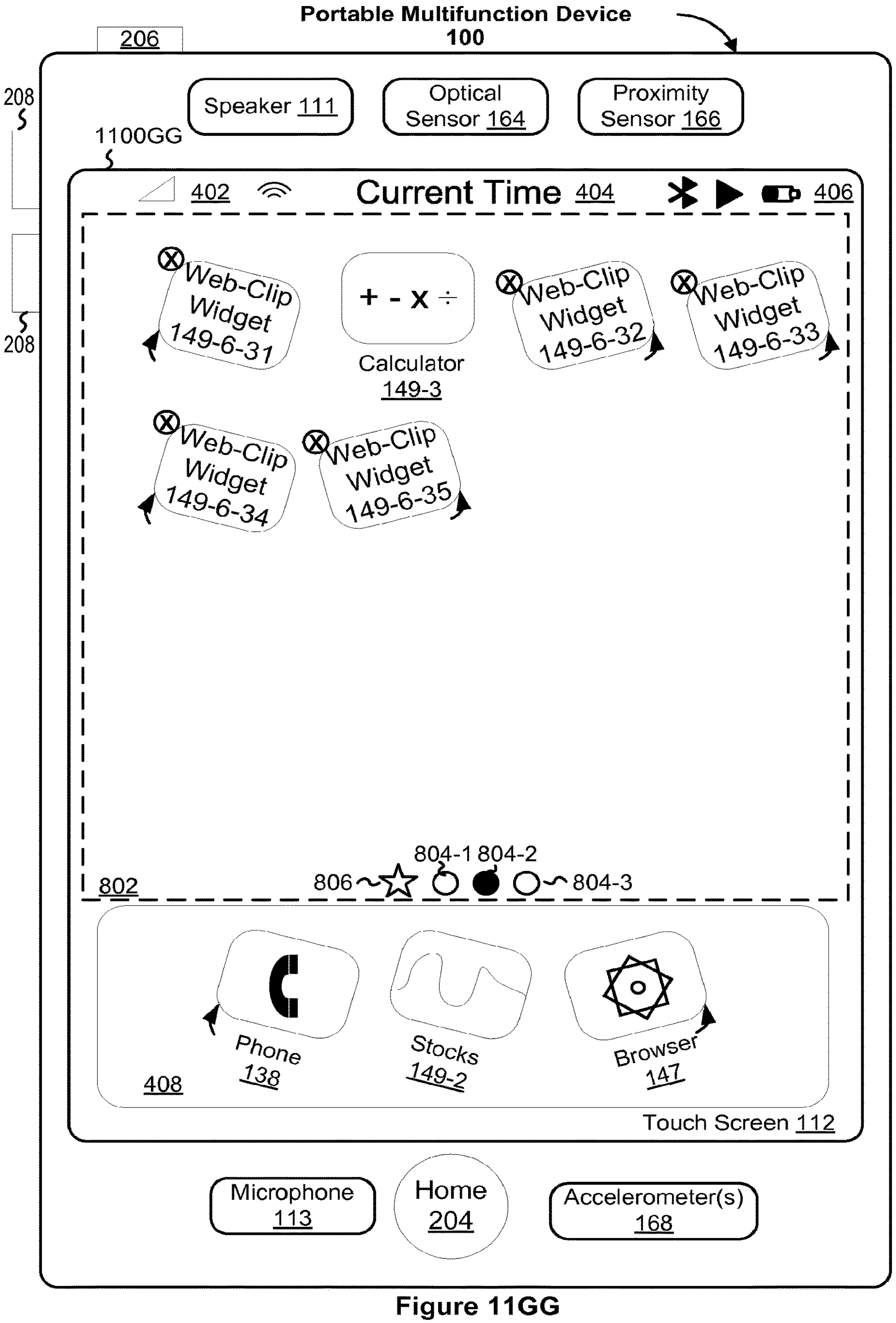
Figure 11H:
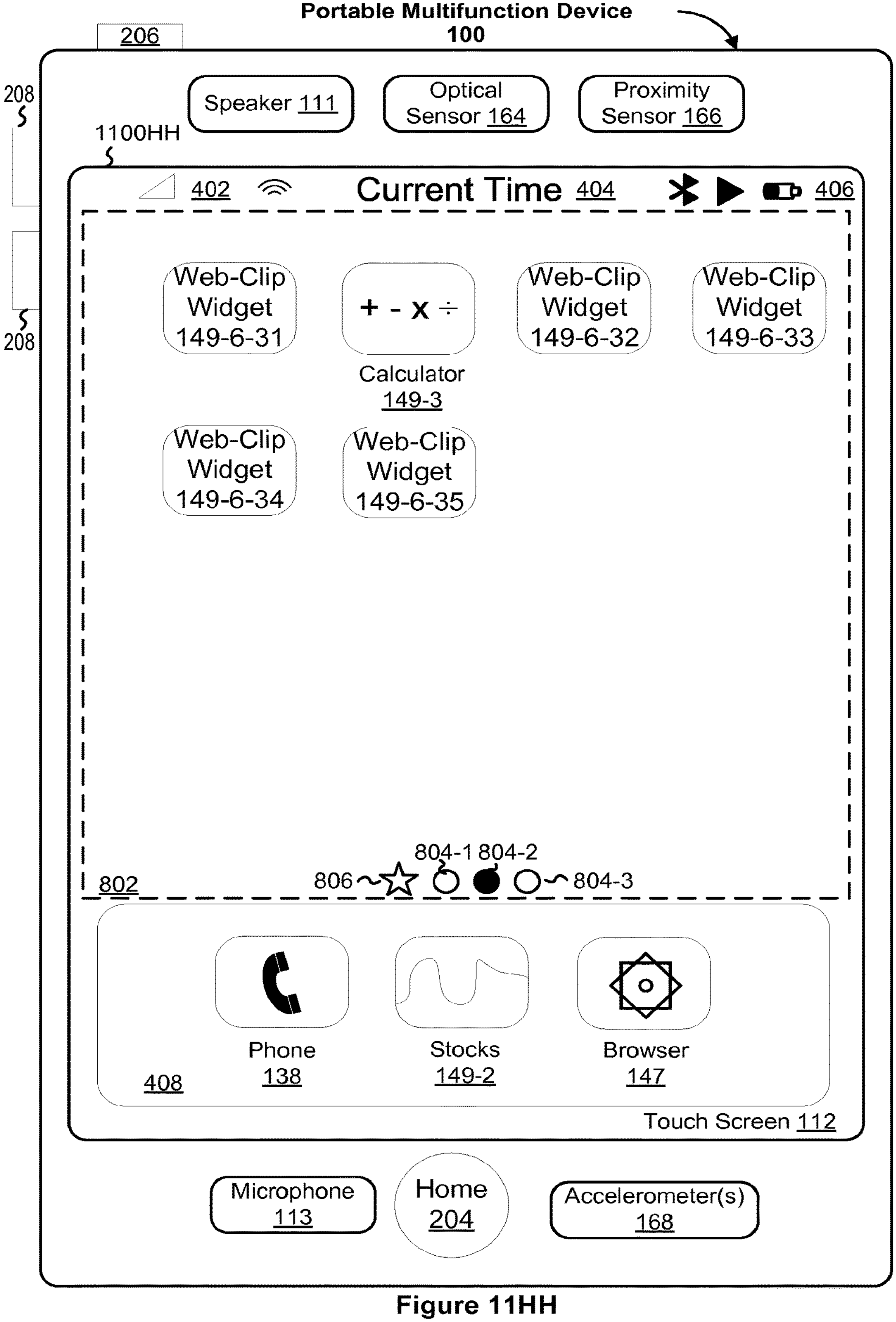
Figure 11I:
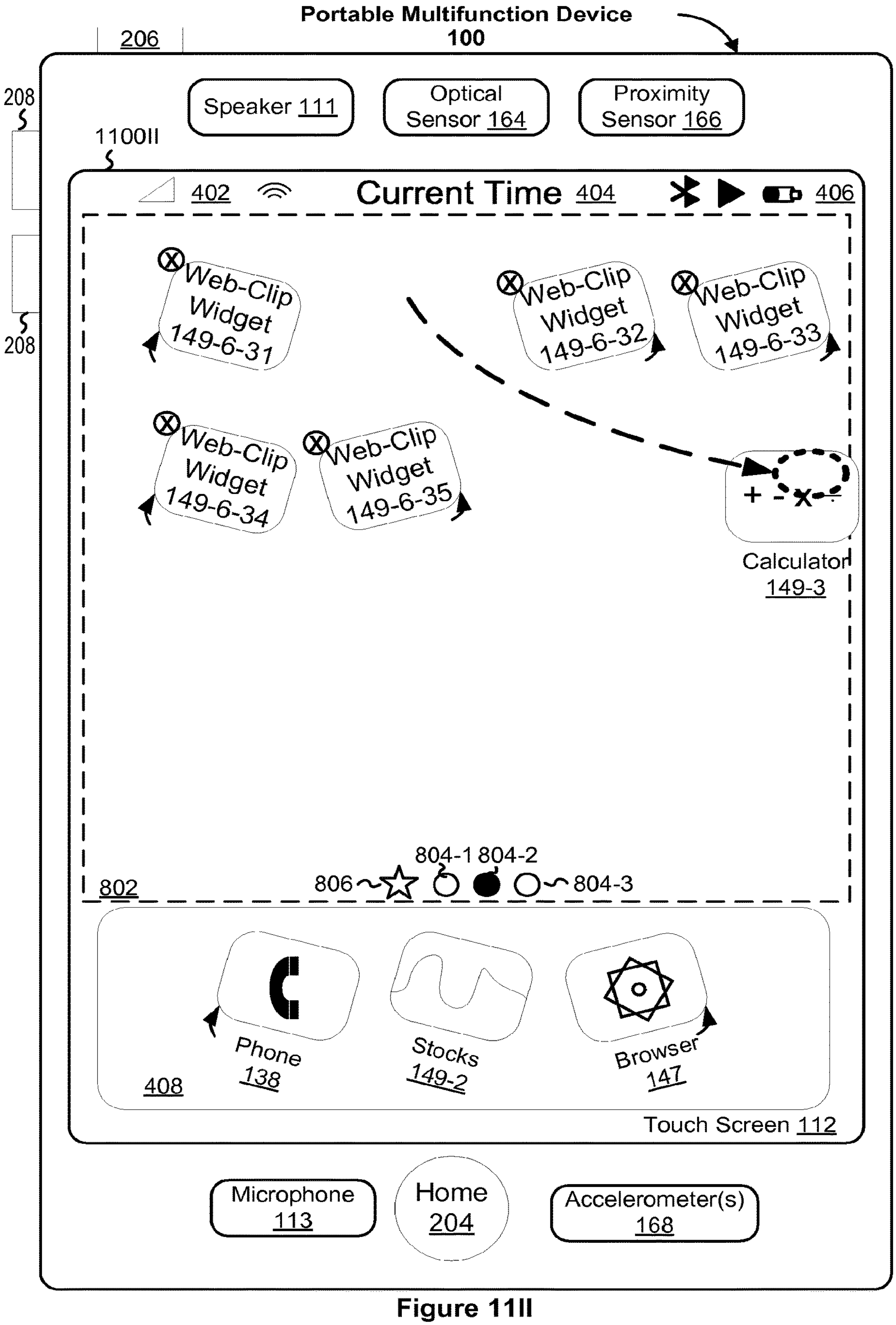
Figure 11J:
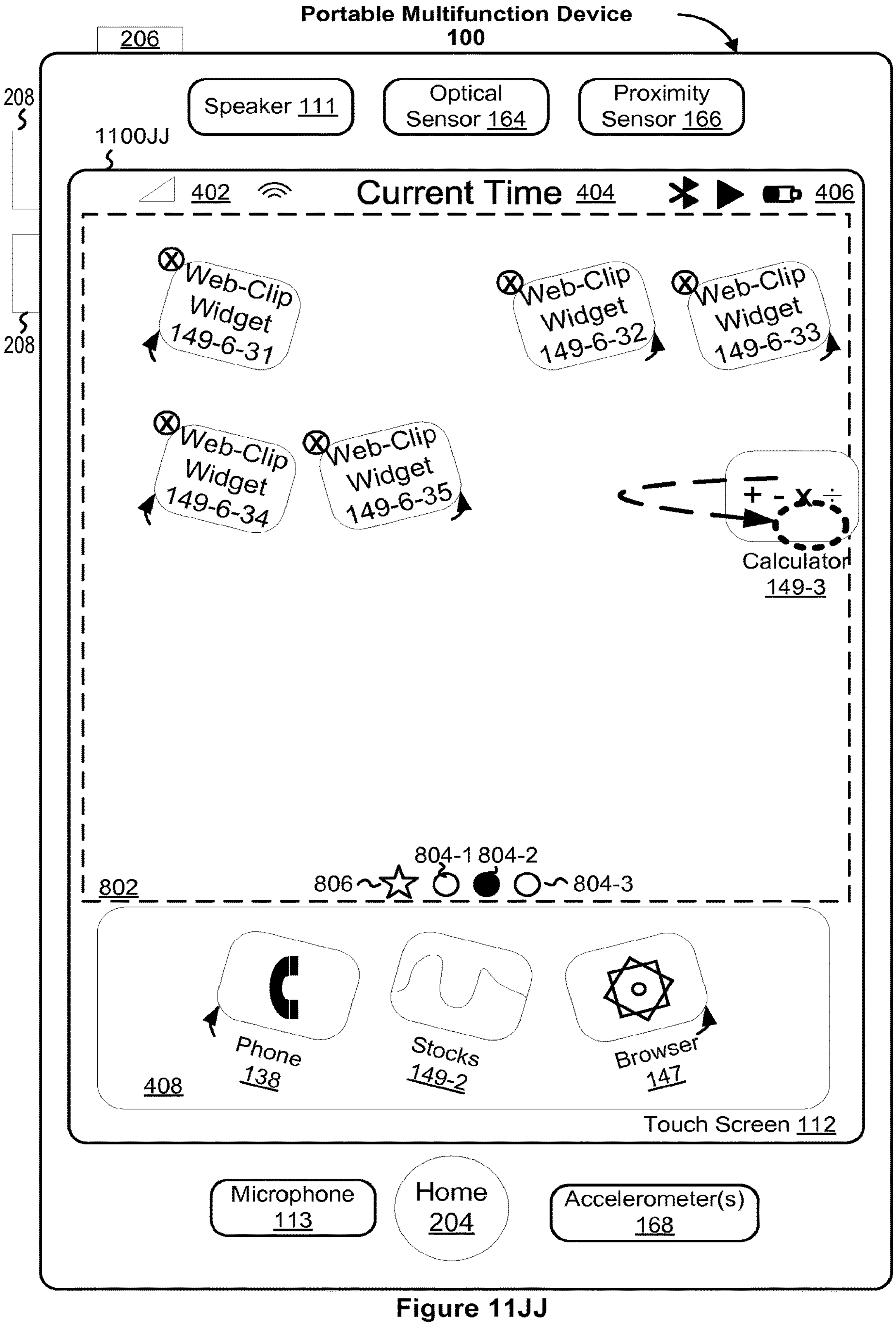
Figure 11K:
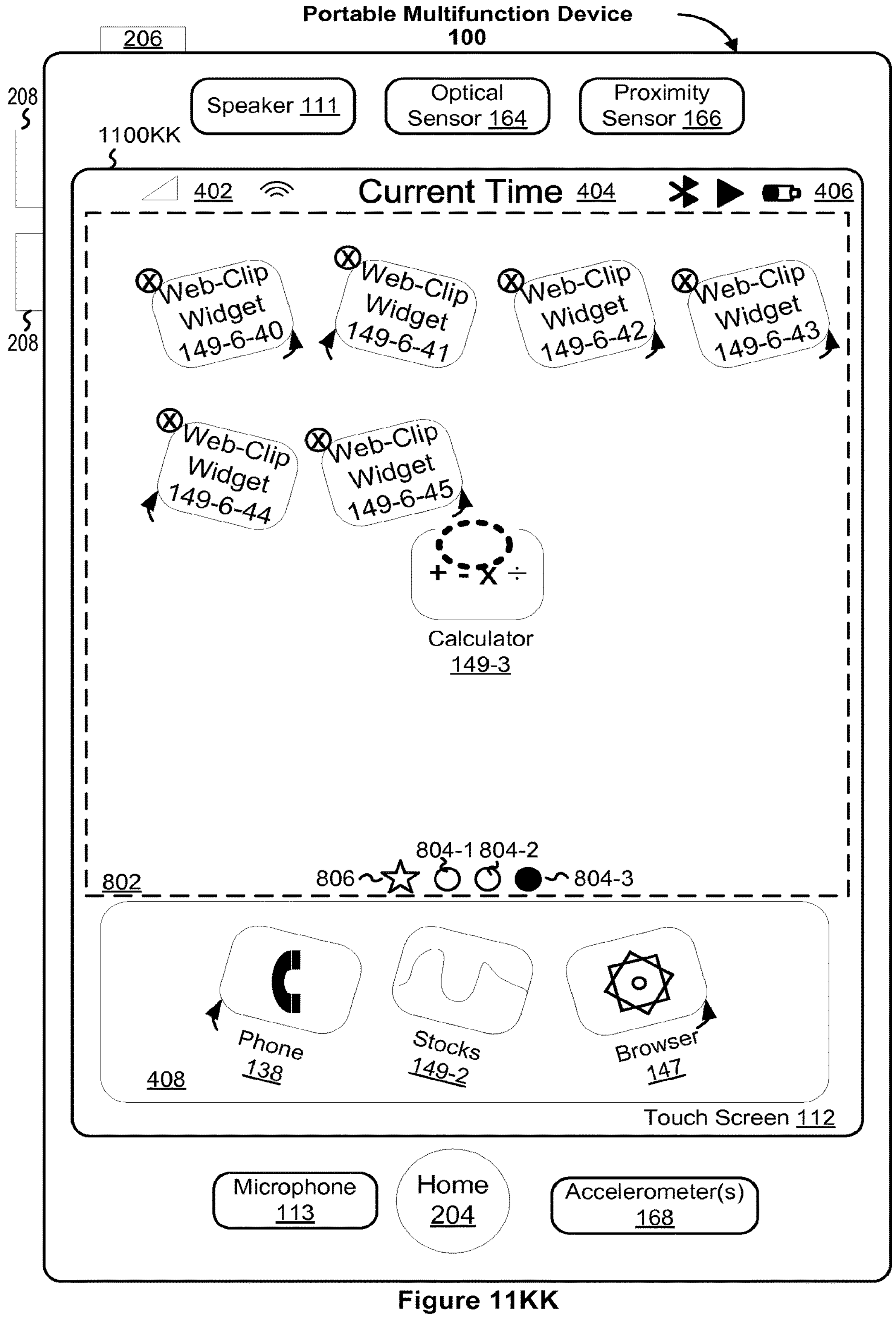
Figure 11L:
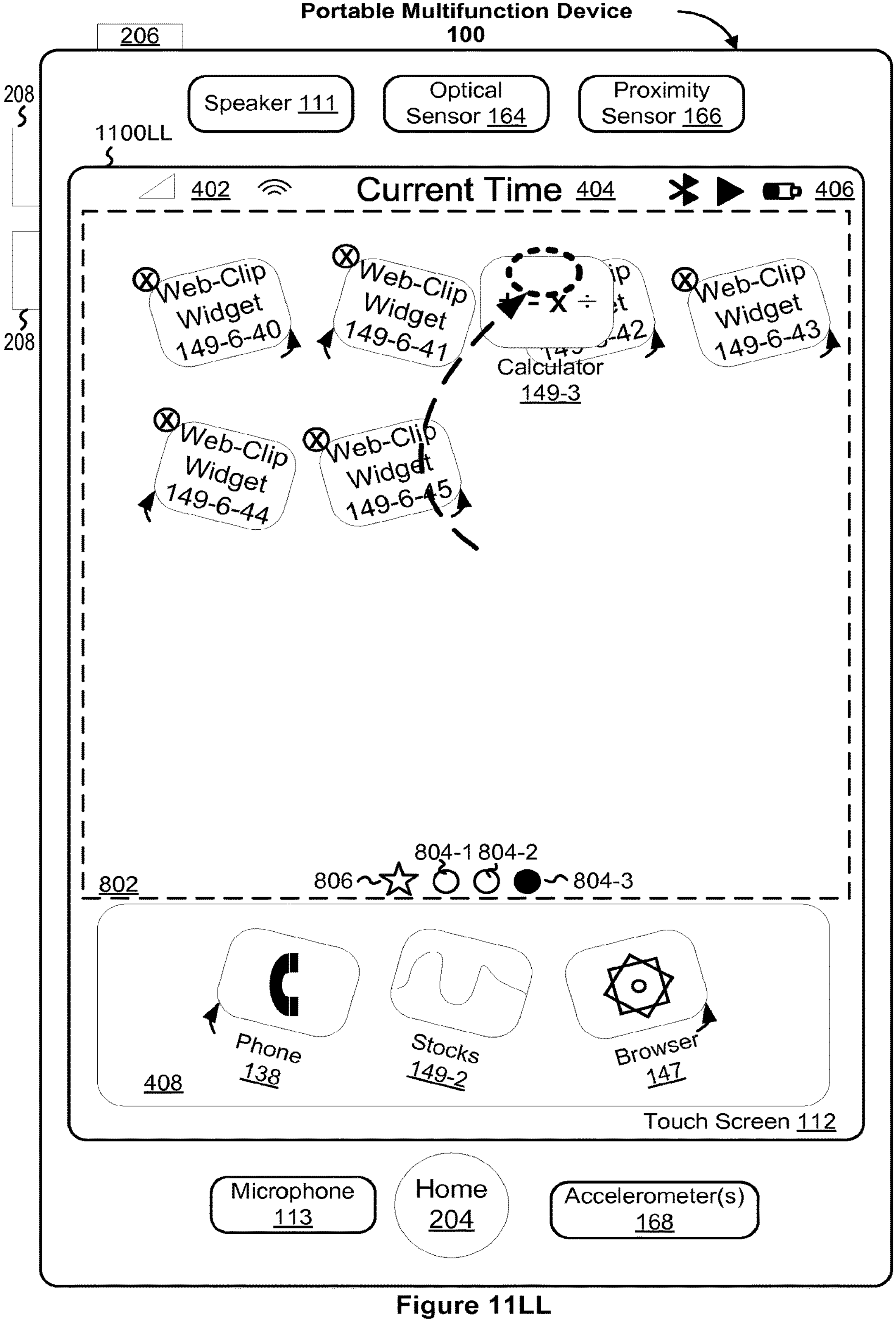
Figure 11M:
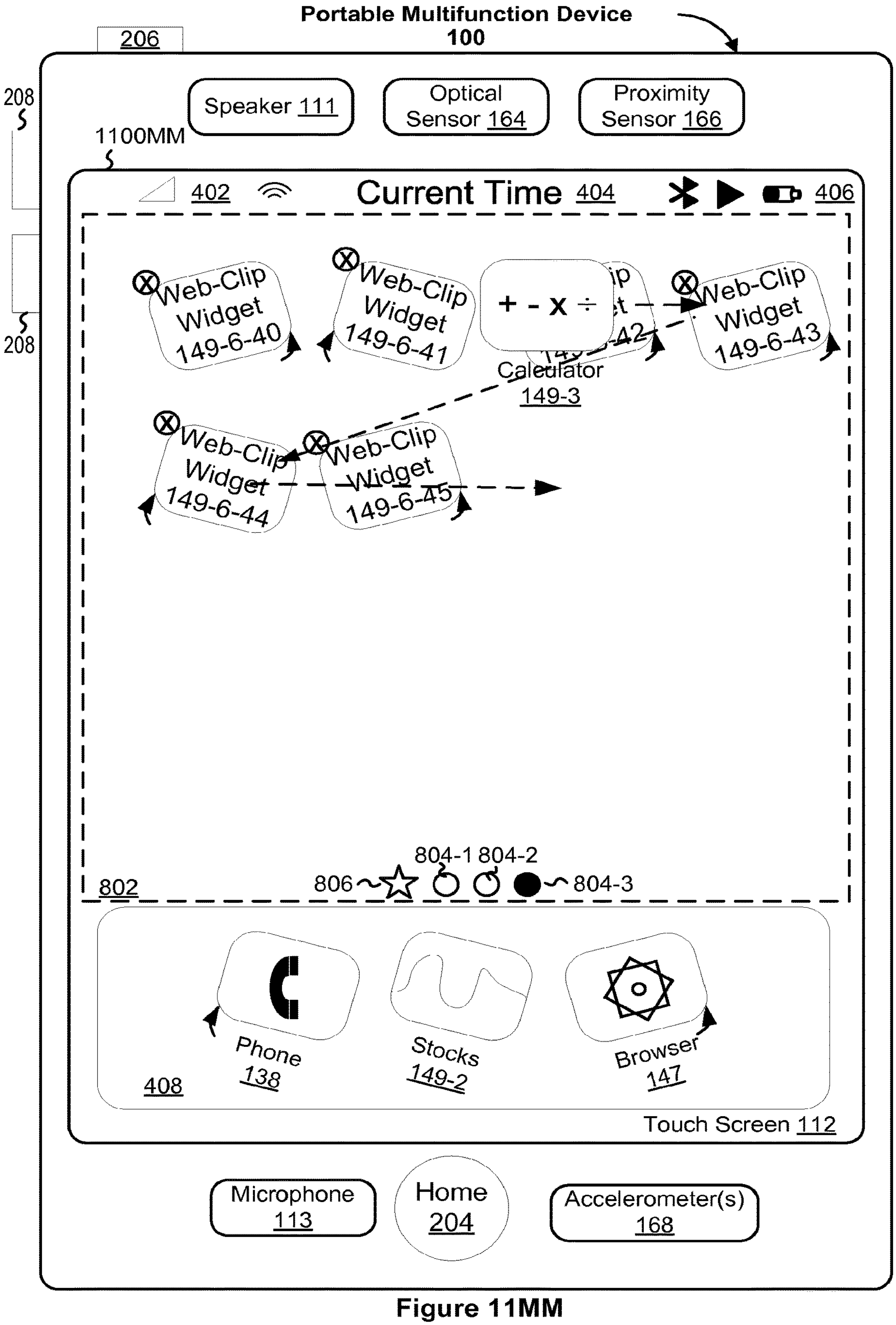
Figure 11N:
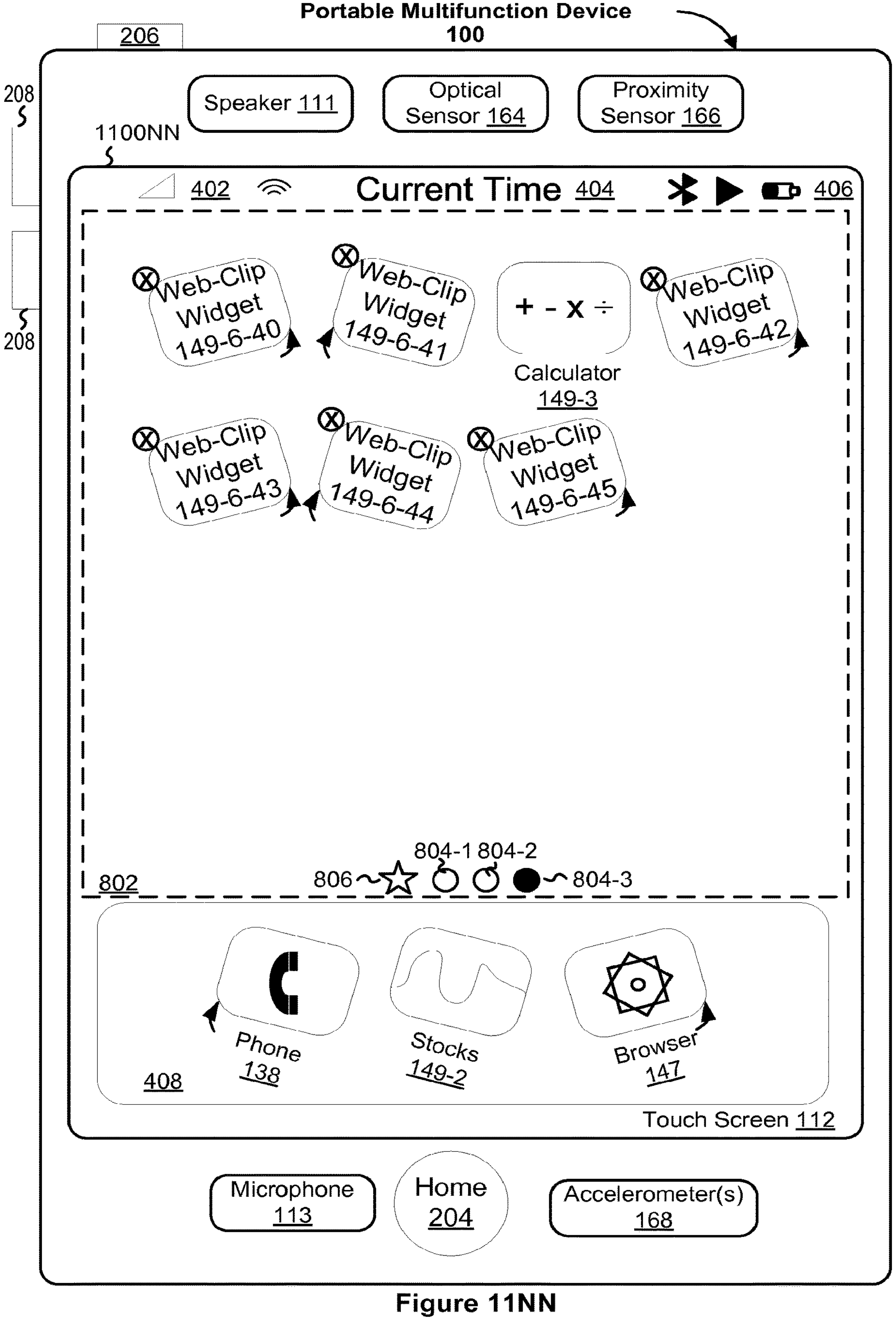
Figure 11O:
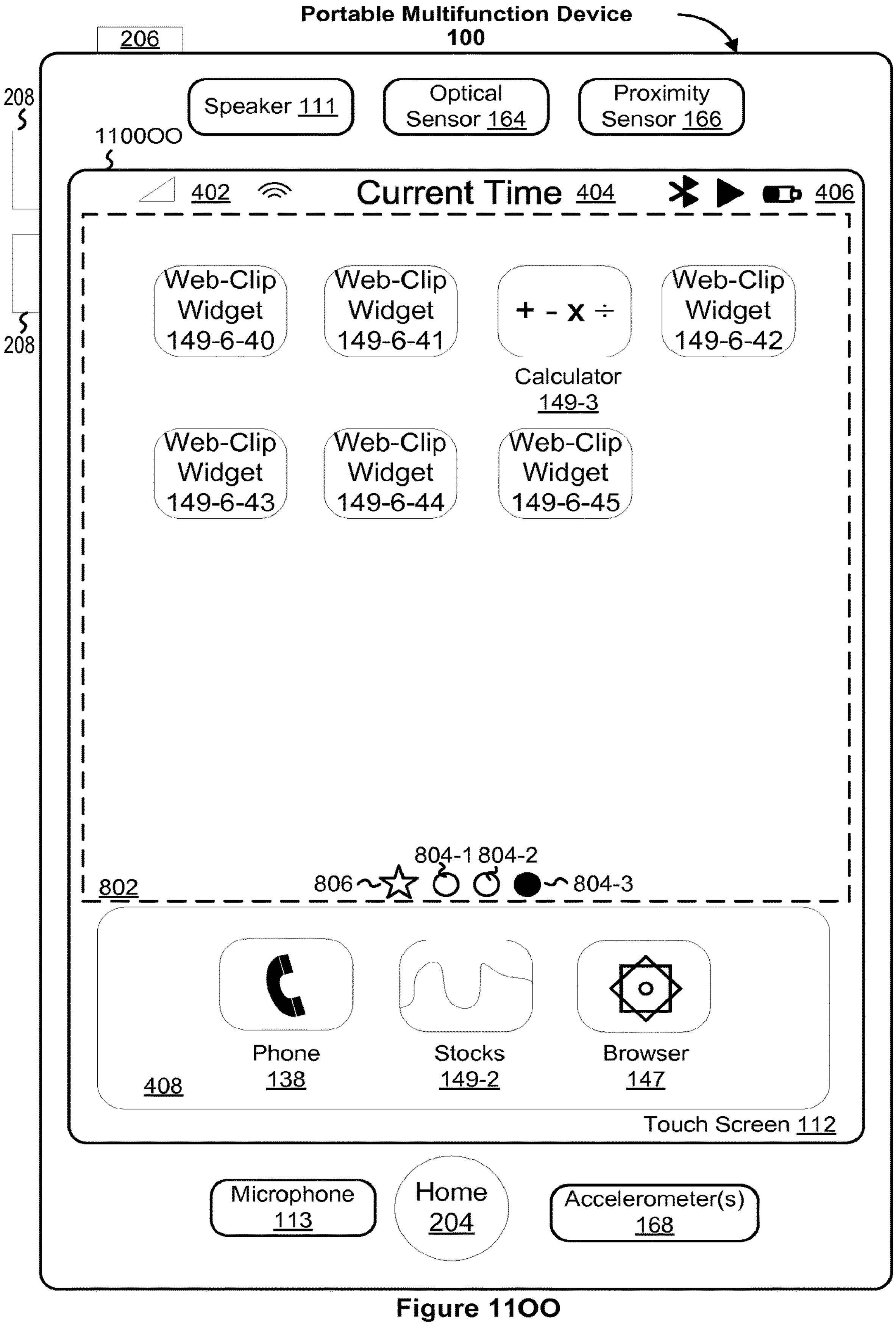
Figure 12A:
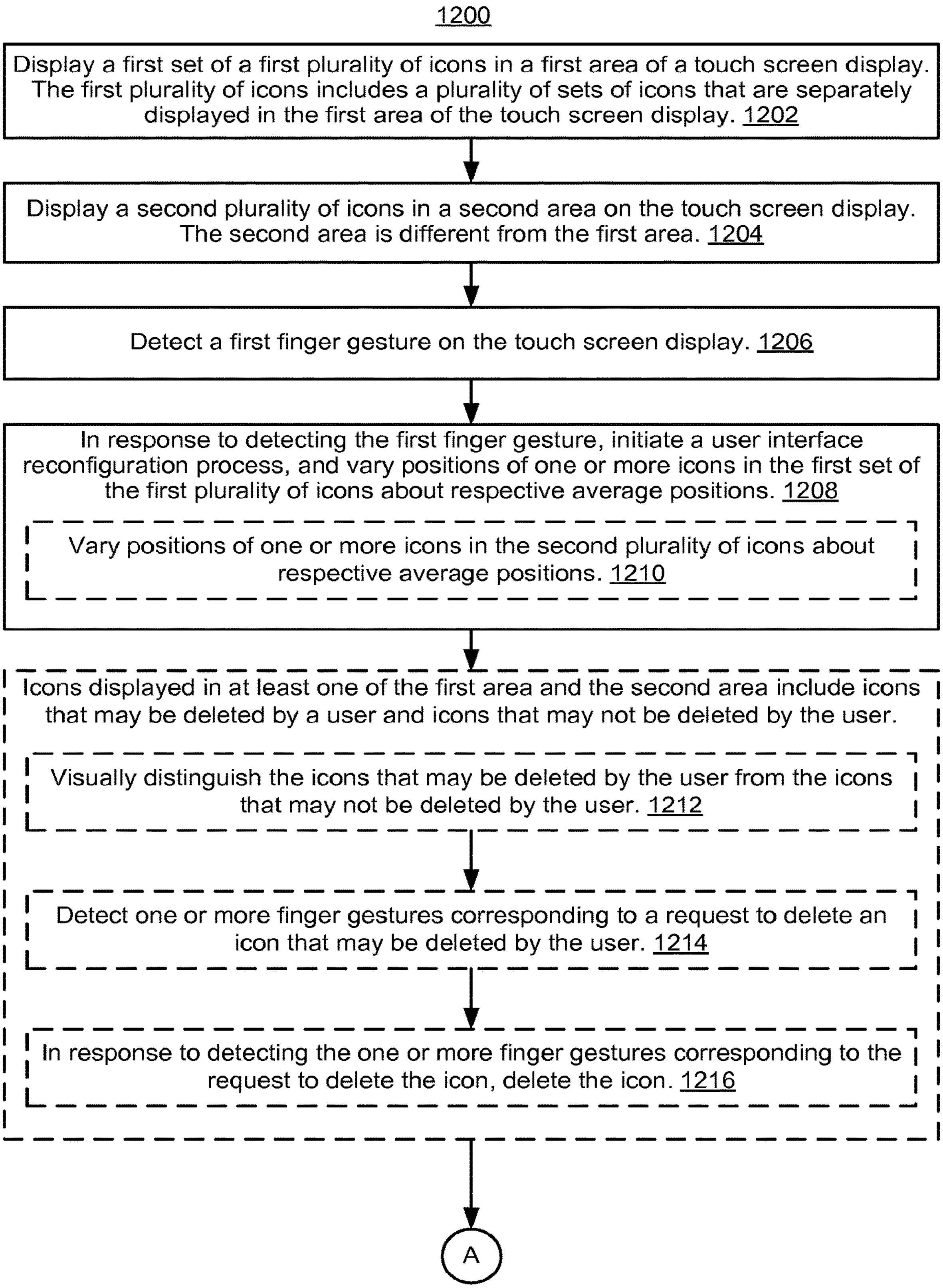
Figure 12B:
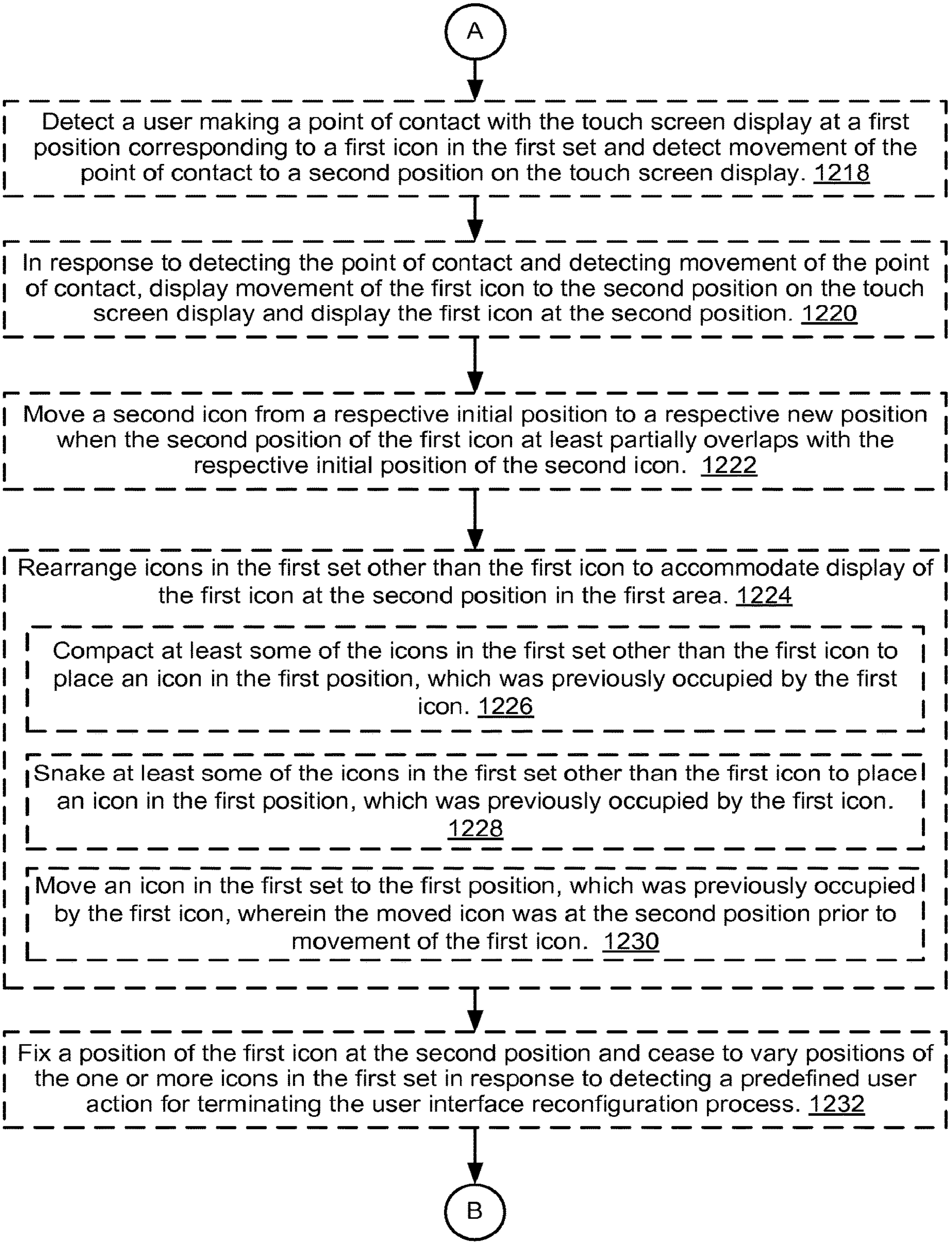
Figure 12C:
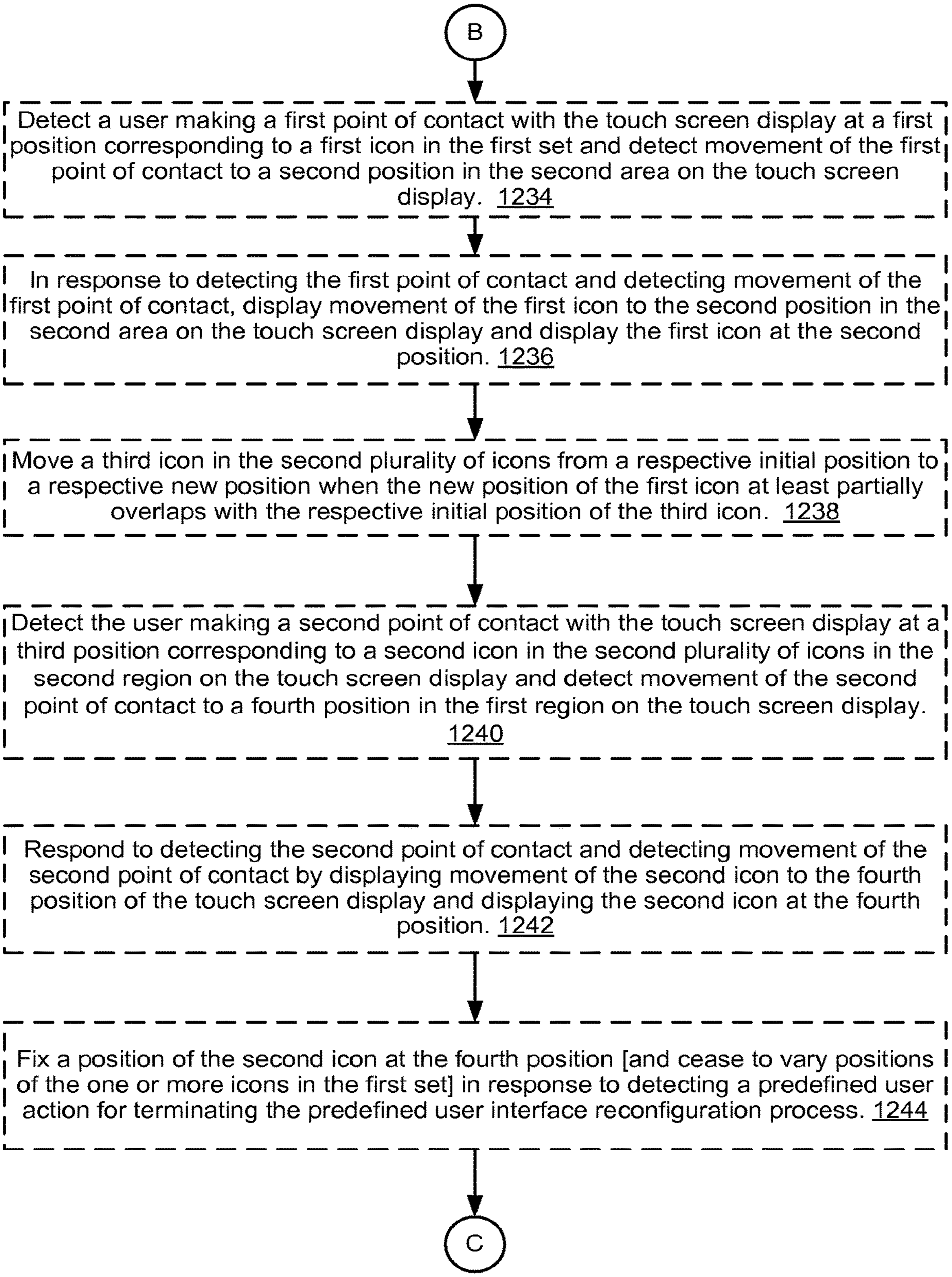
Figure 12D:
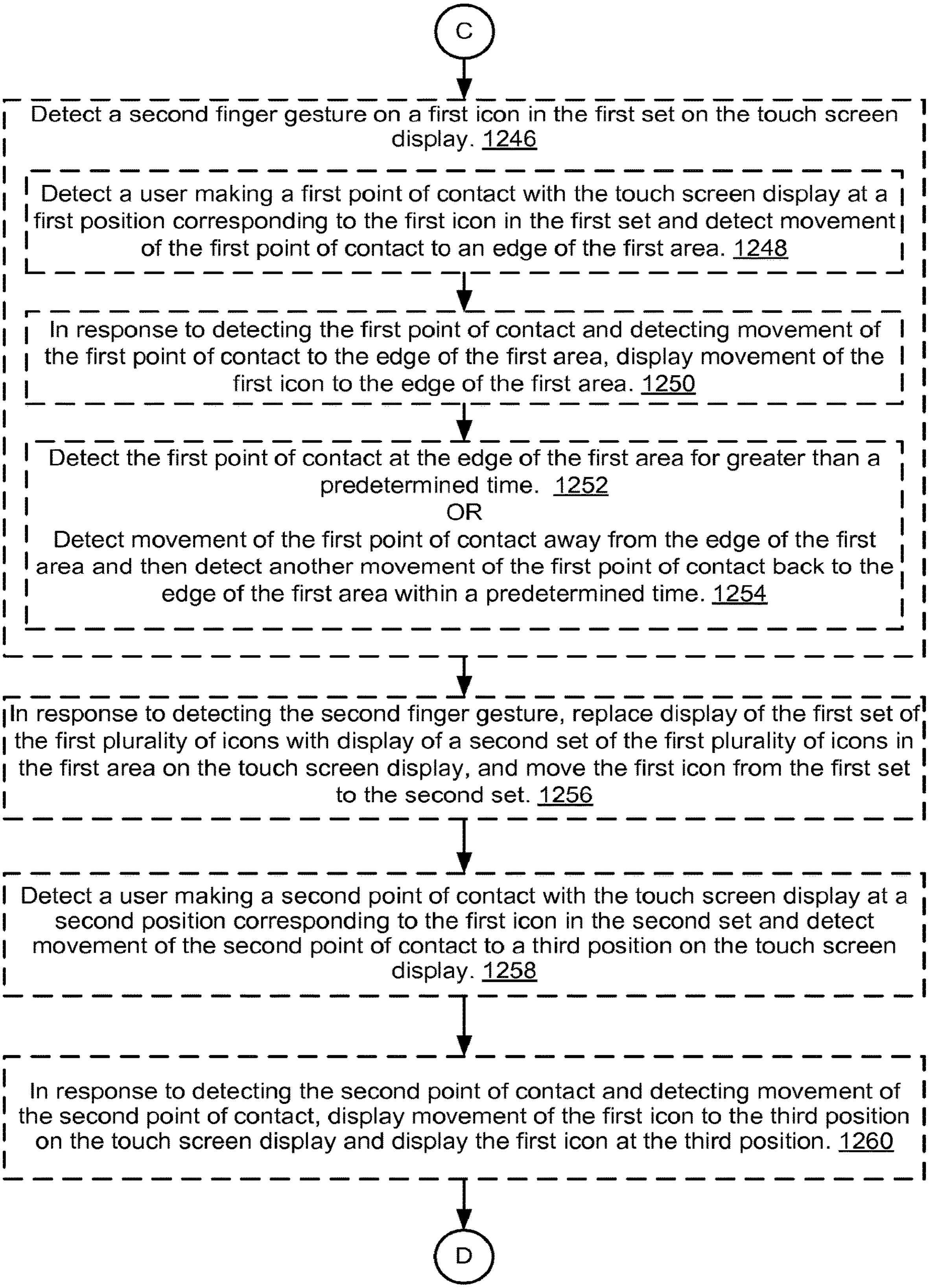
Figure 12E:
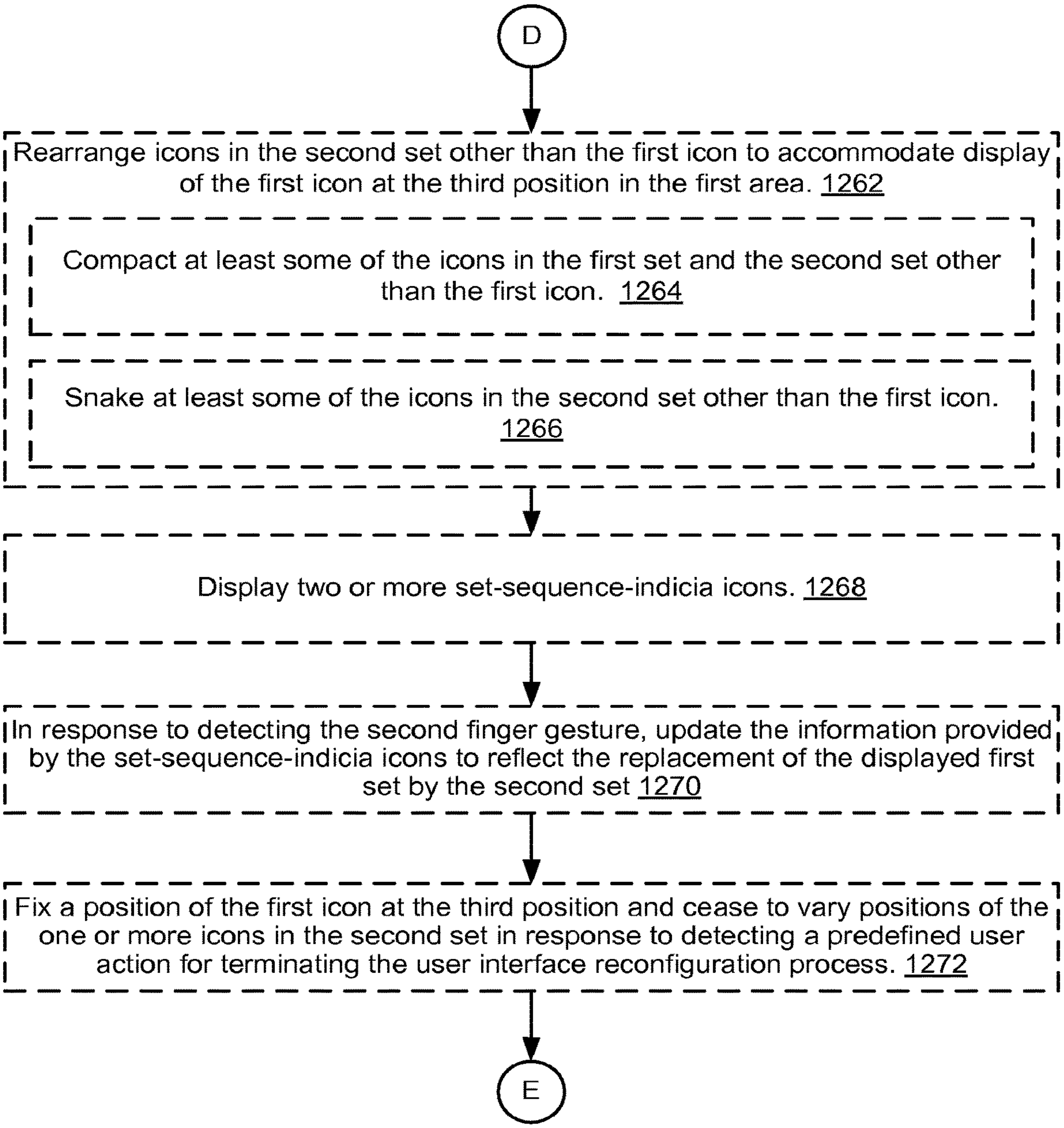

In some embodiments, detecting the second finger gesture includes: detecting (1248) a user making a first point of contact (e.g., contact 1124, FIG. 11X) with the touch screen display at a first position corresponding to the first icon in the first set and detecting movement of the first point of contact to an edge of the first area; and in response to detecting the first point of contact and detecting movement of the first point of contact to the edge of the first area, displaying (1250) movement of the first icon to the edge of the first area (e.g., as shown in FIG. 11X for calculator icon 149-3). In some embodiments, the edge of first area coincides with an edge of the touch screen display. In some embodiments, the plurality of sets form a sequence of sets and going to the right edge results in display of the next set in the sequence of sets and going to the left edge results in display of the previous set in the sequence of sets. In some embodiments, the plurality of sets form a sequence of sets and going to the bottom edge results in display of the next set in the sequence of sets and going to the top edge results in display of the previous set in the sequence of sets.

In some embodiments, detecting the second finger gesture includes detecting (1252) the first point of contact at the edge of the first area for greater than a predetermined time (e.g., 0.2-1.0 seconds).

In some embodiments, detecting the second finger gesture includes detecting (1254) movement of the first point of contact away from the edge of the first area and then detecting another movement of the first point of contact back to the edge of the first area (e.g., as shown in FIG. 1111 for calculator icon 149-3) within a predetermined time (e.g., 0.2-0.5 seconds).

In some embodiments, the computing device detects (1258) a user making a second point of contact with the touch screen display at a second position corresponding to the first icon in the second set and detects movement of the second point of contact to a third position on the touch screen display. In response to detecting the second point of contact and detecting movement of the second point of contact, the computing device displays (1260) movement of the first icon to the third position on the touch screen display and displays the first icon at the third position (e.g., as shown in FIGS. 11Z, 11AA, and 11CC-11EE for calculator icon 149-3). In some embodiments, the third position is in the first area. In some embodiments, the first icon is the only icon in the second set (e.g., as shown in FIG. 11BB for calculator icon 149-3). In other words, the first icon is added to an otherwise empty first area. In some embodiments, the plurality of sets of icons that are separately displayed in the first area comprise a sequence of sets and, during the reconfiguration process, an empty set is added after the last set of icons in the sequence of sets.

In some embodiments, positions of one or more icons in the second set of the first plurality of icons vary about respective average positions (e.g., as shown in FIGS. 11Z and 11AA). In some embodiments, positions of all of the icons in the second set vary about respective average positions. In some embodiments, positions of all of the icons in the second set except the first icon vary about respective average positions.

In some embodiments, the third position is in the first area and the computing device rearranges (1262) icons in the second set other than the first icon to accommodate display of the first icon at the third position in the first area (e.g., as shown in FIGS. 11CC and 11DD). In some embodiments, rearranging icons in the second set other than the first icon includes compacting (1264) at least some of the icons in the first set and the second set other than the first icon (e.g., as shown in FIGS. 11FF and 11GG, where icon 149-6-30 is compacted into the first set). In some embodiments, rearranging icons in the second set other than the first icon includes snaking (1266) at least some of the icons in the second set other than the first icon (e.g., as shown in FIGS. 11CC and 11DD).

In some embodiments, the plurality of sets of icons includes a number of sets of icons that are configured to be separately displayed as a sequence of sets of icons in the first area of the touch screen display. The computing device displays (1268) two or more set-sequence-indicia icons (e.g., icons 804-1, 804-2, and 804-3 in FIGS. 11H-11OO, which operate in the same manner as the corresponding icons in FIGS. 8A-8D, described above). The set-sequence-indicia icons provide information about the number of sets of icons in the plurality of sets of icons and a position of a displayed set of icons in the sequence of sets of icons. In response to detecting the second finger gesture, the computing device updates (1270) the information provided by the set-sequence-indicia icons to reflect the replacement of the displayed first set by the second set (e.g., icon 804-1 is darkened in FIG. 11X when the first set is displayed and icon 804-2 is darkened in FIG. 11Z when the second set is displayed).

In some embodiments, the computing device fixes (1272) a position of the first icon at the third position and ceases to vary positions of the one or more icons in the second set in response to detecting a predefined user action for terminating the user interface reconfiguration process (e.g., as shown in FIGS. 11EE and 11HH). In some embodiments, the predefined user action is activation of a physical button (e.g., menu button 204, FIG. 11EE or 11HH) or a soft button (e.g., a done icon, not shown).

In some embodiments, the computing device detects (1274) a second finger gesture on a first icon in the first set on the touch screen display. In response to detecting the second finger gesture, the computing device replaces (1276) display of the first set of the first plurality of icons with display of a second set of the first plurality of icons in the first area on the touch screen display, and moves the first icon from the first set to the second set (e.g., as shown in FIGS. 11X-11Z, where the first set of icons (141, 148, 144, 143, 155, 149-2, 154, 149-1, 149-4, 149-3, 153, 412, 152, 149-6-20, 149-6-21, and 149-6-22) is replaced by the second set of icons (149-6-30, 149-6-31, 149-6-32, 149-6-33, 149-6-34 and 149-6-35) and the calculator icon 149-3 is moved from the first set to the second set). The computing device detects (1278) a third finger gesture on the first icon in the second set on the touch screen display. In response to detecting the third finger gesture, the computing device replaces (1280) display of the second set of the first plurality of icons with display of a third set of the first plurality of icons in the first area on the touch screen display, and moves the first icon from the second set to the third set (e.g., as shown in FIGS. 11II-KK for calculator icon 149-3). The computing device detects (1282) a user making a second point of contact with the touch screen display at a second position corresponding to the first icon in the third set and detects movement of the second point of contact to a third position on the touch screen display. In response to detecting the second point of contact and detecting movement of the second point of contact, the computing device displays (1284) movement of the first icon to the third position on the touch screen display and displays the first icon at the third position (e.g., as shown in FIGS. 11LL-11NN for calculator icon 149-3). In some embodiments, the third position is in the first area. In some embodiments, the first icon is the only icon in the third set. In other words, the first icon is added to an otherwise empty first area. In some embodiments, positions of one or more icons in the third set of the first plurality of icons vary about respective average positions (e.g., as shown in FIG. 11NN). In some embodiments, positions of all of the icons in the third set vary about respective average positions. In some embodiments, positions of all of the icons in the third set except the first icon vary about respective average positions.

In some embodiments, the computing device fixes (1286) a position of the first icon at the third position and ceases to vary positions of the one or more icons in the third set in response to detecting a predefined user action for terminating the user interface reconfiguration process (e.g., as shown in FIG. 11OO). In some embodiments, the predefined user action is activation of a physical button (e.g., menu button 204, FIG. 11OO) or a soft button (e.g., a done icon, not shown).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computing device, comprising:
a display device;
one or more input devices;
one or more processors; and
memory storing one or more programs configured to be executed by the one or more processors, the one or more programs including instructions for:
displaying, via the display device, a first set of icons in a first region, wherein the first set of icons includes a respective icon;
while displaying the first set of icons, detecting, via the one or more input devices, a first gesture directed to the respective icon that includes movement of the respective icon to an edge of the first region; and
in response to detecting the first gesture:
ceasing display of the first set of icons in the first region; and
displaying, at a location corresponding to the first region, a respective user interface region that does not include other icons, wherein the respective icon is added to the respective user interface region.

2. The computing device of claim 1, wherein the one or more programs further include instructions for:
while displaying the first set of icons in the first region and prior to detecting the first gesture, entering a reconfiguration mode in response to detecting, via the one or more input devices, an input directed to one of the icons in the first set of icons.

3. The computing device of claim 2, wherein the input directed to one of the icons in the first set of icons has a duration greater than a threshold time.

4. The computing device of claim 2, wherein the one or more programs further include instructions for:

while in the reconfiguration mode, displaying, via the display device, an indication that the reconfiguration mode has been entered.

5. The computing device of claim 1, wherein the first set of icons in the first region are in a sequence of sets of icons, and wherein the respective icon added to the respective user interface region is added to the sequence of sets of icons.

6. The computing device of claim 1, wherein the one or more programs further include instructions for:

in response to detecting the first gesture, moving the respective icon from the first set of icons in the first region to the respective user interface region.

7. The computing device of claim 1, wherein the one or more programs further include instructions for:

prior to displaying the first set of icons in the first region, displaying, via the display device, a second set of icons in the first region;

detecting, via the one or more input devices, a second gesture corresponding to a request to display the first set of icons in the first region; and in response to detecting the second gesture:

ceasing display of the second set of icons; and displaying the first set of icons in the first region.

8. The computing device of claim 1, wherein the one or more programs further include instructions for:

concurrently displaying, via the display device, a third set of icons with the first set of icons, wherein the third set of icons are displayed in a second region that is different from the first region; and after ceasing display of the first set of icons and displaying the respective user interface region, concurrently displaying the third set of icons with the respective user interface region, wherein the third set of icons are maintained in the second region.

9. The computing device of claim 1, wherein ceasing display of the first set of icons in the first region and displaying the respective user interface region comprises an animation that moves the first set of icons out of the first region and the respective user interface into the first region.

10. The computing device of claim 1, wherein the first set of icons in the first region and the respective icon added to the respective user interface region are in a sequence of sets of icons, and wherein the one or more programs further include instructions for:

displaying, via the display device, two or more set-sequence-indicia icons, wherein the set-sequence-indicia icons provide information about a quantity of sets of icons in the sequence of sets of icons and a position of a displayed set of icons in the sequence of sets of icons; and in response to detecting the first gesture, updating the information provided by the set-sequence-indicia icons to reflect the ceasing of display of the first set of icons in the first region and the displaying of the respective user interface region.

11. A non-transitory computer-readable storage medium storing one or more programs configured to be executed by one or more processors of a computing device with a display device and one or more input devices, the one or more programs including instructions for:

displaying, via the display device, a first set of icons in a first region, wherein the first set of icons includes a respective icon;

while displaying the first set of icons, detecting, via the one or more input devices, a first gesture directed to the respective icon that includes movement of the respective icon to an edge of the first region; and in response to detecting the first gesture:

ceasing display of the first set of icons in the first region; and displaying, at a location corresponding to the first region, a respective user interface region that does not include other icons, wherein the respective icon is added to the respective user interface region.

12. The non-transitory computer-readable storage medium of claim 11, wherein the one or more programs further include instructions for:

while displaying the first set of icons in the first region and prior to detecting the first gesture, entering a reconfiguration mode in response to detecting, via the one or more input devices, an input directed to one of the icons in the first set of icons.

13. The non-transitory computer-readable storage medium of claim 12, wherein the input directed to one of the icons in the first set of icons has a duration greater than a threshold time.

14. The non-transitory computer-readable storage medium of claim 12, wherein the one or more programs further include instructions for:

while in the reconfiguration mode, displaying, via the display device, an indication that the reconfiguration mode has been entered.

15. The non-transitory computer-readable storage medium of claim 11, wherein the first set of icons in the first region are in a sequence of sets of icons, and wherein the respective icon added to the respective user interface region is added to the sequence of sets of icons.

16. The non-transitory computer-readable storage medium of claim 11, wherein the one or more programs further include instructions for:

in response to detecting the first gesture, moving the respective icon from the first set of icons in the first region to the respective user interface region.

17. The non-transitory computer-readable storage medium of claim 11, wherein the one or more programs further include instructions for:

concurrently displaying, via the display device, a third set of icons with the first set of icons, wherein the third set of icons are displayed in a second region that is different from the first region; and after ceasing display of the first set of icons and displaying the respective user interface region, concurrently displaying the third set of icons with the respective user interface region, wherein the third set of icons are maintained in the second region.

18. The non-transitory computer-readable storage medium of claim 11, wherein the first set of icons in the first region and the respective icon added to the respective user interface region are in a sequence of sets of icons, and wherein the one or more programs further include instructions for:

displaying, via the display device, two or more set-sequence-indicia icons, wherein the set-sequence-indicia icons provide information about a quantity of sets of icons in the sequence of sets of icons and a position of a displayed set of icons in the sequence of sets of icons; and in response to detecting the first gesture, updating the information provided by the set-sequence-indicia icons to reflect the ceasing of display of the first set of icons in the first region and the displaying of the respective user interface region.

19. A method comprising:

at a computing device with a display device and one or more input devices:

displaying, via the display device, a first set of icons in a first region, wherein the first set of icons includes a respective icon;

while displaying the first set of icons, detecting, via the one or more input devices, a first gesture directed to the respective icon that includes movement of the respective icon to an edge of the first region; and in response to detecting the first gesture:

ceasing display of the first set of icons in the first region; and displaying, at a location corresponding to the first region, a respective user interface region that does not include other icons, wherein the respective icon is added to the respective user interface region.

20. The method of claim 19, further comprising:

while displaying the first set of icons in the first region and prior to detecting the first gesture, entering a reconfiguration mode in response to detecting, via the one or more input devices, an input directed to one of the icons in the first set of icons.

21. The method of claim 20, wherein the input directed to one of the icons in the first set of icons has a duration greater than a threshold time.

22. The method of claim 20, further comprising:

while in the reconfiguration mode, displaying, via the display device, an indication that the reconfiguration mode has been entered.

23. The method of claim 19, wherein the first set of icons in the first region are in a sequence of sets of icons, and wherein the respective icon added to the respective user interface region is added to the sequence of sets of icons.

24. The method of claim 19, wherein the one or more programs further include instructions for:

in response to detecting the first gesture, moving the respective icon from the first set of icons in the first region to the respective user interface region.

25. The method of claim 19, further comprising:

concurrently displaying, via the display device, a third set of icons with the first set of icons, wherein the third set of icons are displayed in a second region that is different from the first region; and after ceasing display of the first set of icons and displaying the respective user interface region, concurrently displaying the third set of icons with the respective user interface region, wherein the third set of icons are maintained in the second region.

26. The method of claim 19, wherein the first set of icons in the first region and the respective icon added to the respective user interface region are in a sequence of sets of icons, and wherein the method further comprises:

displaying, via the display device, two or more set-sequence-indicia icons, wherein the set-sequence-indicia icons provide information about a quantity of sets of icons in the sequence of sets of icons and a position of a displayed set of icons in the sequence of sets of icons; and in response to detecting the first gesture, updating the information provided by the set-sequence-indicia icons to reflect the ceasing of display of the first set of icons in the first region and the displaying of the respective user interface region.

* * * * *